(12) United States Patent
Simpson

(10) Patent No.: US 12,579,588 B2
(45) Date of Patent: Mar. 17, 2026

(54) METHOD AND SYSTEM UTILIZING ONE OR MORE VIRTUAL POWER PLANT CAPACITY UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 1091 days.

(21) Appl. No.: 17/373,679

(22) Filed: Jul. 12, 2021

(65) Prior Publication Data

US 2022/0004307 A1 Jan. 6, 2022

Related U.S. Application Data

(63) Continuation-in-part of application No. 17/358,429, filed on Jun. 25, 2021, now Pat. No. 12,152,894, and
(Continued)

(51) Int. Cl.
*G06Q 50/06* (2024.01)
*G06F 3/01* (2006.01)
(Continued)

(52) U.S. Cl.
CPC ............. *G06Q 50/06* (2013.01); *G06F 3/011* (2013.01); *G06Q 30/08* (2013.01); *G06Q 40/04* (2013.01)

(58) Field of Classification Search
CPC ........ G06Q 50/06; G06Q 30/08; G06Q 40/04; G06F 3/011
(Continued)

(56) References Cited

U.S. PATENT DOCUMENTS

| D100,137 S | 6/1936 | Villanueva |
| D209,710 S | 12/1967 | Bruce |
| (Continued) | | |

FOREIGN PATENT DOCUMENTS

| CN | 107341968 A | 11/2017 |
| GB | 2539556 A | 12/2016 |
| (Continued) | | |

OTHER PUBLICATIONS

"Virtual Power Plants" Published by Open access Journal (Year: 2012).*
(Continued)

*Primary Examiner* — Zeina Elchanti
(74) *Attorney, Agent, or Firm* — Pramudji Law Group PLLC; Ari Pramudji

(57) ABSTRACT

Various implementations directed to price time priority queue for virtual power plant and connected grid aggregation are provided. In one implementation, a method may include receiving origin location data and destination location data. The method may also include generating nodal power networks based on the optimized origin location data and the destination location data. The method may further include determining virtual power plant hubs along the transmission route and network, where the virtual hubs include a first virtual hub based on the origin location data and a second virtual hub based on the destination location data. The method may additionally include receiving power device data for the geolocation exchange units. In addition, the method may include receiving market depth data for a geolocation exchange for the geolocation exchange units based on the virtual power plant nodal sequences.

20 Claims, 71 Drawing Sheets

Related U.S. Application Data a continuation-in-part of application No. 17/349,829, filed on Jun. 16, 2021, now Pat. No. 12,260,456, and a continuation-in-part of application No. 17/324,051, filed on May 18, 2021, now Pat. No. 12,354,033, and a continuation-in-part of application No. 17/082,254, filed on Oct. 28, 2020, now Pat. No. 12,361,486, and a continuation-in-part of application No. 17/069,597, filed on Oct. 13, 2020, now Pat. No. 12,346,987, and a continuation-in-part of application No. 16/666,264, filed on Oct. 28, 2019, now Pat. No. 11,500,526, and a continuation-in-part of application No. 16/589,229, filed on Oct. 1, 2019, now abandoned, and a continuation-in-part of application No. 16/556,838, filed on Aug. 30, 2019, now Pat. No. 11,555,709, and a continuation-in-part of application No. 16/397,685, filed on Apr. 29, 2019, now Pat. No. 12,154,183, and a continuation-in-part of application No. 16/359,841, filed on Mar. 20, 2019, now Pat. No. 12,141,885, and a continuation-in-part of application No. 16/357,241, filed on Mar. 18, 2019, now Pat. No. 12,165,223, and a continuation-in-part of application No. 16/274,490, filed on Feb. 13, 2019, now Pat. No. 11,215,466, which is a continuation-in-part of application No. 16/258,658, filed on Jan. 27, 2019, now Pat. No. 11,035,682, and a continuation-in-part of application No. 16/257,032, filed on Jan. 24, 2019, now abandoned, and a continuation-in-part of application No. 16/242,981, filed on Jan. 8, 2019, now abandoned, and a continuation-in-part of application No. 16/242, 967, filed on Jan. 8, 2019, now Pat. No. 12,001,999, and a continuation-in-part of application No. 16/239, 485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, now Pat. No. 12,124,976, said application No. 16/666,264 is a continuation of application No. 15/406,374, filed on Jan. 13, 2017, now Pat. No. 10,460,520, and a continuation-in-part of application No. 15/266,326, filed on Sep. 15, 2016, now Pat. No. 11,138,827.

(60) Provisional application No. 63/052,159, filed on Jul. 15, 2020, provisional application No. 63/051,373, filed on Jul. 13, 2020, provisional application No. 63/044,997, filed on Jun. 26, 2020, provisional application No. 63/039,918, filed on Jun. 16, 2020, provisional application No. 63/027,344, filed on May 19, 2020, provisional application No. 62/927,081, filed on Oct. 28, 2019, provisional application No. 62/914,427, filed on Oct. 12, 2019.

(51) Int. Cl.
　　G06Q 30/08　　(2012.01)
　　G06Q 40/04　　(2012.01)

(58) Field of Classification Search
　　USPC ...................................................... 705/335
　　See application file for complete search history.

(56)　　References Cited

U.S. PATENT DOCUMENTS

| | | | |
|---|---|---|---|
| 4,476,954 | A | 10/1984 | Johnson et al. |
| D318,073 | S | 7/1991 | Jang |
| 5,249,259 | A | 9/1993 | Harvey |
| 5,412,560 | A | 5/1995 | Dennison |
| 5,604,676 | A | 2/1997 | Penzias |
| 5,726,885 | A | 3/1998 | Klein et al. |
| 5,751,245 | A | 5/1998 | Janky et al. |
| 5,948,040 | A | 9/1999 | DeLorme et al. |
| 5,973,619 | A | 10/1999 | Paredes |
| 6,175,831 | B1 | 1/2001 | Weinreich et al. |
| 6,240,396 | B1 | 5/2001 | Walker et al. |
| 6,285,999 | B1 | 9/2001 | Page |
| D453,945 | S | 2/2002 | Shan |
| 6,356,838 | B1 | 3/2002 | Paul |
| 6,400,996 | B1 | 6/2002 | Hoffberg |
| D460,952 | S | 7/2002 | Kataoka |
| 6,421,606 | B1 | 7/2002 | Asai et al. |
| 6,434,530 | B1 | 8/2002 | Sloane et al. |
| D468,738 | S | 1/2003 | Lin |
| D469,089 | S | 1/2003 | Lin |
| 6,609,103 | B1 | 8/2003 | Kolls |
| 6,618,062 | B1 | 9/2003 | Brown et al. |
| 6,646,659 | B1 | 11/2003 | Brown et al. |
| 6,663,564 | B2 | 12/2003 | Miller-Kovach et al. |
| 6,708,879 | B2 | 3/2004 | Hunt |
| 6,850,907 | B2 | 2/2005 | Lutnick et al. |
| 7,010,472 | B1 | 3/2006 | Vasey-Glandon et al. |
| 7,090,638 | B2 | 8/2006 | Vidgen |
| 7,373,320 | B1 | 5/2008 | Mcdonough |
| D590,396 | S | 4/2009 | Lo |
| 7,584,123 | B1 | 9/2009 | Karonis et al. |
| 7,634,442 | B2 | 12/2009 | Alvarado et al. |
| 7,680,690 | B1 | 3/2010 | Catalano |
| 7,680,770 | B1 | 3/2010 | Buyukkokten et al. |
| 7,711,629 | B2 | 5/2010 | Laurent et al. |
| 7,747,739 | B2 | 6/2010 | Bridges et al. |
| 7,756,633 | B2 | 7/2010 | Huang et al. |
| 7,788,207 | B2 | 8/2010 | Alcorn et al. |
| D628,171 | S | 11/2010 | Hakopian |
| 7,886,166 | B2 | 2/2011 | Shnekendorf et al. |
| D638,879 | S | 5/2011 | Suto |
| 7,987,110 | B2 | 7/2011 | Cases et al. |
| 8,024,234 | B1 | 9/2011 | Thomas et al. |
| 8,065,191 | B2 | 11/2011 | Senior |
| D650,385 | S | 12/2011 | Chiu |
| 8,121,780 | B2 | 2/2012 | Gerdes et al. |
| 8,249,946 | B2 | 8/2012 | Froseth et al. |
| 8,296,335 | B2 | 10/2012 | Bouve et al. |
| 8,388,451 | B2 | 3/2013 | Auterio et al. |
| 8,570,244 | B2 | 10/2013 | Mukawa |
| 8,762,035 | B2 | 6/2014 | Levine et al. |
| 8,798,593 | B2 | 8/2014 | Brown et al. |
| 8,918,411 | B1 | 12/2014 | Latif et al. |
| 8,920,175 | B2 | 12/2014 | Black et al. |
| 8,930,490 | B2 | 1/2015 | Brown et al. |
| 8,968,099 | B1 | 3/2015 | Hanke et al. |
| 9,011,153 | B2 | 4/2015 | Bennett et al. |
| 9,020,763 | B2 | 4/2015 | Faaborg et al. |
| 9,077,204 | B2 | 7/2015 | More et al. |
| 9,092,826 | B2 | 7/2015 | Deng et al. |
| 9,159,088 | B2 | 10/2015 | Dillahunt et al. |
| 9,213,957 | B2 | 12/2015 | Stefik et al. |
| 9,274,540 | B2 | 3/2016 | Anglin et al. |
| 9,292,764 | B2 | 3/2016 | Yun et al. |
| 9,387,928 | B1 | 7/2016 | Gentry et al. |
| 9,389,090 | B1 | 7/2016 | Levine et al. |
| 9,389,094 | B2 | 7/2016 | Brenner et al. |
| 9,410,963 | B2 | 8/2016 | Martin et al. |
| 9,436,923 | B1 | 9/2016 | Sriram et al. |
| 9,450,817 | B1 | 9/2016 | Bahadur et al. |
| D772,828 | S | 11/2016 | Kusumoto |
| 9,528,972 | B2 | 12/2016 | Minvielle |
| 9,558,515 | B2 | 1/2017 | Babu et al. |
| 9,665,983 | B2 | 5/2017 | Spivack |
| 9,880,577 | B2 | 1/2018 | Dyess et al. |

(56)                References Cited

U.S. PATENT DOCUMENTS

| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,216,367 B1 | 2/2019 | Patel |
| 10,262,289 B2 | 4/2019 | Vaananen |
| 10,395,332 B1 | 8/2019 | Konrardy et al. |
| 10,403,050 B1 | 9/2019 | Beall et al. |
| 10,408,489 B1 | 9/2019 | Trishaun et al. |
| 10,452,978 B2 | 10/2019 | Shazeer et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,832,337 B1 | 11/2020 | Floyd et al. |
| D903,657 S | 12/2020 | Catania |
| D903,658 S | 12/2020 | Catania |
| D903,659 S | 12/2020 | Catania |
| 10,872,381 B1 | 12/2020 | Leise et al. |
| D910,758 S | 2/2021 | Leong |
| 11,035,682 B2 | 6/2021 | Simpson |
| 11,138,661 B2 | 10/2021 | Simpson |
| 11,138,827 B2 | 10/2021 | Simpson |
| 11,157,852 B2 | 10/2021 | Simpson |
| 11,183,080 B2 | 11/2021 | Wolf et al. |
| D938,375 S | 12/2021 | Zhang |
| 11,215,466 B2 | 1/2022 | Simpson |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 | 1/2023 | Simpson |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,704,219 B1 | 7/2023 | Lerner et al. |
| 11,722,500 B2 | 8/2023 | Singh |
| 11,734,618 B2 | 8/2023 | Ogden |
| D1,007,451 S | 12/2023 | Im |
| 12,124,976 B2 | 10/2024 | Simpson et al. |
| 12,165,223 B2 | 12/2024 | Simpson |
| 12,354,033 B2 | 7/2025 | Simpson |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomaian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0254819 A1 | 12/2004 | Halim |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh et al. |
| 2006/0184321 A1 | 8/2006 | Kawakami |
| 2007/0005224 A1 | 1/2007 | Sutardja |
| 2007/0260723 A1 | 11/2007 | Cohen |
| 2008/0033833 A1 | 2/2008 | Senior |
| 2008/0040232 A1 | 2/2008 | Perchthaler |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195428 A1 | 8/2008 | O'Sullivan |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1 | 2/2010 | Bai et al. |
| 2010/0042453 A1 | 2/2010 | Scaramellino et al. |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0208029 A1 | 8/2010 | Marti |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2010/0318373 A1 | 12/2010 | Harris |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Ajarapu et al. |
| 2011/0184784 A1 | 7/2011 | Rudow et al. |
| 2011/0191248 A1 | 8/2011 | Bishop |
| 2011/0202418 A1 | 8/2011 | Kempton et al. |
| 2012/0023032 A1 | 1/2012 | Visdomini |
| 2012/0072925 A1 | 3/2012 | Jenkins et al. |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0130556 A1* | 5/2012 | Marhoefer ............. G05B 15/02 |
| | | 700/291 |
| 2012/0136527 A1 | 5/2012 | McQuade |
| 2012/0158762 A1 | 6/2012 | Iwuchukwu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0035973 A1 | 2/2013 | Desai et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0032034 A1 | 1/2014 | Raptopoulos |
| 2014/0038781 A1 | 2/2014 | Foley |
| 2014/0052500 A1 | 2/2014 | Vallapuzha et al. |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0282586 A1 | 9/2014 | Shear et al. |
| 2014/0310019 A1 | 10/2014 | Blander et al. |
| 2014/0310149 A1 | 10/2014 | Singh |
| 2014/0324633 A1 | 10/2014 | Pollak et al. |
| 2014/0349672 A1 | 11/2014 | Kern et al. |
| 2014/0358431 A1 | 12/2014 | Isert et al. |
| 2015/0006428 A1 | 1/2015 | Miller et al. |

(56) References Cited

U.S. PATENT DOCUMENTS

| | | |
|---|---|---|
| 2015/0016777 A1 | 1/2015 | Abovitz et al. |
| 2015/0058051 A1 | 2/2015 | Movshovich |
| 2015/0097864 A1 | 4/2015 | Alaniz et al. |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1* | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0018969 A1 | 1/2016 | Sundarraman |
| 2016/0026253 A1 | 1/2016 | Bradski et al. |
| 2016/0034305 A1 | 2/2016 | Shear et al. |
| 2016/0041628 A1 | 2/2016 | Verma |
| 2016/0063436 A1 | 3/2016 | Coles |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0221935 A1 | 8/2016 | Jaworska-Maslanka |
| 2016/0224935 A1 | 8/2016 | Burnett |
| 2016/0225115 A1 | 8/2016 | Levy et al. |
| 2016/0253622 A1 | 9/2016 | Sriram et al. |
| 2016/0253662 A1 | 9/2016 | Sriram |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307276 A1 | 10/2016 | Young |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0318325 A1 | 11/2017 | Ortiz |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2017/0373509 A1* | 12/2017 | Betzin ..................... H02J 3/28 |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0088455 A1 | 3/2018 | Cippant |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0165354 A1 | 6/2018 | Mehta et al. |
| 2018/0165364 A1 | 6/2018 | Mehta et al. |
| 2018/0173742 A1 | 6/2018 | Liu et al. |
| 2018/0173800 A1 | 6/2018 | Chang et al. |
| 2018/0188715 A1 | 7/2018 | Cella et al. |
| 2018/0190026 A1 | 7/2018 | Barnett et al. |
| 2018/0209801 A1 | 7/2018 | Stentz |
| 2018/0209803 A1 | 7/2018 | Rakah |
| 2018/0238705 A1 | 8/2018 | O'Herlihy |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0180862 A1 | 6/2019 | Wisser et al. |
| 2019/0186942 A1 | 6/2019 | Rubin |
| 2019/0188450 A1 | 6/2019 | Spivack et al. |
| 2019/0202448 A1 | 7/2019 | Pal et al. |
| 2019/0204110 A1 | 7/2019 | Dubielzyk |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0259008 A1 | 8/2019 | Lindsey |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0318286 A1 | 10/2019 | Simpson |
| 2019/0324989 A1 | 10/2019 | Borochoff et al. |
| 2019/0325541 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0005388 A1 | 1/2020 | Lim et al. |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0184416 A1 | 6/2020 | Javaheri |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |

(56) References Cited

U.S. PATENT DOCUMENTS

| | | | |
|---|---|---|---|
| 2021/0004909 A1 | 1/2021 | Farmer et al. | |
| 2021/0012278 A1 | 1/2021 | Alon et al. | |
| 2021/0041258 A1 | 2/2021 | Simpson | |
| 2021/0042835 A1 | 2/2021 | Simpson | |
| 2021/0065100 A1 | 3/2021 | Hwang | |
| 2021/0158447 A1 | 5/2021 | Simpson | |
| 2021/0166317 A1 | 6/2021 | Simpson | |
| 2021/0248633 A1 | 8/2021 | Simpson | |
| 2021/0318132 A1 | 10/2021 | Simpson | |
| 2021/0326872 A1 | 10/2021 | Robotham | |
| 2021/0379447 A1 | 12/2021 | Lee | |
| 2021/0382924 A1 | 12/2021 | Aaltonen et al. | |
| 2022/0020073 A1 | 1/2022 | Farmer | |
| 2022/0058578 A1 | 2/2022 | Javaheri | |
| 2022/0068081 A1 | 3/2022 | Pariseau | |
| 2022/0100731 A1 | 3/2022 | Tirapu Azpiroz et al. | |
| 2022/0122026 A1 | 4/2022 | Okabe et al. | |
| 2022/0366368 A1 | 11/2022 | Simpson | |
| 2023/0157579 A1 | 5/2023 | Sato | |
| 2023/0377409 A1 | 11/2023 | Rye | |

FOREIGN PATENT DOCUMENTS

| | | | |
|---|---|---|---|
| JP | 2003177034 A | 12/2001 | |
| KR | 20170078094 A1 | 12/2015 | |
| WO | 9508240 A2 | 3/1995 | |
| WO | 2001041084 A2 | 6/2001 | |
| WO | 2015059691 A1 | 4/2015 | |
| WO | 2015161307 A1 | 4/2015 | |
| WO | 2018024844 A1 | 2/2018 | |
| WO | 2019/134005 A1 | 7/2019 | |
| WO | 2019183468 A1 | 9/2019 | |
| WO | 2021/163675 A1 | 8/2021 | |

OTHER PUBLICATIONS

The Wayback Machine, Interest Rate Swaps, https://web.archive.org/web/20171006212154/https://global.pimco.com/en/gbl/resources/education/understanding-interest-rate-swaps, 2016, pp. 1-7.

Freight Derivatives—a Vital Tool For Your Business, https://www.reedsmith.com/-/media/files/perspectives/2007/02/freight-derivatives--a-vital-tool-for-your-business/files/freight-derivatives--a-vital-tool-for-your-business/fileattachment/etcfreightderivativesavitaltoolforyourbusiness.pdf (Year: 2007), Energy, Trade & Commodities, pp. 1-3.

Jiang, Landu, et al., Sun Chase: Energy-Efficient Route Planning for solar-powered Evs, IEEE 37th international conference on distrubuted computing systems, 2017, pp. 1-11.

Directed Graph, https://en.wikipedia.org/wiki/Directed_graph, pp. 1-6, 2022.

About IBM Food Trust, https://www.ibm.com/downloads/cas/E9DBNDJG, pp. 1-17, 2019.

IBM Blockchain Transparent Supply, https://www.ibm.com/downloads/cas/BKQDK0M2, pp. 1-14, Aug. 2020.

Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.

Change the World, https://fortune.com/change-the-world/2019/IBM/, Fortune Media IP Limited, pp. 1-5, 2022.

IBM Food Trust, https://www.constellationr.com/node/17601/vote/application/view/588, Constellation Research Inc., pp. 1-4, 2010-2022.

Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.

Wyzant, https://web.archive.org/web/20190327185429/https://www.wyzant.com/hotitworks/students, Wyzant tutoring, pp. 1-13 , Mar. 27, 2019.

PCT International Search Report and Written Opinion; PCT/US2021/065855; Mar. 2, 20229.

PCT International Search Report and Written Opinion; PCT/US2022/012717; Mar. 3, 20220.

Zhao, et al., Incentives in Ridesharing with Deficit Control, Proceedings of the 13th International Conference on Autonomous Agents and Multiagent Systems (AAMAS 2014), May 5-9, 2014, pp. 1021-1028.

Peters, et al.; Student Support Services for Online Learning Re-Imagined and Re-Invigorated: Then, Now and What's To Come; Contact North | Contact Nord; Sep. 2017.

Soccer ball-shaped drone might be the safest flying robot yet https://mashable.com/2015/12/21/soccer-ball-drone/ ; Dec. 21, 2015.

Fleishman; Use Parking Apps to Find Lots, Garages, Valet, and Meters; Macworld; Jul. 1, 20159.

Borras, et al. Intelligent Tourism Reminder Systems: A Survey; Expert Systems with Applications 41; Elsevier; Jun. 9, 2014.

Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.

Barry, Kieth, App lets drivers auction public parking spaces, Wired, Aug. 11, 2011, pp. 1-4.

Netlingo, https://web.archive.org/web/20170122184857/https://www.netlingo.com/word/electronic-exchange.php,dated Oct. 22, 2017.

Laseter, Tim, "B2B benchmark: The State of Electronic Exchanges", Tech & Innovation, dated Oct. 1, 2001.

Ramasubramanian, Vasant, "Quadrasense: Immersive UAV-based cross-reality environmental sensor networks," phD diss., Massachusetts Institute of Technology, pp. 1-75, 2015.

Freebeat, Smart Exercise Bike; retrieved from internet: https://www.amazon.com/Resistance-Cushioned-Detection-Altorithm-Instructors/dp/BOBZKKZ6B3/?th=1; Mar. 3, 2023; p. 1.

Li, Jundong, et al., "Multi-network Embedding", pp. 1-9, 2018.

Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.

"Node Influence Metric", Wikipedia, Nov. 6, 2020, pp. 1-5.

EP21916571 European Search Report, May 29, 2024, pp. 1-9.

Bortolini, et al.; "Fresh food sustainable distribution: cost, delivery time and carbon footprint three-objective optimization," 2016, pp. 1-12.

Aratani, Lori, "This app wants to reward you for smart commuting choices," The Washington Post, Aug. 18, 2018, pp. 1-3.

Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.

Fulldomepro, VR Aquatic Simulator with a Dome, Pub. Sep. 3, 2018 https://www.youtube.com/watch?v=k_53G5DksjQ, pp. 1-2.

Randomoneh, Dome Screens & Displays, Pub. Oct. 12, 2012, https:// hardforum.com/threads/dome-screens-displays, p. 1.

Borgobello, Bridget, TOOB Personal Dome Screen Revamped, Pub. Jan. 1, 20122, https:// newatlas.com/toob-earth-personal-dome-screen/21082, p. 1.

Asghari, et al., "Price-aware Real-time Ride-sharing at Scale-An Auction-based Approach", Oct. 31, 2016, SIGSPACIAL'16: Proceedings of the 24th ACM SIGSPATIAL International Conference on Advances in Geographic Information Systems, Article No. 3, pp. 1-10.

EP22740218.7 European Search Report, Nov. 12, 2024, pp. 1-29.

EP23153137.7 Exam Report (Communication pursuant to Article 94(3) EPC), Mar. 5, 2025, pp. 1-11.

Chang, et al., "Estimating Real-Time Traffic Carbon Dioxide Emissions Based on Intelligent Transportation System Technologies," IEEE Mar. 1, 2013, vol. 14, pp. 1-11.

Karbassi, et al.; "Vehicle Route Prediction and Time of Arrival Estimation Techniques for Improved Transportation System Management" Published by IEEE; 2003, pp. 511-516.

Valdes, J. J., et al.; (Sep. 2007). Virtual reality high dimensional objective spaces for multi-objective optimization: An improved representation. In 2007 IEEE Congress on Evolutionary Computation (pp. 4191-4198). IEEE., pp. 1-11.

(56) References Cited

OTHER PUBLICATIONS

Valdes, J. J., et al.; (2007). Multi-objective evolutionary optimization for constructing neural networks for virtual reality visual data mining: Application to geophysical prospecting. Neural networks, 20(4), pp. 498-508.

Zhao, et al., Deshpande, P. M., Naughton, J. F., & Shukla, A (Jun. 1998). Simultaneous optimization and evaluation of multiple dimensional queries. In Proceedings of the 1998 Acm Sigmod international conference on Management of data (pp. 271-282).

PCT International Search Report and Written Opinion; PCT/US2020/027543; Jul. 1, 2020.

PCT International Search Report and Written Opinion; PCT/US2020/023223; Jun. 19, 2020.

PCT International Search Report and Written Opinion; PCT/US2020/023729; Jun. 1, 20208.

PCT International Search Report and Written Opinion; PCT/US2020/021546; Jun. 8, 2020.

PCT International Search Report and Written Opinion; PCT/US2020/018012; Apr. 2, 20201.

PCT International Search Report and Written Opinion; PCT/US2020/012208; Mar. 2, 20204.

Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020). https://www.nature.com/articles/s41598-018-33008-7.

Ahmed, et al.; Energy Trading with Electric Vehicles in Smart Campus Parking Lots; Applied Sciences; Sep. 7, 2018.

Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?

Soccer ball-shaped drone might be the safest flying robot yet https://mashable.com/2015/12/21/soccer-ball-drone/ ; 2015.

Pentland; After Decades of Doubt, Deregulation Delivers Lower Electricity Rates; Forbes; Oct. 1, 20133 (retrieved Feb. 29, 2020). https://www.forbes.com/sites/williampentland/2013/10/13/after-decades-of-doubt-deregulation-delivers-lower-electricity-prices/#201d4a9c1d13.

U.S. Appl. No. 60/035,205; filed Jan. 10, 1997; Page (available via USPTO Public PAIR).

EP23153137.7 European Search Report, May 2, 20234, pp. 1-10.

EP20787830.7 European Search Report, May 1, 20232, pp. 1-10.

Zheyong, Bian, et al., "Planning the Ridesharing Route for the First-Mile Service Linking to Railway Passenger Transportation," Joint Rail Conference, Apr. 2017, pp. 1-11.

EP23168879.7 European Search Report, Jul. 5, 2023, pp. 1-13.

Papa, U., & Del Core, G., "Design of Sonar Sensor Model for Safe Landing of an UAV," IEEE Metrology for Aerospace, 2015, pp. 346-350.

PCT International Search Report and Written Opinion; PCT/US2022/027077; Nov. 1, 2022.

Wei, et al. "Impact of aircraft size and seat availability on airlines demand and market share in duopoly markets" Published by Elsevier, 2005, pp. 315-327.

PCT International Search Report and Written Opinion; PCT/US2022/052969; Mar. 2, 20231.

Little, T.D., et al., On the Joys of Missing Data, Journal of pediatric psychology, 2014, pp. 151-162.

Honaker, J., et al., What to do About Missing Values in Time-Series Cross-Section Data, American Journal of Political Science, 2008 Sept 6, pp. 561-581.

Westerhoff, Market Depth and Price Dynamics: A Note, University of Osnabrueck, Department of Economics Rolandstrasse 8, D-49069 Osnabrueck, German, Mar. 30, 2004, pp. 1-8.

PCT International Search Report and Written Opinion; PCTUS2022/051998; Mar. 8, 2023.

A. Lazarus et al., Multimodal Behavior Therapy. Berlin, Germany: Springer, 1976.

B. P. Yuhas, M. H. Goldstein, and T. J. Sejnowski, "Integration of acoustic and visual speech signals using neural networks," IEEE Commun. Mag., vol. 27, No. 11, pp. 65-71, Nov. 1989.

W. Guo, J. Wang, and S. Wang, "Deep multimodal representation learning: A survey," IEEE Access, vol. 7, pp. 63373-63394, 2019.

L. Wu, S. L. Oviatt, and P. R. Cohen, "Multimodal integration—a statistical view," IEEE Trans. Multimedia, vol. 1, No. 4, pp. 334-341, Dec. 1999.

J. Shang, T. Ma, C. Xiao, and J. Sun, "Pre-training of graph augmented transformers for medication recommendation," 2019, arXiv: 1906.00346.

K. Gavrilyuk, R. Sanford, M. Javan, and C. G. Snoek, "Actor transformers for group activity recognition," inProc. IEEE Conf. Comput. Vis. Pattern Recognit., 2020, pp. 836-845.

Beltagy, M. E. Peters, and A. Cohan, "Longformer: The long-document transformer," 2020, arXiv:2004.05150.

D. Shin, Z. Ren, E. B. Sudderth, and C. C. Fowlkes, "3D scene reconstruction with multi-layer depth and epipolar transformers," in Proc. IEEE Int. Conf. Comput. Vis., 2019, pp. 2172-2182.

P. Xu et al., "SketchMate: Deep hashing for million-scale human sketch retrieval," in Proc. IEEE Conf. Comput. Vis. Pattern Recognit., 2018, pp. 8090-8098.

K. Gupta, J. Lazarow, A. Achille, L. Davis, V. Mahadevan, and A. Shrivastava, "LayoutTransformer: Layout generation and completion with self-attention," 2020, arXiv:2006.14615.

T. Hastie, R. Tibshirani, J. H. Friedman, and J. H. Friedman, The Elements of Statistical Learning: Data Mining, Inference, and Prediction, vol. 2. Berlin, Germany: Springer, 2009.

C. Zhang, Z. Yang, X. He, and L. Deng, "Multimodal intelligence: Representation learning, information fusion, and applications," IEEE J. Sel. Topics Signal Process., vol. 14, No. 3, pp. 478-493, Mar. 2020.

C. Sun, A. Myers, C. Vondrick, K. Murphy, and C. Schmid, "VideoBERT: A joint model for video and language representation learning," in Proc. IEEE Int. Conf. Comput. Vis., 2019, pp. 7463-7472.

N. Carion, F. Massa, G. Synnaeve, N. Usunier, A. Kirillov, and S. Zagoruyko, "End-to-end object detection with transformers," in Proc. Eur. Conf. Comput. Vis., 2020, pp. 213-229.

J. Devlin, M.-W. Chang, K. Lee, and K. Toutanova, "BERT: Pretraining of deep bidirectional transformers for language understanding," 2018, arXiv:1810.04805.

Vaswani et al., "Attention is all you need," in Proc. Int. Conf. Neural Inf. Process. Syst., 2017, pp. 5998-6008.

T. Baltrušaitis, C. Ahuja, and L.-P. Morency, "Multimodal machine learning: A survey and taxonomy." IEEE Trans. Pattern Anal. Mach. Intell., vol. 41, No. 2, pp. 423-443, Feb. 2019.

Cai, et al.; Incorporating Visual Information in Audio Based Self-Supervised Speaker Recognition; IEEE/ACM Transactions on Audio, Speech and Language Processing; vol. 30; pp. 1422-1435; Mar. 2, 20224.

Saulle, Rosella, et al., "Cost and Cost-Effectiveness of the Mediterranean Diet: Results of a Systematic Review," www.mdpi.com/journal/nutrients, Nutrients 2013, 5, pp. 4566-4586.

Garamvolgyi et al.; Towards_Model-Driven_Engineering_of_Smart_Contracts; IEEE/IFIP; pp. 134-139; 2018.

Khan et al.; "A Distri buted-Ledger Consortium Model for Collaborative_Innovation"; IEEE pp. 29-37; 2017.

Meiklejohn S.; Top Ten Obstacles along Distributed Ledgers Path to Adoption; UCL; pp. 13-19; 2017.

Muttavarapu et al.; Distributed_Ledger_for_Spammers_Resume; IEEE; 9 pages, 2018.

U.S. Appl. No. 63/181,866, filed Apr. 29, 2021.

U.S. Appl. No. 63/027,344, filed May 19, 2020.

S. Pramanik, P. Agrawal, and A. Hussain, "OmniNet: A unified architecture for multi-modal multi-task learning," Jul. 3, 2020 v2 , arXiv:1907.07804.

R. Akula, S. Gella, Y. Al-Onaizan, S.-C. Zhu, and S. Reddy, "Words aren't enough, their order matters: On the robustness of grounding visual referring expressions," 2020, arXiv:2005.01655.

R. Child, S. Gray, A. Radford, and I. Sutskever, "Generating long sequences with sparse transformers," 2019, arXiv:1904.10509.

(56)        References Cited

OTHER PUBLICATIONS

Y. Xian, C. H. Lampert, B. Schiele, and Z. Akata, "Zero-shot learning—A comprehensive evaluation of the good, the bad and the ugly," IEEE Trans. Pattern Anal. Mach. Intell., vol. 41, No. 9, pp. 2251-2265, Sep. 2019.

Owens and A. A. Efros, "Audio-visual scene analysis with selfsupervised multisensory features," inProc. Eur. Conf. Comput. Vis., 2018, pp. 639-658.

T. Chen and R. R. Rao, "Audio-visual integration in multimodal communication," Proc. IEEE, vol. 86, No. 5, pp. 837-852, May 1998.

N. Li, S. Liu, Y. Liu, S. Zhao, and M. Liu, "Neural speech synthesis with transformer network," in Proc. AAAI Conf. Artif. Intell., 2019, pp. 6706-6713.

M. Chen, Y. Li, Z. Zhang, and S. Huang, "TVT: Two-view transformer network for video captioning," in Proc. 10th Asian Conf. Mach. Learn., 2018, pp. 847-862.

X. Lin, C. Ding, J. Zeng, and D. Tao, "GPS-Net: Graph property sensing network for scene graph generation," in Proc. IEEE Conf. Comput. Vis. Pattern Recognit., 2020, pp. 3743-3752.

W. Hao, C. Li, X. Li, L. Carin, and J. Gao, "Towards learning a generic agent for vision-and-language navigation via pre-training," in Proc. IEEE Conf. Comput. Vis. Pattern Recognit., 2020, pp. 13134-13143.

S. Ren, K. He, R. Girshick, and J. Sun, "Faster R-CNN: Towards realtime object detection with region proposal networks," in Proc. Int. Conf. Neural Inf. Process. Syst., 2015, pp. 91-99.

Y.-H. H. Tsai, S. Bai, P. P. Liang, J. Z. Kolter, L.-P. Morency, and R. Salakhutdinov, "Multimodal transformer for unaligned multimodal language sequences," in Proc. Conf. Assoc. Comput. Linguistics, 2019, pp. 6558-6569.

J. Lin, A. Yang, Y. Zhang, J. Liu, J. Zhou, and H. Yang, "InterBERT: Vision-and-language interaction for multi-modal pretraining," 2020, arXiv:2003.13198.

D. Tran, H.Wang, L. Torresani, J. Ray, Y. LeCun, and M. Paluri, "A closer look at spatiotemporal convolutions for action recognition," inProc. IEEE Conf. Comput. Vis. Pattern Recognit., 2018, pp. 6450-6459.

S. Xie, C. Sun, J. Huang, Z. Tu, and K. Murphy, "Rethinking spatiotemporal feature learning for video understanding," 2017, arXiv:1712.04851.

L. Zhou, Y. Zhou, J. J. Corso, R. Socher, and C. Xiong, "End-to-end dense video captioning with masked transformer," in Proc. IEEE Conf. Comput. Vis. Pattern Recognit., 2018, pp. 8739-8748.

X. Wang, R. Girshick, A. Gupta, and K. He, "Non-local neural networks," in Proc. IEEE Conf. Comput. Vis. Pattern Recognit., 2018, pp. 7794-7803.

J. L. Ba, J. R. Kiros, and G. E. Hinton, "Layer normalization," 2016, arXiv:1607.06450.

S. Ioffe and C. Szegedy, "Batch normalization: Accelerating deep network training by reducing internal covariate shift," in Proc. Int. Conf. Mach. Learn., 2015, pp. 448-456.

K. He, X. Zhang, S. Ren, and J. Sun, "Deep residual learning for image recognition," in Proc. IEEE Conf. Comput. Vis. Pattern Recognit., 2016, pp. 770-778.

J. Malmaud, J. Huang, V. Rathod, N. Johnston, A. Rabinovich, and K. Murphy, "What's Cookin'? Interpreting cooking videos using text, speech and vision," 2015, arXiv:1503.01558.

L. Zhou, C. Xu, and J. J. Corso, "Towards automatic learning of procedures from web instructional videos," in Proc. AAAI Conf. Artif. Intell., 2018, pp. 7590-7598.

D. Kiela et al., The hateful memes challenge: Detecting hate speech in multimodal memes, 2020, arXiv:2005.04790.

Miech, D. Zhukov, J.-B. Alayrac, M. Tapaswi, I. Laptev, and J. Sivic, "HowTo100M: Learning a text-video embedding by watching hundred million narrated video clips," in Proc. IEEE Int. Conf. Comput. Vis., 2019, pp. 2630-2640.

Das et al., "Visual dialog," in Proc. IEEE Conf. Comput. Vis. Pattern Recognit., 2017, pp. 1080-1089.

R. Krishna, K. Hata, F. Ren, L. Fei-Fei, and J. C. Niebles, "Densecaptioning events in videos," in Proc. IEEE Int. Conf. Comput. Vis., 2017, pp. 706-715.

V. Ordonez, G. Kulkarni, and T. Berg, "Im2Text: Describing images using 1 million captioned photographs," in Proc. Int. Conf. Neural Inf. Process. Syst., 2011, pp. 1143-1151.

R. Krishna et al., "Visual genome: Connecting language and vision using crowdsourced dense image annotations," Int. J. Comput. Vis., vol. 123, pp. 32-73, 2017.

S. Antol et al., "VQA: Visual question answering," in Proc. IEEE Int. Conf. Comput. Vis., 2015, pp. 2425-2433.

T.-Y. Lin et al., "Microsoft COCO: Common objects in context," in Proc. Eur. Conf. Comput. Vis., 2014, pp. 740-755.

P. Sharma, N. Ding, S. Goodman, and R. Soricut, "Conceptual captions: A cleaned, hypernymed, image alt-text dataset for automatic image captioning," in Proc. Conf. Assoc. Comput. Linguistics, 2018, pp. 2556-2565.

H. Luo et al., "UniVL: A unified video and language pre-training model for multimodal understanding and generation," 2020, arXiv:2002.06353.

D. Qi, L. Su, J. Song, E. Cui, T. Bharti, and A. Sacheti, "ImageBERT: Cross-modal pre-training with large-scale weak-supervised image-text data," 2020, arXiv:2001.07966.

Z. Huang, Z. Zeng, B. Liu, D. Fu, and J. Fu, "Pixel-BERT: Aligning image pixels with text by deep multi-modal transformers," 2020, arXiv:2004.00849.

X. Li et al., "Oscar: Object-semantics aligned pre-training for vision-language tasks," in Proc. Eur. Conf. Comput. Vis., 2020, pp. 121-137.

J. Lu, V. Goswami, M. Rohrbach, D. Parikh, and S. Lee, "12-in-1: Multitask vision and language representation learning," in Proc. IEEE Conf. Comput. Vis. Pattern Recognit., 2020, pp. 10434-10443.

L. Zhou, H. Palangi, L. Zhang, H. Hu, J. Corso, and J. Gao, "Unified vision-language pre-training for image captioning and VQA," in Proc. AAAI Conf. Artif. Intell., 2020, pp. 13041-13049.

C. Alberti, J. Ling, M. Collins, and D. Reitter, "Fusion of detected objects in text for visual question answering," 2019, arXiv:1908.05054.

G. Li, N. Duan, Y. Fang, M. Gong, and D. Jiang, "Unicoder-VL: A universal encoder for vision and language by cross-modal pre-training," in Proc. AAAI Conf. Artif. Intell., 2020, pp. 11336-11344.

C. Sun, F. Baradel, K. Murphy, and C. Schmid, "Learning video representations using contrastive bidirectional transformer," 2019, arXiv:1906.05743.

Y.-C. Chen et al., "UNITER: Universal image-text representation learning," in Proc. Eur. Conf. Comput. Vis., 2020, pp. 104-120.

W. Su et al., "VL-BERT: Pre-training of generic visual-linguistic representations," 2019, arXiv:1908.08530.

L. H. Li, M. Yatskar, D. Yin, C.-J. Hsieh, and K.-W. Chang, "VisualBERT: A simple and performant baseline for vision and language," 2019, arXiv:1908.03557.

H. Tan and M. Bansal, "LXMERT: Learning cross-modality encoder representations from transformers," 2019, arXiv:1908.07490.

J. Lu, D. Batra, D. Parikh, and S. Lee, "VILBERT: Pretraining taskagnostic visiolinguistic representations for vision-and-language tasks," 2019, arXiv:1908.02265.

Z. Yang, Z. Dai, Y. Yang, J. Carbonell, R. R. Salakhutdinov, and Q. V. Le, "XLNet: Generalized autoregressive pretraining for language understanding," in Proc. Int. Conf. Neural Inf. Process. Syst., 2019, Art. No. 517.

Z. Dai, Z. Yang, Y. Yang, J. Carbonell, Q. V. Le, and R. Salakhutdinov, "Transformer-XL: Attentive language models beyond a fixed-length context," 2019, arXiv:1901.02860.

Radford, K. Narasimhan, T. Salimans, and I. Sutskever, "Improving language understanding by generative pre-training," 2018. [Online]. Available: https://s3-us-west-2.amazonaws.com/openai-assets/ research-covers/language-unsupervised/language_understanding_ paper.pdf.

M. Lewis et al., "BART: Denoising sequence-to-sequence pre-training for natural language generation, translation, and comprehension," 2019, arXiv:1910.13461.

Y. Li et al., "BEHRT: Transformer for electronic health records," Sci. Rep., vol. 10, 2020, Art. No. 7155.

(56) References Cited

OTHER PUBLICATIONS

Chen, M., et al.; What may visualization processes optimize?. IEEE transactions on visualization and computer. 2015, pp. 1-10.

Meneghini, et al.; Information to the Eye of the Beholder: Data Visualization for Many-Objective Optimization; Institute for polymers and Composites, University of Minho, 2018, pp. 1-9.

Franco, et al.; "Road vehicle emission factors development: A review" Published by Elsevier (Year: 2013); pp. 84-97.

Silverman, "New App Will Let You Buy Or Sell A Parking Space In NYC", CBS News, Jul. 20, 2011; https://www.cbsnews.com/newyork/news/new-app-will-let-you-buy-or-sell-a-parking-space/ (Year: 2011).

* cited by examiner

200

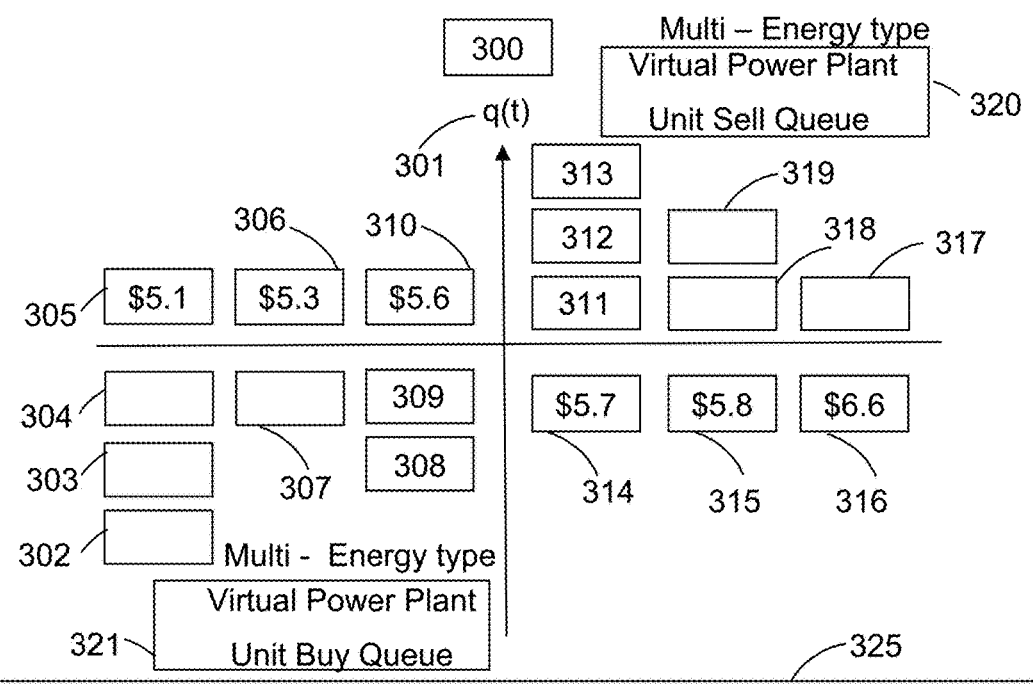

VPP unit specification limit order book ("LOB") is represented by vector q(t) such that the i-th coordinate for i>0, $q_i$ (t), is the number of sell limit orders that are waiting in the LOB at time t at price iδ (δ is the price unit tick size)
The number of buy limit orders at iδ are represented with a negative sign $q_i$(t)

326
$$s(t) = s(q(t)) = \min ( \min \{0 < i\delta: q_i (t) > 0\} )$$
if $q_i$ (t) ≤ 0 for all i > 0, then s(q(t)) = ∞

327
$$b(t) = b(q(t)) = \max ( \max \{i\delta > 0: q_i (t) < 0\} )$$
if $q_i$ (t) ≥ 0 for all i > 0, then b(q(t)) = - ∞

328
If s(t) = b(t), then match renewable energy community linked transportation unit specification and move to confirmation 329
If s(t) > b(t), maintain queue position 330
If s(t) or b(t) is cancelled, remove from queue 331
If s(t) or b(t) is new, insert s(t) or b(t) with priority of price, then time into price time priority queue of LOB

Figure 16:
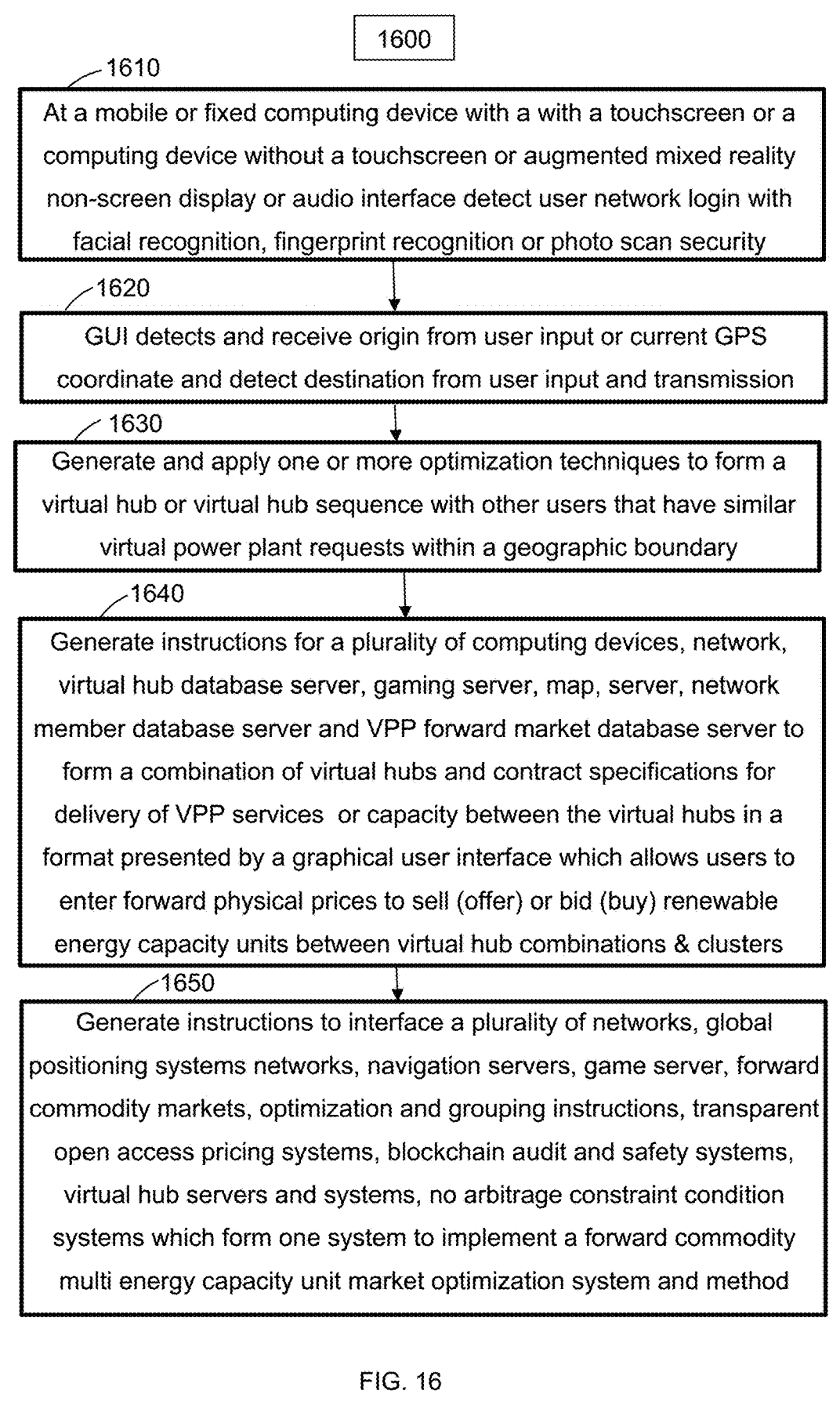

At a mobile or fixed computing device with a with a touchscreen or a computing device without a touchscreen or augmented mixed reality non-screen display or audio interface detect user network login with facial recognition, fingerprint recognition or photo scan security

1620

GUI detects and receive origin from user input or current GPS coordinate and detect destination from user input and transmission

1630

Generate and apply one or more optimization techniques to form a virtual hub or virtual hub sequence with other users that have similar virtual power plant requests within a geographic boundary

1640

Generate instructions for a plurality of computing devices, network, virtual hub database server, gaming server, map, server, network member database server and VPP forward market database server to form a combination of virtual hubs and contract specifications for delivery of VPP services  or capacity between the virtual hubs in a format presented by a graphical user interface which allows users to enter forward physical prices to sell (offer) or bid (buy) renewable energy capacity units between virtual hub combinations & clusters

1650

Generate instructions to interface a plurality of networks, global positioning systems networks, navigation servers, game server, forward commodity markets, optimization and grouping instructions, transparent open access pricing systems, blockchain audit and safety systems, virtual hub servers and systems, no arbitrage constraint condition systems which form one system to implement a forward commodity multi energy capacity unit market optimization system and method

CheckIn

270

2051

Driver
FingerPrint Verified  ☑
FaceScan  Verified  ☑
PicturePhoto Verified ☑

Passenger/Freight
FingerPrint Verified  ☑
FaceScan  Verified  ☑
PicturePhoto Verified ☑

2052

Transport Verified
Proceed to Destination

3910 — User Score: 12.455
3925 — Weapon: 45
3915 — User Power: 456
3930 — Balance: $50
3920 — SOV Count: 29
3988 — Pick Ups: 2

Hillshire Village
18 mins     $3-3.10

3969
3935
3968

3940 — GPS View     Augmented View
3985 — Pasenger     3967
3945
3966
3950  3963     3965
3961
GO     3964
3960 — STOP     3979
3955 — Nav     3962 — Market

4100

4900

4901

ENERGY COMMUNITY INVENTORY UPLINK INTERFACE

| PRODUCT | QUANTITY | SPECIFICATION | PRICE | DATE/TIME |
|---------|----------|---------------|-------|-----------|
| ☀ | 255 | SOLAR | 5.00 | 2/26/19 |
| 🌬 | 300 | WIND | 5.00 | 2/26/19 |
| ⚗ | 500 | BIOMASS | 10.00 | 2/26/19 |
| ◎ | 50 | GEOTHERMAL | 5.00 | 2/26/19 |
| ▥ | 50 | HYDRO | 0.25 | 2/26/19 |
| ≋ | 100 | TIDAL POWER | 10.00 | 2/26/19 |
| ▦ | 100 | HYDROGEN | 10.00 | 2/26/19 |
| ☾ | 100 | MOON | 1.99 | 2/26/19 |
| 🌲 | 1000 | CHLOROPHYLL | 2.99 | 2/26/19 |
| 🍃 | 1000 | PLANT | 1.99 | 2/26/19 |
| | 1000 | Natural Gas, Oil Coal, Nuke | 1.50 | 2/26/19 |

$$\text{VPP}_{\text{virtual power plant score}} = E(B_{VPP}) - 0.005A\ \sigma^2_{VPP}$$

Take an initial Virtual Power Plant Object Coordinate with a vector of attributes and assume two possible results after inputting VPP that is an object with a vector of VPP attributes.

With a probability p

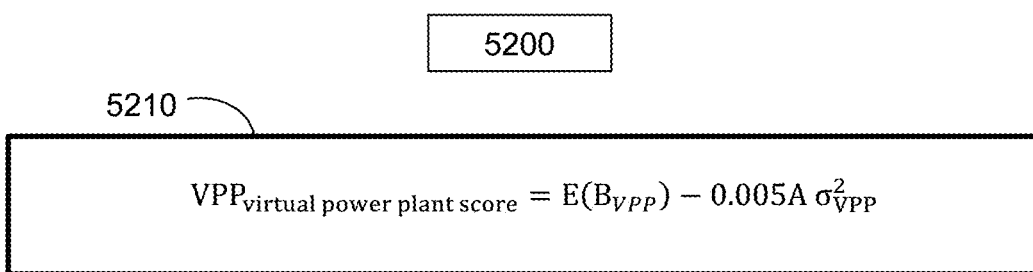

$B_{\text{Initial VPP}}$ p=0.6     $B_{\text{VPP 1}}$ 1-p=0.4     $B_{\text{VPP 2}}$

5230

So the expected value of VPP is:

$$E(B_{VPP}) = p(B_{VPP\ 1}) + (1-p)(B_{VPP\ 2})$$

5240

The variance $\sigma^2$ of the VPP is $$\sigma^2 = p[B_{VPP1} - E(B_{VPP})]^2 + (1-p)[B_{VPP2} - E(B_{VPP})]^2$$

The standard deviation of VPP is $\sigma = \sqrt{\sigma^2}$

Accordingly, if $$E_{\text{VPP object 1}} \geq E_{\text{VPP object 2}}$$

and $$\sigma_{\text{VPP Object 1}} \leq \sigma_{\text{VPP Object 2}}$$

5320 and at least one inequality is strict, inequality has been ruled out

5400

5410

5420

| $E_{\substack{VPP \\ Object}}$ | $\sigma_{\substack{VPP \\ Object}}$ | $VPP_{VPP\ score} = E(B_{VPP}) - 0.005A\,\sigma^2_{VPP}$ |
|---|---|---|
| 10 | 20.0% | $10 - 0.005 \times 4 \times 400 = 2$ |
| 15 | 25.5% | $15 - 0.005 \times 4 \times 650 = 2$ |
| 20 | 30.0% | $20 - 0.005 \times 4 \times 900 = 2$ |
| 25 | 33.9% | $25 - 0.005 \times 4 \times 1,150 = 2$ |

5510 ⌐

5500

| | State 1 | State 2 | State 3 |
|---|---|---|---|
| Unit VPP Probability | 0.5 | 0.3 | 0.2 |
| Unit VPP Toward target | 25% Increase to target | 10% Increase to target | -25% decrease to target |

The mean or expected return of an object is a probability weighted return

In all scenarios:

$$E(r) = \sum_s Pr(s)\, r(s)$$

Applying the aforementioned formula to 5510 above we have $$E(r_{object}) = 0.5\text{x}25 + 0.3\text{x}10 + 0.2\text{x}(-25)$$

The variance of sound object on VPP is $$\sigma^2 = \sum_s Pr(s)\, [r(s) - E(r)]^2$$

Applying the aforementioned formula to 5510 above we have $$\sigma^2_{object} = (0.5(25 - 10.5)^2 + 0.3(10 - 10.5)^2 + 0.2(-25 - 10.5)^2 = 357.25$$

$$\text{Or } \sigma_{object} = \sqrt{357.25} = 18.99\%$$

$$E(r_{object}) = 0.5(E(r_{object\,1})) + 0.5(E(r_{object\,2}))$$

$= 0.5 \times 10.5 + 0.5 \times 5 = 7.75\%$, when object 1 is combined with object 2

$$\sigma_{VPP} = 0.5(\sigma_{object\,1}) + 0.5(\sigma_{object\,2})$$

The standard deviation of the combination of objects

$$[r_{object\,1} - E(r_{object\,1})][r_{object\,2} - E(r_{object\,2})]$$

$$Cov(r_{object\,1}, r_{object\,2}) = \sum_{s} Pr(s)\,[r_{object\,1}(S) - E(r_{object\,1})][r_{object\,2}(S) - E(r_{object\,2})]$$

$$\rho(object\ 1, object\ 2) = \frac{Cov[r_{object\ 1}, r_{object\ 2}]}{\sigma_{object\ 1}\sigma_{object\ 2}}$$

5710

FIG. 57A $$\sigma^2_{MDCO} = w_1^2\sigma^2 + w_2^2\sigma_2^2 + 2w_1w_2Cov(r_1r_2)$$

Where subscript 1 is object 1 or another VPP object and

Subscript 2 is object 2 or another VPP object

5720                     FIG. 57B $$\max_{vector\ of\ VPP}[M_{VPP\ score}] = E\left(r_{\substack{VPP \\ Object}}\right) - 0.005A\sigma^2_{\substack{VPP \\ Object}}$$

Where term A is the VPP Objects's user preference index

| | Ojects$_1$ or obj$_1$ | objects$_2$ or obj$_2$ |
|---|---|---|
| Oject or Objects weight | $w_{obj\,1}$ | $w_{obj2}$ |
| $w_{obj\,1}$ | $\sigma^2_{obj\,1}$ | $Cov(r_{obj1}, r_{obj2})$ |
| $w_{obj\,2}$ | $Cov(r_{obj\,1}, r_{obj2})$ | $\sigma^2_{obj\,2}$ |

| | Object 1 | Object 2 |
|---|---|---|
| Expected VPP    ; E(r) | 8% | 13% |
| Standard deviation ;    $\sigma$ | 12% | 20% |
| Covariance;   $Cov(r_{obj1}, r_{obj2})$ | 72 | |
| Correlation Coefficient ; $\rho_{obj1,obj2}$ | 0.30 | |

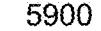
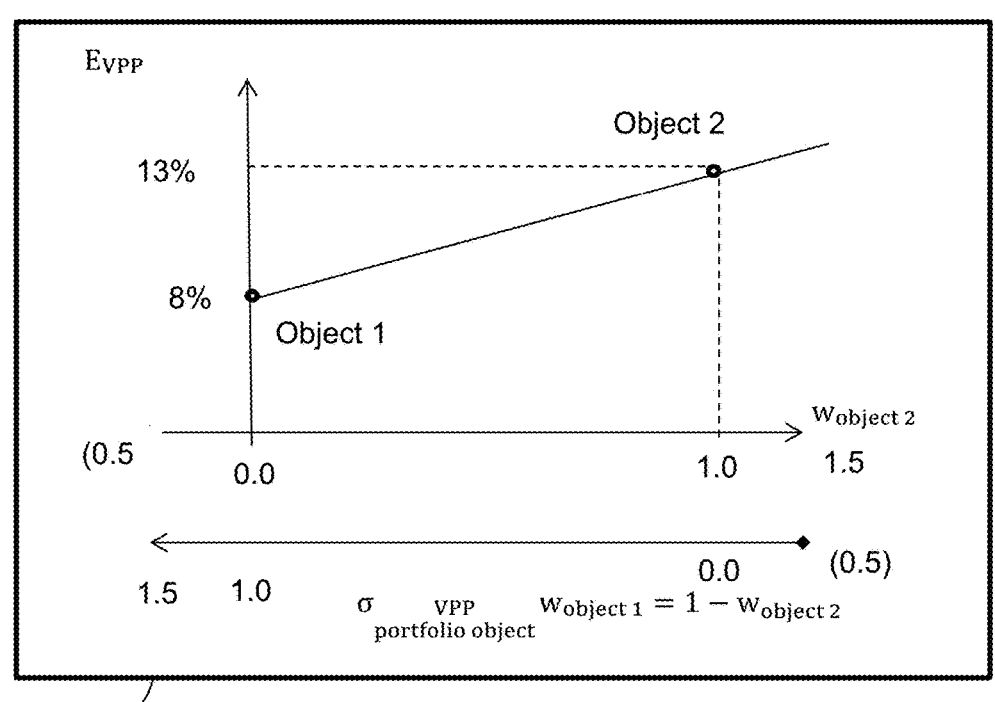
5910
FIG. 59A
5920
| $w_{object\ 1}$ | $w_{object\ 2}$ | $\rho = -1$ | $\rho = 0$ | $\rho = 0.3$ | $\rho = 1$ |
|---|---|---|---|---|---|
| 0.0 | 1.00 | 20.00% | 20.00% | 20.00% | 20.00% |
| 0.25 | 0.75 | 12.00 | 15.3 | 16.16 | 18.00 |
| 0.50 | 0.50 | 4 | 11.66 | 13.11 | 16.00 |
| 0.75 | 0.25 | 4.00 | 10.30 | 11.53 | 14.00 |
| 1.00 | 0.0 | 12.00 | 12.00 | 12.00 | 12.00 |
| Minimum $\sigma_m$ | | 0.00 | 10.29 | 11.45 | - |
| $w_{object\ 1}$@min$\sigma_m$ | | 0.63 | 0.74 | 0.82 | - |
FIG. 59B

6000

6010 ⌐

6020 ⌐

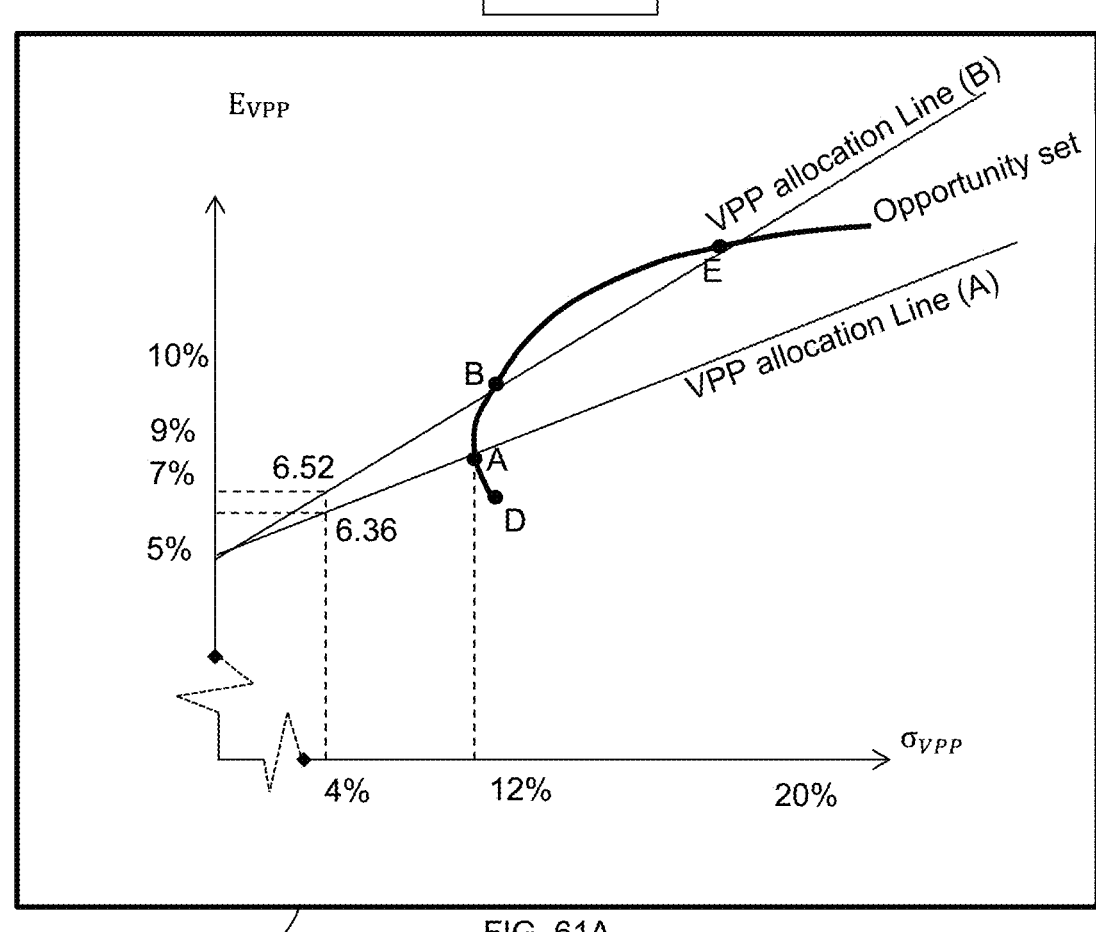
FIG. 61A
6110
$$\text{Slope}_{\text{VPP Allocation Line (A)}} = \frac{E(VPP)_{\text{object 1,object 2}} - \text{object}_{\text{no }\sigma}}{\sigma_{\text{object 1,object 2}}}$$
$$= \frac{8.9 - 5}{11.45} = 0.34$$
6120
FIG. 61B 6200
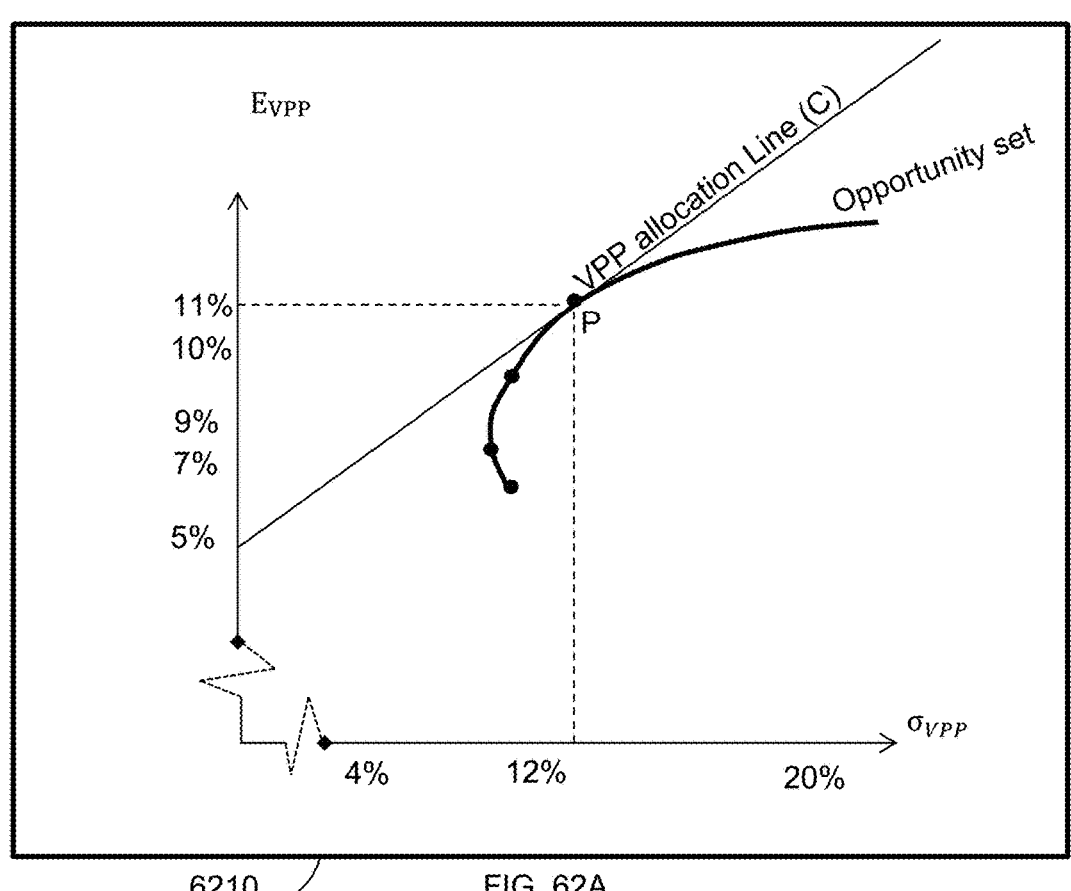
6210                    FIG. 62A
$$Slope_{VPP\ allocation\ line} = \frac{E_{VPP} - VPP\ Original_{VPP}}{\sigma_{VPP}}$$
$$E_{VPP(MC)\ of\ combination} = w_{object\ 1}E_{object\ 1(MC)} + w_{object\ 2}E_{object\ 2(MC)}$$
$$= 8w_{object\ 1} + 13w_{object\ 2}$$
$$\sigma_{object\ combination} = [w_{obj1}^2\sigma_{obj1}^2 + w_{obj2}^2\sigma_{obj2}^2 + 2w_{obj1}w_{obj2}Cov(r_{obj1}r_{obj2})]^{\frac{1}{2}}$$
$$= [144w_{obj1}^2 + 400w_{obj2}^2 + 2x72w_{obj1}w_{obj2}]^{\frac{1}{2}}$$
6220                    FIG. 62B

6300

$$\max_{w_i} \text{Slope}_{\text{VPP allocation line}} = \frac{\text{VPP} - \text{VPP Orginal}_{\text{VPP}}}{\sigma_{\text{VPP}}}$$

Subject to $\sum w_i = 1$, which is the standard problem in calculus.

6310                FIG. 63A $w_{\text{obj1}}$ $$= \frac{[E(r_{\text{obj1MC}}) - \text{VPP Orig}_{\text{MC}}]\sigma^2_{\text{obj2BC}} - [E(r_{\text{obj2MC}}) - \text{VPP Orgi}_{\text{MC}}]\text{Cov}(r_{\text{obj1MC}}, r_{\text{obj2MC}})}{[E(r_{\text{obj1MC}}) - \text{VPP Orig}_{\text{MC}}]\sigma^2_{\text{obj2MC}} + [E(r_{\text{obj2BC}}) - \text{VPP Orig}_{\text{MC}}]\sigma^2_{\text{obj1MC}} - [E(r_{\text{obj1MC}}) - \text{VPP Orig}_{\text{MC}} + E(r_{\text{obj2mc}}) - \text{VPP Orig}_{\text{MC}}]\text{Cov}(r_{\text{obj1MC,obj2MC}})}$$

$$w_{\text{object 2}} = 1 - w_{\text{object 1}}$$

$$w_{\text{object 1}} = \frac{(8-5)400 - (13-5)72}{(8-5)400 + (13-5)144 - (8-5+13-5)72}$$
$$= 0.40$$
$$w_{\text{object 2}} = 1 - 0.40$$
$$= 0.6$$

6320 ⟋

FIG. 63B $$y = \frac{E(r_{\text{combination objects}}) - \text{VPP Orig}_{\text{MC}}}{0.01 \times A\sigma^2_{\text{combination objects}}}$$

$$= \frac{11-5}{0.01 \times 4 \times 14.2^2} = 0.7439$$

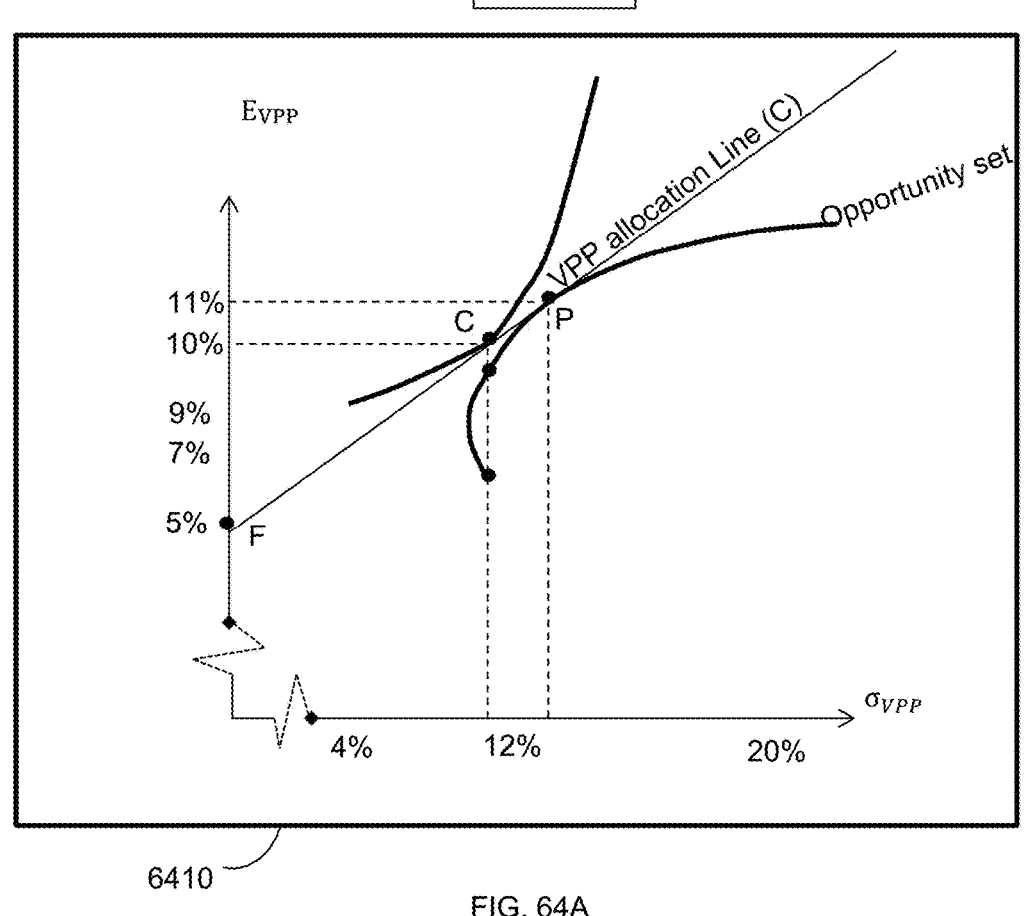

Specify the VPP of all objects (expected VPP, variances and covariances)

Establish the combination of VPP

Calculate the optimal VPP combination

Calculate the properties of the VPP combination using weights determined by optimization.

Allocate object weights between obects combo and original object.

Calculate the fraction of the complete object towards the objects and original object Calculate the share of objects in each object and original object

$$E(r_p) = \sum_{i=1}^{n} w_i E(r_i)$$

$$\sigma_p^2 = \sum_{i=1}^{n} w_i^2 \sigma_i^2 + \sum_{\substack{i=1 \\ i \neq j}}^{n} \sum_{j=1}^{n} w_i w_j \mathrm{Cov}(r_i, r_j)$$

6610

6620

6700

$$w \in R^d$$

Vector w is a set of object weights $w = \begin{bmatrix} w_1 \\ w_2 \\ \cdot \\ w_d \end{bmatrix}$   where $w_1 + w_2 + \cdots + w_d = 1$ Let the expected object portfolio VPP vector be $$r = \begin{bmatrix} r_1 \\ r_1 \\ \cdot \\ \cdot \\ r_d \end{bmatrix}, E(r) = \begin{bmatrix} E(r_1) \\ E(r_2) \\ \cdot \\ \cdot \\ E(r_d) \end{bmatrix}$$

Variance – covariance Matrix of objects in the object VPP combination $$\sum = \begin{bmatrix} \sigma_1^2 & \cdots & \sigma_{1d} \\ \vdots & \ddots & \vdots \\ \sigma_{1d} & \cdots & \sigma_d^2 \end{bmatrix}$$

$$r_p = w'x\,r = [w_1 \quad \cdots \quad w_d]x \begin{bmatrix} r_1 \\ \vdots \\ r_d \end{bmatrix}$$

$$E(r_p) = w'x\,E(r)$$

$$\sigma_p^2 = w'x \sum x\,w = [w_1 \ldots w_d] \begin{bmatrix} \sigma_1^2 & \cdots & \sigma_{1d} \\ \vdots & \ddots & \vdots \\ \sigma_{1d} & \cdots & \sigma_d^2 \end{bmatrix} \begin{bmatrix} w_1 \\ \vdots \\ w_d \end{bmatrix}$$

Process Optimized VPP
system configured weights

Leave
VPP
Power
as is

No

Yes

Execute User Instructions
with price time priority queue

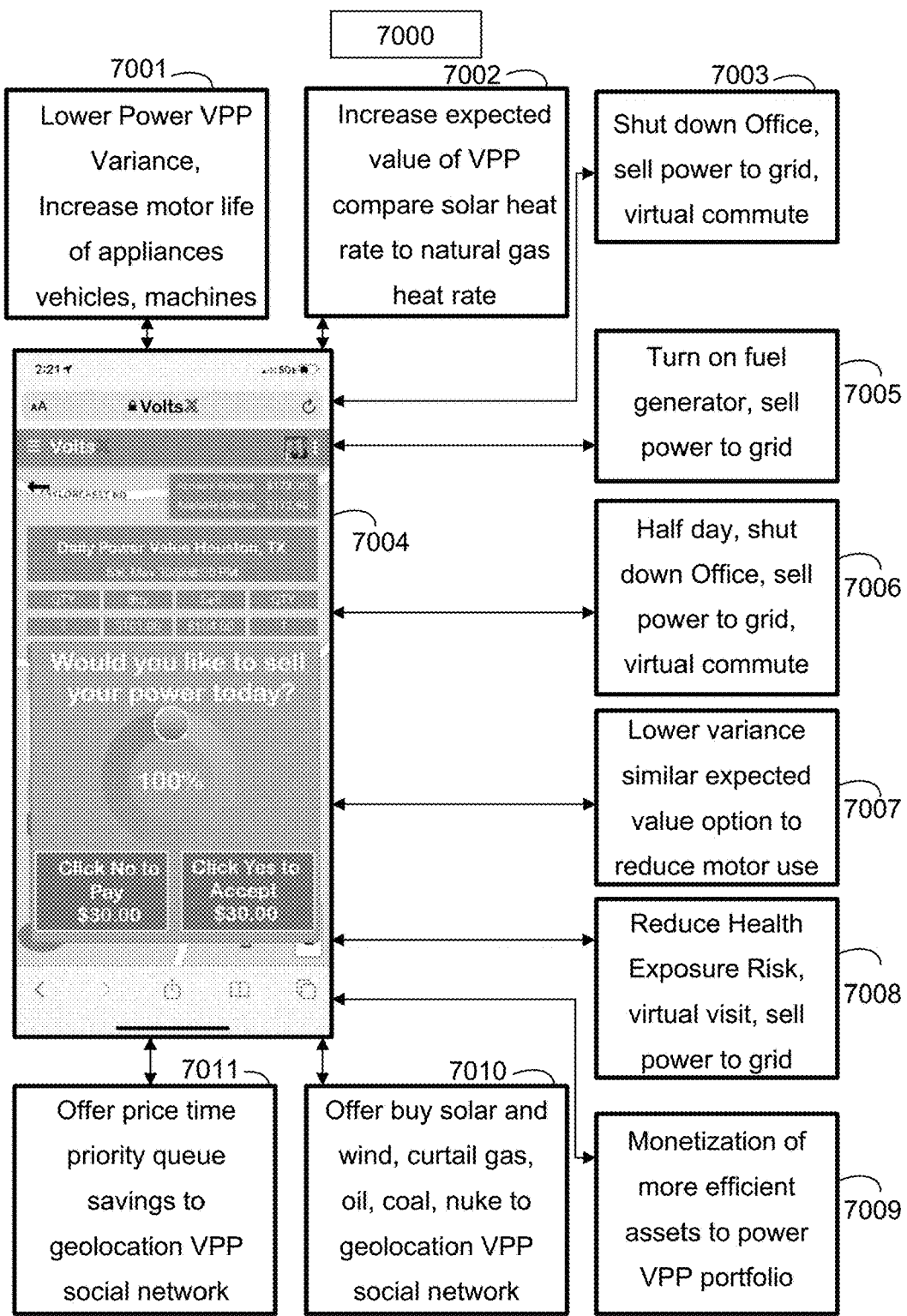

7000

7001
Lower Power VPP Variance, Increase motor life of appliances vehicles, machines 7002
Increase expected value of VPP compare solar heat rate to natural gas heat rate 7003
Shut down Office, sell power to grid, virtual commute 7005
Turn on fuel generator, sell power to grid

7004

7006
Half day, shut down Office, sell power to grid, virtual commute

7007
Lower variance similar expected value option to reduce motor use

7008
Reduce Health Exposure Risk, virtual visit, sell power to grid

7011
Offer price time priority queue savings to geolocation VPP social network

7010
Offer buy solar and wind, curtail gas, oil, coal, nuke to geolocation VPP social network 7009
Monetization of more efficient assets to power VPP portfolio

Multi dimension optimization minimizing VPP portfolio expected return variance subject to VPP portfolio expected return targets shows clear gains in reduced power usage

7102

7103

Multi dimension optimization is required to consider equation variables outside of single site optimization or single mode optimization

METHOD AND SYSTEM UTILIZING ONE OR MORE VIRTUAL POWER PLANT CAPACITY UNITS

CROSS-REFERENCE TO RELATED APPLICATIONS

This application claims the benefit of and priority to Provisional Patent Application No. 63/051,373, filed 2020 Jul. 13 and titled VIRTUAL POWER PLANT OPTIMIZA- TION METHOD AND SYSTEM; and Provisional Patent Application No. 63/052,159, filed 2020 Jul. 15 and titled MULTI-DIMENSION INFORMATION SERVICE HEL- MET METHOD AND SYSTEM; each of which is herein incorporated by reference.

This application is a continuation-in-part of each of the following: Patent Application Number US Ser. No. 17/358, 429, filed 2021 June 25 and titled MULTI-DIMENSION CLASSIFICATION OBJECT MATRICES TO ESTIMATE MULTI-DIMENSIONAL REPRESENTATIONS WITH MULTI FUNCTION DEVICE, which claims priority to U.S. 63/044,997, filed 2020 Jun. 26; patent application Ser. No. 17/349,829, filed 2021 Jun. 16 and titled VIRTUAL REALITY, AUGMENTED REALITY, MIXED REALITY DATA EXCHANGE SOCIAL NETWORK WITH MULTI DIMENSIONAL MAP TILE PORTING, which claims pri- ority to US 63/039,918, filed 2020 Jun. 16; patent applica- tion Ser. No. 17/324,051, filed 2021 May 18 and titled TIME INTERVAL GEOLOCATION COMMUNITY OBJECTS WITH PRICE-TIME PRIORITY QUEUES FOR TRANS- FORMED TIME INTERVAL GEOLOCATION UNITS, which claims the benefit of and priority to Provisional Application No. 63/027,344, filed 2020 May 19; patent application Ser. No. 17/082,254, filed 2020 Oct. 28 and titled TOLL AND CONGESTION COMMUNITY OBJECTS WITH PRICE-TIME PRIORITY QUEUES FOR TRANS- FORMED TOLL AND CONGESTION CAPACITY UNITS, which claims the benefit of and priority to Provi- sional Application No. 62/927,081 filed 2019 Oct. 28; patent application Ser. No. 17/069,597, filed 2020 Oct. 13 and titled PRICE TIME PRIORITY QUEUE ROUTING FOR TRANSPORTATION CAPACITY UNITS, which claims the benefit of and priority to Provisional Application No. 62/914,427 filed 2019 Oct. 12; patent application Ser. No. 16/666,264, filed 2019 Oct. 28 and titled COMPUTER BALL DEVICE FOR MIXED REALITY, VIRTUAL REALITY, OR AUGMENTED REALITY, which is a con- tinuation of application Ser. No. 15/406,374, filed 2017 Jan. 13, now U.S. Pat. No. 10,446,520, patent application Ser. No. 16/589,229, filed 2019 Oct. 1 and titled TRANSPOR- TATION AND FREIGHT CAPACITY UNITS; patent appli- cation Ser. No. 16/556,838, filed 2019 Aug. 30 and titled FINANCIAL SWAP INDEX METHOD AND SYSTEM ON TRANSPORTATION CAPACITY UNITS AND TRADING DERIVATIVE PRODUCTS BASED THEREON; patent application Ser. No. 16/397,685, filed 2019 Apr. 29 and titled TUTORING COMMUNITY OBJECTS WITH PRICE-TIME PRIORITY QUEUES FOR TRANSFORMED TUTORING UNITS; patent application Ser. No. 16/359,841, filed 2019 Mar. 20 and titled PARK- ING COMMUNITY OBJECTS WITH PRICE-TIME PRI- ORITY QUEUES FOR TRANSFORMED PARKING UNITS; patent application Ser. No. 16/357,241, filed 2019 Mar. 18 and titled RENEWABLE ENERGY COMMUNITY OBJECTS WITH PRICE-TIME PRIORITY QUEUES FOR TRANSFORMED RENEWABLE ENERGY UNITS; patent application Ser. No. 16/274,490, filed 2019 Feb. 13, titled ROUTE COMMUNITY OBJECTS WITH PRICE-TIME PRIORITY QUEUES FOR TRANSFORMED TRANS- PORTATION UNITS, which is a continuation-in-part of patent application Ser. No. 16/258,658, filed 2019 Jan. 27, now U.S. Pat. No. 11,035,682, and titled NAVIGATION ROUTES AS COMMUNITY OBJECT VIRTUAL HUB SEQUENCES TO WHICH USERS MAY SUBSCRIBE; patent application Ser. No. 16/257,032, filed 2019 Jan. 24 and titled SECURITIZATION OF TRANSPORTATION UNITS; patent application Ser. No. 16/242,981, filed 2019 Jan. 8 and titled STRATEGY GAME LAYER OVER PRICE BASED NAVIGATION; patent application Ser. No. 16/242, 967, filed 2019 Jan. 8 and titled PRICE BASED NAVIGA- TION; patent application Ser. No. 16/239,485, filed 2019 Jan. 3 and titled MARKET LAYER PRICE QUEUE MAP ROUTING FOR MULTI-LAYERED NODAL NETWORK TOPOLOGY FOR A MULTI-MODAL SECURE FOR- WARD MARKET AUCTION IN TRANSPORTATION CAPACITY AND SPACE; patent application Ser. No. 16/183,647, filed 2018 Nov. 7 and titled FINANCIAL SWAP PAYMENT STRUCTURE METHOD AND SYS- TEM ON TRANSPORTATION CAPACITY UNIT ASSETS; patent application Ser. No. 16/167,525, filed 2018 Oct. 22 and titled MULTI-LAYERED NODAL NETWORK TOPOLOGY FOR A MULTI-MODAL SECURE FOR- WARD MARKET AUCTION IN TRANSPORTATION CAPACITY AND SPACE; patent application Ser. No. 15/877,393, filed 2018 Jan. 23 and titled ELECTRONIC FORWARD MARKET EXCHANGE FOR TRANSPOR- TATION SEATS AND CAPACITY IN TRANSPORTA- TION SPACES AND VEHICLES; patent application Ser. No. 15/266,326, filed 2016 Sep. 15 and titled IMPLEMEN- TATIONS OF A COMPUTERIZED BUSINESS TRANS- ACTION EXCHANGE FOR VARIOUS USERS; each of which is herein incorporated by reference.

BACKGROUND OF THE INVENTION

Field of the Invention

The following descriptions and examples are not admitted as prior art by virtue of their inclusion within this section.

In some scenarios, virtual power plant environments and the ability to replicate centralized power plant physical environments are becoming increasingly important as chip processing speeds, networking, GPS, location based services and data storage continue to become more efficient improv- ing user experience and utility. Current virtual power plant environments are a long way from centralized power plant physical environments in software implementation and soft- ware and hardware tools remain considerably challenged and limited in scope and mostly residing in static or very limited dynamic environments. The multi-dimension aspects of virtual environments and improvements in virtual ren- dering allows for power optimization models to include new variables in the optimization sequences. Energy is becoming more distributed rather than centralized due to reductions in cost of solar, wind, battery storage, biomass, chlorophyll, geo-thermal, distributed fuel and many other energy pro- ducing and consumption efficiency technologies. Single small distributed power systems at a home level are not compatible with wholesale trading systems that utilities use. In the early years of the formation of the internet, search was extraordinary inefficient with keyword search led by the likes of Yahoo and Alta Vista. Keyword internet document search was a rule based system to organize the presentation of hypertext transfer protocol or "http" documents. Keyword search led to searching for documents that would perhaps take a user ten to twenty pages of clicking retrieved documents to find a most relevant result that led to hours of extra time. By contrast, Larry Page disclosed his original search algorithm which made former keyword rule based systems obsolete as he indexed web pages or http documents based on a relevance back link prioritization. The search algorithm method of back link prioritization dramatically improved former rule based systems of search and thus was granted a patent. Similar to the large deficiencies of rule based power aggregation systems, weak algorithm based power aggregation methods have been presented which would amount to keyword search prior to the page rank back link algorithm. Power loads are not optimized for multi-dimension variance and covariance correlation which necessarily leads to increase wear and tear on devices. Further, alternative rule based virtual power plant optimization methods lead to clear lower levels of efficiency and performance and expected return. Individual owners of distributed power systems are therefore left at competitive disadvantages to wholesale utility operators and wholesale utility operators also run deficient systems. Retail electricity prices are multiple factors higher than wholesale power prices for no apparent benefit to the retail consumer or operator of distributed power generation or use facilities. Some retail operators have tried to provide retail access to the wholesale power market in recent years, but the systems are not organized in a manner that yields results that place the individual operator with the same information advantage as the wholesale operators of power. Asymmetric information, asymmetric systems and unorganized power unit aggregation yield to low quality results for retail owner operators and consumers. Exchange optimization models have not been linked to geolocation data to improve these results until the disclosed invention. Two, three, four and five dimension tensor modeling of power factor data is deficient from incorporating time, sensory, sound, weather, scale, micro-scale, nano-scale, temperature, and other string theory dimensions possible of additional universes, starting points in history of different universes and alternative laws of physics. Internet of Things devices may also incorporate multi-dimension data and substitution methods required for more efficient optimization considering both expected value which are probability weighted contemporaneously with variance and covariance of the portfolio of power consuming and producing devices to minimize virtual power plant portfolio expected value variance for an objective expected return which necessarily leads to a mathematically superior outcome due to maximizing risk adjusted return and minimizing wear and tear on the power consuming and producing devices for that return threshold. Current objective functions for virtual power plant optimization are very limited and in the case of virtual power plants, non-existent or void of organization. This situation is unfortunate as many people in the world simply have limited means to such organized systems and linked devices. Lastly, unorganized power systems lead to a great deal of losses for limited environmental resources which can be very costly to the environment and to user costs and profits.

To avoid problems associated with limited resources and high cost inefficiently organized power systems, computing devices may be improved by integrating a plurality of dimensions from a power factor database, structures with social networks, transit and space utilization optimization, optimization of user objective functions and price time priority queue exchanges and securitization transformations which may add additional dimensions to improve user utility while reducing the cost of the current unorganized systems. Each of the aforementioned are steps in the overall optimization sequence linked to devices and electricity.

Accordingly, there is a need for implementations of various methods to couple a multi-dimension mapping database (latitude, longitude, altitude, sound, sensory, time, weather, temperature, scale, micro-scale, nano-scale, alterative transit, alterative room selection, power load or generation dimension, fuel to power heat rate dimension, chemistry dimension, cross-product dimension, nth dimension), multi dimension coordinate object portfolio optimization, data exchange, rendering engine, CPU devices (Central Processing Unit, "CPU"), GPU devices (Graphic Processing Unit, "GPU"), securitization transformations, social networking, device level portfolio optimization and price time priority exchange databases. In some embodiments, the CPU or CPU(s) or GPU form factor may be expressed as a CPU or GPU mobile device, internet of things power plug device, power inverter, battery storage, tablet device, internet of things central control device, stationary computing device, augmented reality device, virtual reality device, sensory device, audio device, visual device or other general computing device, such as those described in U.S. Pat. No. 10,460,520 B2, "Computer Ball Device for Mixed Reality, Virtual Reality or Augmented Reality," filed Jan. 13, 2017, the contents of which are hereby incorporated by reference in their entirety. In some embodiments, the CPU or GPU form factor may be mechanotransduction devices such as earphones or headphones with cameras to optimize across dimensions. In some embodiments, multi-dimensional map tile database elements may replicate virtual environments or immerse social network participants in virtual environments. In some embodiments, multi dimension coordinate objects, such as devices capable of consuming or producing power, may be optimized with an objective function to improve the user utility. In some embodiments, the plurality of user social networks may include both public and private views. In some embodiments, social network objects may form virtual power plant generating or consuming networks. In some embodiments, the plurality of user social network private view may display invite only participants. In some embodiments, the plurality of user social network public view may display multiple virtual environment participants with their derived placement in the database virtual, augmented or mixed reality environment. In some embodiments, the plurality of form factors for the multi-dimensional map tile database, virtual power plant optimizer, data exchange, proxy dimension database and machine learning proxy algorithm provide efficient user experiences for virtual travel as well as arranged meetings from the time exchange as described in U.S. provisional patent application Ser. No. 63/027,344, "Time interval geolocation community objects with price-time priority queues for transformed time interval geolocation units," filed May, 19, 2020, the contents of which are hereby incorporated by reference in their entirety. As described in U.S. provisional patent application Ser. No. 63/027,344 above, power producing or consuming objects may be optimized across dimensions whereby virtual meetings may occur to consolidate room space of attendees to reduce heating and air conditioning and power costs and increase profits by allowing the collective group to make money by consolidating online virtual meetings so that appliances may be shut down in alternative spaces and the power sold back to the grid to create a profit for the user or company using the system. In some embodiments, expected values of energy units may be compared and optimized to present users the relative trade offs between virtual transportation energy consumption and physical transportation energy consumption in the optimization over the overall energy consumption portfolio which may be aggregated to form a virtual power plant that both consumes and produces energy by looking at relative value cost of various meeting locations in corroboration with physical transit dimensions. In some embodiments, an aspect of the present invention is directed towards the ability to weight portfolios of energy consumption and generation with negative and positive weights over a plurality of energy consumption and generation dimensions to maximize user utility adjusted for virtual power plant portfolio variance or equivalently minimizing virtual power plant portfolio variance for a target expected return value of the users return or utility function. In some embodiments, a negative virtual power plant object weight may represent a power consuming virtual power plant object whereas a positive virtual power plant weight may represent a power producing virtual power plant object. In yet other embodiments, a negative virtual power plant object weight may represent a power producing virtual power plant object whereas a positive virtual power plant weight may represent a power consuming virtual power plant object. Virtual power plants methods and systems are also described in U.S. patent application Ser. No. 16/357,241, "Renewable Energy Community Objects with price time priority queues for transformed renewable energy units," filed Jul. 18, 2019, the contents of which are hereby incorporated by reference in their entirety. Optimization organization of the virtual power plant utility function across these dimensions has not been done by prior art which leaves great deficiencies for users, environmental waste, lost profits.

SUMMARY

Described herein are implementations of various technologies relating to price time priority queues for multi-dimensional virtual power plant device aggregation systems. The above aforementioned deficiencies and other problems associated with virtual power plant object systems incapable of securitization, optimization conditions of forward wholesale prices to determine expected values based on multi-dimension power factor databases and minimization techniques over energy use and expected value variance are eliminated or reduced by the disclosed multifunction device and method. In one implementation, a method may include receiving origin location data and destination location data from a first user, where the origin location data corresponds to a geographic origin and the destination location data corresponds to a geographic destination. The method may also include alternative power system and method optimization variables and techniques for power curtailment or optimal use do not consider forward expected return values which dynamically interact with real time power prices and usages, variance and covariance power plant object adjustments to risk adjust return as well as reduce electric motor wear and tear, efficient virtual power plant aggregation, multi-dimension optima, or optimal weightings adjusting for volatility of price markets and quantities used thereby reducing equipment wear and tear. The method may further include current power systems of technology to integrate computing into everyday life and power generation and consumption have largely been accepted or constrained to power consumption reduction or curtailment or limiting peak consumption to reduce costs.

In another implementation, a computing system may include one or more processors, and the computing system may also include one or more memory having program instructions executable by the one or more processors to receive origin location data and destination location data from a first user device, where the origin location data corresponds to a geographic origin and the destination location data corresponds to a geographic destination. The one or more memory may also have program instructions executable by the one or more processors to generate a plurality of net metering or net generation scenarios based on the origin location data and the destination location data. In another implementation and aspect of the invention, the disclosed method and system may include hardware configurations reduces or eliminates these aforementioned deficiencies. In some embodiments, a computer-implemented method for use in conjunction with a computing device comprises: detecting a power load quantity of generation or consumption over a plurality of power producing and consuming units, calculating the expected value return and return variance and return correlation of a matrix of multi-dimensional power producing and consuming units and unit alternatives, minimizing the variance of an objective function which weights power producing and consuming units and unit alternatives for a given objective function of expected value return, processing the optimal energy unit portfolio positive and negative weights for the expected portfolio value with the energy unit price time priority queue to request user market execution approval and processing the positive and negative weights of the optimized objective function with instructions to the power producing and consuming unit and unit alternative devices to produce or curtail output.

In another aspect of the invention, the disclosed price-time priority queue organized multi-dimension power factor data and data exchange with multi-dimension coordinate object optimization over the user utility function allows electronic devices to behave and organize social networks, virtual objects, augmented reality objects, mixed reality objects and actual objects in a manner that greatly improves the time and efficiency and cost and revenue by which the objects may be utilized by a plurality of users despite former lack of organizational structure to the data.

In another aspect of the invention, one step in the algorithm includes various methods to couple a multi-dimension mapping database (latitude, longitude, altitude, sound, sensory, time, weather, temperature, scale, micro-scale, nano-scale, power load or generation dimension, inverter status, meter measurement, fuel to power heat rate dimension, alternative transit option dimensions, alternative meeting room option dimensions, chemistry dimension, cross-product dimension, health risk chemistry dimension, nth dimension), multi dimension coordinate object portfolio optimization, data exchange, rendering engine, CPU devices (Central Processing Unit, "CPU"), GPU devices (Graphic Processing Unit, "GPU"), securitization transformations, social networking, device level portfolio optimization and price time priority exchange databases. In some embodiments, the CPU or CPU(s) or GPU form factor may be expressed as a CPU or GPU mobile device, internet of things power plug device, power inverter, battery storage, tablet device, internet of things central control device, stationary computing device, augmented reality device, virtual reality device, sensory device, audio device, visual device, energy management optimization or other general computing device, such as those described in U.S. Pat. No. 10,460,520 B2, "Computer Ball Device for Mixed Reality, Virtual Reality or Augmented Reality," filed Jan. 13, 2017, the contents of which are hereby incorporated by reference in their entirety. In some embodiments, the CPU or GPU form factor may be mechanotransduction devices such as earphones or headphones with cameras to optimize across dimensions. In some embodiments, multi-dimensional map tile database elements may replicate virtual environments or immerse social network participants in virtual environments. In some embodiments, multi dimension coordinate objects, such as devices capable of consuming or producing power, may be optimized with an objective function to improve the user utility. In some embodiments, the plurality of user social networks may include both public and private views. In some embodiments, social network objects may form virtual power plant generating or consuming networks. In some embodiments, the plurality of user social network private view may display invite only participants. In some embodiments, the plurality of user social network public view may display multiple virtual environment participants with their derived placement in the database virtual, augmented or mixed reality environment. In some embodiments, the plurality of form factors for the multi-dimensional power factor tile database, virtual power plant optimizer, data exchange, proxy dimension database and machine learning proxy algorithm provide efficient user experiences for virtual travel as well as arranged meetings from the time exchange as described in U.S. provisional patent application 63/027,344 which has non provisional U.S. patent application Ser. No. 17/324,051, "Time interval geolocation community objects with price-time priority queues for transformed time interval geolocation units," filed May, 19, 2020, the contents of which are hereby incorporated by reference in their entirety. As described in U.S. provisional patent application Ser. No. 17/324,051 above, power producing or consuming objects may be optimized across dimensions whereby virtual meetings may occur to consolidate room space of attendees to reduce heating and air conditioning and lighting and power costs and increase profits by allowing the collective group to make money by consolidating online virtual meetings so that appliances may be shut down in alternative spaces and the power sold back to the grid to create a profit for the user or company using the system. In some embodiments, expected values of energy units may be compared and optimized to present users the relative trade offs between virtual transportation energy consumption and physical transportation energy consumption in the optimization over the overall energy consumption portfolio which may be aggregated to form a virtual power plant that both consumes and produces energy by looking at relative value cost of various meeting locations in corroboration with physical transit dimensions. In some embodiments, an aspect of the present invention is directed towards the ability to weight portfolios of energy consumption and generation with negative and positive weights over a plurality of energy consumption and generation dimensions to maximize user utility adjusted for virtual power plant portfolio variance or equivalently minimizing virtual power plant portfolio variance for a target expected return value of the users return or utility function. In some embodiments, a negative virtual power plant object weight may represent a power consuming virtual power plant object whereas a positive virtual power plant weight may represent a power producing virtual power plant object. In yet other embodiments, a negative virtual power plant object weight may represent a power producing virtual power plant object whereas a positive virtual power plant weight may represent a power consuming virtual power plant object. Virtual power plants methods and systems are also described in U.S. patent application Ser. No. 16/357,241, "Renewable Energy Community Objects with price time priority queues for transformed renewable energy units," filed Jul. 18, 2019, the contents of which are hereby incorporated by reference in their entirety. Optimization organization of the virtual power plant utility function across these dimensions has not been done by prior art which leaves great deficiencies for users, environmental waste, lost profits.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3 illustrates an exemplary price-time priority queue for virtual power plant object community linked subject objects or device and transmission combinations and community subject object sequences for transformed virtual power plant interval object community linked virtual power plant interval object units.

FIG. 16 illustrates an exemplary a flow diagram illustrating methods exemplary users move through while participating, transacting and trading virtual power plant interval object community linked virtual power plant interval object or time interval object capacity with associated price-time priority queues in accordance with some embodiments.

FIG. 25 illustrates an exemplary user interface to display open or restriction settings for auctions of the virtual power plant interval object community linked virtual power plant interval object forward market with associated price-time priority queues system and method in accordance with some embodiments.

FIG. 49 illustrates an exemplary virtual power plant interval object unit uplink inventory interface with time interval object community linked subject virtual power plant interval object sequence unit market system and method with associated price-time priority queues.

FIGS. 52A and 52B illustrate an exemplary implementation of methods utilizing a plurality of linear and non-linear equations to maximize multi dimension user portfolio object utility function of the virtual power plant in accordance with some embodiments.

FIGS. 55A and 55B and 55C illustrate one exemplary probability distribution of a virtual power plant object utilizing a plurality of linear and non-linear equations to maximize multi dimension user portfolio virtual power plant object utility.

FIGS. 56A and 56B and 56C and 56D illustrate a virtual power plant object portfolio, expected value of the virtual power plant portfolio object, standard deviation of the virtual power plant object portfolio and covariance of the virtual power plant object portfolio.

FIGS. 57A and 57B and 57C illustrate how the covariance and correlation equations of virtual power plant objects relate to the maximization of the virtual power plant multi dimension object score for the virtual power plant portfolio of objects.

FIGS. 58A and 58B illustrate some descriptive virtual power plant objects and virtual power plant object portfolios sampling analysis statistics of a partial implementation of a simple two object multi dimension virtual power plant object embodiment of the system and method.

FIGS. 59A and 59B illustrate an exemplary scenario of an experiment with different virtual power plant object proportions to observe the effect on the expected value of the multi dimension virtual power plant objects and virtual power plant object portfolios with various weightings.

FIG. 60B illustrates the multi dimension virtual power plant coordinate object combination opportunity set for various correlation factors.

FIGS. 61A and 61B illustrate the opportunity set generated from the joint probability distribution of the combination of multi dimension virtual power plant object coordinates of virtual power plant object 1 and virtual power plant object 2 using the data from FIG. 61B as well as the slope of the reward to variability ratio or multi dimension object virtual power plant score allocation line (A).

FIGS. 62A and 62B illustrate the highest sloping multi dimension virtual power plant object score allocation line (C) at point P intersecting with the opportunity set.

FIGS. 63A and 63B and 63C illustrate the framework to maximize the slope of the multi dimension virtual power plant object score allocation line subject to the condition that the sum of the weight of all the multi dimension coordinate object will sum to one which is a standard calculus problem.

FIGS. 64A and 64B illustrate an exemplary implementation of methods utilizing a plurality of linear and non-linear equations to maximize multi dimension user virtual power plant portfolio object utility in accordance with some embodiments.

FIG. 67 illustrates the expected general exemplary case of the method with vectors to illustrate any general combination of multi dimension virtual power plant coordinate object components, multi dimension virtual power plant coordinate objects and combinations and how they interact with any multi dimension virtual power plant coordinate object components or elements.

FIG. 70 illustrates an exemplary portfolio set of minimized objective function multi dimension expected value variance subject to a target multi dimension expected value which achieves a profit target while minimizing wear and tear on consuming and producing electric motors and storage and switching alternative spaces in corroboration with multi dimension optimization over video conference to optimize energy consumption over transportation, heating and air conditioning, health risk, traffic driving risk, road condition risk and other dimension risk.

DETAILED DESCRIPTION

Figure 1:
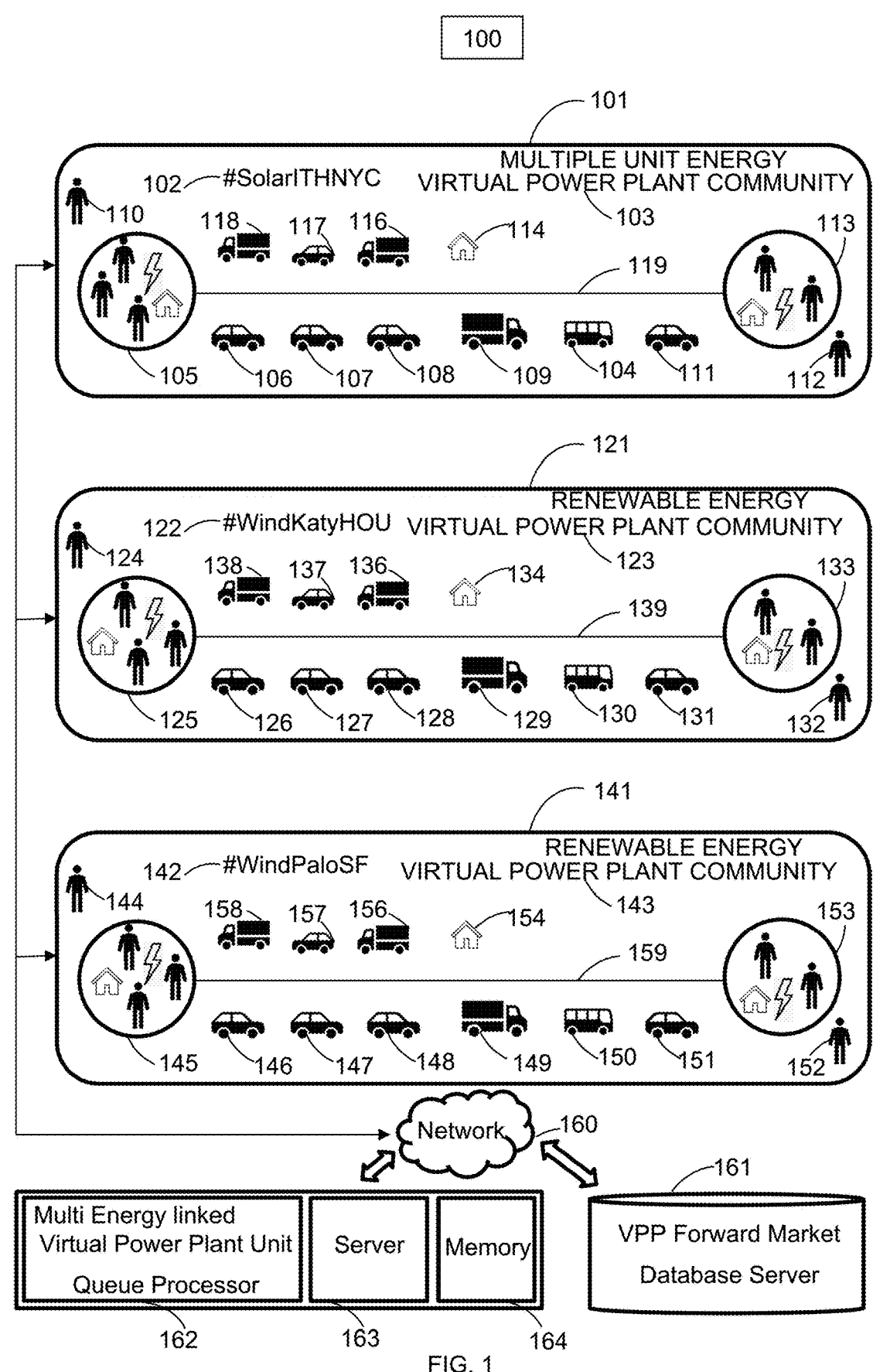
FIG. 1 illustrates an exemplary schematic diagram of implementations of the mobile CPU and plurality of multiform factored CPU or GPU devices networked with the multi-dimension power factor database, to form a plurality of social network based virtual power plants organized by a optimization layer to minimize power consumption and production device portfolio variance and covariance subject to an expected value objective function linked to a price time priority queue for market execution of the optimization parameters.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact virtual power plant data community linked transmission and virtual power plant data units with associated price-time priority queues as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A computing device, as described herein, may include any computing implementation known to those skilled in the art, including mobile computing devices. In some implementations, a fixed stationary computing device, a virtual reality headset, a mixed reality headset, an augmented reality headset, or an audio interfaced computer device may be used instead. In another implementation, the computing device may be used in conjunction with a projection computing device. The computing device may be used with or include any device which communicates and integrates the use of: a network, community route processor, my route processor, sequence route processor, global positioning system (GPS) network, routing algorithms based on dynamic market inputs, servers, forward commodity forward market auction database, grouping software instructions for hubs, securitization transformations and specifications, game servers, indexing algorithms for transportation and freight unit securities, forwards, futures, options, swaps and contracts on various navigation routes, navigation servers, routing sequence algorithms, virtual hub topology methods and systems, transparent open access user interface pricing systems with price time priority queues, blockchain audit and safety methods, facial recognition, fingerprint recognition or photo recognition of users for security and identity check, and/or algorithms for no arbitrage conditions and constraints. A computing device, as described herein, may utilize a user interface (e.g., a graphical user interface) formatted on mobile or stationary computing devices over various mediums. Such devices may be connected through a network for the purpose of grouping users into virtual hub sequences of community objects as a gateway to participating, transacting, and/or trading transportation or freight capacity units between combinations of virtual hubs as a forward commodity in an auction.

Various implementations directed to price time priority queue routing for transportation capacity units will now be described in the following paragraphs with reference to FIGS. 1-71.

The following paragraphs provide various techniques of various embodiments described herein such as illustrated as in FIG. 1. In one implementation, as illustrated in FIG. 1, a user 110 may be assigned or may join a multi-unit energy virtual power plant community 101, 103 which is a sequence of virtual power plant hub(s). In some embodiments, a virtual hub may represent a virtual power plant portfolio of power consuming objects, power producing objects or power alternative objects. In some embodiments, a virtual power plant portfolio may represent a single power consuming object, power producing object or power alternative object or many power consuming objects, power producing objects or power alternative objects. In some embodiments, the virtual power plant hub sequence may be assigned a metadata tag such as #SolarITHNYC 102 which is short for a longer full name sequence such as Solar from Ithaca, N.Y. to New York City. In some embodiments, the origin virtual hub 105 which may include smart meters, meters, connected appliances, connected distributed generation, net metering and power inverters, and may be a specific virtual power plant address and geolocation data in the city of Ithaca, New York in the NYISO, which is the New York Independent System Operator ("NYISO") for power or the equivalent thereof. In some embodiments, the virtual power plant grid point or transmission line 119 between the virtual power plant address of an address in Ithaca, New York such as the street address of two Seneca Street, virtual power plant hub 105 and the fifty Fifth Avenue virtual power plant hub 113 may be a sequence of two virtual power plant hubs. In some embodiments, there may be many one or more homes, commercial or industrial facilities 114, forming a network 101 or social network 101 which consume or produce power. In some embodiments, trucks 118 along the geolocation based virtual power plant or virtual power plant transmission line 119 or cars 117 or additional trucks 116 or additional cars 107 which are headed in a certain direction along the virtual power plant or virtual power plant transmission line 119 may also join the social network of a virtual power plant community 101. In some embodiments, additional vehicles 106, 107, 108, 109, 104 or bikes, eBikes or eScooters 111 may be headed the other direction along the virtual power plant hub sequence 119 between two virtual power plant hub points 105, 113 which may include smart meters, meters, connected appliances, connected distributed generation, net metering and power inverters. In some embodiments, additional user(s) 112 may join the virtual hub power plant sequence community 103. In yet another exemplary implementation, a user 124 may be assigned or may join a virtual power plant community 122, 121, 123 which are a sequence of virtual power plant hub(s) or virtual power plant hub(s) zone(s). In some embodiments, the virtual hub power plant sequence may be assigned a metadata tag such as #WindKatyHOU 122 which is may represent an exemplary virtual power plant or virtual power plant transmission line which has a plurality of user tie in, interchange or inverter zones 122. In some embodiments, the zone may have a plurality of residential, commercial or industrial facilities 134 or vehicles such as cars 126, 127, 131, 130 and trucks 129, 136, 138 and eScooters, eBikes, bikes as well as airplanes and drones for air landing strips, autonomous vehicles 130, bikes, boats for shipping lanes or ports, busses, drone landing areas or unmanned aerial craft landing areas on the virtual power plant hub, or a limo or livery service, or motorcycle, or moped, or shuttle for space landing areas, or spaceship for space landing areas, or subway for subway stations, or taxis or transportation network companies or trains, or package delivery services on a plurality of modes or robotic delivery services. In some embodiments, there may be many one or more trucks 129 along the virtual power plant or virtual power plant transmission line 139 or cars 131 or residential, commercial or industrial facilities 125 which may include smart meters, meters, connected appliances, connected distributed generation, net metering and power inverters and which are geolocation zoned along the virtual power plant or virtual power plant transmission 139. In some embodiments, the graphical user interface may communicate with the network 160 and receive instructions from the multi form factor energy virtual power plant unit queue processor 162 and server 163 and memory 164 as well as the virtual power plant capacity forward market database base server 161. In yet another exemplary implementation, a user 124 or additional user 110 may be assigned or may join a virtual power plant community 121 which is a sequence of virtual power plant hub(s) from the geofence or crossing the geofence.

In some embodiments, virtual power plant hub sequences such as the street address of two Seneca Street virtual power plant hub 105 and the virtual power plant hub 113 which may include smart meters, meters, connected appliances, connected distributed generation, net metering and power inverters, and may be a sequence of two virtual power plant hubs are transformed into community objects which may then be assigned a plurality of attributes in the same sense as a class in the Java programming language has methods as a part of the class object in object oriented programming. In some embodiments, the data transformation of a virtual power plant hub sequence into a community object allows the similar benefits of the data transformations involved in computing languages with methods which help the instructions of the computer program communicate in an organized manner using modular logic. In some embodiments, virtual power plant hub sequences such as 105 to 113 #SolarITH-NYC 102 may be combined with other virtual power plant hub sequences to extend the series sequence of which hub or hub sequence may include smart meters, meters, connected appliances, connected distributed generation, net metering and power inverters. As we have discussed at length in the previous sections of the disclosed invention, while there may be hundreds or thousands or millions of people or residential or commercial or industrial assets along various virtual power plant capacity virtual hub sequences, there currently exists no method or system of organizing a virtual power plant or virtual power plant hub sequence into a transformed data community object with securitization attributes. The attributes of communities allow for superior communication, accountability and even transactions to occur within a community object 101. In some embodiments, the data transformation of a virtual power plant hub sequence community object 101 allows a plurality of network members 110, 112 to be assigned virtual power plant communities 103 based on a plurality of attributes, prior GPS location histories, geofencing, navigation search queries, which may include smart meters, meters, connected appliances, connected distributed generation, net metering and power inverters, or other attributes. In some embodiments, the virtual power plant object has been further transformed with multi dimension database attributes of geolocation tagging with latitude, longitude, altitude and a plurality of other multi dimension attributes to effectively compare not only ramping up and down of power consumption and production assets, but also substituting methods such as virtual transportation costs, alternative room heating, cooling, lighting and other power attribute costs and heat rate revenue efficiency. In some embodiments, virtual power plant hub sequences which have been transformed into community objects 101 provide greater communication and organizational ability for a market to transact virtual power plant parking capacity unit(s) and provide a gateway for those transportation and freight capacity unit transactions as described in U.S. Patent Application Publication, Ser. No. 15/877,393, "Electronic Forward market exchange for transportation capacity seats and capacity in transportation capacity spaces and vehicles," filed Jan. 23, 2018, the entirety of which is incorporated by reference herein.

In some embodiments, virtual power plant hub sequences which have been transformed into community objects 101 communicate through a network 160 to associate a price-time priority queue 145, 146, 147, 148, 149, 150, 151, 158, 157, 156, 154, 159 for a transformed virtual power plant capacity community object using a virtual power plant capacity unit queue processor 162, a server 163, memory 164 and a virtual power plant capacity forward market database server 161. In some other embodiments, the price-time priority queues for communities 105, 113, 133, 134, 136, 137, 138, 139, 141, 145, 146, 147, 148, 149, 150, 151, 153 may also be organized into other priority schema queue structures and sequences. In some embodiments, the virtual power plant hub sequences or community objects 101 may be independent or sequenced to construct a waypoint sequence of multiple linked virtual power plant hub power plant community objects 101. In some embodiments, the associated price-time priority queue 125, 133, 134, 136, 137, 138, 139, 140, 141, 142, 143, 144, 145, 146, 147, 148, 149, 150, 151, 153 for virtual power plant capacity units may have generated processing and user interface display instructions from the virtual power plant capacity unit queue processor 162, the server 163, the memory 164 and a virtual power plant capacity forward market database server 161 through a network 160. In some embodiments, the price-time priority queue 125, 133, 134, 136, 137, 138, 139, 140, 141, 142, 143, 144, 145, 146, 147, 148, 149, 150, 151, 153 for transformed virtual power plant capacity units may process and display a plurality of time and date sequences for a plurality of forward delivery periods for transformed virtual power plant capacity unit(s). In some embodiments, the geolocation virtual object legal securitization transformation step as described in U.S. patent application Ser. No. 15/877,393, "Electronic forward market exchange for transportation seats and capacity in transportation spaces and vehicles," filed Jan. 23, 2018 and U.S. Provisional Patent Application Ser. No. 62/977,559, "Method to transmit geolocation exchange based markets," filed Feb. 17, 2020 and U.S. Provisional Patent Application Ser. No. 63/027,344, "Time interval geolocation community objects with price-time priority queues for transformed time interval geolocation units," filed May 19, 2020, the entirety used as reference herein. In some embodiments, an exemplary priority schema may follow the buy quantity of virtual power plant capacity units 300 label which may be a price-time priority schema to label the buy quantity at a given price and time of virtual power plant capacity units as the first price time priority position buy quantity of two virtual power plant capacity units 309 for a social community virtual power plant object such as 101, 121, 141. In some embodiments, the second price-time priority queue position may be represented by a buy quantity of one 308 for virtual power plant capacity units at a given virtual power plant hub sequence 101, 121, 141. In some embodiments, the third price-time priority queue position may be represented by a buy quantity of one 307 for virtual power plant capacity units at a given virtual power plant hub sequence. In some embodiments, an exemplary priority schema of buy prices may follow the price of virtual power plant capacity unit 145 such as #WindPaloSF 142 which may be wind power available in Palo Alto, California at a given specification time and date and geolocation.

Figure 2:
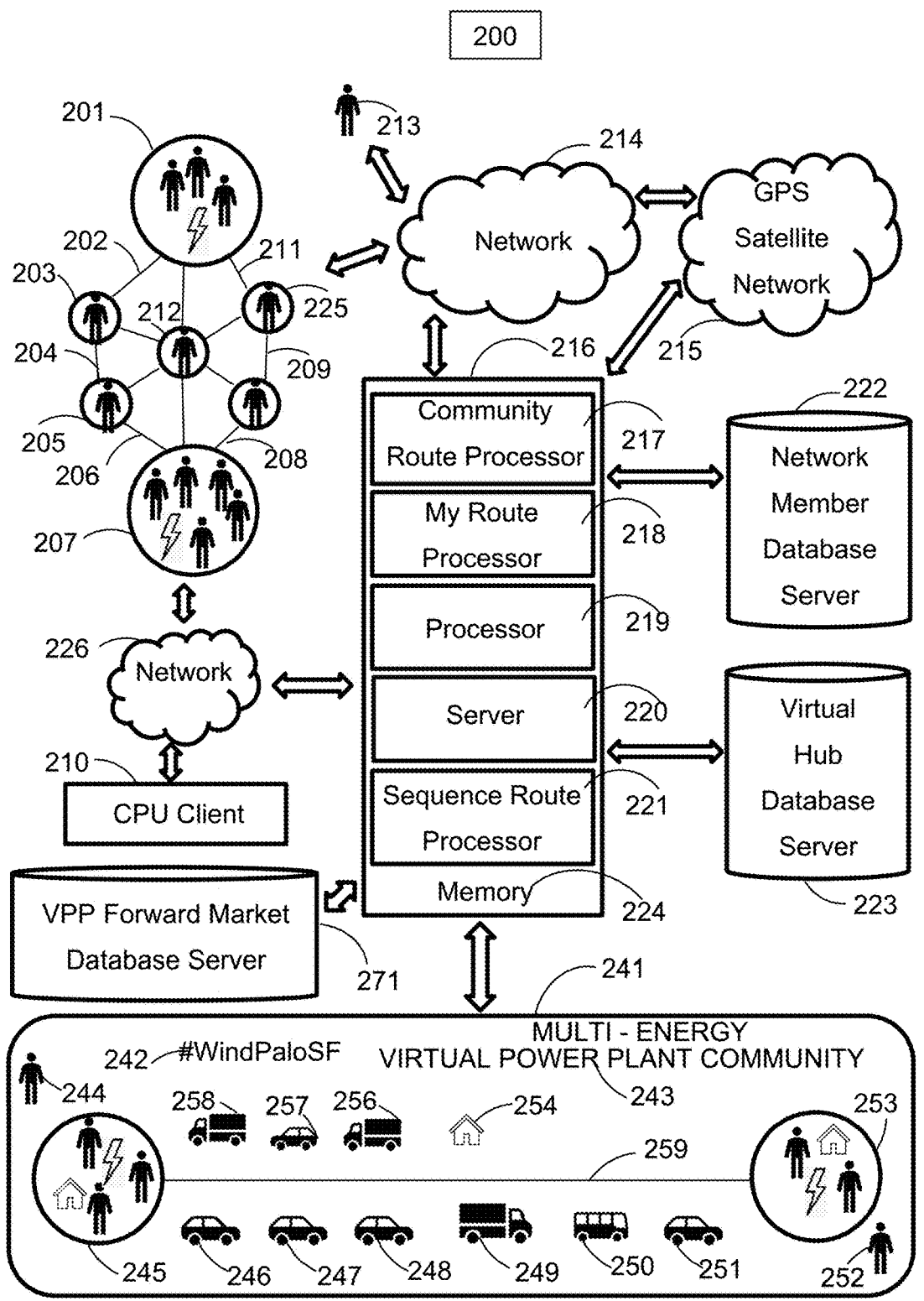
FIG. 2 illustrates an exemplary schematic diagram of implementations of methods considering multiple user of the virtual power plant network and optimization and trading system.

The embodiment illustrated in FIG. 2 illustrates an exemplary network sequencing from a plurality of users 201, 202, 203, 204 of the social network configuration setting a power factor virtual power plant mapping sequence for a virtual power plant hub 205 originating in New York, New York

207 in power plant to Paris, France 206 with a final destination of Hawaii 208. In some embodiments, the multi-dimension power factor map tile rendered virtual power plant hub 205, 207 and virtual power plant transmission sequence 206 may render a plurality of users 213 whereby social network virtual power plant object users of the virtual power plant object sequence 205, 206, 207 may use a plurality of modes such as natural gas, solar, wind, oil, heating oil, diesel, nuclear, biomass, geothermal, methane, battery, reserve, hydro or many other virtual power plant sequences with many dimensions with the geo-dimension sequence CPU engine 217 over a plurality of buildings, commercial, residential, industrial or other facilities such as the Eiffel tower 225 along the Seine river or the louvre 203 or a plurality of other virtual power plant objects which have been acquired by the multi-dimension map power factor tile database 6900 with gap rendering by the proxy dimension database server 220 and the multi-dimension geo CPU rendering engine 219 to a plurality of multi-form factor devices such as in the multi-energy virtual power plant community 243 rendered by the multi-dimensional power factor map tile database server 223. In some embodiments, the user 213 may pair with a plurality of other users or other virtual power plant communities to expand or achieve a higher expected return value from the objective function of the virtual power plant community 5210 through a series of network 160 recommendations from the optimization functions to a plurality of virtual power plant users over residential, commercial, industrial, vehicle and other spaces 201, 211, 203, 209, 212, 205, 207. In some embodiments, the virtual power plant 201 may have the dimension of transportation substitution or room substitution through optimized community route virtual power plant processor instructions 217. In some embodiments, the virtual power plant 218 rendered may correspond to a destination 203 or stop 207, 206 on the virtual trip as a multi dimension power factor database object 205 which may have been compared to heating or cooling or lighting another alternative room space.

FIG. 3 illustrates an exemplary user price-time priority queue 300 for transacting or matching transformed virtual power plant capacity unit data, participating, transacting and/or trading virtual power plant capacity, representing the transformed virtual power plant capacity unit value as a homogeneous asset specification or virtual power plant capacity as a physical forward commodity security between combinations of virtual power plant hubs over various virtual power plant capacity modes. In some embodiments, user transformed virtual power plant capacity unit(s) or transformed virtual power plant capacity unit(s) associated with virtual power plant community objects interface 300 includes the following instructions, transformations and elements, or a subset or superset thereof:

exemplary transformed virtual power plant capacity unit price-time priority sell queue 320;

exemplary transformed virtual power plant capacity unit price-time priority buy queue 321;

exemplary transformed virtual power plant capacity unit price priority bucket 305 in the virtual power plant capacity unit buy queue of $5.10;

exemplary transformed virtual power plant capacity unit price priority bucket 306 in the virtual power plant capacity unit buy queue of $5.30;

exemplary transformed virtual power plant capacity unit price priority bucket 310 in the virtual power plant capacity unit buy queue of $5.60;

exemplary transformed virtual power plant capacity unit price priority bucket 314 in the virtual power plant capacity unit sell queue of $5.70;

exemplary transformed virtual power plant capacity unit price priority bucket 315 in the virtual power plant capacity unit sell queue of $5.80;

exemplary transformed virtual power plant capacity unit price priority bucket 316 in the virtual power plant capacity unit sell queue of $6.60;

exemplary transformed virtual power plant capacity unit price-time priority buy price 304 in the first time position of the price priority bucket 305 of $5.10;

exemplary transformed virtual power plant capacity unit price-time priority buy price 303 in the second time position of the price priority bucket 305 of $5.10;

exemplary transformed virtual power plant capacity unit price-time priority buy price 302 in the third time position of the price priority bucket 305 of $5.10;

exemplary transformed virtual power plant capacity unit price-time priority buy price 307 in the first time position of the price priority bucket 306 of $5.30;

exemplary transformed virtual power plant capacity unit price-time priority buy price 309 in the first time position of the price priority bucket 310 of $5.60;

exemplary transformed virtual power plant capacity unit price-time priority buy price 308 in the second time position of the price priority bucket 310 of $5.60;

exemplary transformed virtual power plant capacity unit price-time priority sell price 311 in the first time position of the price priority bucket 314 of $5.70;

exemplary transformed virtual power plant capacity unit price-time priority sell price 312 in the second time position of the price priority bucket 314 of $5.70;

exemplary transformed virtual power plant capacity unit price-time priority sell price 313 in the third time position of the price priority bucket 314 of $5.70;

exemplary transformed virtual power plant capacity unit price-time priority sell price 318 in the first time position of the price priority bucket 315 of $5.80;

exemplary transformed virtual power plant capacity unit price-time priority sell price 319 in the second time position of the price priority bucket 315 of $5.80;

exemplary transformed virtual power plant capacity unit price-time priority sell price 317 in the first time position of the price priority bucket 316 of $6.60;

exemplary transformed virtual power plant capacity unit price time priority limit order book ("LOB") 325 is represented by the vector q(t) 301, such that the i-th coordinate for i>0, $q_i(t)$, is the number of sell limit orders of transformed virtual power plant capacity units that are waiting in the LOB at time t a price iδ (δ is the price unit tick size of the transformed virtual power plant capacity unit), the number of buy limit orders for transformed virtual power plant capacity units at iδ are represented with a negative sign $q_i(t)$;

exemplary benchmark price 326 of all sell limit orders at time t are computed as $s(t)=s(q(t))=\min$ (min {0<iδ: $q_i(t)>0$}), if $q_i(t)$ is less than or equal to 0 for all i>0, then s (q(t))=infinity;

exemplary benchmark price 327 of all buy limit orders at time t are computed as $b(t)=b(q(t))=\max$ (max {iδ>0: $q_i(t)<0$}), if $q_i(t)$ is greater than or equal to 0 for all i>0, then b(q(t))=negative infinity;

exemplary order match 328 in the transformed virtual power plant capacity unit limit order book where s(t)=b(t), which then moves the method and system to the matched transformed virtual power plant capacity unit limit order confirmation and delivery process;

exemplary limit order book status of no order match 329, where s(t)>b(t);

exemplary limit order book i-th $q_i(t)$ element 330 of LOB is cancelled, remove from queue;

exemplary i-th qi(t) element is a new transformed virtual power plant capacity unit order 331 in LOB, insert into respective limit order buy queue 321 or limit order sell queue 320 with priority of price, then time into the price time priority queues 300.

In some embodiments, the price-time priority queue 300 for transformed virtual power plant capacity units may be assigned to a virtual power plant community object 241 which is a waypoint virtual power plant transmission or virtual power plant hub sequence of transformed virtual power plant capacity units. In some embodiments, the price-time priority queue 300 may be assigned to two or more virtual power plants as a virtual power plant community object 241 or the price-time prior queue 300 may be assigned to a virtual power plant community object sequence of many virtual power plant hubs 203 to 205 to 207 to 212 which have been added together to form one continuous virtual power plant community object 241 and respective price-time priority queue for transformed virtual power plant capacity units through processing instructions from the community virtual power plant transmission route processor 217 and sequence virtual power plant route transmission processor 221 via the network(s) 226 and 214 and 215. In some embodiments, the limit order book 301 vector may be assigned to a specific date and time for the virtual power plant community sequence object which is a forward market price for transformed virtual power plant capacity unit(s) 271 and virtual power plant community sequence object(s) 241. In some embodiments, a specific transformed virtual power plant capacity unit price-time priority queue limit buy order 304 with a specific price stamp bucket 305 of $5.10, may be cancelled, if the 304 order is cancelled, the 303 price-time priority limit order book buy queue price then moves to the higher price-time priority queue position of 304 and price-time priority price of 302 moves to position 303. In some embodiments, the price-time priority limit order sell price 319 of price-time priority bucket price 315 of $5.80 may be cancelled, if 319 price-time priority of the transformed virtual power plant capacity unit is cancelled, then order 317 moves to a higher position in the overall transformed virtual power plant capacity queue 320 even though the limit order book price 317 remains in the price bucket of 316 which is $6.60. In some embodiments, price-time priority insertion may occur where a new order is inserted into either the transformed virtual power plant capacity unit buy queue 320 or transformed virtual power plant capacity unit sell queue 321. In some embodiments, by example but not limiting by example, a new price-time limit order for a transformed virtual power plant capacity unit may be inserted as a sell order at a price of $5.70 at position 313 which would then assume order 312 was also at a price of $5.70 and that order 312 was placed with a time that was before order 313 was placed. In the aforementioned example of the price-time order insertion of 313, price-time orders of 319, 318 and 317 have moved lower in their relative position even though they remain in distinctly different price buckets of 315 and 316 respectively as the price-time priority queue 300, price is first priority, then time stamp in the price-time priority queue 300 for transformed virtual power plant capacity units.

In some embodiments, the lowest selling price s(t) 326 may equal the highest buying price b(t) 327, in which case the highest transformed virtual power plant capacity unit buy queue price bucket 310 is equal to the lowest transformed virtual power plant capacity unit sell queue 320 selling bucket price 314. In the example 300 of the limit order book 301, but not limiting by example, the highest transformed unit buy price 310 of $5.60 is lower than the lowest virtual power plant capacity unit sell queue 320 lowest selling bucket 314 of $3.70 so no match occurs because s(t)>b(t) 329. In some embodiments, many order insertions 331 or order cancellations 330 may occur for transformed virtual power plant capacity units from the virtual power plant capacity forward market database server 271 associated with community objects which are series of waypoints 241.

In some embodiments, the LOB 300 for transformed virtual power plant capacity units may contain many different types of instruction structures and specifications such as limit orders 720, market orders 720, market if touched orders 720, snap market orders 720, snap mid orders 720, snap to primary orders 720, peg to benchmark orders 720, or adaptive custom orders 720 which are custom customer designed instructions which are all standard order types for anyone skilled in the art of markets. In some embodiments, the LOB 300 for transformed virtual power plant capacity units may also contain instructions for order times such as good for the day 710, good till cancelled 710, immediate or cancel 710, good till date 710, day till cancelled 710 or a plurality of additional custom instructions for the timing of the order of the transformed virtual power plant capacity unit in the LOB 300 that is associate with a virtual power plant community object 241. In some embodiments, a plurality of additional instructions and specifications may also be unique to each transformed virtual power plant capacity unit LOB 300 such as virtual power plant mode 811, air mode 812, autonomous vehicle mode 813, bike mode 814, boat mode 815, bus mode 816, drone mode 817, limo mode 818, motorcycle mode 819, moped mode 820, shuttle mode 821, spaceship mode 822, subway mode 823, business mode 824, scooter mode, eBike mode, eScooter mode, electric vehicle mode 827, train mode 825, fastest optimized mode 826, which may combine many modes 810 or a single mode 810 for a waypoint commute community object 241 or waypoint community sequence 201 to 203 to 205 to 212 to 207 of many commute communities 241. In yet other embodiments, the limit order book may compare specification modes of virtual modes 830 or industrial and commercial building virtual power plant modes and cargo modes 829 and virtual power plant home modes 828 against each other in the overall optimization sequence.

In some embodiments, the LOB 300 may be assigned to transformed virtual power plant capacity residential unit 828 that have associated commute community objects 241. In some embodiments, the LOB 300 for transformed virtual power plant capacity units may be assigned to cargo 829 such as a trailer of a rig or container of a boat or container on a truck or any type of cargo that takes up the space of a transformed virtual power plant capacity unit. In some embodiments, the LOB 300 may even be assigned to the virtual transformed virtual power plant capacity unit 830 which would be space along a packet moving medium such as a telecom pipeline, satellite telecom or wireless telecom that moves packets of data which are transformed virtual power plant capacity units parked in storage on the cloud. In some other embodiments, the virtual power plant mode 811 may also be used to optimize energy loads for natural gas consumption, coal consumption, nuclear consumption, heating oil consumption, diesel oil consumption, solar consumption, wind consumption, biomass consumption, methane consumption, general british thermal unit energy consumption or other fuel consumption in energy equivalent units for the optimization sequence.

In some embodiments, the virtual power plant capacity unit may be assigned to a plurality of other priority queues for trading purposes including but not limited to various blockchain sequences tied to the virtual power plant capacity unit over a distributed ledger on the community virtual power plant processor 217 or server 220 or sequence virtual power plant processor 221 or virtual power plant forward market database server 271.

Figure 4:
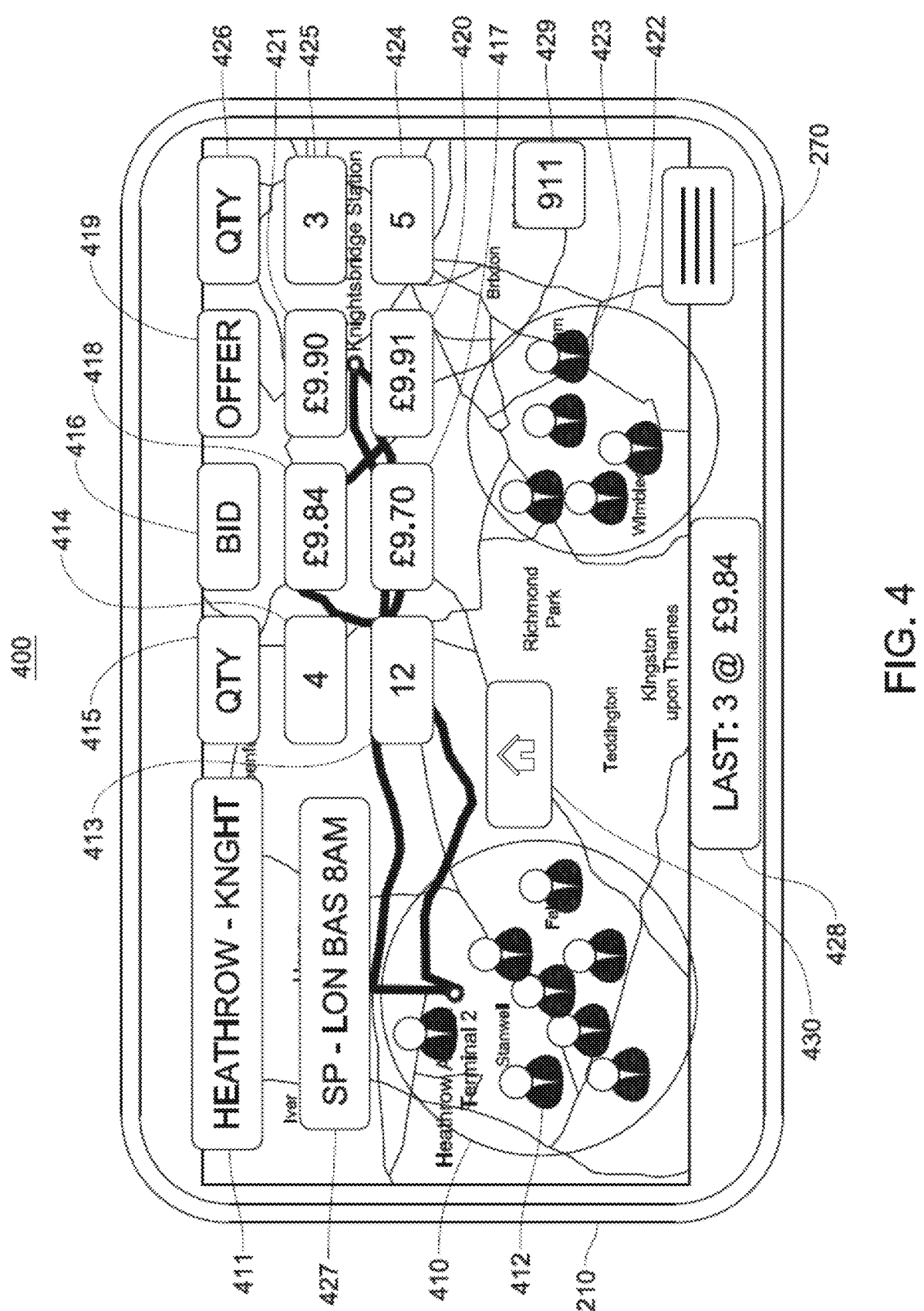
FIG. 4 illustrates an exemplary user interface with various international virtual power plant interval object of the London Heathrow airport with transmission to Knightsbridge configurations of trading virtual power plant interval object community linked virtual power plant interval object capacity with associated price-time priority queues in accordance with some embodiments.

FIG. 4 illustrates exemplary user interfaces 210 for participating, transacting and/or trading virtual power plant capacity as a physical forward data transformed virtual power plant capacity unit commodity or security between combinations of virtual power plant hubs which may be virtual power plant community objects 241 over various virtual power plant capacity modes. In some embodiments, user interface 210 includes the following elements, or a subset or superset thereof:

exemplary virtual power plant hub combination 411;

exemplary virtual hub origin/from location 410 with users 412 within the virtual power plant hub location 310;

exemplary specification summary of the market, level of service and time of delivery commencement 427, in this particular embodiment the GUI 210 has moved to an international virtual power plant market hub combination market such as within London;

exemplary mode of virtual power plant capacity type of residential, commercial or industrial which may include smart meters, meters, connected appliances, connected distributed generation, net metering and power inverters 430;

exemplary transaction summary of the last trade auction quantity and price 428 in the local currency or another currency set by the user 110;

exemplary virtual power plant hub destination/to location 422 and user who is being delivered on the virtual power plant capacity unit 423;

exemplary bid/buy quantity title header 415 for an exemplary virtual power plant capacity hub market;

exemplary bid/buy price title header 416 for an exemplary virtual power plant capacity hub market;

exemplary offer/sell price title header 419 for an exemplary virtual power plant capacity hub market;

exemplary offer/sell quantity title header 426 for an exemplary virtual power plant capacity hub market;

exemplary bid/buy quantity 414 for the best bid quantity for the associated LOB 300 from a plurality of users 110 for an exemplary respective virtual power plant capacity virtual hub combination that has undergone a plurality of data transformations in the method 411;

exemplary bid/buy quantity 413 for the second-best bid quantity for the associated LOB 300 from a plurality of users 110 for an exemplary respective virtual power plant capacity or virtual power plant hub combination that has undergone a plurality of data transformations in the method 411;

exemplary bid/buy price 418 for the best bid price for the associated LOB 300 from a plurality of users 110 for an exemplary respective virtual power plant capacity virtual hub combination that has undergone a plurality of data transformations in the method 411;

exemplary bid/buy price 417 for the second-best bid price for the associated LOB 300 from a plurality of users 110 for an exemplary respective virtual power plant capacity or virtual power plant hub combination that has undergone a plurality of data transformations in the method 411;

exemplary offer/sell price 421 for the best offer price for the associated LOB 300 from a plurality of users 110 for an exemplary respective virtual power plant capacity or virtual power plant hub combination that has undergone a plurality of data transformations in the method 411;

exemplary offer/sell price 420 for the second-best offer price for the associated LOB 300 from a plurality of users 110 for an exemplary respective virtual power plant capacity or virtual power plant hub combination that has undergone a plurality of data transformations in the method 411;

exemplary offer/sell quantity 425 for the best offer quantity for the associated LOB 300 from a plurality of users 110 for an exemplary respective virtual power plant capacity or virtual power plant hub combination that has undergone a plurality of data transformations in the method 411;

exemplary offer/sell quantity 424 for the second-best offer quantity for the associated LOB 300 from a plurality of users 110 for an exemplary respective virtual power plant capacity or virtual power plant hub combination that has undergone a plurality of data transformations in the method 411;

exemplary safety dispatch "911" button 429 to enact video and audio recording of the user 110 environment and dispatch of that information to authorities;

exemplary hamburger menu button 270 to move back to menu options and settings away from the participation, transaction, trading GUI 210 embodiment.

In some embodiments the user 110 may enter a transaction quantity and price for transformed virtual power plant capacity unit securities to participate, transact and/or trade by the GUI 210 detecting user 110 contact with a bid/buy price 418 or offer/sell price 421. The GUI 210 detects user 110 contact with any of the GUI 210 buttons which have been aforementioned. The GUI 210 may detect user contact 110 with any of the GUI 210 buttons 418, 417, 420,421 or user 110 voice interface with the application 210 method. Upon user 110 contact with buttons on the GUI 210, instructions are instantiated which allows the user 110 to change the specifications of the respective virtual hub combination 411. A plurality of prices and markets may be presented based on a plurality of contract specifications. In some embodiments, the best bid/buy price 418 may be moving up in price or down in price depending on the market conditions at any given time. In some embodiments the last auction trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments, upon selecting the virtual power plant community sequence price time priority queue transaction price 418, the user 110 may confirm the price 418 for execution under the LOB step method 300. In some embodiments the matrix of market quantities and prices 413, 414, 415, 416, 417, 418, 419, 420, 421, 424, 425, 426 may be referred to as market depth in the GUI 210 embodiment. In some embodiments the number of users 110 may be displayed as user icons 412 or 423 for the amount of people logged in which desire to transact, trade or participate in a given virtual hub 410 to virtual hub 422 combination auction. In some embodiments, users 110 may select the virtual power plant capacity mode 430 such that the user allows a market for only one form of transformed virtual power plant capacity as a commodity or security or the user 110 may allow the system to show multiple forms of transformed virtual power plant capacity between two virtual power plant capacity hubs 410, 411, 422. In some embodiments the GUI 210 may detect a user 110 selecting the 911 button 429 which may activate voice and video recording functions on the mobile or stationary device 210 and transmit the data with a confirmation from the user 110 to the authorities to provide enhanced security while participating, transacting or trading forward transformed virtual power plant capacity as a commodity or security. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits virtual power plant capacity or data through the network 214 or wireless GPS network 215 to call upon instruction routines and instruction sub-routines on the virtual power plant capacity forward market database server 271, virtual power plant hub database server 223, network member database server 222, and/or instructions in the memory of the cloud and local CPUs 219 which all interface together to make one system which may deliver virtual power plant capacity units to users 110 from and to a plurality of virtual hubs 410, 422 with a plurality of specifications 427 at specific market prices.

Figure 5:
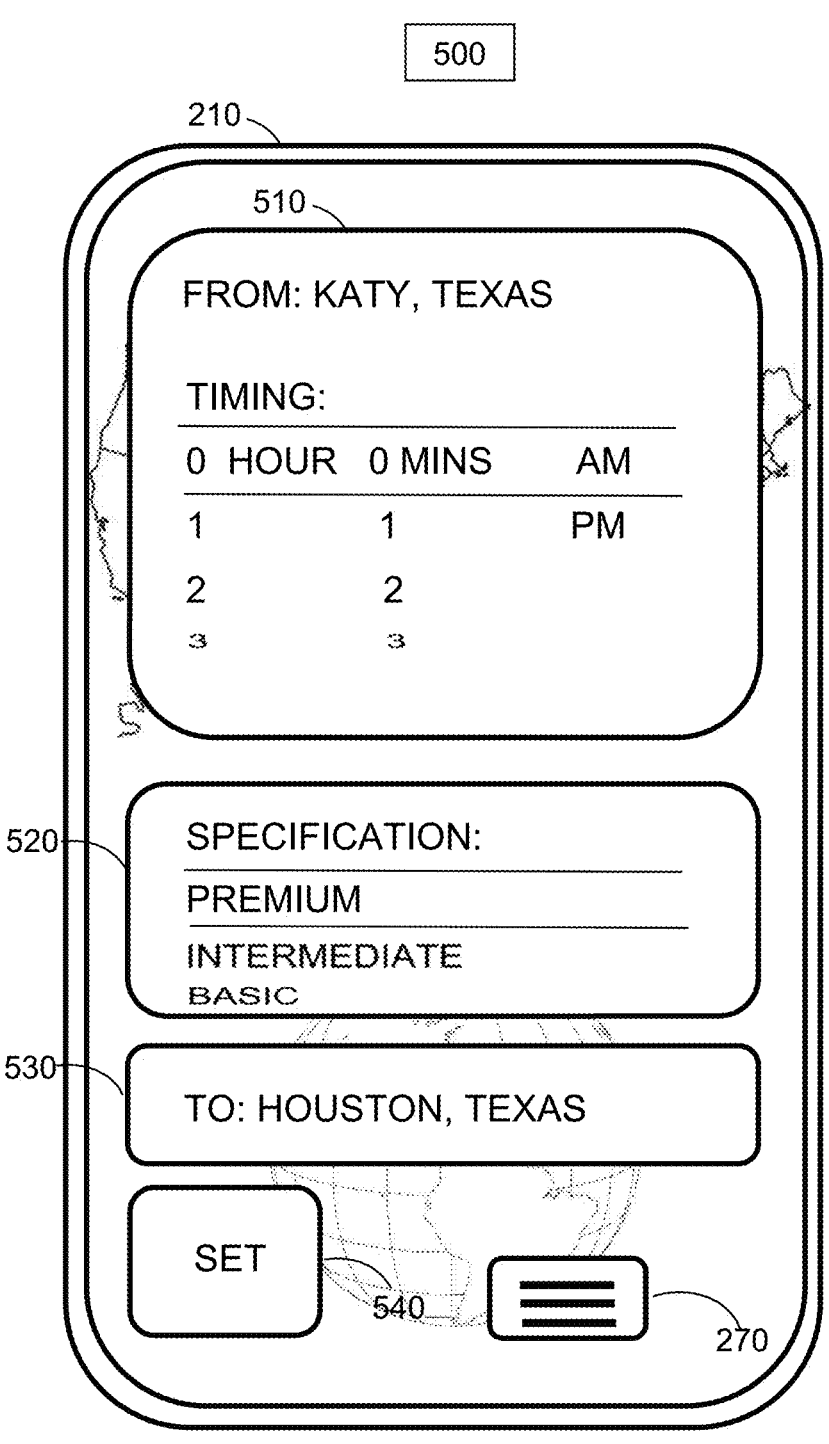
FIG. 5 illustrates an exemplary user interface to select a specification grade of virtual power plant interval object community linked virtual power plant interval object capacity with associated price-time priority queues with various timing specifications in accordance with some embodiments.

FIG. 5 illustrates an exemplary user interface 210 for listing virtual power plant capacity unit timing specifications 510 on a portable multifunction device in accordance with some embodiments. In some embodiments, user interface 210 includes the following elements, or a subset or superset thereof:

origin/from virtual power plant hub timing specification (a data transformation) 510;

specification of quality of virtual power plant capacity (a data transformation) 520;

destination/to virtual power plant hub (a data transformation) 530;

setting button 540 to transmit the timings 510 and quality specification grade 520 (a data transformation);

hamburger button 270 to instruct the GUI 210 to take the user 110 to the menu screen.

In some embodiments, the user 110 may select a plurality of timing options in the timing selection specification 510. The timing specification constraint may be the time at which the transformed virtual power plant capacity unit security which may interconnect and/or invert with origin/from virtual power plant hub 410. As in any commodity market, if a user 110 is late and they have purchased the virtual power plant capacity unit, the user must still pay for the virtual power plant capacity regardless if the user 110 is present at the time of interconnection or not with replacement cost or liquidated damages. The user has the option if they know they will be late to sell back the virtual power plant capacity unit to the market at the then current price. Accordingly, for the purpose of example, but not limiting by example, if a user 110 bought a transformed virtual power plant capacity unit security for £9.90 421 and the user 110 realized they would be late for the 8 am virtual power plant interconnection specification 427, then the user 110 may either pay for the virtual power plant capacity unit even though the user 110 was interconnected and did not take delivery of the virtual power plant capacity unit security, or the user 110 may preemptively sell back the virtual power plant capacity unit security to the market at the then current bid price 418. The user 110 would then have offset their obligation in a timely manner and another user 110 on the network 214, 215, 226 may then purchase the available virtual power plant capacity unit security. By eliminating the initial obligation by an creating an offset obligation, the additional data transformation concepts such as cost of cover, replacement costs, liquidated damages or force majeure are not employed by the method. In some embodiments, virtual power plant capacity or virtual power plant hub combination units may or may not have the available liquidity if the user 110 were to wait too long before delivery or interconnection of the virtual power plant capacity unit to make an adjustment and therefore may need to take delivery or interconnection even if they are not interconnected. In some embodiments, the user 110 may select a grade specification 520. For the purpose of example, but not limiting by example, a plurality of specification grades may exist, such as "premium" which may be defined by certain classes of virtual power plant capacity units and/or certain quality levels. Similarly, for the purpose of example, but not limiting by example, a plurality of specification grades may exist such as "intermediate" or "basic" which may be defined by certain classes of virtual power plant capacity unit securities and/or certain quality levels. In some embodiments, many variations of specification grades may be utilized in a priority grid structure. In some embodiments, the user 110 may select the interconnection destination/to virtual power plant hub 530 to change the virtual power plant hub combination. In some embodiments, the user 110, may contact the "set" button 540 to transmit the transformed virtual power plant capacity unit security specification data by using the GUI 210 which may instantiate instructions in the memory of the mobile computing device which then transmits virtual power plant capacity data through the network 214 or wireless GPS network 215 to call upon instruction routines and instruction sub-routines on the virtual power plant capacity forward market database server 271, virtual power plant unit queue hub database server 223 and processor 219, network member database server 222, map routing servers 220 and/or instructions in the memory of the cloud and local CPUs 219 which all interface together to make one system which may deliver transformed virtual power plant capacity unit securities or unitized objects to users 110 from and to a plurality of virtual power plant hubs 410, 422 with a plurality of specifications at specific market prices.

Figure 6:
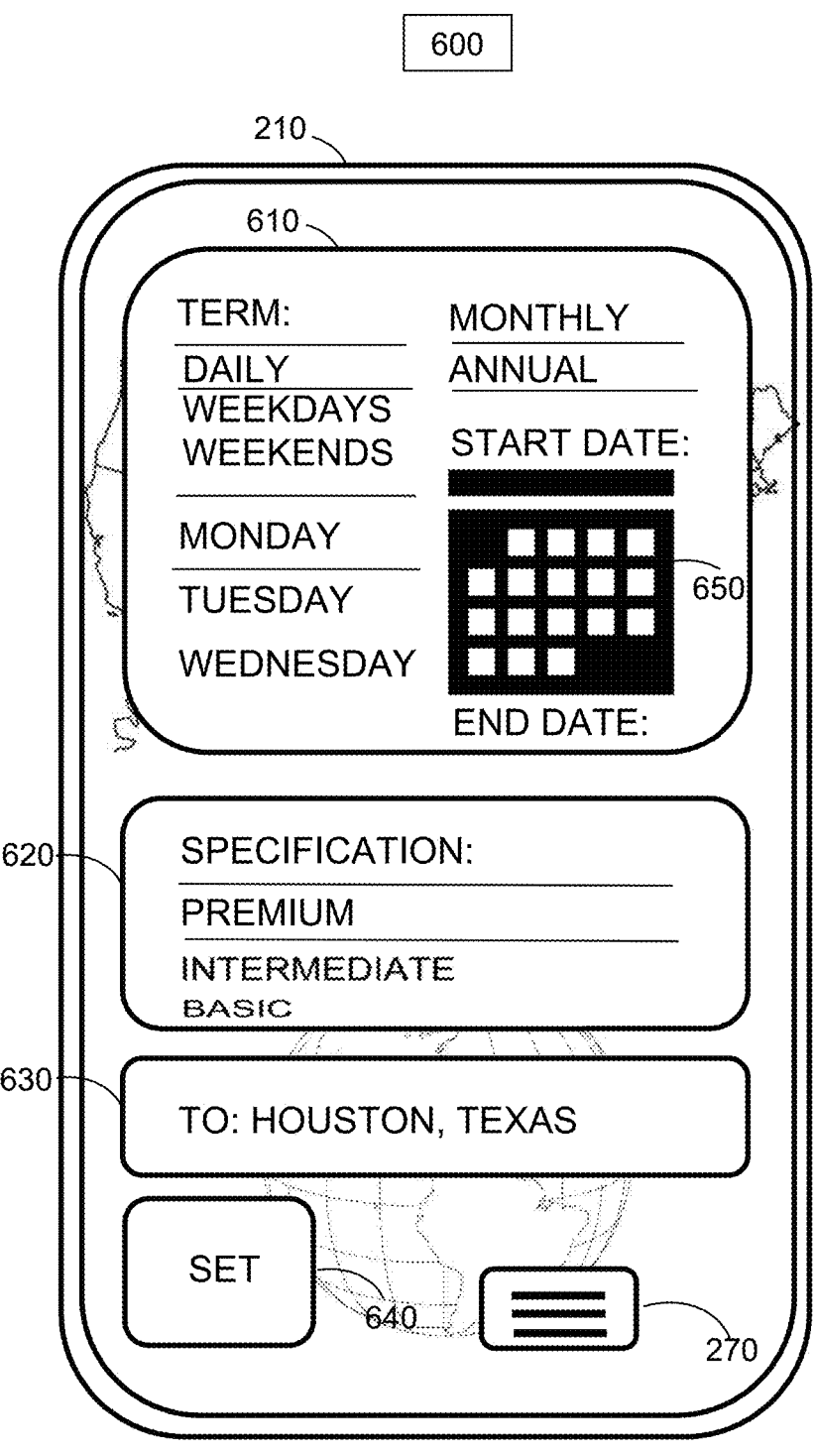
FIG. 6 illustrates an exemplary user interface with various term specifications for virtual power plant interval object community linked virtual power plant interval object capacity with associated price-time priority queues in accordance with some embodiments.

FIG. 6 illustrates an exemplary user interface 210 for selecting the term transformation specification 610 on a portable multifunction device in accordance with some embodiments. In some embodiments, user interface 210 includes the following elements, or a subset or superset thereof:

term specification options (a data transformation) 610;

specification of quality of virtual power plant capacity (a data transformation) 620;

destination/to virtual power plant hub(a data transformation) 630;

setting button 640 to transmit the term 610 and quality virtual power plant specification grade (a data transformation) 620;

calendar button 650 to select specification start dates and
end dates for a plurality of virtual power plant capacity
or freight hub combinations (a data transformation);
hamburger button 270 to instruct the GUI 210 to take the
user 110 to the menu screen.

In some embodiments, the term specification 610 may be
used to participate, transact and/or trade in a specific virtual
power plant hub combination for a specific time period
specification. Users 110 may set the term to daily, weekly,
monthly, annual, weekdays, weekends, specific days such as
Monday, Tuesday, Wednesday, Thursday, Friday, Saturday,
Sunday or any combination of term selections the user 110
sets as relevant for participating, transacting or trading in the
transformed virtual power plant capacity unit securities
market. Not limiting by example, but for use of illustrating
a possible subset of term selections, the user 110 may select
"weekdays" 610 during a specific calendar time-period 650
of a given year. In some embodiments, specific time start
dates and end dates may be set by the user with the calendar
button 650. In some embodiments a user 110 may select
"Mondays" 610 within a specification date window 650 (a
data transformation). In some embodiments, the user 110
may select "weekends" 610 during a specification calendar
window of dates 650 (a data transformation). In some
embodiments, the user 110, may contact the "set" button 640
to transmit the transformed virtual power plant capacity unit
specification data by using the GUI 210 which may instan-
tiate instructions in the memory of the mobile computing
device which then transmits virtual power plant capacity
data through the network 214 or wireless GPS network 215
to call upon instruction routines and instruction sub-routines
on the virtual power plant capacity forward market database
server 271, virtual power plant hub database server 223,
network member database server 222, virtual power plant
map routing servers 220, and/or instructions in the memory
of the cloud and local CPUs 219 which all interface together
to make one system which may deliver virtual power plant
capacity units to users 110 from and to a plurality of virtual
power plant hubs 410, 422 with a plurality of specifications
at specific market prices.

Figure 7:
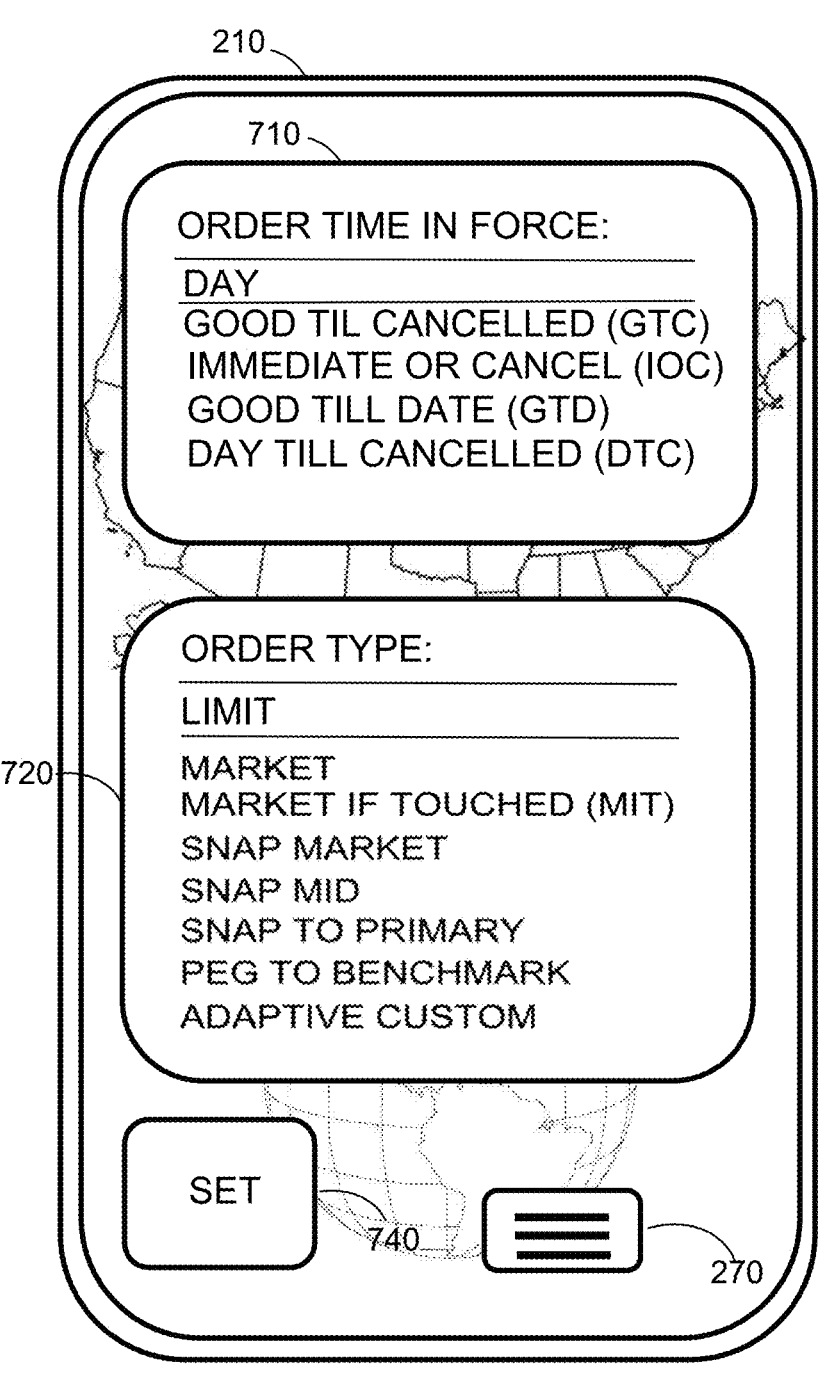
FIG. 7 illustrates an exemplary user interface with various order types and order time in force designations for virtual power plant interval object community linked virtual power plant interval object capacity with associated price-time priority queues in accordance with some embodiments.

FIG. 7 illustrates an exemplary user interface 210 for
selecting order time in force order types 710 (a data trans-
formation) as well as order types 720 (a data transformation)
on a portable multifunction device in accordance with some
embodiments. In some embodiments, user interface 210
includes the following elements, or a subset or superset
thereof:

order time in force specification options (a data transfor-
mation) 710;

order type specification options (a data transformation)
720;

setting button 740 to transmit the order time in force
specification 710 and order type specification option
720 (a data transformation);

hamburger button 270 to instruct the GUI 210 to take the
user 110 to the menu screen.

In some embodiments, user interface 210 may be used by
the user 110 to select a plurality of order time in force 710
specifications. In some embodiments, order time in force
selections 710 may include a subset or superset thereof: day
(DAY) order 710; good till cancelled order (GTC) 710;
immediate or cancel order (IOC) 710; good till date order
(GTD) 710; day till cancelled order (DTC) 710. Order time
in force 710 specifications may be used to designate how
long a user 110 order may be valid. In some embodiments,
the GUI 210 may display the definitions of a plurality of
order time in force 710 characteristics so that the user 110 may select the appropriate order time in force 710 specifi-
cation for the virtual power plant capacity unit that the user
110 may participate, transact and/or trade virtual power
plant units. In some embodiments, the user interface 210
may be used to select the order type 720 specifications. In
some embodiments, order type selections 720 may include
a subset or superset thereof: Limit 720, Market 720, Market
if Touched (MIT) 720; Snap to Market 720; Snap to Mid
720; Snap to primary 720; Peg to benchmark 720; adaptive
custom 720. In some embodiments, the GUI 210 may
display the definitions of a plurality of order types 720
characteristics so that the user 110 may select the appropri-
ate order type 720 specification for the virtual power plant
capacity unit that the user 110 may participate, transact
and/or trade virtual power plant units. In some embodi-
ments, the user 110, may contact the "set" button 740 to
transmit the virtual power plant capacity unit specification
mode data by using the GUI 210 which may instantiate
instructions in the memory of the mobile computing device
which then transmits virtual power plant capacity data
through the network 214 or wireless GPS network 215 to
call upon instruction routines and instruction sub-routines on
the virtual power plant capacity forward market database
server 271, virtual power plant hub database server 223,
network member database server 222, virtual power plant
map routing servers 220, and/or instructions in the memory
of the cloud and local CPUs 219 which all interface together
to make one system which may deliver and interconnect
virtual power plant capacity units to users 110 from and to
a plurality of virtual power plant hubs 410, 422 with a
plurality of specifications at specific market prices.

Figure 8:
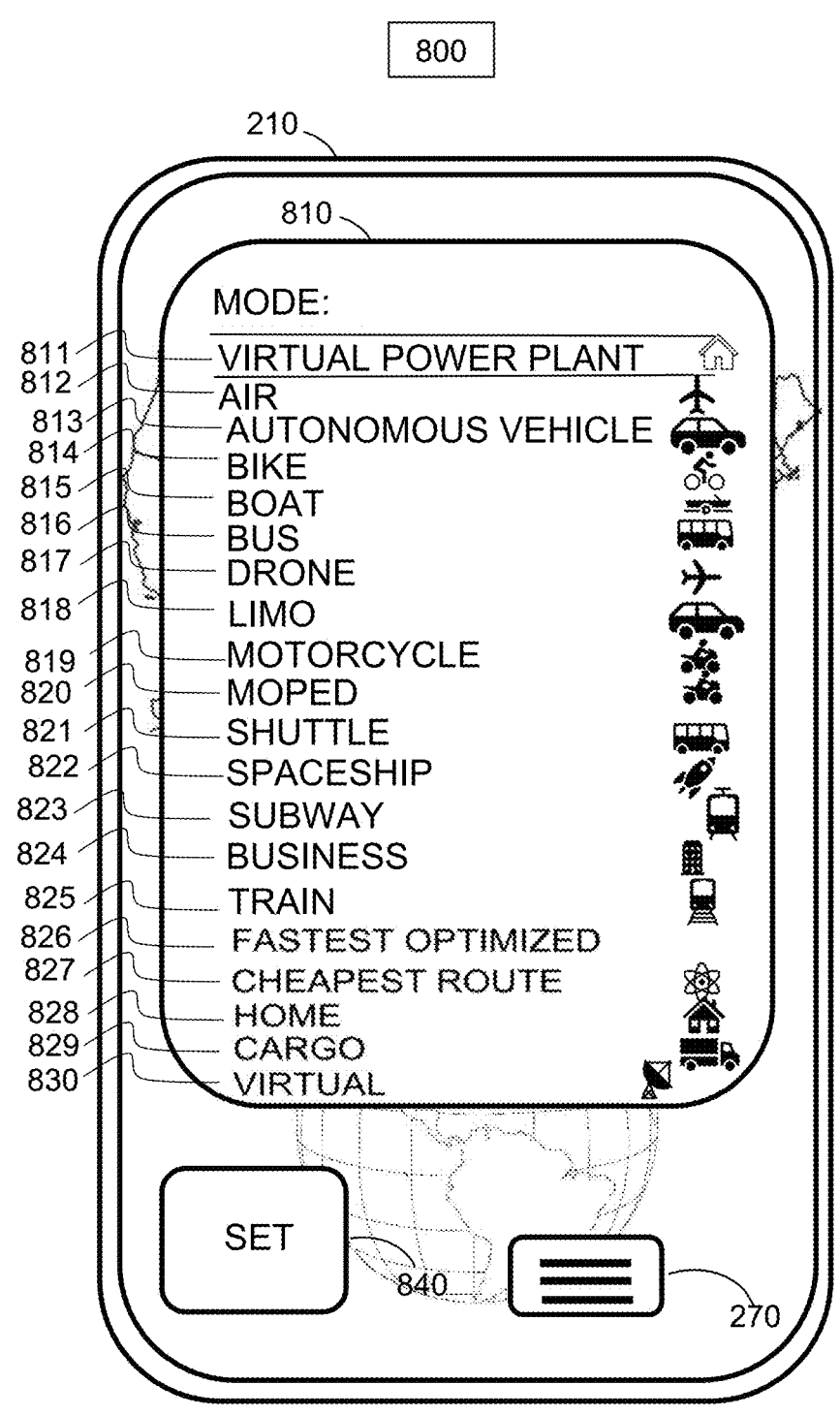
FIG. 8 illustrates an exemplary user interface with various modes of virtual power plant interval object community linked virtual power plant interval object capacity with associated price-time priority queues in accordance with some embodiments.

FIG. 8 illustrates an exemplary user interface 210 for
selecting virtual power plant hub capacity unit modes 810 (a
data transformation) on a portable multifunction device in
accordance with some embodiments. In some embodiments,
user interface 210 includes the following elements, or a
subset or superset thereof:

virtual power plant hub capacity unit modes 810 (a data
transformation);

setting button 840 to transmit the virtual power plant hub
capacity unit modes 810;

hamburger button 270 to instruct the GUI 210 to take the
user 110 to the menu screen.

In some embodiments, user interface 210 may be used by
the user 110 to select a plurality of virtual hub transformed
virtual power plant capacity unit security modes 810 speci-
fications. In some embodiments, virtual power plant hub
capacity unit mode selections 810 may include a subset or
superset thereof: virtual power plant 811; air 812; autono-
mous vehicle 813; bike 814; boat 815; bus 816; drone 817;
limo 818; motorcycle 819; moped 820; shuttle 821; space-
ship 822; subway 823; business, residential, industrial 824;
train 825; fastest optimized 826; cheapest route and trans-
mission 827; home and residential 828; cargo 829; virtual
830; eScooter; eBike, or other modes. In some embodi-
ments, virtual power plant hub capacity unit modes are
simply that a user 110 would have a virtual power plant
capacity unit in an automobile or an residential, commercial
or industrial facility as examples, but not limiting by
example. In some embodiments, the user 110 may bid on
cargo virtual power plant capacity 829 or residential virtual
power plant capacity 828 in any mode or multi-modal of
transformed power plant capacity between a combination of
virtual power plant capacity hub locations. In some embodi-
ments, the user 110 may use one or multiple modes of virtual
power plant capacity between a combination of virtual
power plant hub capacity points. In some embodiments, the user 110, may contact the "set" button 840 to transmit the transformed virtual power plant capacity unit specification mode data by using the GUI 210 which may instantiate instructions in the memory of the mobile computing device which then transmits virtual power plant capacity data through the network 214 or wireless GPS network 215 to call upon instruction routines and instruction sub-routines on the virtual power plant capacity forward market database server 271, virtual power plant hub database server 223, network member database server 222, map routing servers 220 and/or instructions in the memory of the cloud and local CPUs 219 which all interface together to make one system which may deliver virtual power plant capacity units to users 110 from and to a plurality of virtual power plant hubs 410, 422 with a plurality of specifications at specific market prices.

Figure 9:
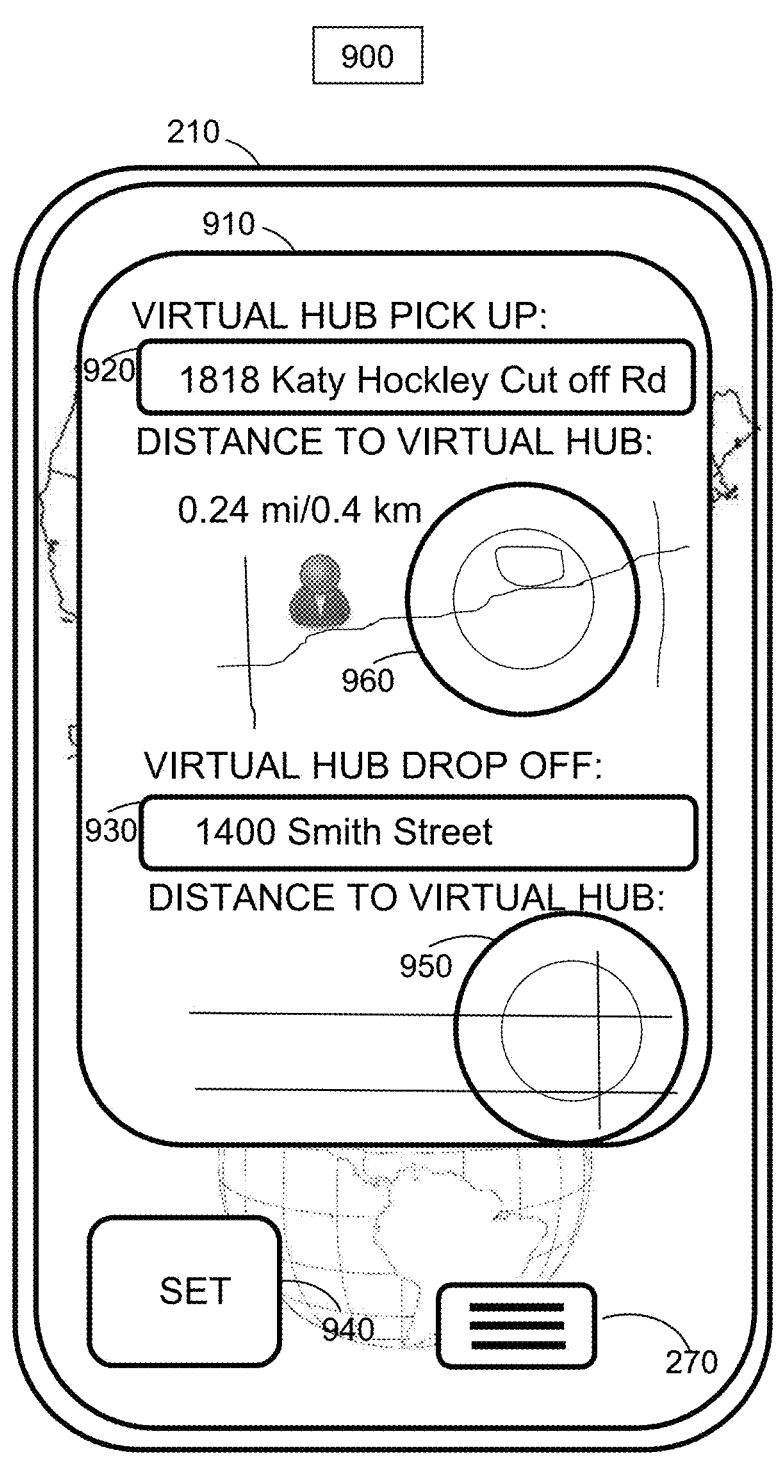
FIG. 9 illustrates an exemplary user interface with the distance between the user and a virtual power plant interval object community linked virtual hub pick up point for virtual power plant interval object community linked virtual power plant interval object capacity with associated price-time priority queues as well as the distance between a user and a virtual drop off point for a virtual power plant interval object community linked virtual power plant interval object capacity with associated price-time priority queues in accordance with some embodiments. In some embodiments, the various pick up and drop off points may represent power transmission cost and parameters.

FIG. 9 illustrates an exemplary user interface 210 for identifying the distance the user 110 is from the virtual power plant hub from a map and distance perspective on a portable multifunction device in accordance with some embodiments. In some embodiments, user interface 210 includes the following elements, or a subset or superset thereof:

virtual power plant hub capacity unit interconnect and inverter display 910;

virtual power plant hub capacity unit interconnect and inverter address 920;

virtual power plant hub capacity unit interconnect and inverter address 930;

virtual power plant hub capacity unit interconnect and inverter target zone 960;

virtual power plant hub capacity unit interconnect and inverter target zone 950;

setting button 940 to transmit the virtual power plant capacity unit addresses 920, 930;

hamburger button 270 to instruct the GUI 210 to take the user 110 to the menu screen.

In some embodiments, user interface 210 may be used by the user 110 to select a plurality of virtual power plant capacity unit address 910 specifications. In some embodiments, virtual power plant capacity unit address selections 910 may include a subset or superset thereof: virtual power plant hub ingest interconnect and/or inverter address 920; virtual power plant hub delivery interconnect and/or inverter address 930. In some embodiments, virtual power plant capacity unit addresses 920 and 930 may be changed before delivery of a virtual power plant capacity unit. The user interface power factor map and address tool 910 displays the users 110 distance from the address of the virtual power plant capacity hub as well as a power factor map to assist the user 110 in finding the location of the virtual power plant capacity hub. In some embodiments, user interface 210 displays the virtual hub ingest or interconnect and/or inverter zone 960 on a map in context to the user's 110 location or virtual power plant hub location 960. In some embodiments, user interface 210 displays the virtual power plant hub delivery zone 950 on a map in context to the user's 110 location. In some embodiments, the user 110, may contact the "set" button 940 to transmit the virtual power plant capacity unit specification mode data by using the GUI 210 which may instantiate instructions in the memory of the mobile computing device which then transmits virtual power plant capacity data through the network 214 or wireless GPS network 215 to call upon instruction routines and instruction sub-routines on the virtual power plant capacity forward market database server 271, virtual power plant hub database server 223, network member database server 222, power factor map routing servers 220, and/or instructions in the memory of the cloud and local CPUs 219 which all interface together to make one system which may deliver virtual power plant capacity units to users 110 from and to a plurality of virtual power plant hubs 410, 422 with a plurality of specifications at specific market prices.

Figure 10:
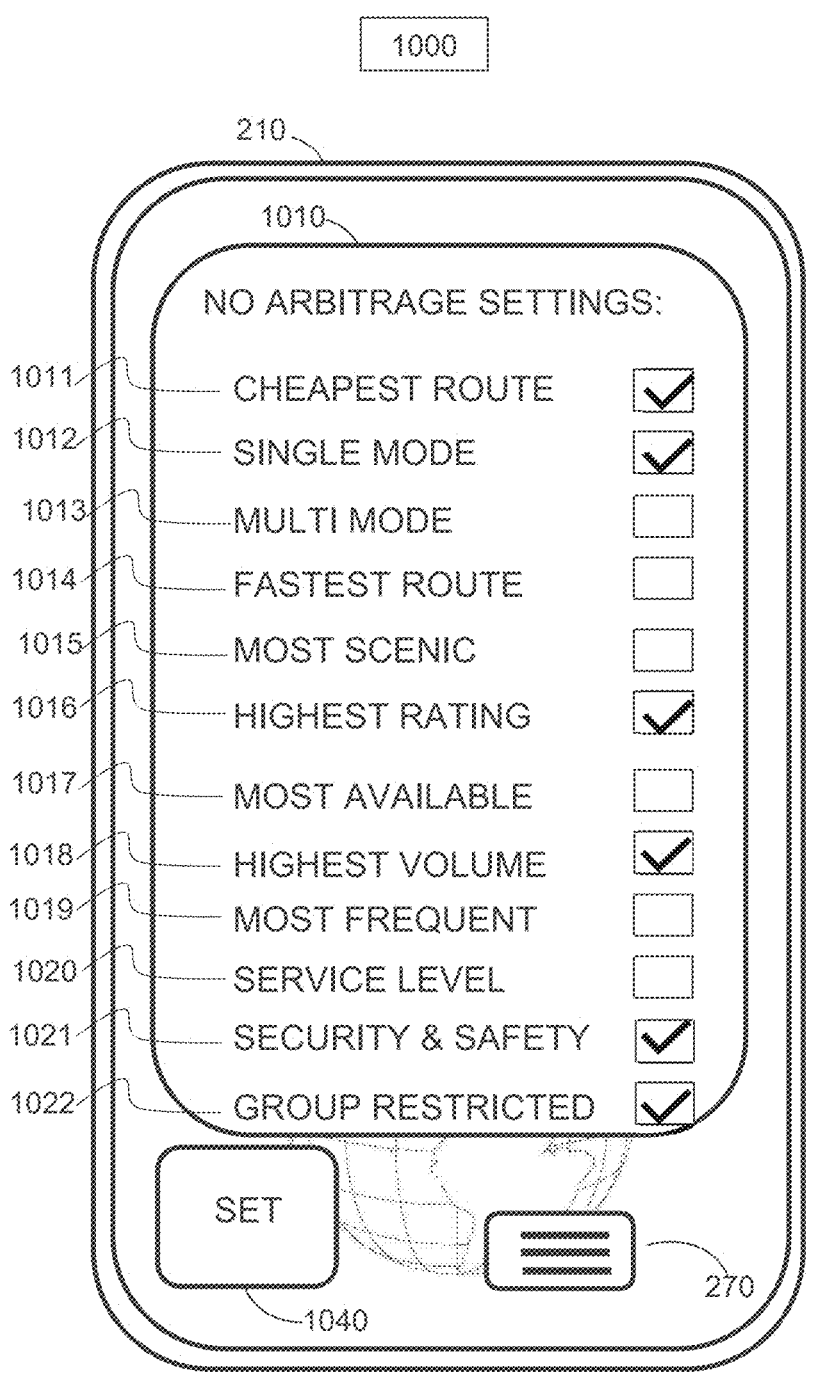
FIG. 10 illustrates an exemplary user interface for settings and constraints of the virtual power plant interval object community linked virtual power plant interval object capacity with associated price-time priority queues trading method and system in accordance with some embodiments.

FIG. 10 illustrates an exemplary user interface 210 for identifying the constraints and no arbitrage settings 1010 the user 110 selects on a portable multifunction device in accordance with some embodiments (multiple data transformations). In some embodiments, user interface 210 includes the following elements, or a subset or superset thereof:

constraint and no arbitrage settings 1010 (a data transformation);

setting button 1040 to transmit the virtual power plant hub capacity constraints and no arbitrage settings;

hamburger button 270 to instruct the GUI 210 to take the user 110 to the menu screen.

In some embodiments, user interface 210 may be used by the user 110 to select a plurality of virtual power plant capacity constraint and no arbitrage settings 1010. In some embodiments, virtual power plant hub capacity unit constraint and no arbitrage selections 1010 may include a subset or superset thereof: cheapest transmission route 1011 (a data transformation); single transmission mode 1012 (a data transformation); multi-transmission mode 1013 (a data transformation); fastest transmission route 1014 (a data transformation); most transmission scenic 1015 (a data transformation); highest transmission rating 1016 (a data transformation); most available transmission 1017 (a data transformation); highest transmission volume 1018 (a data transformation); most frequent transmission 1019 (a data transformation); transmission service level 1020 (a data transformation); transmission security and safety 1021 (a data transformation). In some embodiments, the "cheapest transmission route setting" 1011 instantiates instructions in the memory of the CPU 210 to complete a standard cost minimization linear program to assist the user 110 to complete the virtual power plant capacity unit between two virtual power plant hubs with the lowest cost. In some embodiments, the "single transmission mode" 1012 instantiates instructions in the memory of the CPU 210 to set a constraint for the user 110 to complete the virtual power plant capacity unit between two virtual power plant hubs with the only one mode of virtual power plant capacity. In some embodiments, the "multi transmission mode" 1013 instantiates instructions in the memory of the CPU 210 to set a constraint for the user 110 to complete the virtual power plant capacity unit between two virtual power plant hubs with more than one mode of virtual power plant capacity. In some embodiments, the "fastest transmission route" 1014 instantiates instructions in the memory of the CPU 210 to complete standard linear programming equation to minimize transmission time for the user 110 to complete the virtual power plant capacity unit between two virtual power plant hubs with the shortest transmission time. In some embodiments, the settings 1010 may set instructions for the price based transmission and congestion navigation routing index and GUI presentation on the user(s) 110 interface 210. In some embodiments, the "most scenic transmission" 1015 instantiates instructions in the memory of the CPU 210 to complete an algorithm with the highest transmission ratings for transmission scenery to assist the user 110 to complete the transformed virtual power plant capacity unit between two virtual power plant hubs with highest transmission scenery rating. In some embodiments, the "highest transmission rating" 1016 instantiates instructions in the memory of the CPU 210 to complete a rating algorithm to assist the user 110 to complete the virtual power plant capacity unit between two virtual power plant hubs with the highest transmission or congestion rating. In some embodiments, the "most available transmission" 1017 instantiates instructions in the memory of the CPU 210 to complete an algorithm to search for the transmission route with the most open virtual power plant capacity units to assist the user 110 to complete the virtual power plant capacity unit between two virtual power plant hubs with the most available open transmission or open virtual power plant capacity units. In some embodiments, the "highest transmission volume" 1018 instantiates instructions in the memory of the CPU 210 to complete an algorithm to select the virtual power plant transmission route with the highest transmission volume of participants to assist the user 110 to complete the transformed virtual power plant capacity unit between two virtual power plant hubs with the largest number of users 110. In some embodiments, the "most frequent transmission" 1019 instantiates instructions in the memory of the CPU 164 to complete most frequent route analysis from a timing constraint perspective to assist the user 110 to complete the virtual power plant capacity unit between two virtual power plant hubs with the most frequent transmission. In some embodiments, the "transmission service level" 1020 instantiates instructions in the memory of the CPU 210 to align the constraint to select the service level to assist the user 110 to complete the virtual power plant capacity unit between two virtual power plant hubs with the correct level of transmission service. In some embodiments, the "transmission security and safety" 1021 instantiates instructions in the memory of the CPU 210 to run transmission safety and security algorithms on the user's 110 based on block chain performance of buyers and sellers to assist the user 110 to complete the virtual power plant capacity unit between two virtual power plant hubs with the highest level of transmission safety and security. In some embodiments, the "transmission group restricted" 1022 instantiates instructions in the memory of the CPU 210 to run grouping limitation algorithms on the user's 110 market auction based on limiting the pool of virtual power plant buyers and sellers and virtual power plants to assist the user 110 to complete the virtual power plant capacity unit between two virtual hubs with a limit on the pool of available users or virtual power plants. In some embodiments, a plurality of settings which transform the data may be sequenced for presenting as a transformed market 400 or as a transformed market as a layer on a virtual power plant transmission navigation system with indexed virtual power plant routes based on power price or congestion price or transmission price 4200. A user(s) 110 pool for group restricted transmission 1022 (a data transformation) settings may limit the user pool displayed by email, security, sex, rating or a plurality of other restrictions. In some embodiments, the user 110, may contact the "set" button 1040 to transmit the virtual power plant capacity unit security specification settings mode data by using the GUI 210 which may instantiate instructions in the memory of the mobile computing device which then transmits virtual power plant capacity data through the network 214 or wireless GPS network 215 to call upon instruction routines and instruction sub-routines on the virtual power plant capacity forward market database server 271, virtual power plant hub database server 223, network member database server 222, virtual power plant power factor map routing servers 220, and/or instructions in the memory of the cloud and local CPUs 210 which all interface together to make one system which may deliver virtual power plant capacity units to users 110 from and to a plurality of virtual power plant hubs 410, 422 with a plurality of specifications at specific market prices.

Figure 11:
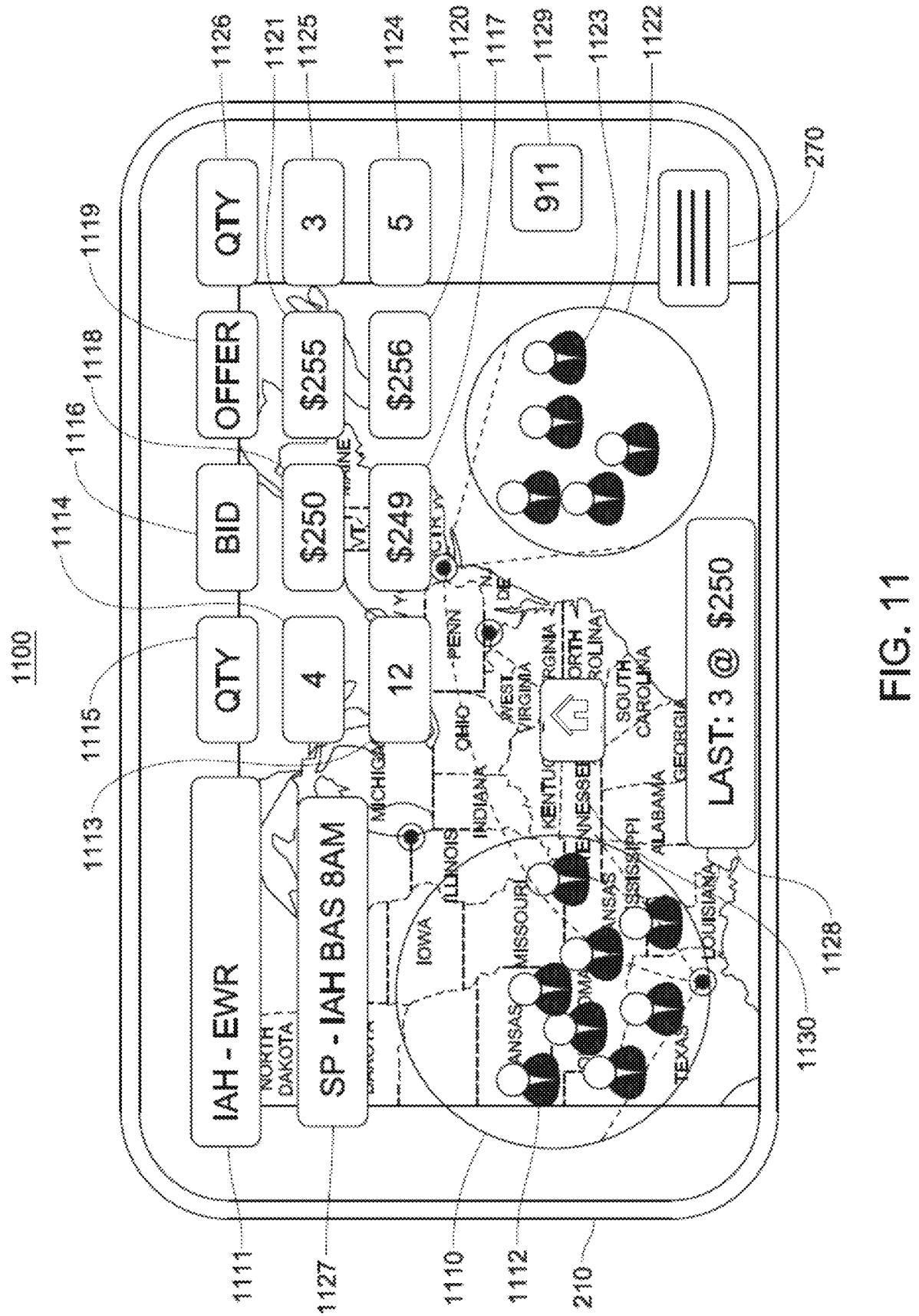
FIG. 11 illustrates an exemplary user interface for transacting and trading virtual power plant interval object Houston to New York virtual power plant interval object community linked virtual power plant interval object capacity with associated price-time priority queues in accordance with some embodiments.

FIG. 11 illustrates exemplary user interfaces 210 for participating, transacting and/or trading transformed virtual power plant capacity as a physical forward commodity or security between combinations of virtual power plant hubs over various virtual power plant capacity modes. In some embodiments, user interface 210 includes the following elements, or a subset or superset thereof:

exemplary virtual power plant hub combination 1111;

exemplary virtual power plant hub origin/from location 1110 with users 1112 within the virtual power plant hub location 1110;

exemplary specification summary of the market, level of service and time of delivery commencement 1127;

exemplary mode of residential, industrial or commercial virtual power plant capacity or capacity type 1130;

exemplary transaction summary of the last trades quantity and price 1128;

exemplary virtual power plant hub destination/to location 1122 and user who is being delivered on the virtual power plant capacity unit 1123;

exemplary bid/buy quantity title header 1115 for an exemplary virtual power plant capacity hub market;

exemplary bid/buy price title header 1116 for an exemplary virtual power plant capacity hub market;

exemplary offer/sell price title header 1119 for an exemplary virtual power plant capacity hub market;

exemplary offer/sell quantity title header 1126 for an exemplary virtual power plant capacity hub market;

exemplary bid/buy quantity 1114 for the best bid quantity from a plurality of users 110 for an exemplary respective virtual power plant capacity or virtual power plant hub combination that has undergone a plurality of data transformations in the method 1111;

exemplary bid/buy quantity 1113 for the second-best bid quantity from a plurality of users 110 for an exemplary respective virtual power plant capacity or virtual power plant combination that has undergone a plurality of data transformations in the method 1111;

exemplary bid/buy price 1118 for the best bid price from a plurality of users 110 for an exemplary respective virtual power plant capacity or virtual power plant hub combination that has undergone a plurality of data transformations in the method 1111;

exemplary bid/buy price 1117 for the second-best bid price from a plurality of users 110 for an exemplary respective virtual power plant capacity or virtual power plant hub combination that has undergone a plurality of data transformations in the method 1111;

exemplary offer/sell price 1121 for the best offer price from a plurality of users 110 for an exemplary respective virtual power plant capacity or virtual power plant hub combination that has undergone a plurality of data transformations in the method 1111;

exemplary offer/sell price 1120 for the second-best offer price from a plurality of users 110 for an exemplary respective virtual power plant capacity or virtual power plant hub combination that has undergone a plurality of data transformations in the method 1111;

exemplary offer/sell quantity 1125 for the best offer quantity from a plurality of users 110 for an exemplary respective virtual power plant capacity or virtual power plant hub combination that has undergone a plurality of data transformations in the method 1111;

Exemplary offer/sell quantity 1124 for the second-best offer quantity from a plurality of users 110 for an exemplary respective virtual power plant capacity or virtual power plant hub combination that has undergone a plurality of data transformations in the method 1111;

exemplary safety dispatch "911" button 1129 to enact video and audio recording of the user 110 environment and dispatch of that information to the authorities;

exemplary hamburger menu button 270 to move back to menu options and settings away from the participation, transaction, trading auction GUI 210 embodiment.

In some embodiments the user 110 may enter a transaction quantity and price for transformed virtual power plant capacity unit securities to participate, transact and/or trade by the GUI 210 detecting user 110 contact or audio interface with a bid/buy price 1118 or offer/sell price 1121. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual power plant hub combination 1111. A plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1121 or bid/buying price 1118. In some embodiments, users 110 may adjust settings of the GUI 210 to show more bid/buying prices 1117 or more offer/selling prices 1120. In some embodiments the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 110 may be displayed as user icons 1112 or 1123 for the amount of people logged in which desire to transact, trade or participate in a given virtual power plant hub 1110 to virtual power plant hub 1122 combination. In some embodiments, users 110 may select the virtual power plant capacity mode 1130 which may include smart meters, meters, connected appliances, connected distributed generation, net metering and power inverters, such that the user allows a market for only one form of virtual power plant capacity as a commodity or the user 110 may allow the system to show multiple forms of virtual power plant capacity between two virtual power plant capacity hubs 1110, 1111, 1122. In some embodiments the GUI 210 may detect a user 110 selecting the 911 button 1129 which may activate voice and video recording functions on the mobile or stationary device 210 and transmit the data with a confirmation from the user 110 to the authorities to provide enhanced security while participating, transacting or trading transformed forward virtual power plant capacity as a commodity or security. In some embodiments the user may toggle between the GUI 210 market view screen in FIG. 10 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits virtual power plant capacity data which may include smart meters, meters, connected appliances, connected distributed generation, net metering and power inverters, through the network 214 or wireless GPS network 215 to call upon instruction routines and instruction sub-routines specification mode data by using the GUI 210 which may instantiate instructions in the memory of the mobile computing device which then transmits virtual power plant capacity data through the network 214 or wireless GPS network 215 to call upon instruction routines and instruction sub-routines on the virtual power plant capacity forward market database server 271, virtual power plant hub database server 223, network member database server 222, power factor map routing servers 220, and/or instructions in the memory of the cloud and local CPUs 210 which all interface together to make one system which may deliver virtual power plant capacity units to users 110 from and to a plurality of virtual power plant hubs 410, 422 with a plurality of specifications at specific market prices which all interface together to make one system which may deliver virtual power plant capacity units to users 110 from and to a plurality of virtual power plant hubs 1110, 1122 with a plurality of specifications at specific market prices.

Figure 12:
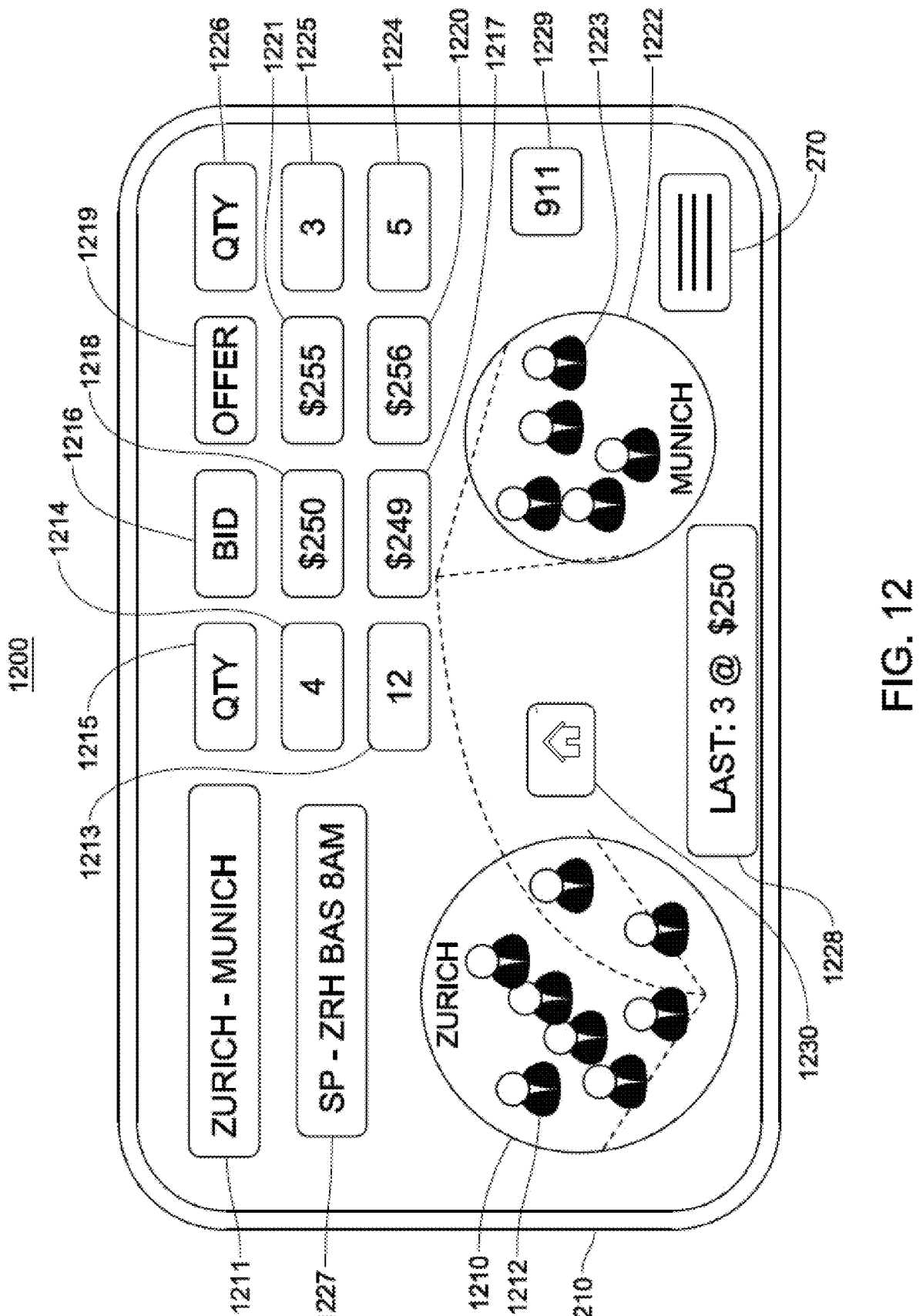
FIG. 12 illustrates an exemplary user interface for transacting and trading Zurich to Munich virtual power plant interval object community linked virtual power plant interval object capacity with associated price-time priority queues in accordance with some embodiments.

FIG. 12 illustrates exemplary user interfaces 210 for participating, transacting and/or trading transformed virtual power plant capacity as a physical forward commodity or security between combinations of virtual power plant hubs over various virtual power plant capacity modes. In some embodiments, user interface 210 includes the following elements, or a subset or superset thereof:

exemplary virtual power plant hub combination 1211;

exemplary virtual power plant hub origin/from location 1210 with users 1212 within the virtual power plant hub location 1210;

exemplary specification summary of the virtual power plant market, level of service and time of delivery commencement 1227;

exemplary mode of train virtual power plant capacity type 1230 which may include smart meters, meters, connected appliances, connected distributed generation, net metering and power inverters;

exemplary transaction summary of the last trades quantity and price 1228;

exemplary virtual power plant hub destination/to delivery and/or inverter location 1222 and user who is being delivered on the virtual power plant capacity unit 1223;

exemplary bid/buy quantity title header 1215 for an exemplary virtual power plant capacity hub market;

exemplary bid/buy price title header 1216 for an exemplary virtual power plant capacity hub market;

exemplary offer/sell price title header 1219 for an exemplary virtual power plant capacity hub market;

exemplary offer/sell quantity title header 1226 for an exemplary virtual power plant capacity hub market;

exemplary bid/buy quantity 1214 for the best bid quantity from a plurality of users 110 for an exemplary respective power plant capacity hub combination that has undergone a plurality of data transformations in the method 1211;

exemplary bid/buy quantity 1213 for the second-best bid quantity from a plurality of users 110 for an exemplary respective virtual power plant capacity virtual hub combination that has undergone a plurality of data transformations in the method 1211;

exemplary bid/buy price 1218 for the best bid price from a plurality of users 110 for an exemplary respective virtual power plant capacity hub combination that has undergone a plurality of data transformations in the method 1211;

exemplary bid/buy price 1217 for the second-best bid price from a plurality of users 110 for an exemplary respective virtual power plant capacity hub combination that has undergone a plurality of data transformations in the method 1211;

exemplary offer/sell price 1221 for the best offer price from a plurality of users 110 for an exemplary respective virtual power plant capacity hub combination that has undergone a plurality of data transformations in the method 1211;

exemplary offer/sell price 1220 for the second-best offer price from a plurality of users 110 for an exemplary respective virtual power plant capacity hub combination that has undergone a plurality of data transformations in the method 1211;

exemplary offer/sell quantity 1225 for the best offer quantity from a plurality of users 110 for an exemplary respective virtual power plant capacity or virtual hub combination that has undergone a plurality of data transformations in the method 1211;

exemplary offer/sell quantity 1224 for the second-best offer quantity from a plurality of users 110 for an exemplary respective virtual power plant capacity or virtual power plant hub combination that has undergone a plurality of data transformations in the method 1211;

exemplary safety dispatch "911" button 1229 to enact video and audio recording of the user 110 environment and dispatch of that information to authorities.

exemplary hamburger menu button 270 to move back to menu options and settings away from the participation, transaction, trading GUI 210 embodiment.

In some embodiments the user 110 may enter a transaction quantity and price for virtual power plant capacity units to participate, transact and/or trade by the GUI 210 detecting user 110 contact with a bid/buy price 1218 or offer/sell price 1221. The GUI 210 detects user 110 contact with any of the GUI 210 buttons which have been aforementioned. Upon user 110 contact with buttons or audio interface on the GUI 210, instructions are instantiated which allows the user 110 to change the specifications of the respective virtual power plant hub combination 1211. A plurality of transformed prices and transformed markets may be presented based on a plurality of transformed contract specifications. In some embodiments, the best bid/buy price 1118 may be moving up in price or down in price depending on the virtual power plant market conditions at any given time. In some embodiments the last trade or last transacted price for a given specification is listed to help the user 110 understand how the market is moving so that the user 110 may submit a competitive offer/selling price 1221 or bid/buying price 1214. In some embodiments, users 110 may adjust settings of the GUI 210 to show more bid/buying prices 1217 or more offer/selling prices 1120. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 110 may be displayed as user icons 1212 or 1223 for the amount of people logged in which desire to transact, trade or participate in a given virtual power plant hub 1210 to virtual power plant hub 1222 combination. In some embodiments, users 110 may select the virtual power plant capacity mode 1230 such that the user allows a market for only one form or mode of virtual power plant capacity as a commodity or security or the user 110 may allow the system to show multiple forms (multi-modal) of virtual power plant capacity between two virtual power plant capacity hubs 1210, 1211, 1222. In some embodiments the GUI 210 may detect a user 110 selecting the 911 button 1229 which may activate voice and video recording functions on the mobile or stationary device 210 and transmit the data with a confirmation from the user 110 to the authorities to provide enhanced security while participating, transacting or trading transformed forward virtual power plant capacity units as a commodity or security. In some embodiments the user may toggle between the GUI or CPU device 210 market view screen in FIG. 4 and other menu 270 options and settings by the user 110 selecting the hamburger button 270 and the GUI 210 detecting the user 110 input or contact or audio instructions. In some embodiments the GUI 210 may instantiate instructions in the memory of the mobile computing device 210 which then transmits virtual power plant capacity data through the network 214 or wireless GPS network 215 to call upon instruction routines and instruction sub-routines on the virtual power plant capacity forward market database server 271, virtual power plant hub database server 223, network member database server 222, power plant map routing servers 220, and/or instructions in the memory of the cloud and local CPUs 219 which all interface together to make one system which may deliver virtual power plant capacity units to users 110 from and to a plurality of virtual power plant hubs 1210, 1222 with a plurality of specifications at specific market prices.

Figure 13:
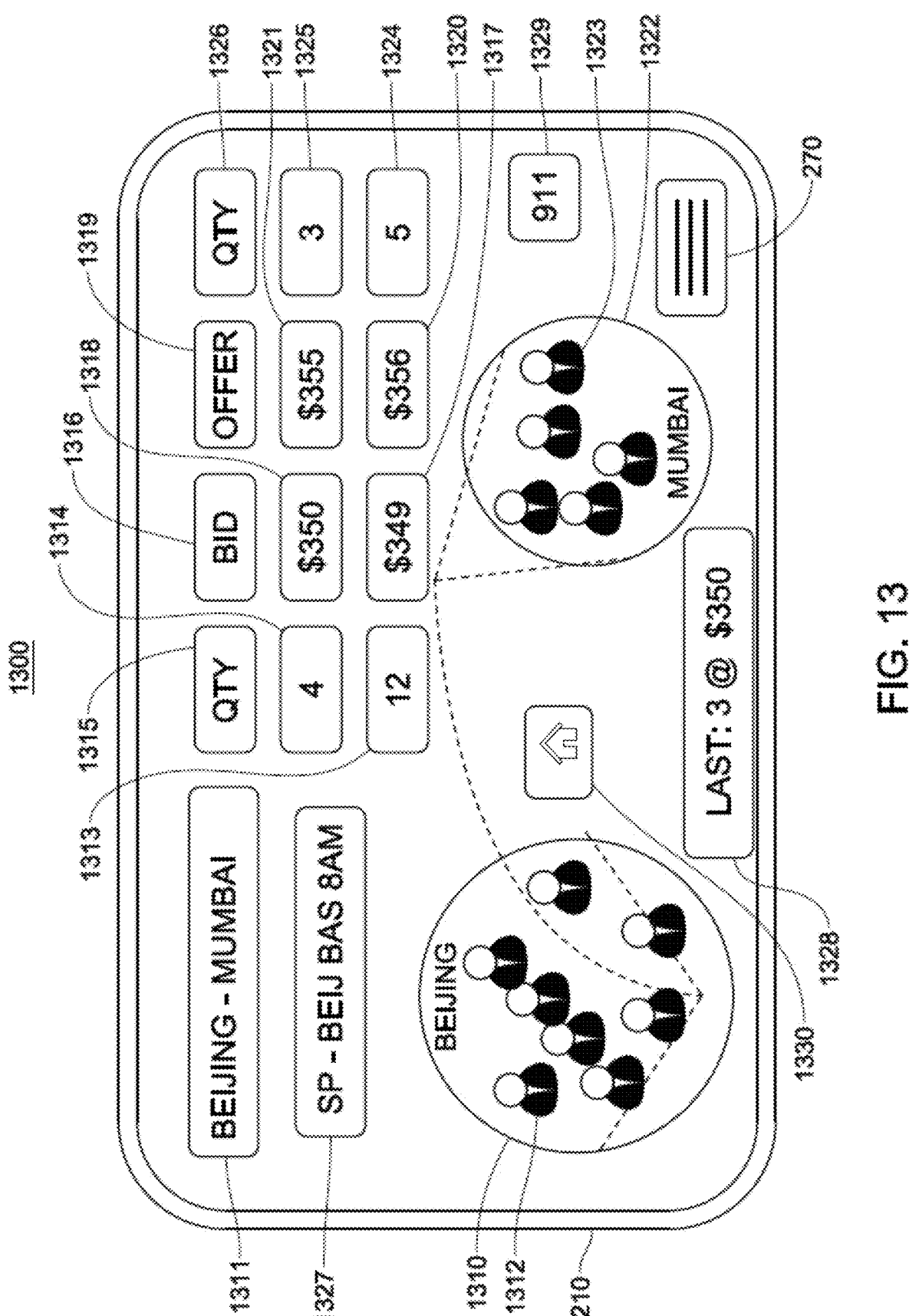
FIG. 13 illustrates an exemplary user interface for transacting and trading Beijing to Mumbai virtual power plant interval object community linked virtual power plant interval object capacity with associated price-time priority queues in accordance with some embodiments.

FIG. 13 illustrates exemplary user interfaces 210 for participating, transacting and/or trading transformed virtual power plant capacity as a physical forward commodities or securities between combinations of virtual hubs over various virtual power plant capacity modes. In some embodiments, user interface 210 includes the following elements, or a subset or superset thereof:

exemplary virtual power plant hub combination 1311;

exemplary virtual power plant hub origin/from location 1310 with users 1312 within the virtual power plant hub location 1310;

exemplary specification summary of the market, level of service and time of delivery commencement 1327;

exemplary mode of residential, commercial or industrial virtual power plant capacity type 1330;

exemplary transaction summary of the last trades quantity and price 1328;

exemplary virtual hub destination/to location 1322 and user who is being delivered on the virtual power plant capacity unit 1323;

exemplary bid/buy quantity title header 1315 for an exemplary virtual power plant capacity market;

exemplary bid/buy price title header 1316 for an exemplary virtual power plant capacity market;

exemplary offer/sell price title header 1319 for an exemplary virtual power plant capacity market;

exemplary offer/sell quantity title header 1326 for an exemplary virtual power plant capacity market;

exemplary bid/buy quantity 1314 for the best bid quantity from a plurality of users 110 for an exemplary respective virtual power plant capacity or virtual power plant hub combination that has undergone a plurality of data transformations in the method 1311;

exemplary bid/buy quantity 1313 for the second-best bid quantity from a plurality of users 110 for an exemplary respective virtual power plant capacity or virtual power plant hub combination that has undergone a plurality of data transformations in the method 1311;

exemplary bid/buy price 1318 for the best bid price from a plurality of users 110 for an exemplary respective virtual power plant capacity or virtual power plant hub combination that has undergone a plurality of data transformations in the method 1311;

exemplary bid/buy price 1317 for the second-best bid price from a plurality of users 110 for an exemplary respective virtual power plant capacity or virtual power plant hub combination that has undergone a plurality of data transformations in the method 1311;

exemplary offer/sell price 1321 for the best offer price from a plurality of users 110 for an exemplary respective virtual power plant capacity or virtual power plant hub combination that has undergone a plurality of data transformations in the method 1311;

exemplary offer/sell price 1320 for the second-best offer price from a plurality of users 110 for an exemplary respective virtual power plant capacity or virtual power plant hub combination that has undergone a plurality of data transformations in the method 1311;

exemplary offer/sell quantity 1325 for the best offer quantity from a plurality of users 110 for an exemplary respective virtual power plant capacity or virtual power plant hub combination that has undergone a plurality of data transformations in the method 1311;

exemplary offer/sell quantity 1324 for the second-best offer quantity from a plurality of users 110 for an exemplary respective virtual power plant capacity or virtual power plant hub combination that has undergone a plurality of data transformations in the method 1311;

exemplary safety dispatch "911" button 1329 to enact video and audio recording of the user 110 environment and dispatch of that information to authorities.

exemplary hamburger menu button 270 to move back to menu options and settings away from the participation, transaction, trading GUI 210 embodiment.

In some embodiments the user 110 may enter a transaction quantity and price for virtual power plant capacity units to participate, transact and/or trade by the GUI 210 detecting user 110 contact or audio instructions with a bid/buy price 1318 or offer/sell price 1321. The GUI 210 detects user 110 contact with any of the GUI 210 buttons which have been aforementioned. Upon user 110 contact or audio interface with buttons or audio instructions on the GUI 210, instructions are instantiated which allows the user 110 to change the specifications of the respective virtual power plant hub combination 1311. A plurality of prices and markets may be presented based on a plurality of transformed contract specifications. In some embodiments, the best bid/buy price 1318 may be moving up in price or down in price depending on the market conditions at any given time. In some embodiments the last trade or last transacted price for a given transformed specification is listed to help the user 110 understand how the market is moving so that the user 110 may submit a competitive offer/selling price 1321 or bid/buying price 1314. In some embodiments, users 110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 110 may be displayed as user icons 1312 or 1323 for the amount of people logged in which desire to transact, trade or participate in a given virtual power plant hub 1310 to virtual hub 1322 transformed combination. In some embodiments, users 110 may select the virtual power plant capacity mode 1330 such that the user allows a market for only one form of virtual power plant capacity as a commodity or the user 110 may allow the system to show multiple forms of transformed virtual power plant capacity or securities between two virtual power plant capacity hubs 1310, 1311, 1322. In some embodiments, by way of example and not to limit by example to avoid doubt, transformed virtual power plant capacity units or transformed virtual power plant capacity unit securities may even be substitutable between modes if the other specifications meet the grade category of the transformed virtual power plant capacity unit specification or transformed virtual power plant capacity unit security. In some embodiments, a user(s) 110 may have bought a transformed virtual power plant capacity unit with a specification and the delivery mechanism was a residential, industrial or commercial virtual power plant unit 1330, however the user 110 bought back their transformed virtual power plant capacity unit or transformed virtual power plant capacity unit security and now the original purchaser may be matched with a virtual power plant of another user 110 who will deliver the transformed virtual power plant capacity unit or transformed virtual power plant capacity unit security. In some embodiments, residential, industrial or commercial 1330 which may include smart meters, meters, connected appliances, connected distributed generation, net metering and power inverters, or a plurality of other modes may be substitutable if the transformed virtual power plant capacity unit or transformed virtual power plant capacity unit security meets the delivery transformed specification grade. In some embodiments the GUI 210 may detect a user 110 selecting the 911 button 1329 which may activate voice and video recording functions on the mobile or stationary device 210 and transmit the data with a confirmation from the user 110 to the authorities to provide enhanced security while participating, transacting or trading forward virtual power plant capacity as a commodity. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits virtual power plant capacity data through the network 214 or wireless GPS network 215 to call upon instruction routines and instruction sub-routines on the virtual power plant capacity forward market database server 220, virtual hub database server 223, network member database server 222, power factor map routing servers 220, and/or instructions in the memory of the cloud and local CPUs 210 which all interface together to make one system which may deliver virtual power plant capacity units to users 110 from and to a plurality of virtual power plant hubs 1310, 1322 with a plurality of specifications at specific market prices.

Figure 14:
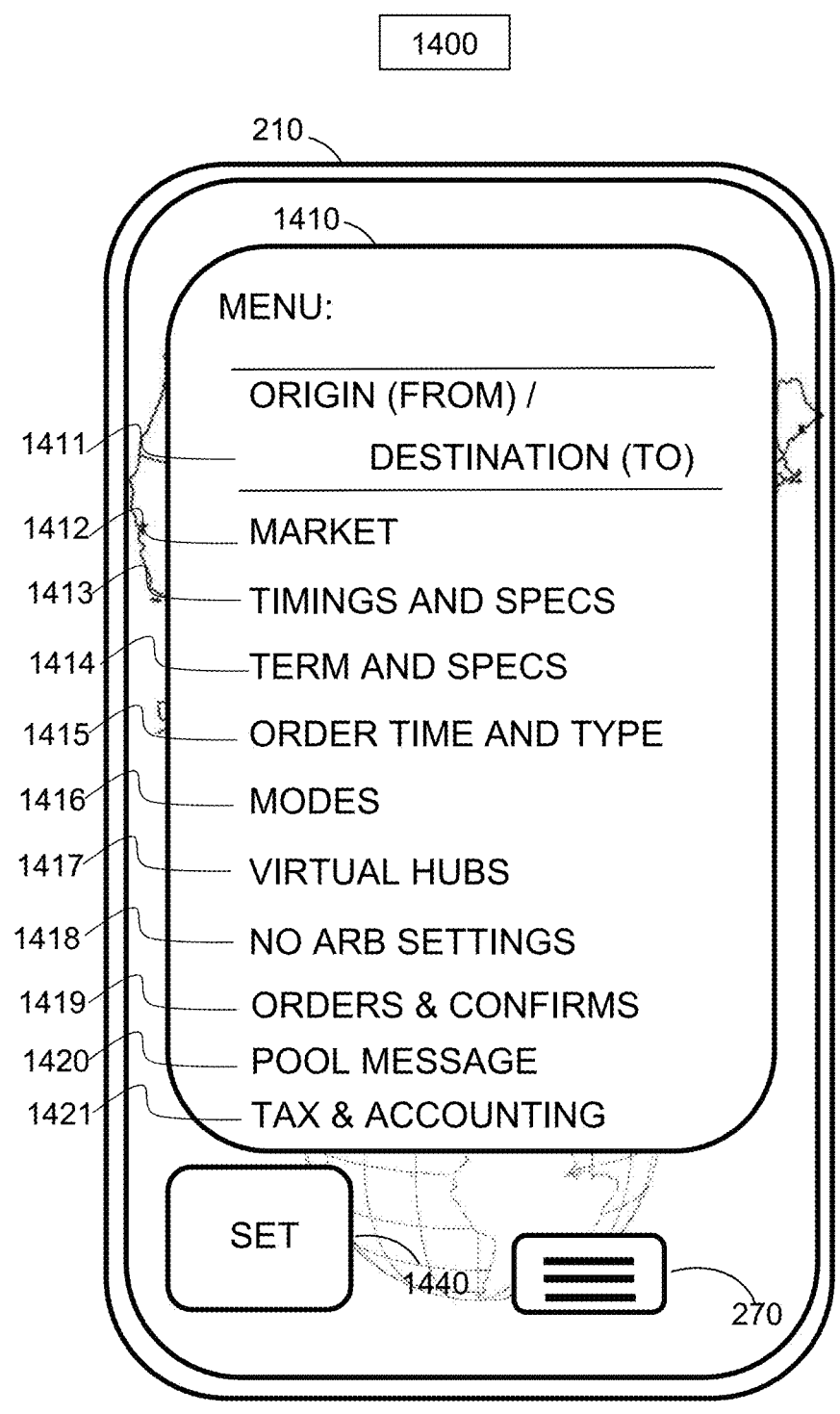
FIG. 14 illustrates an exemplary user interface for virtual power plant interval object community linked objects with associated price-time priority queues transacting and trading various menu options within the system and method in accordance with some embodiments.

FIG. 14 illustrates an exemplary user interface 210 for selecting menu options 1410 on a portable multifunction device in accordance with some embodiments. In some embodiments, user interface 210 includes the following elements, or a subset or superset thereof:

menu options 1410;

origin (from)/destination (to) menu option 1411;

market menu option 1412;

timings and specs menu option 1413;

term and specs menu option 1414;

order time and type menu option 1415;

modes menu option 1416;

virtual power plant hubs menu option 1417;

no arb settings menu option 1418;

orders and confirms menu option 1419;

pool message menu option 1420;

tax and accounting menu option 1421;

setting button 1440 to transmit the menu option;

hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 4. In some embodiments, the user 110, may contact the "market" menu option 1412 which may instruct the GUI 210 to render a market participation, transaction and/or trading screen such as 400, 1100, 1200, or 1300. In some embodiments the user may toggle between the GUI 210 market view screen in FIG. 4 and other menu 270 options and settings by the user 110 selecting the hamburger button 270 and the GUI 210 detecting the user 110 input or contact. In some embodiments, the user 110, may contact the "timings and specs" menu option 1413 which may instruct the GUI 210 to render a timings and specs screen such as 500. In some embodiments, the user 110, may contact the "term and specs" menu option 1414 which may instruct the GUI 210 to render a term and specs screen such as 600. In some embodiments, the user 110, may contact the "order time and type" menu option 1415 which may instruct the GUI 210 to render an order time and type screen such as 700. In some embodiments, the user 110, may contact the "modes" menu option 1416 which may instruct the GUI 210 to render a mode screen such as 800. In some embodiments, the user 110, may contact the "Virtual Hubs" menu option 1417 which may instruct the GUI 210 to render a virtual power plant hubs screen such as 900. In some embodiments, the user 110, may contact the "no arb settings" menu option 1418 which may instruct the GUI 210 to render a no arbitrage constraint screen such as 1000. In some embodiments, the user 110, may contact the "orders and confirms" menu option 1419 which may instruct the GUI 210 to render the market orders and transaction confirmations for the user 110. In some embodiments, the user 110, may contact the "pool message" menu option 1420 which may instruct the GUI 210 to message either the actual virtual power plant capacity unit processor 162 or the opposite seller user 110 or buyer user 110 depending on if the user 110 was an opposite buyer or seller of the virtual power plant capacity unit. In some embodiments, the user 110, may contact the "tax and accounting" menu option 1421 which may instruct the GUI 210 to render tax and accounting information for the respective user 110. In some embodiments the GUI 210 menu option selection 1410 may instantiate instructions in the memory of the mobile computing device 210 which then transmits virtual power plant capacity data through the network 214 or wireless GPS network 215 to call upon instruction routines and instruction sub-routines on the virtual power plant capacity forward market database server 271, virtual power plant hub database server 223, network member database server 222, power factor map routing server 220, and/or instructions in the memory of the cloud and local CPUs 210 which all interface together to make one system which may deliver virtual power plant capacity units or securities to users 110 from and to a plurality of virtual power plant hubs 410, 422 with a plurality of specifications at specific market prices.

Figure 15:
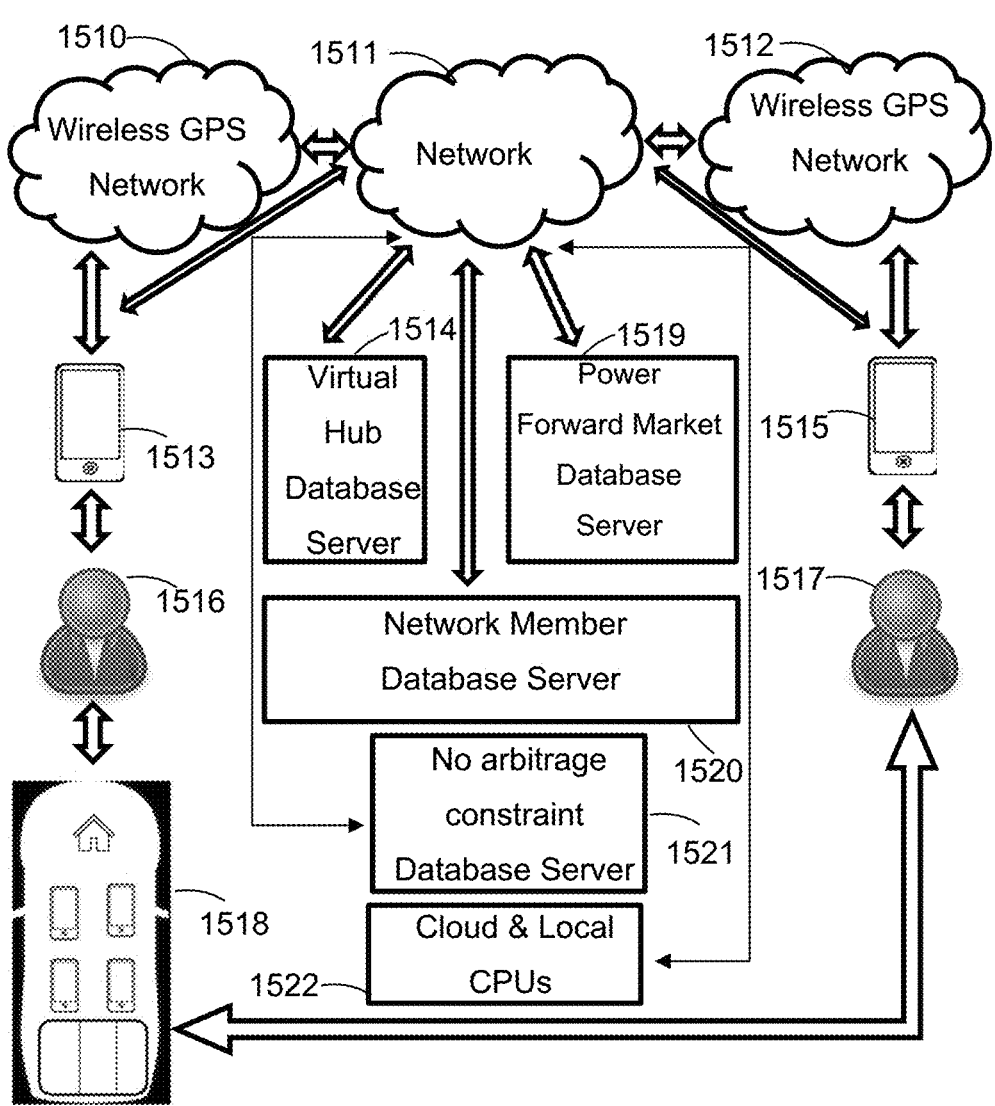
FIG. 15 illustrates an exemplary schematic diagram of a network configuration and implementations of methods which support the method and system of trading virtual power plant interval object community linked virtual power plant interval object capacity with associated price-time priority queues in accordance with some embodiments.

FIG. 15 illustrates an exemplary network configuration 1500 in one exemplary implementation of participating, transacting and/or trading transformed virtual power plant capacity units or securities in accordance with some embodiments. In some embodiments, network configuration 1500 includes the following elements, or a subset or superset thereof:

wireless global positioning system (GPS) network 1510;

network/s 1511;

additional global positioning system (GPS) network 1512;

user member portable multifunction device 1513;

virtual power plant hub database server 1514;

virtual power plant capacity forward market database server 1519;

additional user member portable multifunction device 1515;

network member database server 1520;

network member user 1516;

additional network member user 1517;

no arbitrage constraint database server 1521;

cloud and Local CPUs 1522;

virtual power plant capacity unit mode 1518.

In some embodiments, the software and/or instructions stored in memory of the cloud & local CPUs 1522 and portable multifunction devices 1513, 1515 may include additional instructions to instantiate specification requirements, participation, transactions, and/or trading on the virtual power plant capacity unit network 1511. In some embodiments, instructions may include standard database web services with the database as service provider (i.e. calling from the outside in, which lets the client GUI 210 or 1513 call each of the virtual power plant hub database server 1514 and/or virtual power plant capacity forward market database server 1519 and/or network member database server 1520 and/or no arbitrage constraint database server 1521 and/or cloud & local CPUs 1522 through the wireless GPS network 1510 or network 1511. In some embodiments, each of the virtual power plant hub database server 1514 which may include smart meters, meters, connected appliances, connected distributed generation, net metering and power inverters and/or virtual power plant capacity forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the virtual power plant capacity unit market GUI 210 so that the users 1516 and/or 1517 may participate, transact and/or trade virtual power plant capacity units. In some embodiments, the virtual power plant hub database server 1514 stores power factor map tile data in addition to user location data which is utilized by the GUI 210 to display or render location of virtual hubs and user 1516 proximity to those virtual power plant hubs 200, 400, 900, 1100, 1200, 1300. In some embodiments, the virtual power plant capacity forward market database server 1519 stores bid and offer data for respective quantities of users as well as transaction data and a plurality of market data for each virtual power plant hub combination. In some embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 may interface through the network 1511 and/or wireless GPS networks 1510, 1512 such that virtual power plant capacity units may be participated in, transacted and/or traded efficiently in the context of a market for virtual power plant capacity units or securities. Included aforementioned data elements may be a subset or superset of data used for any specific calculation or transformation to participate, transact or trade virtual power plant capacity units or securities.

FIG. 16 illustrates a flowchart embodiment of steps a user may perform to participate, transact and/or trade transformed virtual power plant capacity units or securities between virtual power plant hub combinations. In some embodiments a user at a mobile or portable multifunction device and/or fixed computing device with a touchscreen or a computing device without a touchscreen or augmented, audio interface computing device, mixed reality non-screen display may detect user login to the virtual power plant capacity unit network 1610. In some embodiments, the GUI of the virtual power plant capacity unit network may detect and receive origin location from user input or current GPS coordinate information and detect destination address from user input and transmission of data 1620. In some embodiments, the GUI and/or CPUs and/or databases may generate and apply one or more optimization techniques to form a virtual power plant hub with other users that have similar virtual power plant capacity requests within a geographic boundary 1630. In some embodiments, the GUI and/or CPUs and or databases may generate instructions for a plurality of computing devices, network, virtual power plant hub database server, network member database server and virtual power plant capacity forward market database server 271 to form a combination of virtual power plant hubs and transformed contract specifications for delivery of virtual power plant capacity services or virtual power plant capacity between the virtual power plant hubs in a format presented by a graphical user interface which allows users to enter forward physical prices to sell (offer) or bid (buy) virtual power plant capacity units or securities between virtual power plant hub combinations 1640 in an open market auction format. In some embodiments, the GUI and/or CPUs and or databases may generate instructions to interface a plurality of networks, global positioning systems networks, servers, forward commodity market auctions, map routing servers, grouping instruction software for virtual power plant hubs, navigation servers, transparent open access pricing systems, game servers, blockchain audit of green or brown power source and origin and safety systems, virtual power plant hub servers and systems, no arbitrage constraint condition systems which form one system to implement a forward commodity virtual power plant capacity unit forward market system and method 1650. In some embodiments, the blockchain audit of the power may include methods disclosed in U.S. provisional application 63/181, 866 filed Apr. 21, 2021 and titled "Multi-function device legal product claim blockchain", the contents included in their entirety herein which may tag power generated by a specific green source at distributed generation such as solar, wind, geothermal, hydrogen, hydro, turbine, chlorophyll, methane, natural gas, ethane, oil, hydrocarbons, coal, nuclear or other types of generation to verify power that is transacting on the system in the blockchain.

Figure 17:
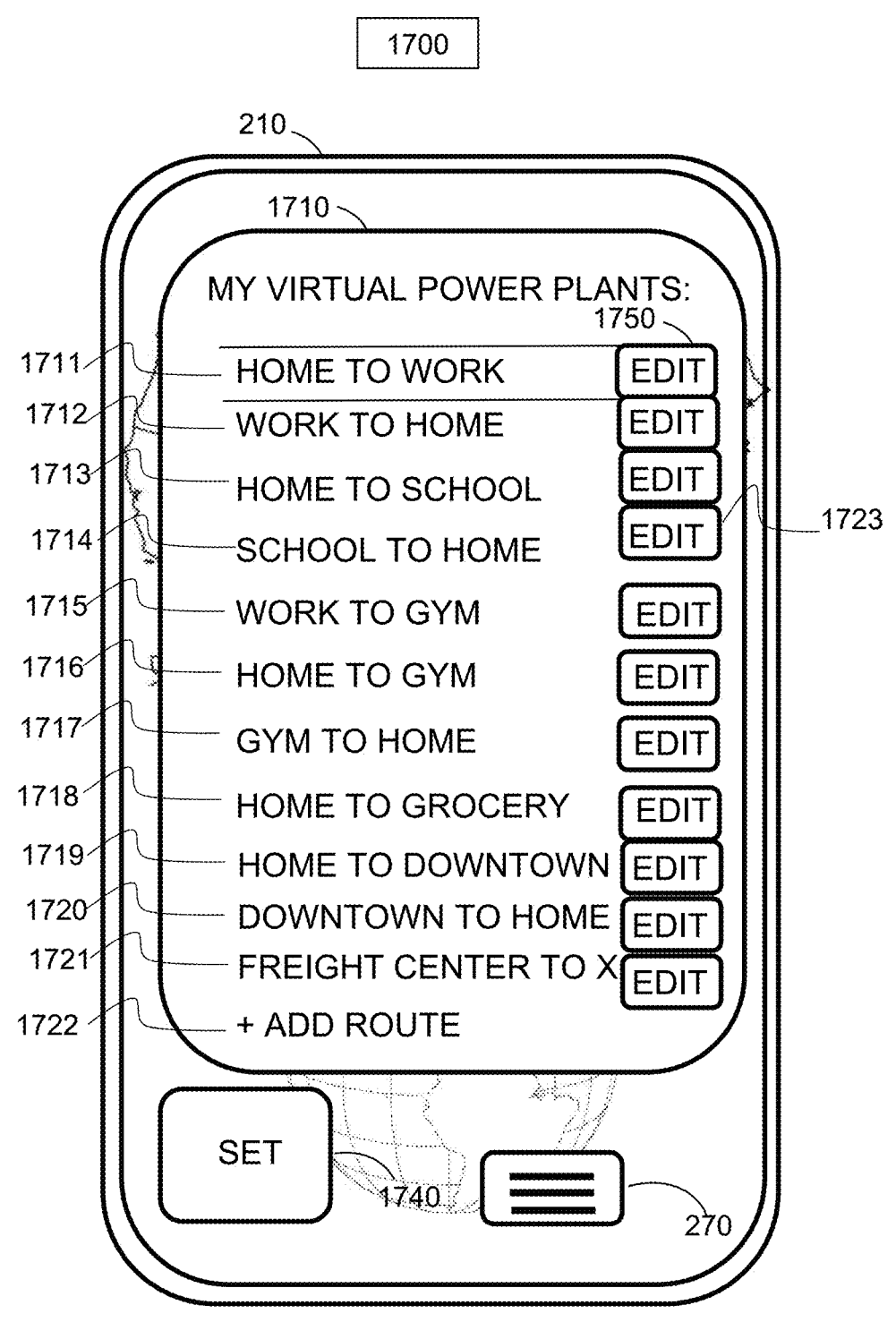
FIG. 17 illustrates an exemplary user virtual power plant interface for displaying most frequent or selected subjects in accordance with some embodiments.

FIG. 17 illustrates an exemplary embodiment of a user 110 most frequent virtual power plant capacity transmission routes or virtual power plant zone objects 1710 in one exemplary implementation of participating, transacting and/or trading virtual power plant capacity units in accordance with some embodiments. In some embodiments, most frequent my routes, zones or objects include the following elements, or a subset or superset thereof:

home to work 1711 (may have subsets of transformed data);

work to home 1712 (may have subsets of transformed data);

home to school 1713 (may have subsets of transformed data);

school to home 1714 (may have subsets of transformed data);

work to gym 1715 (may have subsets of transformed data);

home to gym 1716 (may have subsets of transformed data);

gym to home 1717 (may have subsets of transformed data);

home to grocery 1718 (may have subsets of transformed data);

home to downtown 1719 (may have subsets of transformed data);

downtown to home 1720 (may have subsets of transformed data);

virtual power plant freight center to X where X is a delivery or transmission route or multi virtual power plant hub combination 1721 (may have subsets of transformed data);

+add route 1722 (may have subsets of transformed data);

edit 1723 (may have subsets of transformed data);

setting button 1740 to transmit the my virtual power plant data;

hamburger button 270 to instruct the GUI 210 to take the user 110 to the menu screen.

In some embodiments, the GUI 210 may be used to select, store and/or edit user 110 frequent or preferred routes ("MY VIRTUAL POWER PLANTS") 1710 for more efficient access to virtual power plant capacity unit markets over various modes and specifications of virtual power plant capacity. In some embodiments, the user 110 may select, store and/or edit address and specification data for "home to work" 1711 and/or "work to home" 1712 and/or "home to school" 1713 and/or "school to home" 1714 and/or "work to gym" 1715 and/or "home to gym" 1716 and/or "gym to home" 1717 and/or "home to grocery" 1718 and/or "home to downtown" 1719 and/or "downtown to home" 1720 and/or "freight center to X" 1721 and/or "+ add route" or zone or transmission or objects 1722. In some embodiments, the my virtual power plant 1710 module may include any route or transmission or virtual power plant object a user 110 may request on any virtual power plant capacity unit mode and/or specification. In some embodiments, the user may toggle between the GUI 210 market view screen in FIG. 4 and other menu 270 options and settings by the user 110 selecting the hamburger button 270 and the GUI 210 detecting the user 110 input or contact. In some embodiments, the user 110 is notified via SMS text, in application, email or a plurality of other well-known communication methods when market activity occurs on a given transmission and route or virtual power plant hub combination. In other words, the "my virtual power plant" 1710 feature not only allows for one touch access to a saved route, but also performs notification features between users. Lastly, in some embodiments, the EDIT 1750 button allows a user 110 to modify a plurality of notification settings such as email, SMS text, in application, voice, messaging or other notification methods.

Figure 18:
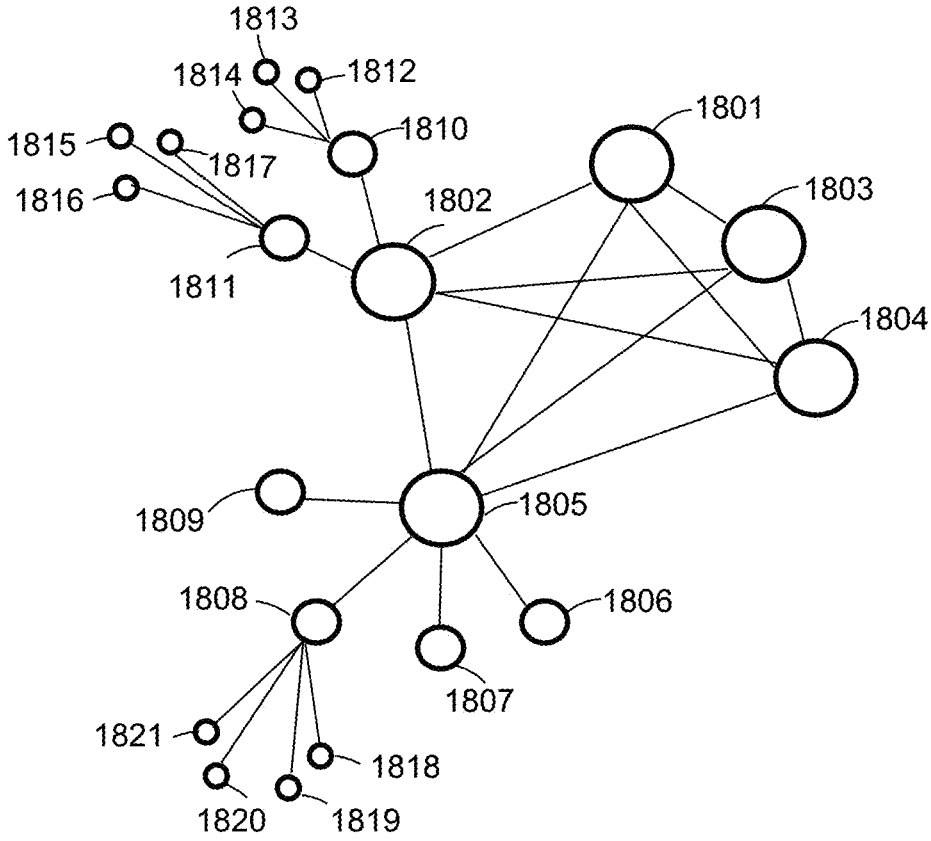
FIG. 18 illustrates an exemplary network topology of a virtual power plant interval object community linked virtual hub combination or series of multiple virtual power plant interval object community linked virtual hub combinations for use in the market auction platform for forward virtual power plant interval object community linked time interval object capacity with associated price-time priority queues method in accordance with some embodiments.

FIG. 18 illustrates an exemplary network topology configuration 1800 in one exemplary implementation of participating, transacting and/or trading transformed virtual power plant capacity units or securities in accordance with some embodiments. In some embodiments, network configuration 1800 includes the following elements, or a subset or superset thereof:

large virtual power plant hub nodes such as 1801, 1802, 1803, 1804, 1805;

medium virtual power plant hub nodes such as 1810, 1811, 1809, 1808, 1807, 1806;

small virtual power plant hub nodes such as 1812, 1813, 1814, 1815, 1816, 1816, 1817, 1818, 1819, 1820, 1821;

In some embodiments, the overall network node topology 1800 is comprised of large virtual power plant nodes 1801, 1802, 1803, 1804, 1805 and medium virtual power plant hub nodes 1810, 1811, 1809, 1808, 1807, 1806 and small virtual power plant hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual power plant hub locations in a city, multiple cities or even countries or multiple countries. In some embodiments, forward virtual power plant capacity market auctions may occur directly between two exemplary virtual power plant points such as 1815 and 1818 or the method and system may combine a series of smaller auctions to comprise a larger auction between two endpoints on the system. In some embodiments, a series of smaller virtual power plant auctions may be combined between 1815 and 1811 as well as 1811 and 1802 as well as 1802 and 1805 as well as 1805 and 1808 as well as 1808 and 1818 which would be added together to make a combined virtual power plant hub auction. A combined series of smaller auctions may be constrained by instructions which form auctions based on cheapest virtual power plant capacity 1011, single mode virtual power plant transmission or virtual power plant object auctions 1012, multi-mode virtual power plant transmission or virtual power plant object 1013, fastest transmission or virtual power plant constraints 1014, most scenic transmission or virtual power plant object auctions 1015, highest rating transmission or virtual power plant object auctions 1016, most available or liquid virtual power plant auctions 1017, highest virtual power plant volume auctions 1018, most frequent virtual power plant auctions 1019, service level virtual power plant auctions 1020, virtual power plant security and safety level auctions 1021, virtual power plant group restricted auctions by sex, email, organization, gender or other 1022. In some embodiments, the constraints allow for many types of auctions which are unique and novel for transformed virtual power plant capacity units or securities in a forward virtual power plant capacity market. In some embodiments, the user 110 may specify instructions that set forward virtual power plant market auction constraints based on one or a plurality of constraints. In some embodiments, the constrained virtual power plant auctions may have fungible units which allow many participants to transact in the auctions. In some embodiments, the disclosed creation of a forward market of virtual power plant capacity units between virtual power plant hubs 1801 and 1804 or other combinations along map routes has the attributes of a fungible forward virtual power plant contract which allows for one virtual power plant capacity unit to be substitutable for another virtual power plant capacity unit because the unit has been transformed and defined as a commodity contract. By use of example, but not limiting by example, in other words, if user A bought a virtual power plant capacity unit from user B between 1801 virtual power plant hub and 1804 virtual power plant hub, but then user A was not able to perform the obligation to purchase the virtual power plant capacity unit between 1801 virtual power plant hub and 1804 virtual power plant hub from user B, user A could resell the virtual power plant capacity unit contract between virtual power plant hub 1801 and virtual power plant hub 1804 to a third party user C on the forward virtual power plant capacity unit auction market between virtual power plant hub 1804 and virtual power plant hub 1801 to retrieve the financial payment made for their original purchase from user B and then user C would replace user A and be matched with user B for the virtual power plant capacity unit transformation between virtual power plant hub 1804 and virtual power plant hub 1801. No other prior art system or method performs the aforementioned data transformation combination which may include smart meters, meters, connected appliances, connected distributed generation, net metering and power inverters. In some embodiments, the virtual power plant capacity unit auction substitutability dynamic creates a unique and novel invention that does not exist in the world today. In some embodiments, user 110 input 210 instructions use constrained optimization to form one virtual power plant auction between two points or a series of multiple virtual power plant auctions that form one larger virtual power plant auction.

In some embodiments, the forward virtual power plant capacity unit auctions subject to various constraints may be presented as a linear programming cost minimization problem in the exemplary case where the user 110 selects the cheapest transmission route or congestion route or virtual power plant object 1011 constraint. In such exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost virtual power plant auction path. In another such exemplary case, the user 110 may select instructions for the auction to minimize both cost and shortest route. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize virtual power plant cost subject to the shortest path that yields a path of 1815 to 1811 to 1802 to 1805 to 1808 to 1818. The plurality of combinations of linear programming sequences of auctions for virtual power plant capacity units between two points may consider an infinite set of combinations and permutations.

In some embodiments, the forward transformed virtual power plant capacity and freight unit or transformed virtual power plant capacity security unit auctions may be held side by side between two competing virtual power plant transmission routes or virtual power plant objects 4200. By way of example but not limiting by example a user may input instructions for the method and system to provide transmission or virtual power plant objects between 1801 virtual power plant hub and 1805 virtual power plant hub. One route may be directly between 1801 virtual power plant hub and 1805 virtual power plant hub. Another route may be between virtual power plant hub 1801 and virtual power plant hub 1805 by way of virtual power plant hub 1802. The time between the virtual power plant routes may vary due to traffic, construction, road conditions, accidents or a plurality of other exogenous factors, however, the data transformation of the disclosed method allows for two auctions to form side by side. Side by side virtual power plant auctions may be displayed on a market based user interface 1300 or as a software layer of instructions over a navigation system 4200. The first virtual power plant capacity unit auction may be between virtual power plant hub 1805 and virtual power plant hub 1801 directly as one auction. A second auction may be by combining two smaller auctions between virtual power plant hub 1805 and virtual power plant hub 1802 with the auction between 1802 virtual power plant hub and 1801 virtual power plant hub which could be expressed independently or as a combined auction. The plurality of route auctions for the virtual power plant capacity unit (auction one directly between 1801 virtual power plant hub and 1805 virtual power plant hub) (auction two between 1801 virtual power plant hub and 1805 virtual power plant hub by way of 1802 virtual power plant hub) may allow for the user to have transparent price virtual power plant auction information for the value of various proposed routes which have different price values.

Figure 19:
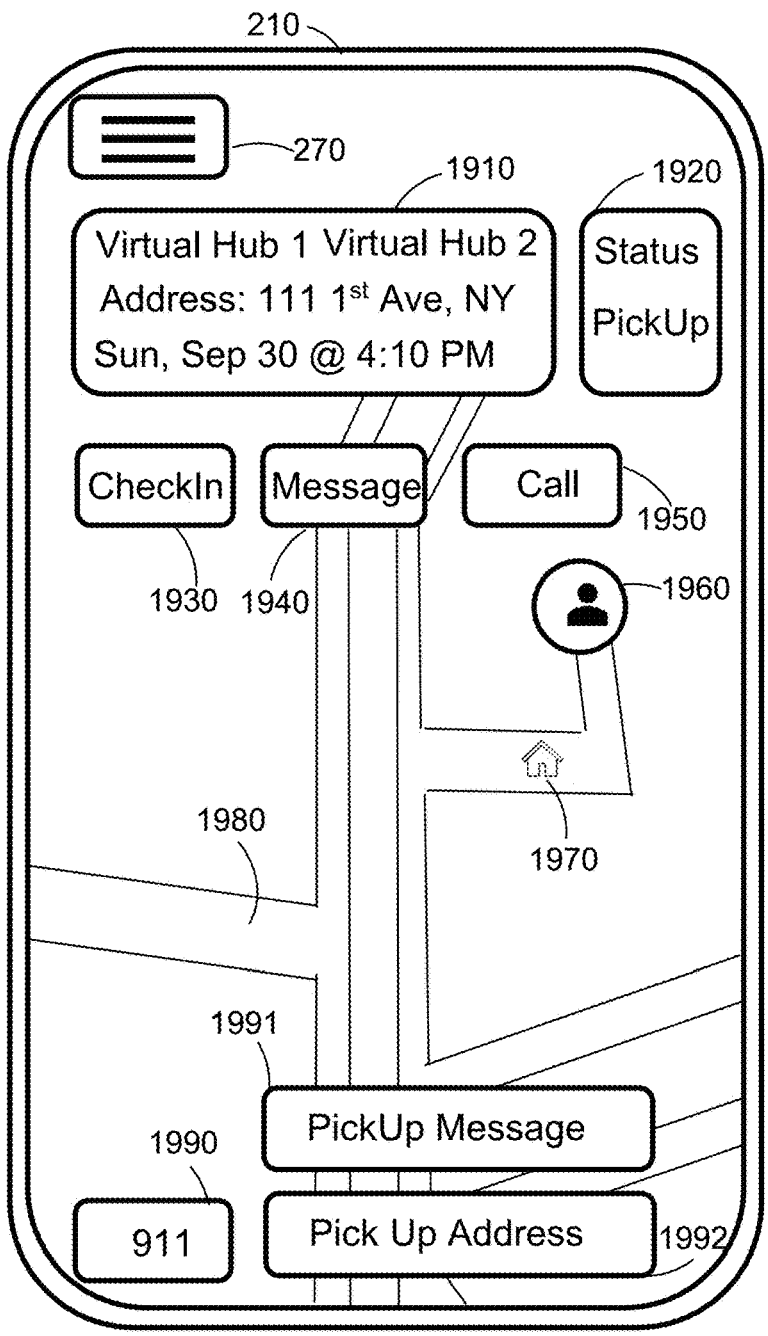
FIG. 19 illustrates an exemplary user interface to display the map of the virtual power plant interval object community linked virtual hub to virtual hub subject of a given transaction for virtual power plant interval object community linked forward virtual power plant interval object capacity and transmission with associated price-time priority queues units in accordance with some embodiments.

FIG. 19 illustrates an exemplary delivery and pick up geofence status configuration 1900 in one exemplary implementation of participating, transacting and/or trading transformed virtual power plant capacity units or securities in accordance with some embodiments. In some embodiments, the delivery and pick up status configuration 1900 includes the following elements, or a subset or superset thereof:

computing device unit GUI 210 to display method of multi layered network node topology for forward market of virtual power plant capacity units.

hamburger menu toggle 270 to move between different application configurations;

virtual power plant hub 1 pickup, ingest and/or inverter address and virtual power plant hub 2 destination, delivery and/or inverter address at a contract specification with regards to quality, day, date and time 1910;

trip status for PickUp of virtual power plant capacity unit 1920;

checkIn user or transmission or virtual power plant object status for virtual power plant capacity unit 1930;

messaging texts and instructions between users to make pick up, ingest and/or inverter and delivery and/or inverter of virtual power plant capacity units 1940;

call between users with number masking for privacy security 1950;

GPS power factor map location of user 110 who is a buyer or seller of virtual power plant location 1960 which may include smart meters, meters, connected appliances, connected distributed generation, net metering and power inverters;

GPS power factor map location of user 110 who is a buyer or seller of virtual power plant unit location 1970 which may include smart meters, meters, connected appliances, connected distributed generation, net metering and power inverters;

GPS power factor map of virtual power plant capacity unit delivery and/or inverter and pickup, ingest and/or inverter 1980;

texting message window for virtual power plant capacity unit communication between users 1991;

PickUp, ingest and/or inverter address data window during PickUp, ingest, and/or inverter status 1992;

security button to report security issues to 911 and system database 1990;

In some embodiments, the GUI 210 transmits delivery instructions to the users 110 to help the user have a rendering or map of their GPS virtual power plant location 1960 relative to the selling virtual power plant user 1970 of virtual power plant capacity units. In some embodiments, the GUI 210 displays the virtual power plant status such as PickUp, ingest and/or inverter 1920 status, the trip status may include subsets or supersets of various status conditions such as PickUp, ingest, inverting, start, leaving, on-going, in-progress, arriving, arrived or a plurality of other virtual power plant status conditions. In some embodiments, the virtual power plant view of the GUI 210 may include a CheckIn 1930 button to confirm a virtual power plant transformed virtual power plant capacity unit has been moved into the transformed virtual power plant capacity unit object which could be a combination of transformed modes or other type of virtual power plant capacity mode. In some embodiments, the user 110 may transmit a message using the message 1940 button which may transmit audio, visual or text messages between users 110, 1970, 1960. In some embodiments, the users 110, 1960, 1970 may call each other using the call 1950 button to communicate pickup or delivery instructions. In some embodiments, a user 110, 1960, 1970 may message another user 110, 1960, 1970 to communicate using the PickUp, ingest and/or inverting Message window 1991 which may utilize visual, audio or text communication modes as well as log a message history between users. In some embodiments the users 110, 1960, 1970 may toggle to other modes of the application using the menu hamburger button 270. In some embodiments the GPS display of a power factor map with the relative position of a virtual power plant capacity unit seller 1970 and a virtual power plant capacity unit buyer 1960 are displayed to help users 110 understand each others virtual power plant relative position and location on a power factor map 1980. In some embodiments the GPS location of the virtual power plant capacity unit seller 1970 and virtual power plant capacity unit buyer 1960 are tracked in real time with location updates on the power factor virtual power plant map 1980.

Figure 20:
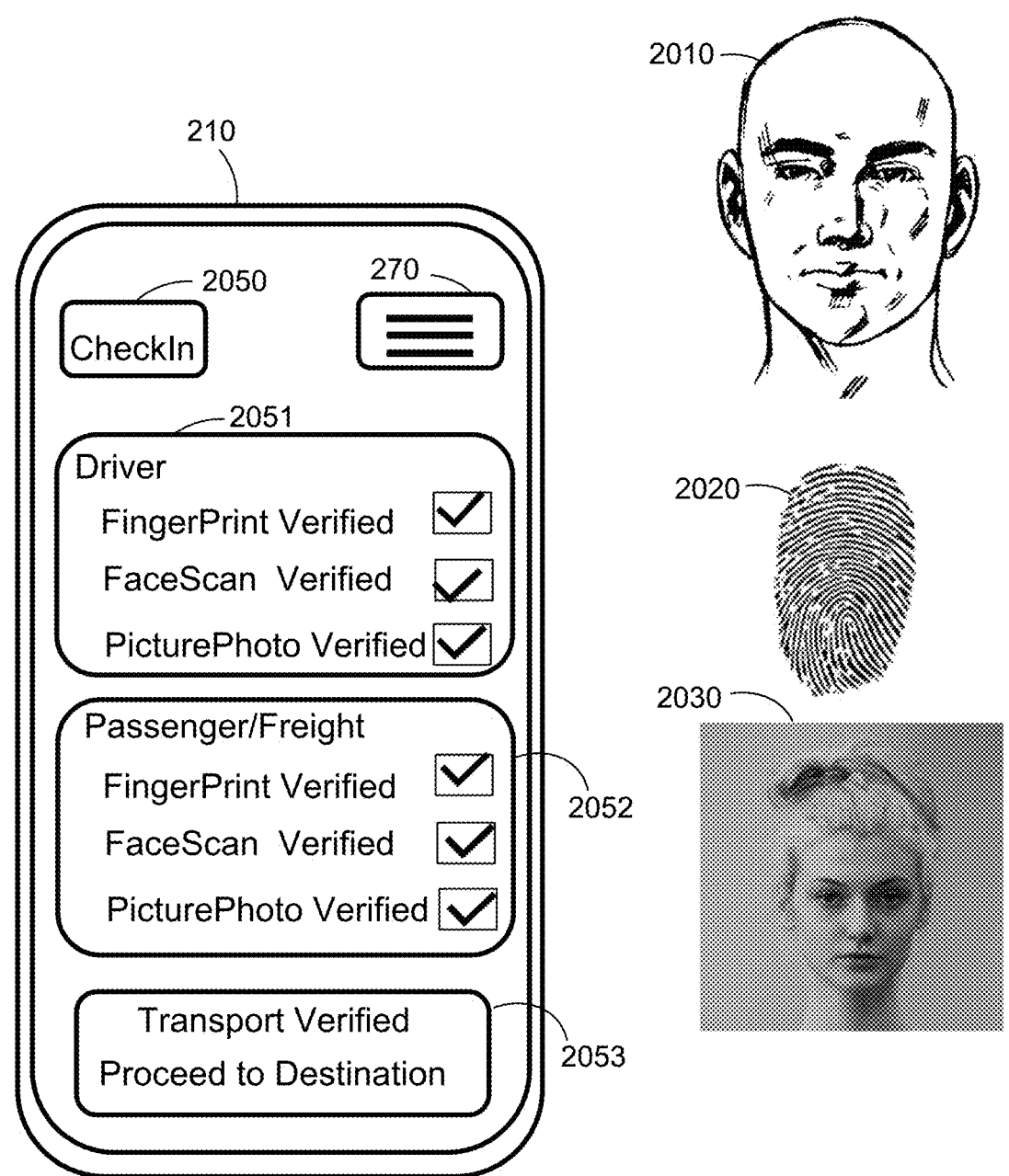
FIG. 20 illustrates an exemplary user interface to display the results of a security check and verification of users identity for virtual power plant interval object community linked forward virtual power plant interval object capacity units with associated price-time priority queues in accordance with some embodiments.

FIG. 20 illustrates an exemplary check in and security database configuration 2000 for a virtual background power plant community linked transmission or virtual background power plant unit multi layered network node topology in one exemplary implementation of participating, transacting and/or trading transformed virtual background power plant community linked transmission or virtual background power plant capacity units or securities in accordance with some embodiments. In some embodiments, the multi layered network node topology of participating, transacting and/or trading virtual background power plant community linked transmission or virtual background power plant capacity configuration 2000 includes the following security configuration elements, or a subset or superset thereof:

exemplary user interface 2001;

exemplary checkin 2050 for multi-factor authentication 2050;

exemplary user interface menu 2070;

exemplary multi-factor verification of the seller of the virtual power plant unit 2051;

exemplary multi-factor verification of the buyer of the virtual power plant unit 2052;

exemplary user 2010;

exemplary fingerprint scan 2020 of a buyer and seller virtual power plant user;

exemplary facial recognition or retina scan of a buyer and seller virtual power plant user 2030;

exemplary virtual power plant community linked seller transmission or virtual power plant or virtual power plant seller unit user interface 2051 to confirm identity verification against a plurality of crime databases;

exemplary virtual power plant community linked passenger unit or virtual power plant unit user interface 2052 to confirm identity verification against a plurality of crime databases;

exemplary handshake verification user interface 2053 to confirm both buyer and seller of virtual power plant community linked transmission or virtual power plant units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, virtual power plant community linked transmission or virtual power plant unit security may be a subset or superset of the aforementioned in the formation of an open forward market auction for a multi layered network node topology for a forward market of virtual power plant community linked transmission and virtual power plant units. Such security checks are standard in airports, but they are not automated and they are not utilized in other modes of transmission which degrades the overall safety of other transmission methods if they are not utilized. In some embodiments, the check in instructions may reject a user from confirmed verified transmission if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to virtual power plant community linked transport verified status 2853 in the system.

Figure 21:
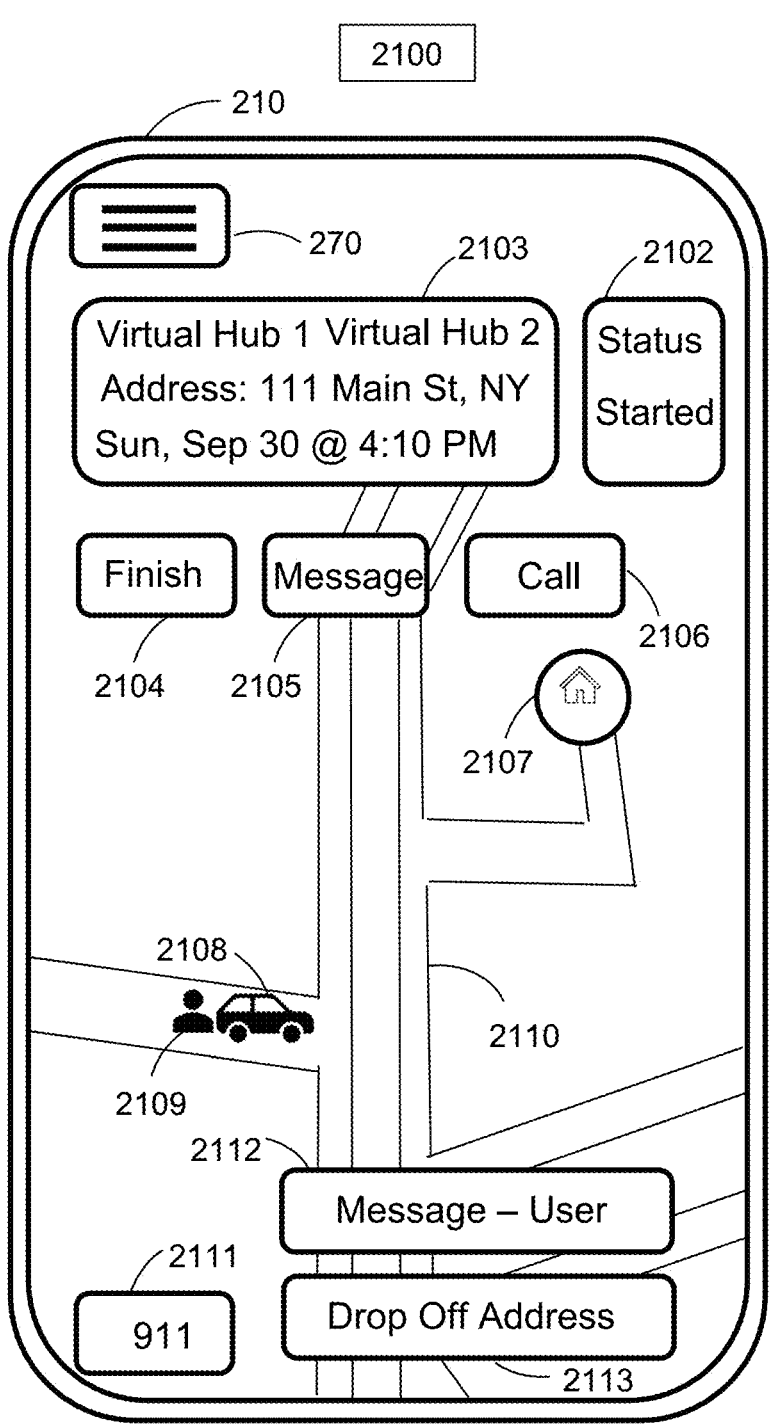
FIG. 21 illustrates an exemplary user interface to display the status of the virtual power plant interval object community linked virtual hub to virtual hub subject of a given transaction for virtual power plant interval object community linked forward virtual power plant interval object capacity units and transmission with associated price-time priority queues in accordance with some embodiments.

FIG. 21 illustrates an exemplary delivery and pick up status configuration 2100 once a virtual power plant capacity unit delivery and/or inverting has started in one exemplary implementation of participating, transacting and/or trading virtual power plant capacity units in accordance with some embodiments. In some embodiments, the delivery and/or inverting and pick up, ingest, and/or inverting status configuration 2100 includes the following elements, or a subset or superset thereof:

computing device unit GUI 210 to display method of multi layered network node topology for forward market of virtual power plant capacity units.

hamburger menu toggle 270 to move between different application configurations;

virtual power plant hub 1 pickup, ingest and/or inverter address and virtual power plant hub 2 destination and/or inverting address at a transformed contract specification with regards to quality, day, date and time 2103 of delivery of a virtual power plant capacity unit;

trip status of started of virtual power plant capacity unit or security 2102;

finish virtual power plant status delivery, pick up, ingest, or inverting capacity unit 2104 once a virtual power plant capacity unit has been commenced;

messaging texts and instructions between users to make pick-up, on-going transmission route status and delivery complete of virtual power plant capacity units 2105;

call between virtual power plant system users with number masking for privacy security 2106;

GPS map location of virtual power plant user 2109 who is a virtual power plant user with location 2109;

GPS map location of virtual power plant user 2108 who is a virtual power plant user with unit location 2108;

GPS map of virtual power plant capacity unit delivery and pickup, ingest and/or inverting status 2110;

texting message window for virtual power plant capacity unit communication between users 2112;

starting point of virtual hub for forward virtual power plant capacity units 2107 which may include smart meters, meters, connected appliances, connected distributed generation, net metering and power inverters;

security button to report virtual power plant security issues to 911 and system database 2111;

drop off address for delivery and/or inverting of virtual power plant capacity unit 2111.

In some embodiments, the GUI 210 transmits delivery instructions to the virtual power plant users 110 to help the user have a rendering or virtual power plant map of their GPS location 2109 relative to the virtual power plant selling user 2108 of transformed virtual power plant capacity units or securities. In some embodiments, the GUI 210 displays the virtual power plant status such as Started 2102 status, the virtual power plant status may include subsets or supersets of various status conditions such as PickUp, Started, leaving, on-going, in-progress, arriving, arrived, inverting, delivered or a plurality of other virtual power plant status conditions. In some embodiments, the trip view of the GUI 210 may include a Finish 2104 button to confirm a user or virtual power plant capacity unit has been delivered or completed by the virtual power plant capacity unit object which could be a plurality of other types of virtual power plant capacity modes. In some embodiments, the user 110 may transmit a message using the message 2105 button which may transmit audio, visual or text messages between users 110, 2109, 2108. In some embodiments, the users 110, 2109, 2109 may call each other using the call 2106 button to communicate pickup or delivery instructions or other necessary communication. In some embodiments, a user 110, 2109, 2108 may message another user 110, 2109, 2108 to communicate using the Message-User window 2112 which may utilize visual, audio or text communication modes as well as log a message history between users. In some embodiments the users 110, 2109, 2108 may toggle to other modes of the application using the menu hamburger button 270. In some embodiments the GPS display of a map with the relative position of a transformed virtual power plant capacity unit security seller 2108 and a transformed virtual power plant capacity unit or security buyer 2109 are displayed to help users 110 understand each others relative virtual power plant position and location on a virtual power plant object and transmission map 2110. In some embodiments the GPS location of the virtual power plant capacity unit seller 2108 and virtual power plant capacity unit buyer 2109 are tracked in real time with location updates on the virtual power plant map 2110.

Figure 22:
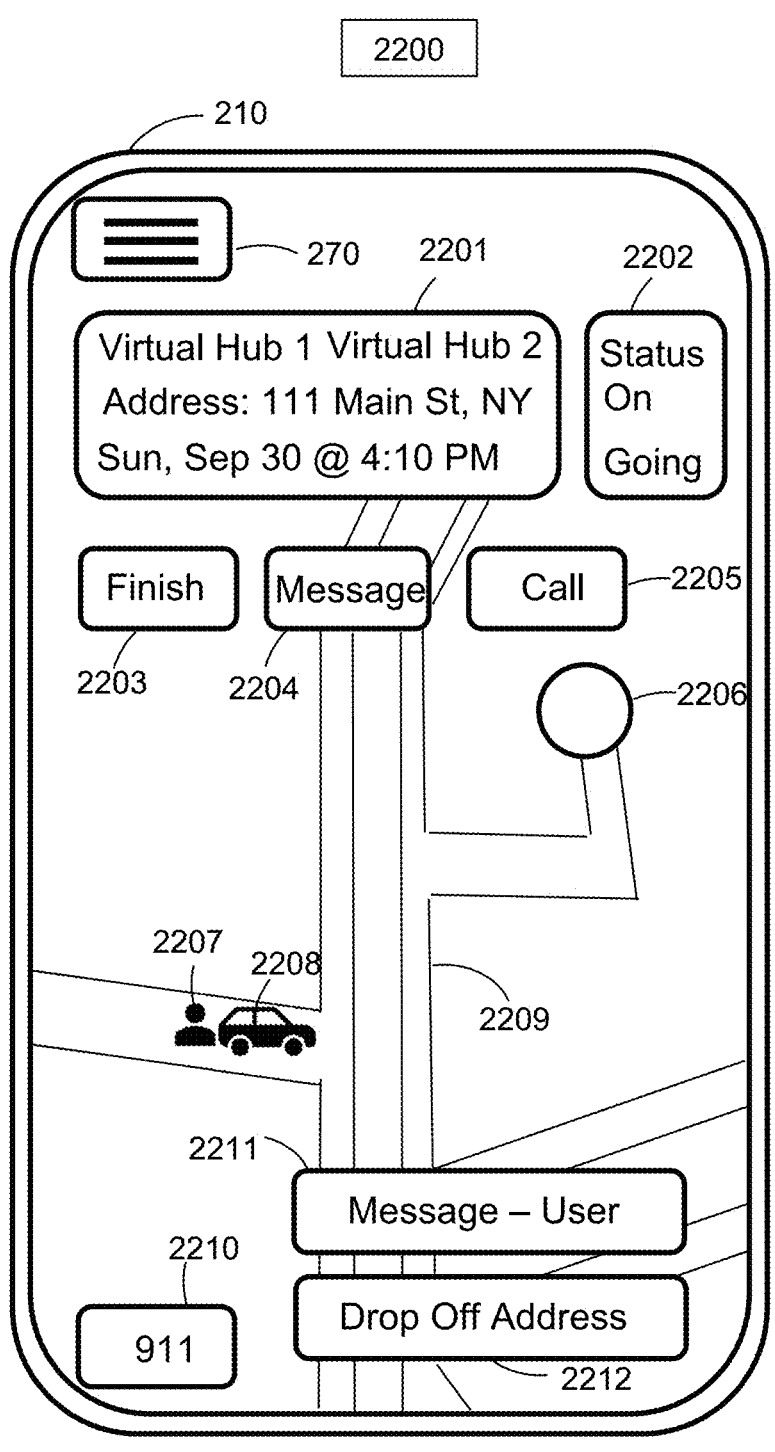
FIG. 22 illustrates an exemplary user interface to display the status of the virtual power plant interval object community linked virtual hub to virtual hub subject of a given transaction for virtual power plant interval object community linked forward virtual power plant interval object capacity units and transmission with associated price-time priority queues in accordance with some embodiments.

FIG. 22 illustrates an exemplary virtual power plant delivery and pick up and/or ingest or inverting status configuration 2200 once a virtual power plant capacity unit delivery is ongoing in one exemplary implementation of participating, transacting and/or trading transformed virtual power plant capacity units or securities in accordance with some embodiments. In some embodiments, the delivery and pick up status configuration 2200 includes the following elements, or a subset or superset thereof:

computing device unit GUI 210 to display method of multi layered network node topology for forward market of virtual power plant capacity units.

hamburger menu toggle 270 to move between different application configurations;

virtual power plant hub 1 pickup address and virtual power plant hub 2 destination address at a contract specification with regards to quality, day, date and time 2201 of delivery of a virtual power plant capacity unit;

virtual power plant status of ongoing for virtual power plant capacity unit 2202;

finish virtual power plant status button for virtual power plant capacity unit 2203 once a virtual power plant capacity unit has been delivered;

virtual power plant messaging texts and instructions between users to make pick-up, on-going transmission route status and delivery complete of virtual power plant capacity units 2204;

call between system users with number masking for privacy security 2205;

GPS map location of user 2209 who is a virtual power plant location 2209;

GPS map location of user 2208 who is a virtual power plant unit location 2207;

GPS map of virtual power plant capacity unit delivery and pickup 2206 which may include smart meters, meters, connected appliances, connected distributed generation, net metering and power inverters;

texting message window for virtual power plant capacity unit communication between users 2211;

starting point of virtual power plant hub for forward virtual power plant capacity units 2206;

security button to report and record security issues to 911 and system database 2210;

drop off address for delivery of virtual power plant capacity unit 2212.

In some embodiments, the GUI 210 transmits delivery instructions to the users 110 to help the user 110 have a rendering or virtual power plant map of their GPS location 2207 relative to the selling user 2208 of virtual power plant capacity units. In some embodiments, the GUI 210 displays the virtual power plant status such as On-Going 2202 status, the virtual power plant status may include subsets or supersets of various status conditions such as PickUp, Started, leaving, on-going, inverting, in-progress, arriving, arrived, delivered or a plurality of other virtual power plant status conditions. In some embodiments, the trip view of the GUI 210 may include a Finish 2203 button to confirm a virtual power plant capacity unit or security has been delivered or completed by the virtual power plant capacity unit object which could be residential, industrial, commercial, transit or other types of virtual power plant capacity modes. In some embodiments, the user 110 may transmit a message using the message 2204 button which may transmit audio, visual or text messages between users 110, 2207, 2208. In some embodiments, the users 110, 2207, 2208 may call each other using the call 2205 button to communicate pickup or delivery instructions or other necessary communication. In some embodiments, a user 110, 2207, 2208 may message another user 110, 2207, 2208 to communicate using the Message-User window 2211 which may utilize visual, audio or text communication modes as well as log a message history between users 110, 2207, 2208. In some embodiments the users 110, 2207, 2208 may toggle to other modes of the application using the menu hamburger button 270. In some embodiments the GPS display of a map with the relative position of a virtual power plant capacity unit seller 2208 and a virtual power plant unit buyer 2207 are displayed to help users 110 understand each others relative position and location on a virtual power plant map 2209. In some embodiments the GPS location of the virtual power plant capacity unit seller 2208 and virtual power plant capacity or freight unit buyer 2207 are tracked in real time with location updates on the virtual power plant map 2209. In some embodiments, the GUI 210 may display the Drop Off Address 2212 of the virtual power plant capacity unit. In some embodiments a user 110, 2207, 2208 may use a 911 button 2210 to submit a recording to the system servers and to authorities who are connected to the system if anything has occurred that may compromise the security of any user or virtual power plant capacity unit.

Figure 23:
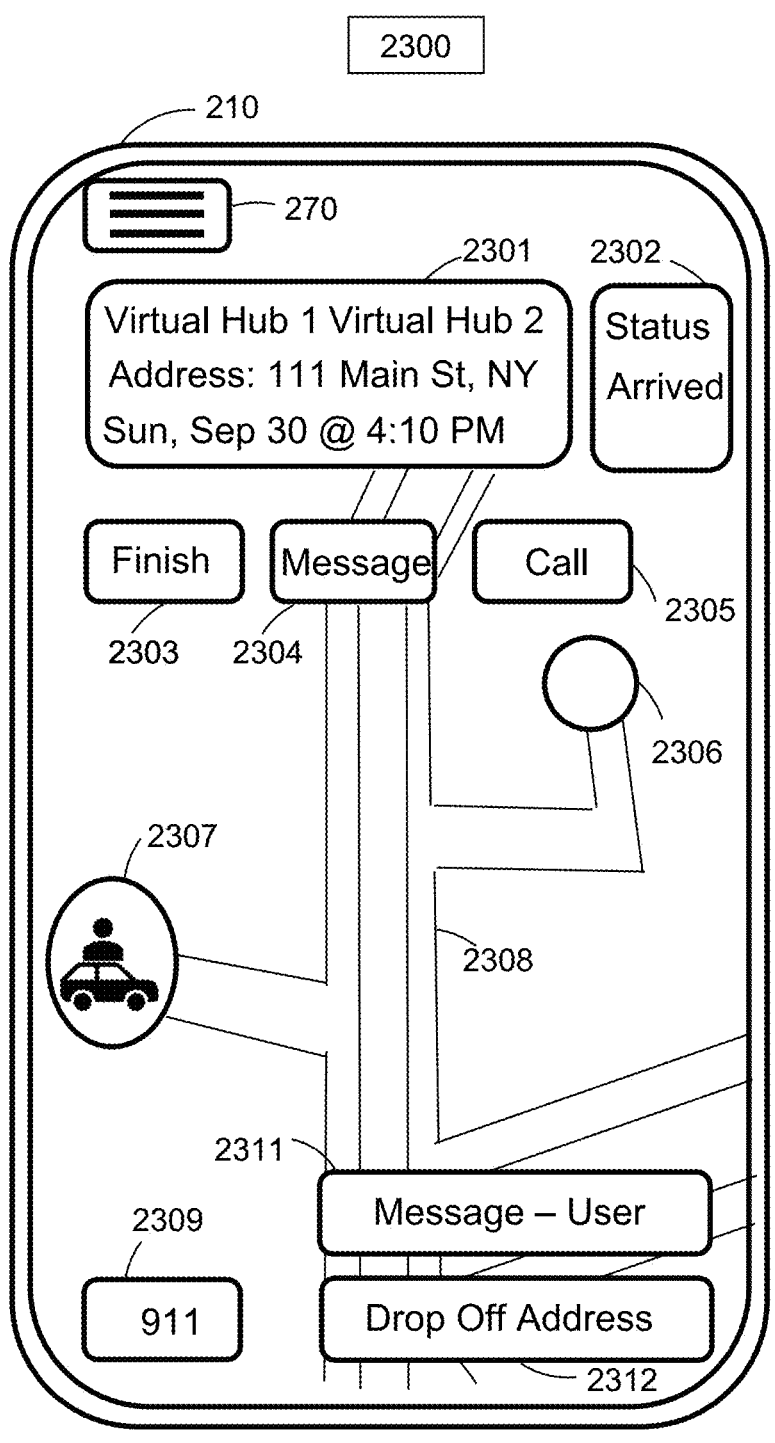
FIG. 23 illustrates an exemplary user interface to display the status of the virtual power plant interval object community linked virtual hub to virtual hub subject of a given transaction for virtual power plant interval object community linked forward virtual power plant interval object capacity units and transmission with associated price-time priority queues in accordance with some embodiments.

FIG. 23 illustrates an exemplary virtual power plant delivery and pick up status configuration 2300 once a virtual power plant capacity unit delivery has arrived in one exemplary implementation of participating, transacting and/or trading virtual power plant capacity units in accordance with some embodiments. In some embodiments, the delivery and pick up status configuration 2300 includes the following elements, or a subset or superset thereof:

computing device unit GUI 210 to display method of multi layered network node topology for forward market of virtual power plant capacity units.

hamburger menu toggle 270 to move between different application configurations;

virtual power plant hub 1 pickup address and virtual power plant hub 2 destination address at a contract specification with regards to quality, day, date and time 2301 of delivery of a virtual power plant capacity unit;

virtual power plant status of arrived for virtual power plant capacity unit 2302;

finish virtual power plant capacity unit 2303 once a virtual power plant capacity unit has been delivered;

messaging texts and instructions between users to make pick-up, on-going route status and delivery complete of virtual power plant capacity units 2304;

virtual power plant call between system users with number masking for privacy security 2305;

GPS virtual power plant map location of user 2307 who is a virtual power plant location 2307;

GPS virtual power plant map location of user 2307 who is a virtual power plant location 2307;

GPS virtual power plant map of virtual power plant capacity unit delivery and pickup 2308;

virtual power plant texting message window for virtual power plant capacity unit communication between users 2311;

starting point of virtual power plant hub for forward transformed virtual power plant capacity units or securities 2306 which may include smart meters, meters, connected appliances, connected distributed generation, net metering and power inverters;

ending point of virtual power plant hub for forward transformed virtual power plant capacity units or securities 2307;

security button to report and record security issues to 911 and system database 2309;

virtual power plant drop off, delivery, inverter address for delivery of virtual power plant unit 2312;

In some embodiments, the GUI 210 transmits delivery instructions to the users 110 to help the user 110 have a rendering or virtual power plant map of their GPS location 2307 relative to the selling user 2307 of virtual power plant capacity units. In some embodiments, the GUI 210 displays the virtual power plant status such as Arrived 2302 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2303 button to confirm a virtual power plant capacity unit has been delivered or completed by the virtual power plant capacity unit object which could be a residential, industrial, commercial, transportation or other types of virtual power plant capacity modes. In some embodiments, the user 110 may transmit a message using the message 2304 button which may transmit audio, visual or text messages between users 110, 2307. In some embodiments, the users 110, 2307 may call each other using the call 2305 button to communicate pickup or delivery instructions or other necessary communication. In some embodiments, a user 110, 2307 may message another user 110, 2307 to communicate using the Message-User window 2311 which may utilize visual, audio or text communication modes as well as log a message history between users 110, 2307. In some embodiments the users 110, 2307 may toggle to other modes of the application using the menu hamburger button 270. In some embodiments the GPS display of a virtual power plant map with the relative position of a virtual power plant capacity unit seller 2307 and a virtual power plant capacity unit buyer 2307 are displayed to help users 110 understand each others relative position and location on a virtual power plant map 2308. In some embodiments the GPS location of the virtual power plant capacity and virtual power plant unit seller 2307 and transformed virtual power plant capacity unit or security buyer 2307 are tracked in real time with location updates on the virtual power plant map 2308. In some embodiments, the GUI 210 may display the Drop Off Address 2312 of the transformed virtual power plant capacity unit or security. In some embodiments a user 110, 2307 may use a 911 button 2309 to submit a recording to the system servers and to authorities who are connected to the system if anything has occurred that may compromise the security of any user or virtual power plant capacity unit.

Figure 24:
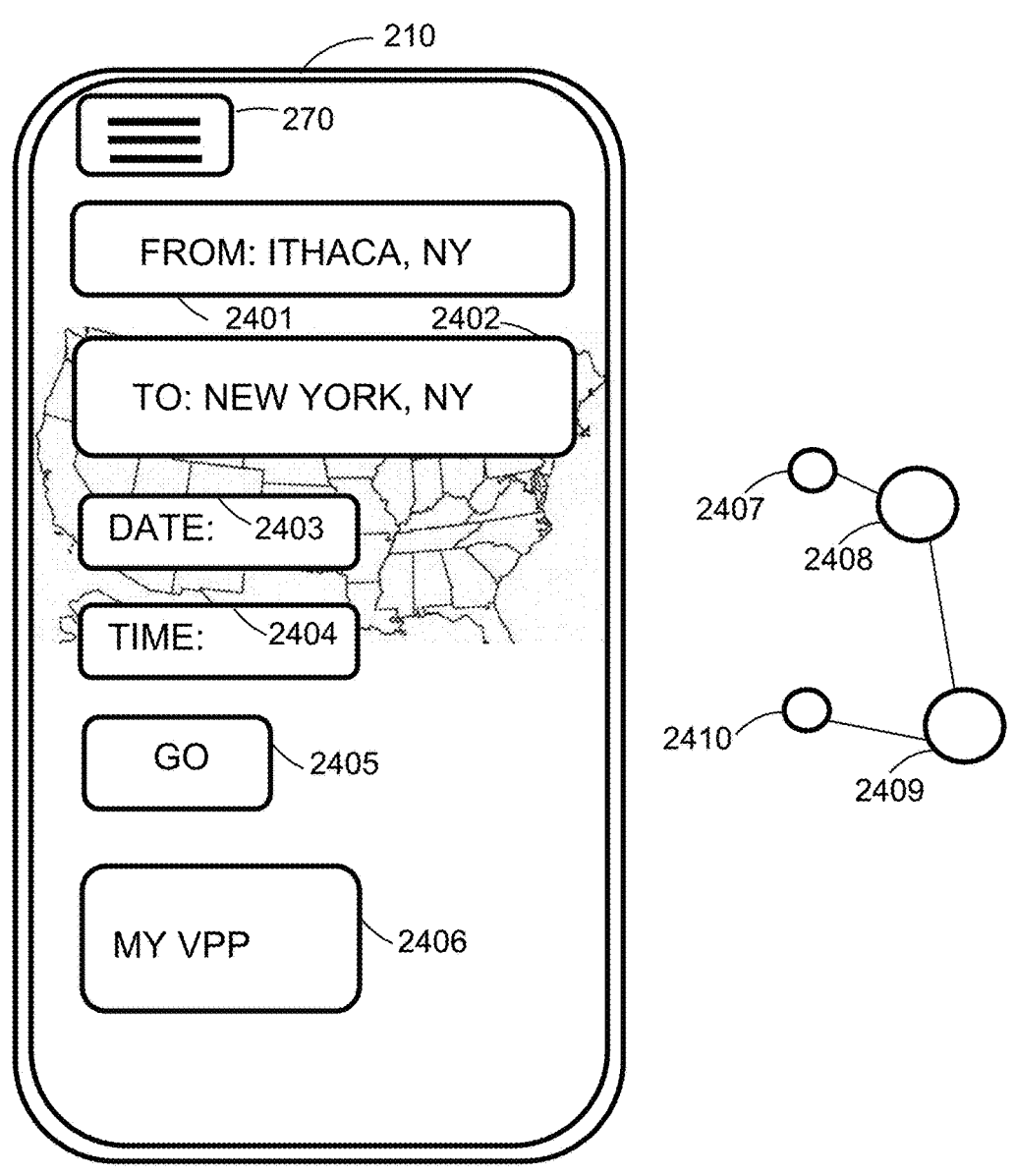
FIG. 24 illustrates an exemplary user interface to display a multi-hub, virtual-hub sequence given a start and end point for a transaction auction for virtual power plant interval object community linked forward virtual power plant interval object capacity units and transmission with associated price-time priority queues in accordance with some embodiments.

FIG. 24 illustrates an exemplary delivery and pick up configuration 2400 for a virtual power plant data community linked transmission or virtual power plant data unit multi layered network node topology in one exemplary implementation of participating, transacting and/or trading virtual power plant data community linked transmission or virtual power plant data capacity units in accordance with some embodiments. In some embodiments, the multi layered network node topology of participating, transacting and/or trading virtual power plant data community linked transmission or virtual power plant data capacity configuration 2400 includes the following elements, or a subset or superset thereof:

computing device unit GUI 2420 to display method of multi layered network node topology for forward market of virtual power plant data community linked transmission and virtual power plant data units;

hamburger menu toggle 2470 to move between different application configurations;

from virtual power plant node starting point 2401 of a multi layered network virtual power plant node topology for forward market of virtual power plant data community linked transmission and virtual power plant data units;

to or destination node ending point 2402 of a multi layered network node topology for forward market of virtual power plant data community linked transmission and virtual power plant data units;

date module 2403 in GUI 210 of an auction for a multi layered network node topology for virtual power plant data community linked forward market of transformed transmission and virtual power plant data units or securities;

time module 2404 in GUI 2470 of pickup and delivery of an auction for a multi layered network virtual power plant node topology for virtual power plant data community linked forward market of transmission and virtual power plant data units;

go button 2405 to form a price-time priority queue auction for a multi layered network virtual power plant node topology for virtual power plant data community linked forward market of transformed transmission and virtual power plant data units or securities;

my meetings button 2406 to quickly obtain common From 2401 or To 2402 points in a price-time priority auction for a multi layered network virtual power plant node topology for virtual power plant data community linked forward market of transformed transmission and virtual power plant data units for a user on the system;

multi-hub network for multi-dimension map tile database 2407, 2408, 2409, 2410 which may form a single dual virtual power plant node price-time priority auction 2407 to 2408 or 2407 to 2410 or any possible node combination or a multi-node auction series for a multi layered network virtual power plant node topology which may include smart meters, meters, connected appliances, connected distributed generation, net metering and power inverters for virtual power plant data community linked forward market of transmission and virtual power plant data units for a user on the system.

In some embodiments, the GUI 210 transmits a From virtual power plant node 2401 and To virtual power plant node 2402 with instructions to the users 110 with a specific date 2403 and time 2404 of a multi layered network virtual power plant node topology for forward market of transformed virtual power plant data community linked transmission and virtual power plant data units for a user on the system to perform an auction by pressing the Go button 2405. The system may use a plurality of constraints such as but not limited by cheapest virtual power plant object route and/or transmission virtual power plant object 1811, single virtual power plant mode of virtual power plant data community linked transmission 1812, multi type method virtual power plant mode of virtual power plant data community linked transmission 1813, fastest virtual power plant route 1814, most scenic virtual power plant route 1815, highest rated virtual power plant route and/or highest rated virtual power plant transmission 1816, most available transmission virtual power plant route 1817, highest volume virtual power plant route 1818, most frequent virtual power plant route 1819, service level virtual power plant route 1820, security and safety of virtual power plant route 1821, group restricted email or group criteria 1822 to use any two virtual power plant node points 2407, 2408, 2409, 2410 or any combination of virtual power plant points 2407, 2408, 2409, 2410. In some embodiments the system may use no constraint, one constraint or a plurality of constraints to allow the user 110 to participate, transact or trade in a multi layered network virtual power plant node topology for virtual power plant data community linked forward market of transmission and virtual power plant data units in a price-time priority queue auction. In some embodiments the price-time priority queue auction for virtual power plant data community linked forward market transformed transmission or virtual power plant data units or securities may be comprised of an auction between only two points or a plurality of points subject to a plurality of constraints. In some embodiments the from or starting point or ingest virtual power plant may be 2407, but the system selects an auction between 2408 and 2409 rather than starting at 2407 because one or more constraints were selected to frame the price-time priority queue auction for virtual power plant data community linked forward market transmission or virtual power plant data units. In some embodiments, an auction may be comprised of multiple modes of virtual power plant data community linked transmission comprising a vehicle virtual power plant data community linked transmission or virtual power plant data unit auction between 2407 and 2408 points, followed by an virtual power plant data community linked solar transmission or virtual power plant data unit auction between 2408 and 2409, followed by an virtual power plant data community linked wind auction between 2410 and 2409 for virtual power plant data community linked transmission or virtual power plant data units. In some embodiments the various plurality of auctions may be displayed as one price-time priority auction or a series of price-time priority auctions. In some embodiments, auctions for a multi layered network node topology for a virtual power plant data community linked forward market of transmission and virtual power plant data units may consist of any subset or superset of the aforementioned possibilities including any constraints 1800 or any plurality of modes 1600.

Figure 25:
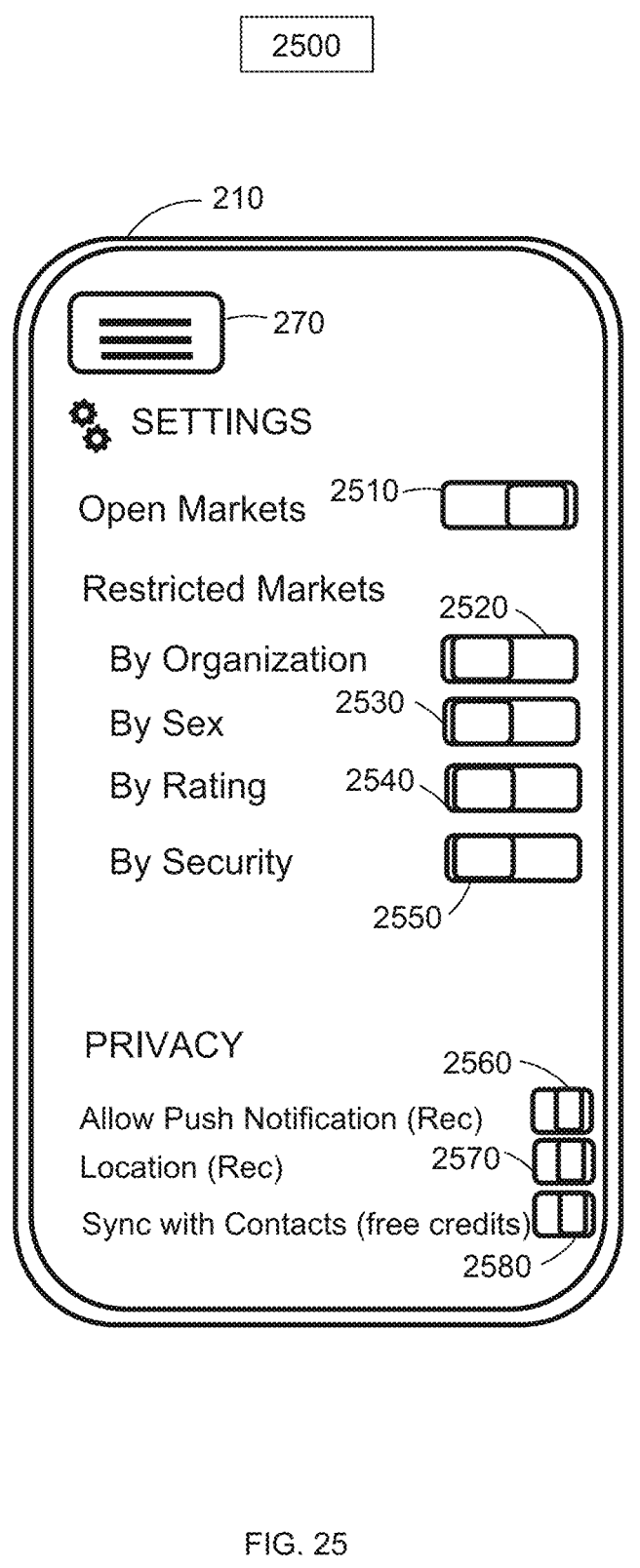

FIG. 25 illustrates an exemplary setting configuration 2500 for an virtual power plant data community linked transmission or virtual power plant data unit multi layered network node topology in one exemplary implementation of participating, transacting and/or trading virtual power plant data community linked transmission or virtual power plant data capacity units in accordance with some embodiments. In some embodiments, the multi layered network virtual power plant node topology of participating, transacting and/or trading virtual power plant data community linked transmission or virtual power plant data capacity configuration 2500 includes the following setting elements, or a subset or superset thereof:

computing device unit GUI 2501 to display method of multi layered network node topology for forward market of transformed virtual power plant data community linked transmission and virtual power plant data units or securities.

hamburger menu toggle 2502 to move between different application configurations;

open markets setting toggle 2510 which allows a user to see all market participants of a given auction on a multi layered network virtual power plant node topology for a forward market of transformed virtual power plant data community linked transmission and virtual power plant data units or securities;

restricted markets setting By Organization 2520, By Sex 2530, By Rating 2540, By Security 2550 or by any other restriction the user 110 defines which limit the price-time priority queue auction participants for the virtual power plant user;

privacy settings which restrict push notifications 2560, virtual power plant location information 2570; Sync with contacts 2580, or other privacy settings;

In some embodiments, a user 110 may select open markets 2510 which show every participant in a given auction for a multi layered network node topology for a forward market of virtual power plant data community linked transmission and virtual power plant data units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market price-time priority auction for a multi layered network node topology for a forward market of virtual power plant data community linked transmission and virtual power plant data units.

Figure 26:
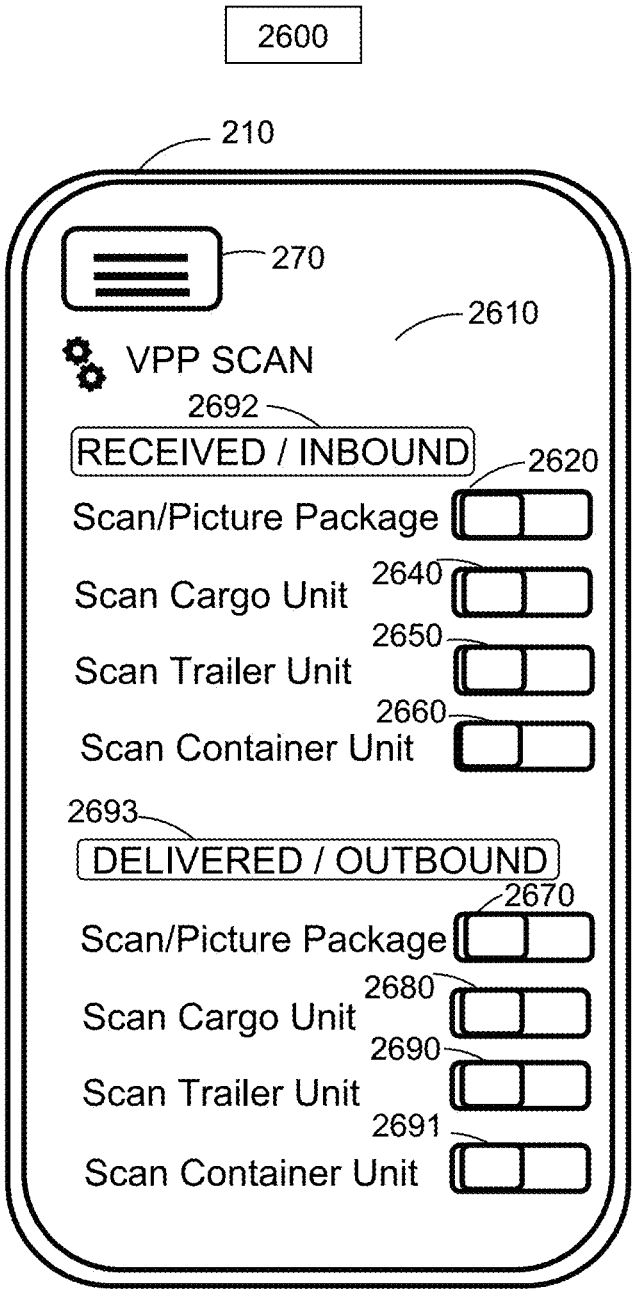
FIG. 26 illustrates an exemplary user interface to display inbound and outbound package, cargo or virtual power plant interval object QR scans or UPC scans or pictures to document virtual power plant interval object community linked virtual power plant interval object units in which are delivered against the forward market virtual power plant interval object community linked auction with associated price-time priority queues for two or more virtual hub virtual power plants in accordance with some embodiments.

FIG. 26 illustrates an exemplary setting for an inbound data or outbound virtual power plant data configuration 2600 for a transformed virtual power plant data community linked transmission or virtual power plant data unit multi layered network node topology in one exemplary implementation of participating, transacting and/or trading virtual power plant data community linked transmission or virtual power plant data capacity units in accordance with some embodiments. In some embodiments, the multi layered network node topology of participating, transacting and/or trading virtual power plant data community linked transmission or virtual power plant data capacity configuration 2600 includes the following setting for a an inbound data or outbound data elements, or a subset or superset thereof:

computing device unit GUI 2601 to display method of multi layered network node topology for forward market of virtual power plant data community linked transformed transmission and virtual power plant data units.

hamburger menu toggle 2602 to move between different application configurations;

inbound data or outbound data module 2610 to document the status and position of transformed forward market virtual power plant data or virtual power plant data community linked transmission units or security;

inbound virtual power plant data or outbound data or received module 2692 to scan an inbound data or outbound data configuration in the context of a plurality of data sizes such as meter or appliance read or production with multi dimensions and scalars and attributes for the multi-dimension virtual power plant tile map database 160, or other transformed virtual trip data community linked transmission or virtual power plant data unit identifier or security;

inbound virtual power plant data or outbound virtual power plant data scan toggle switch 2620 to scan an inbound virtual power plant data or outbound virtual power plant data configuration for the multi-dimension virtual power plant tile map database 160, or other transformed virtual power plant data community linked transmission or virtual power plant data unit identifier or security;

inbound virtual power plant data or outbound data toggle switch 2640 to scan an inbound virtual power plant data or outbound virtual power plant data configuration for the multi-dimension tile map database 160, or other transformed virtual power plant data community linked transmission or virtual power plant data unit identifier or security;

trailer battery virtual power plant unit inbound scan toggle switch 2650 to scan an inbound data or outbound virtual power plant data configuration for the multi-dimension tile map database 223, or other transformed virtual power plant data community linked transmission or virtual power plant data unit identifier or security;

container battery unit Inbound scan toggle switch 2660 to scan an inbound data or outbound data configuration for the multi-dimension virtual power plant tile map database 223, or other transformed virtual power plant data community linked transmission or virtual power plant data unit identifier or security;

an inbound virtual power plant data or outbound virtual power plant data configuration for the multi-dimension virtual power plant tile map database 160 or delivered module 2693 to scan an inbound data or outbound data configuration for the multi-dimension virtual power plant tile map database 223, or other transformed virtual trip data community linked transmission or virtual power plant data unit or security identifier or security;

an inbound data or outbound data configuration for the multi-dimension virtual power plant tile map database 223 or delivered scan toggle 2670 to scan a an inbound data or outbound data configuration for the multi-dimension virtual power plant tile map database 223, or other transformed virtual power plant data community linked transmission or virtual power plant data unit identifier or security;

an inbound virtual power plant data or outbound virtual power plant data configuration for the multi-dimension virtual power plant tile map database 223 scan toggle 2680 to scan an inbound data or outbound data configuration for the multi-dimension virtual power plant tile map database 223, or other transformed virtual power plant data community linked transmission or virtual power plant data unit identifier;

an inbound data or outbound data configuration for the multi-dimension tile map database 160 scan toggle 2690 to scan an inbound data or outbound data configuration for the multi-dimension virtual power plant tile map database 223, or other transformed virtual power plant data community linked transmission or virtual power plant data unit identifier;

an inbound data or outbound data configuration for the multi-dimension virtual power plant tile map database 223 scan toggle 2691 to scan an inbound virtual power plant data or outbound virtual power plant data configuration for the multi-dimension virtual power plant tile map database 223, or other transformed virtual power plant data community linked transmission or virtual power plant data unit identifier.

In some embodiments, a user 110 may select the package virtual power plant battery or cargo battery unit scan module 2610 to scan or take a picture of an inbound virtual power plant data or outbound virtual power plant data configuration for the multi-dimension tile map database 223 characteristic. In some embodiments, the user 110 may select the inbound Scan/Picture virtual power plant toggle 2620 which captures the identification characteristic which may include QR Codes, Uniform Product Codes, Serial Numbers, an inbound data or outbound data configuration for the multi-dimension virtual power plant tile map database 223 or other an inbound data or outbound data configuration for the multi-dimension tile virtual power plant map database 223 identification characteristics of a an inbound data or outbound data configuration for the multi-dimension virtual power plant tile map database 223 community linked transmission or virtual trip data unit. In some embodiments, inbound virtual power plant cargo may include a larger virtual power plant unit structure than an inbound virtual power plant data or outbound virtual power plant data configuration for the multi-dimension virtual power plant tile map database 223 such as a very large virtual power plant database with multi-dimension virtual power plant tile map database unit with identification characteristics which may include QR Codes, Uniform Product Codes, Serial Numbers, an inbound data or outbound data configuration for the multi-dimension virtual power plant tile map database 223 or other cargo identification characteristics, for such larger units a user 110 may use the Scan an inbound data or outbound data configuration for the multi-dimension virtual power plant tile map database 223 Unit toggle 2640 to capture the an inbound data or outbound data configuration for the multi-dimension virtual power plant tile map database 223 identification characteristic for inbound receipt of the virtual power plant data community linked transmission or virtual power plant data unit. In some embodiments, an inbound Scan an inbound data or outbound data configuration for the multi-dimension tile map database 160 Unit toggle 2650 option may be used by a user 110 to instruct the system configuration that receipt of a an inbound data or outbound data configuration for the multi-dimension virtual power plant tile map database 223 unit such as an inbound data or outbound data configuration for the multi-dimension virtual power plant tile map database 223 unit, may be scanned to identify the virtual power plant data community linked transmission or virtual power plant data unit. In some embodiments, an inbound Scan Container Unit 2660 toggle may be utilized to track the receipt or location of an inbound data or outbound data configuration for the multi-dimension virtual power plant tile map database 223 element or virtual object. In some embodiments, a user 110 may select the outbound virtual power plant package or cargo unit scan module 2693 to scan or take a picture of a an inbound data or outbound data configuration for the multi-dimension virtual power plant tile map database 223 object identification code such as a QR code, Uniform Product code, an inbound data or outbound data configuration for the multi-dimension virtual power plant tile map database 223 or other identifying characteristic to confirm delivery to a delivery address of the virtual power plant data community linked transmission or virtual power plant data unit. In some embodiments, the user 110 may select the outbound Scan/Picture an inbound data or outbound data configuration for the multi-dimension virtual power plant tile map database 223 toggle 2670 which captures the identification characteristic of a package or data structure virtual power plant data community linked transmission or virtual power plant data unit once the virtual power plant unit is delivered to the delivery address which may be a server location. In some embodiments, cargo may include a larger virtual power plant unit structure such as a plurality of pictures and multi-dimension virtual power plant map tile database elements than a an inbound virtual power plant data or outbound virtual power plant data configuration for the multi-dimension virtual power plant tile map database 223 such as a large database or drone flyover dataset unit with identification characteristics which may include QR Codes, Uniform Product Codes, Serial Numbers, inbound data or outbound data configuration for the multi-dimension virtual power plant tile map database 223 or other cargo identification characteristics, for such larger units a user 110 may use the outbound Scan an inbound data or outbound data configuration for the multi-dimension virtual power plant tile map database 223 toggle 2680 to capture the cargo virtual power plant data identification characteristic for outbound receipt of the transformed virtual power plant data community linked transmission or virtual power plant data unit or security. In some embodiments, an outbound virtual power plant Scan an inbound virtual power plant data or outbound virtual power plant data configuration for the multi-dimension virtual power plant tile map database 223 Unit toggle 2690 option may be used by a user 110 to instruct the system configuration that delivery of a large virtual power plant data unit such as an large virtual power plant database unit, may be scanned to identify the virtual power plant data community linked transmission or virtual power plant data unit and confirm delivery. In some embodiments, the virtual power plant data unit 2680 may be installed in a home or business to allow for virtual power plant data storage of the virtual power plant data community linked unit. In some embodiments, an outbound Scan virtual power plant data Unit 2691 toggle may be utilized to track the delivery or location of a shipping virtual power plant data which has been delivered. In some embodiments, transformed virtual power plant data community linked transmission or virtual power plant data units or securities may be a subset or superset of the aforementioned in the formation of an open forward market auction for a multi layered network virtual power plant node topology for a forward market of transformed virtual power plant data community linked transmission and virtual power plant data units or securities. In some embodiments, CPU units 210 may be placed as dash cameras to ingest data and export to the virtual power plant data exchange during the delivery of goods and services using processes described in U.S. patent application Ser. No. 15/877,393, "Electronic forward market exchange for transportation seats and capacity in transportation vehicles and spaces," filed Jan. 18, 2018, which is hereby incorporated by reference in its entirety.

Figure 27:
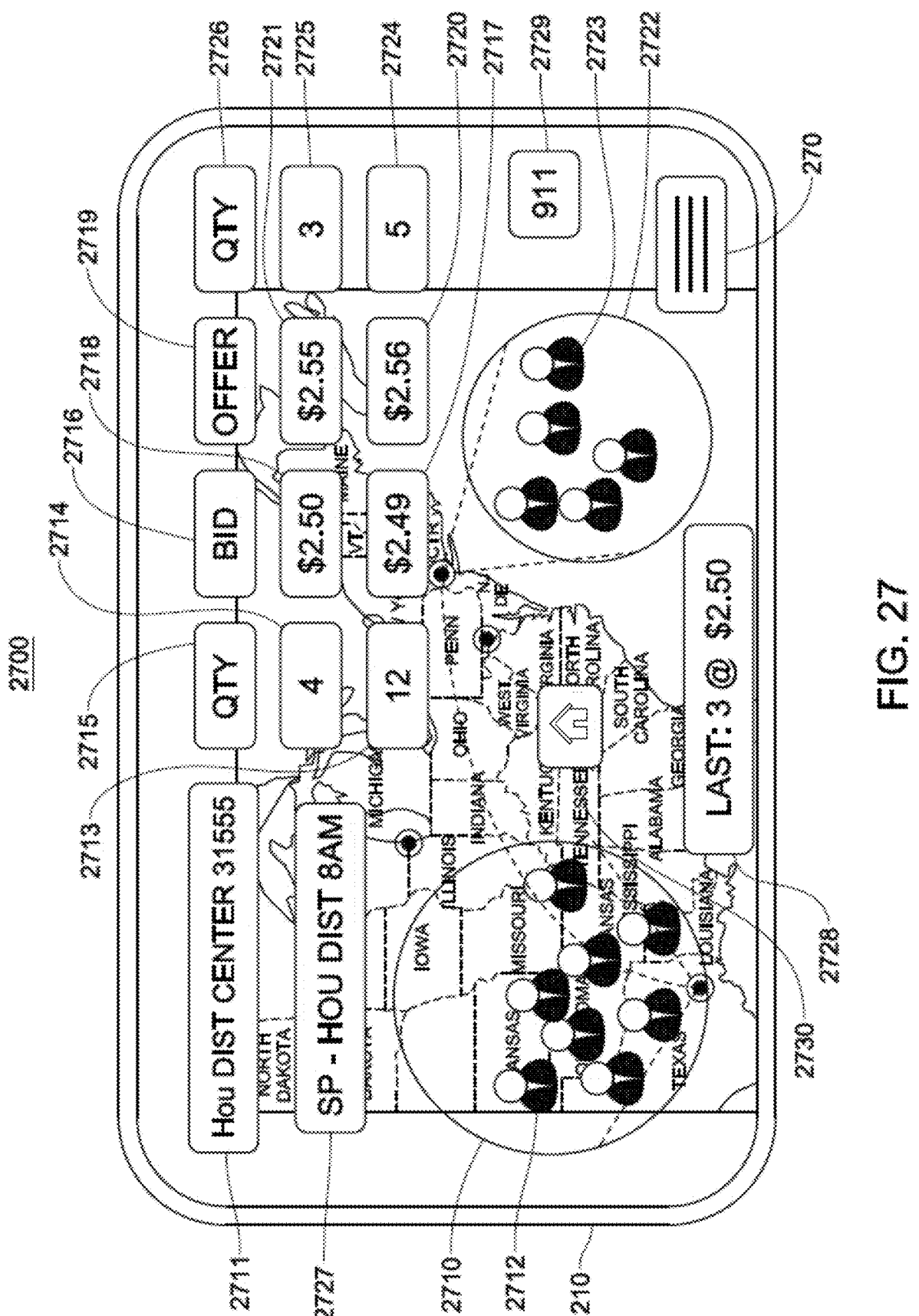
FIG. 27 illustrates an exemplary user interface to display a virtual hub virtual interval object community linked forward virtual hub virtual power plant interval object auction unit in Houston Distribution center virtual hub virtual power plant interval object with associated price-time priority queues a given hub or multi-hub combination in accordance with some embodiments.

FIG. 27 illustrates an exemplary setting for a virtual power plant market configuration 2700 for a transformed virtual power plant capacity unit or security multi layered network node topology in one exemplary implementation of participating, transacting and/or trading transformed virtual power plant capacity units or securities in accordance with some embodiments. In some embodiments, user interface 210 includes the following elements, or a subset or superset thereof:

exemplary virtual power plant hub combination from a virtual power plant center location (a data transformation) 2711;

exemplary virtual power plant hub origin/from location 2710 with virtual power plant users or originators 2712 within the virtual power plant hub location 2710 (a data transformation);

exemplary virtual power plant specification summary of the market, level of service and time of delivery commencement 2727 (a data transformation);

exemplary mode of virtual power plant capacity type 2730 (a data transformation);

exemplary transaction summary of the last trades quantity and price 2728;

exemplary virtual power plant hub destination/to location 2722 and user who is being delivered on the virtual power plant capacity unit 2723 (a data transformation);

exemplary bid/buy quantity title header 2715 for an exemplary virtual power plant capacity unit hub market (a data transformation);

exemplary bid/buy price title header 2716 for an exemplary virtual power plant capacity hub market (a data transformation);

exemplary offer/sell price title header 2719 for an exemplary virtual power plant capacity hub market (a data transformation);

exemplary offer/sell quantity title header 2726 for an exemplary virtual power plant capacity hub market (a data transformation);

exemplary bid/buy quantity 2414 for the best bid quantity from a plurality of users 110 for an exemplary respective virtual power plant capacity or virtual hub combination 2711 (a data transformation);

exemplary bid/buy quantity 2713 for the second-best bid quantity from a plurality of users 110 for an exemplary respective virtual power plant capacity or virtual power plant hub combination 2711 (a data transformation);

exemplary bid/buy price 2718 for the best bid price from a plurality of users 110 for an exemplary respective virtual power plant capacity or virtual power plant hub combination 2711 (a data transformation);

exemplary bid/buy price 2717 for the second-best bid price from a plurality of users 110 for an exemplary respective virtual power plant capacity or virtual power plant hub combination 2711 (a data transformation);

exemplary offer/sell price 2721 for the best offer price from a plurality of users 110 for an exemplary respective virtual power plant capacity or virtual power plant hub combination 2711 (a data transformation);

exemplary offer/sell price 2720 for the second-best offer price from a plurality of users 110 for an exemplary respective virtual power plant capacity or virtual power plant hub combination (a data transformation) 2711;

exemplary offer/sell quantity 2725 for the best offer quantity from a plurality of users 110 for an exemplary respective virtual power plant capacity or virtual power plant hub combination (a data transformation) 2711;

exemplary offer/sell quantity 2724 for the second-best offer quantity from a plurality of users 110 for an exemplary respective virtual power plant capacity or virtual power plant hub combination (a data transformation) 2711;

exemplary virtual power plant safety dispatch "911" button 2729 to enact video and audio recording of the user 110 environment and dispatch of that information to authorities and system servers.

exemplary hamburger menu button 270 to move back to menu options and settings away from the participation, transaction, trading auction GUI 210 embodiment.

In some embodiments, the user 110 may enter a transaction quantity and price for virtual power plant capacity or freight capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual power plant hub combination 2711. A plurality of prices and markets may be presented based on a plurality of transformed contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 110 may be displayed as user icons 2712 or 2723 for the amount of people logged in which desire to transact, trade or participate in a given virtual power plant hub 2710 to virtual power plant hub 2722 combination for virtual power plant capacity units. In some embodiments, users 110 may select the virtual power plant capacity mode 2730 which may include smart meters, meters, connected appliances, connected distributed generation, net metering and power inverters, such that the user allows a market for only one form of transformed virtual power plant capacity as a commodity or the user 110 may allow the system to show multiple forms of virtual power plant capacity or between two virtual power plant capacity hubs 2710, 2711, 2722. In some embodiments the GUI 210 may detect a user 110 selecting the 911 button 2729 which may activate voice and video recording functions on the mobile or stationary device 111 and transmit the data with a confirmation from the user 110 to the authorities and system servers to provide enhanced security while participating, transacting or trading forward transformed virtual power plant capacity as a commodity or security. In some embodiments the user may toggle between the GUI 210 market view screen in FIG. 4 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 111 which then transmits transformed virtual power plant capacity data through the network 214 or wireless GPS network 215 to call upon instruction routines and instruction sub-routines on the virtual power plant capacity forward market database server 271, virtual power plant hub database server 223, network member database server 222, virtual power plant map routing servers 220, and CPUs 210 which all interface together to make one system which may deliver virtual power plant capacity units to users 110 from and to a plurality of virtual power plant hubs 2710, 2722 with a plurality of specifications at specific market prices.

Figure 28:
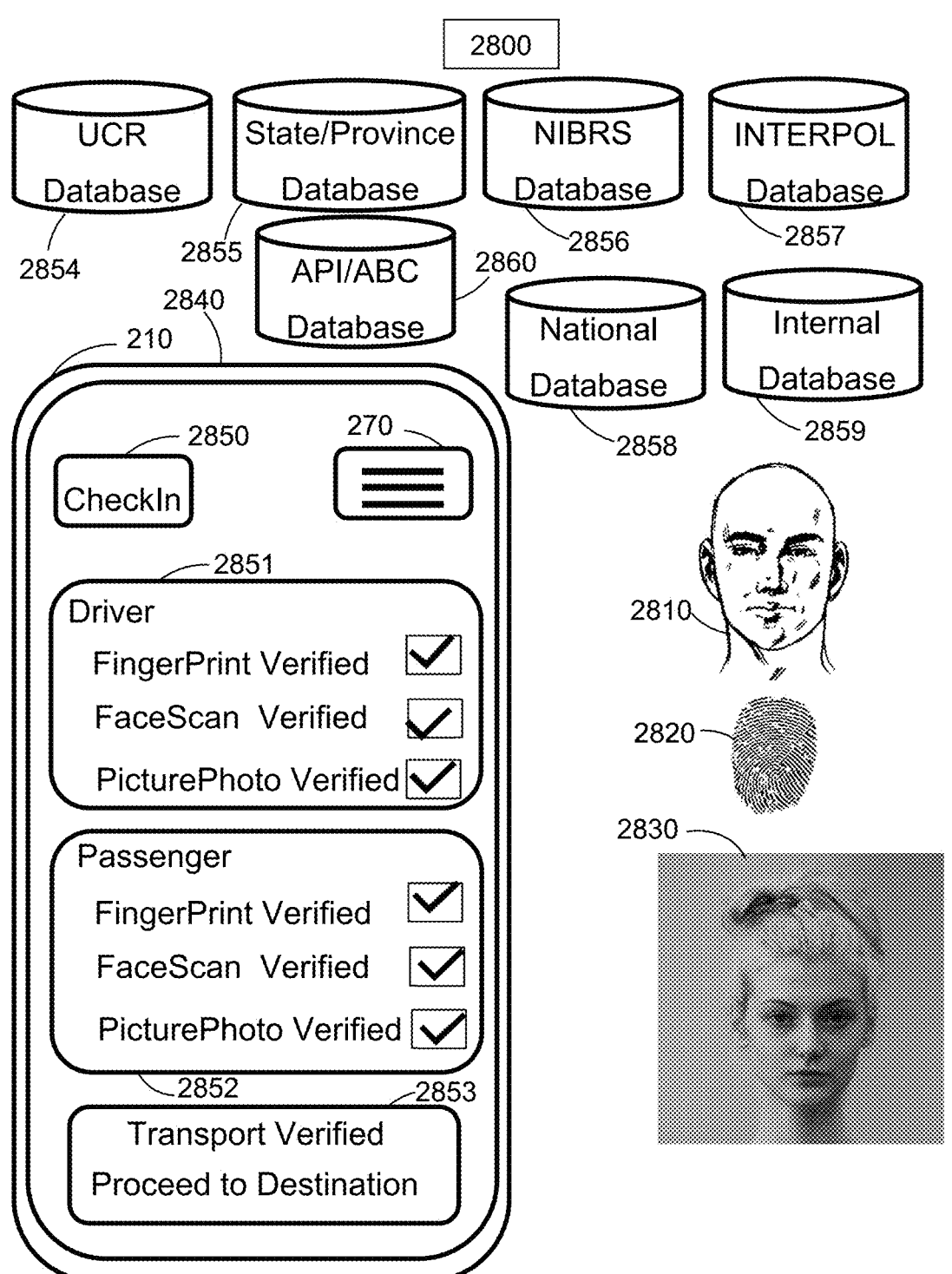
FIG. 28 illustrates an exemplary user background and security check prior to rendering of virtual power plant object for the multi-dimension power factor database and data exchange linked with associated price-time priority queues in accordance with some embodiments.

FIG. 28 illustrates an exemplary check in and security database configuration 2800 for an virtual power plant data community linked transmission or virtual power plant data unit multi layered network virtual power plant node topology in one exemplary implementation of participating, transacting and/or trading transformed virtual power plant data community linked transmission or virtual power plant data capacity units or securities in accordance with some embodiments. In some embodiments, the multi layered network node topology of participating, transacting and/or trading virtual power plant data community linked transmission or virtual power plant data capacity configuration 2800 includes the following security configuration elements, or a subset or superset thereof:

exemplary uniform crime reporting ("UCR") database 2854 from international agencies who report crime;

exemplary International State or Provincial crime reporting database 2855 from international governments who report crime;

exemplary International National Incident Based Reporting System ("NIBRS") crime reporting database 2856 from international governments who report crime;

exemplary Interpol crime reporting database 2857 from international governments who report crime which connects National Central Bureaus ("NCBs");

exemplary International application program interface and ABC ("API/ABC") crime reporting database 2860 from international governments who report crime;

exemplary national crime reporting database 2858 from international governments who report crime;

exemplary internal system crime reporting database 2859 from crimes which occurred on system;

exemplary facial scan to identify user 2810 against a plurality of crime databases;

exemplary fingerprint scan to identify user 2820 against a plurality of crime databases;

exemplary photo or photo scan to identify user 2830 against a plurality of crime databases;

exemplary voice scan to identify user 2810 against a plurality of crime databases;

exemplary Computing device unit GUI 2801 to display method of multi layered network virtual power plant node topology for forward market of virtual power plant data community linked transmission and virtual power plant data units;

hamburger menu toggle 2802 to move between different application configurations;

exemplary virtual trip data community linked user or virtual power plant data transmission or virtual power plant object data or seller unit user interface 2851 to confirm identity verification against a plurality of crime databases;

exemplary virtual power plant data community linked passenger unit or virtual power plant data unit user interface 2852 to confirm identity verification against a plurality of crime databases;

exemplary handshake verification user interface 2853 to confirm both buyer and seller of virtual power plant data community linked transmission or virtual power plant data units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, virtual power plant data community linked transmission or virtual power plant data unit security may be a subset or superset of the aforementioned in the formation of an open forward market auction for a multi layered network virtual power plant node topology for a forward market of virtual power plant data community linked transmission and virtual power plant data units. Such security checks are standard in airports, but they are not automated and they are not utilized in other modes of transmission which degrades the overall safety of other transmission methods if they are not utilized. In some embodiments, the check in instructions may reject a user from confirmed verified transmission if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to virtual power plant data community linked transmission or virtual power plant object verified status 2853 in the system.

Figure 29:
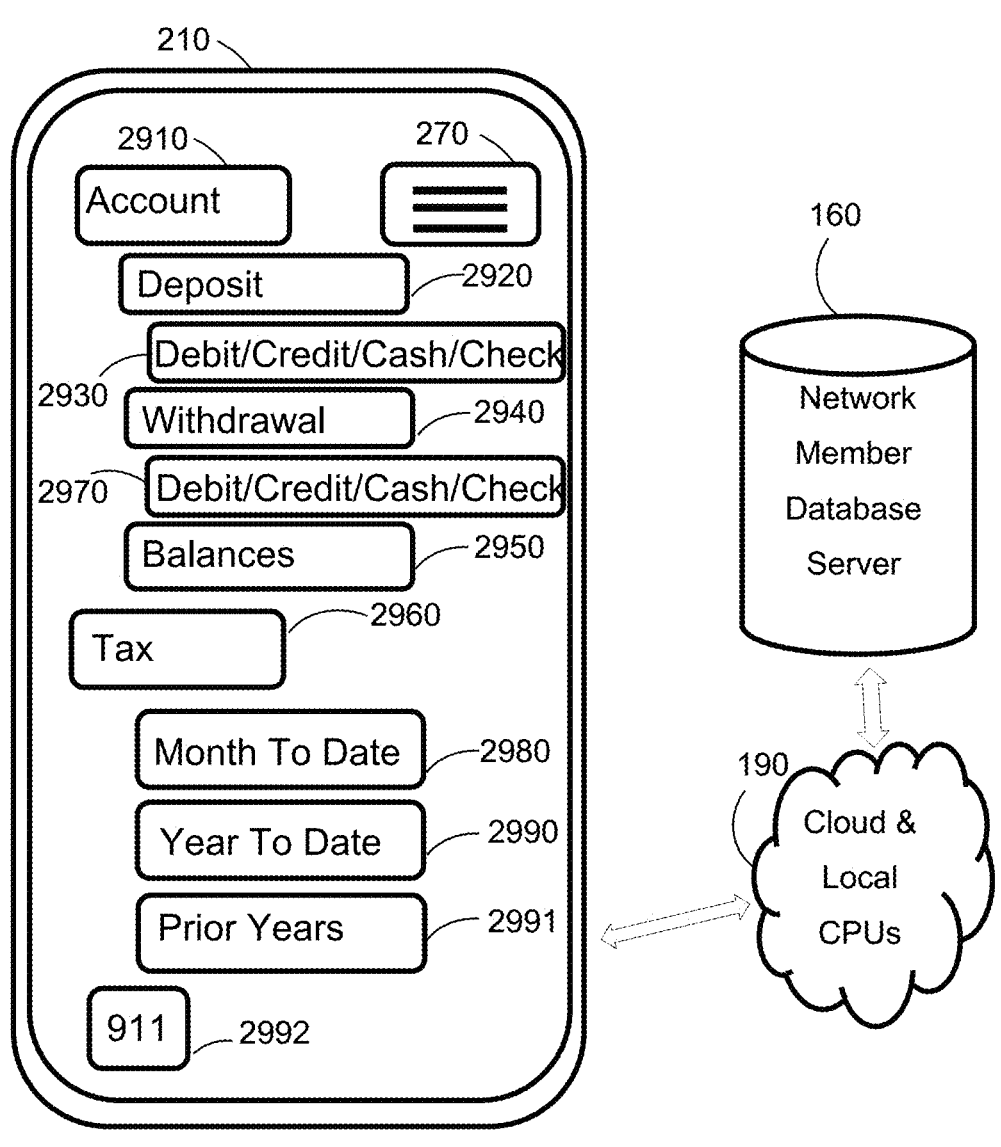
FIG. 29 illustrates an exemplary user account and tax and payment module prior to rendering of virtual power plants for the multi-dimension power factor database and data exchange linked with associated price-time priority queues in accordance with some embodiments.

FIG. 29 illustrates an exemplary user accounting configuration 2900 for a transformed virtual power plant data community linked transmission or virtual power plant data unit or security multi layered network virtual power plant node topology in one exemplary implementation of participating, transacting and/or trading transformed virtual power plant data community linked transmission or virtual power plant data capacity unit auctions in accordance with some embodiments. In some embodiments, the multi layered network virtual power plant node topology of participating, transacting and/or trading transformed virtual power plant data community linked transmission or virtual power plant data capacity configuration 2900 includes the following accounting elements, or a subset or superset thereof:

computing device unit GUI 2901 to display method of multi layered network node topology for forward market of virtual power plant data community linked transmission and virtual power plant data units.

exemplary hamburger menu toggle 270 to move between different application configurations;

exemplary account button 2910 to edit or confirm user account data;

exemplary deposit button 2920 to add transaction funds or transaction currency or transaction balances to the user account;

exemplary deposit method button 2930 to add transaction funds or transaction currency or transaction balances to the user account through Debit, Credit, Cash, Check, virtual currency, digital currency or a plurality of other payment methods;

exemplary withdrawal button 2940 to send transaction funds or transaction currency or transaction balances to the user account in a different institution;

exemplary withdrawal method button 2970 to send transaction funds or transaction currency or transaction balances to the user account at a different institution through Debit, Credit, Cash, Check, virtual currency, digital currency or a plurality of other payment methods;

exemplary balances button 2950 to confirm user account balances;

exemplary tax button 2960 to track user account activity for taxation reporting;

exemplary month to date tax reporting button 2980;

exemplary year to date tax reporting button 2990;

exemplary prior year tax reporting button 2991;

exemplary "911" security button 2991;

exemplary Network Member Database Server 160;

exemplary cloud and CPU and Network configuration 190 to send and receive Network Member account data.

In some embodiments, user account 2910 data may be displayed with voice or screen or non-screen computing devices with instructions from the GUI 2901 in accordance with instructions on the method and system. In some embodiments, user deposit 2920 data may be displayed with voice or screen or non-screen computing devices with instructions from the GUI 2901 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 2901 in accordance with instructions on the method and system. In some embodiments, user withdrawal 2940 data may be displayed with voice or screen or non-screen computing devices with instructions from the GUI 2901 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 2901 in accordance with instructions on the method and system to place money in the system account into a different institution specified by the user 110. In some embodiments, user balances 2950 data may be displayed with voice or screen or non-screen computing devices with instructions from the GUI 2901 in accordance with instructions on the method and system. In some embodiments, user tax button 2960 data may be displayed with voice or screen or non-screen computing devices with instructions from the GUI 2901 in accordance with instructions on the method and system. In some embodiments, user month to date tax data button 2980, year to date tax data button 2990, prior year tax data button 2991 may be displayed with voice or screen or non-screen computing devices with instructions from the GUI 2901 in accordance with instructions on the method and system. In some embodiments, the accounting and tax information may be stored in the Network Member Database Server 222 and transmitted through the cloud, network and CPUs 210, 226 to the GUI computing device 210. In some embodiments, transmission or virtual trip data unit accounting and fund interfaces may be a subset or superset of the aforementioned in the formation of an open forward market price-time priority auction for a multi layered network node topology for a forward market of virtual trip data community linked transmission and virtual trip data units.

Figure 30:
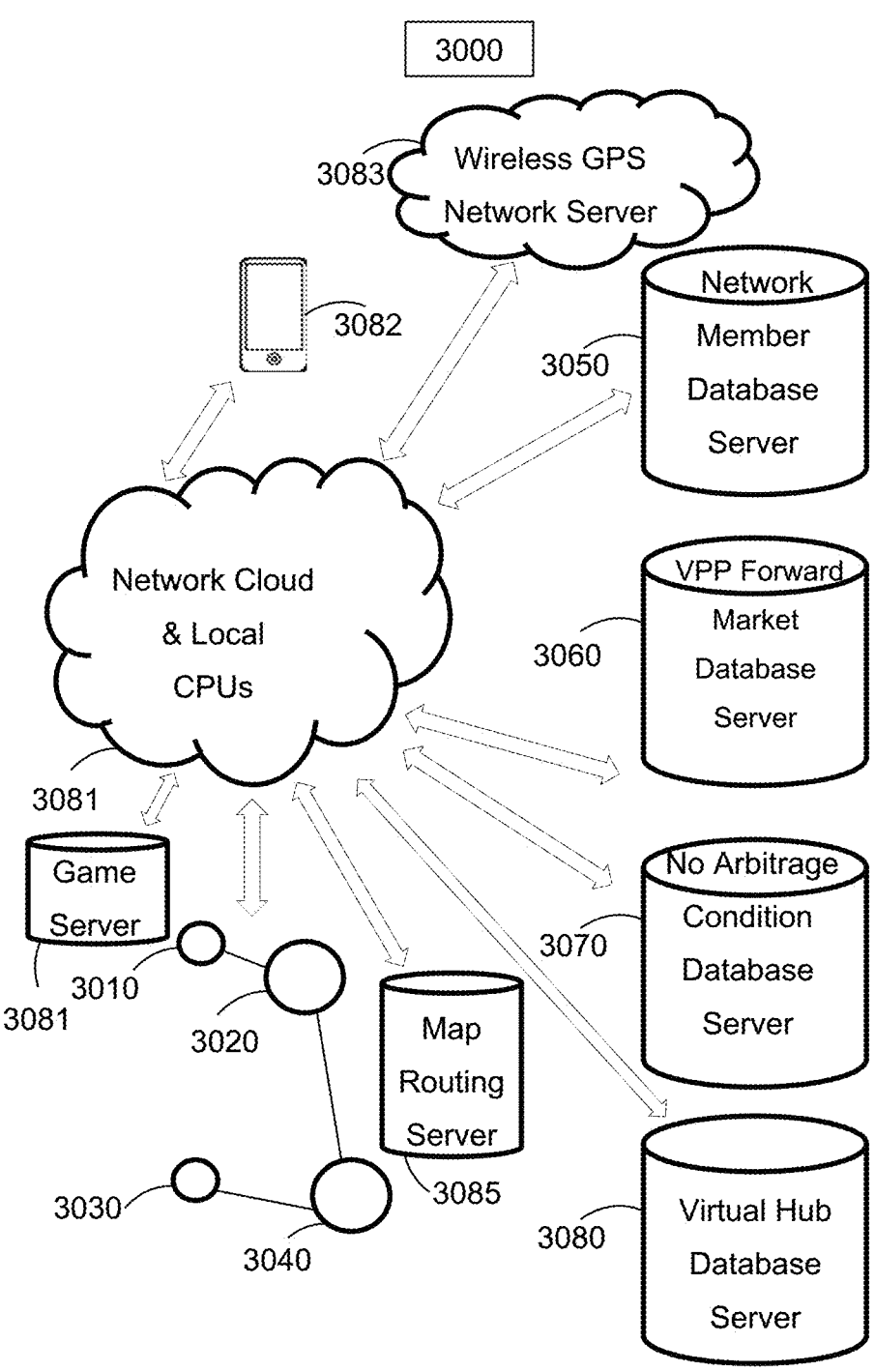
FIG. 30 illustrates an exemplary network configuration in corroboration with additional other embodiments for virtual power plants.

FIG. 30 illustrates an exemplary network configuration 3000 for a virtual power plant data community linked transmission or virtual power plant data unit multi layered network virtual power plant node topology in one exemplary implementation of participating, transacting and/or trading transmission or virtual power plant data capacity unit auctions in accordance with some embodiments. In some embodiments, the multi layered network node topology of participating, transacting and/or trading virtual power plant data community linked transmission or virtual power plant data capacity configuration 3000 includes the following accounting elements, or a subset or superset thereof:

exemplary wireless GPS Network and Server 3083;

exemplary wireless computing device that is audio, video, screen or non-screen interfaced 3082;

exemplary Network Member Database Server 3050;

exemplary virtual power plant data community linked Data Transmission Forward Market Database Server 3060;

exemplary virtual power plant data community linked VPP Virtual Power Plant Forward Market Database Server 3060;

exemplary virtual power plant data community linked No Arbitrage Condition Database Server 3070;

exemplary virtual power plant data community linked Virtual Hub Database Server 3080;

exemplary Network, Network Cloud, and local CPUs 3081;

exemplary Network Multi Layered Network Virtual Hub Node Topology for forward market virtual power plant data community linked transmission of virtual power plant data unit price-time priority auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of virtual power plant data community linked transmission or virtual power plant data with instructions and data from the Virtual Hub Database Server 3080, the No Arbitrage Condition Database Server 3070, the virtual trip data community linked VPP Forward Market Database Server 3060, the Network Member Database Server 3050 and the Wireless GPS Network Server 3083. Network Data may be displayed with voice or screen or non-screen computing devices with instructions from the GUI 2901 in accordance with instructions on the method and system.

Figure 31:
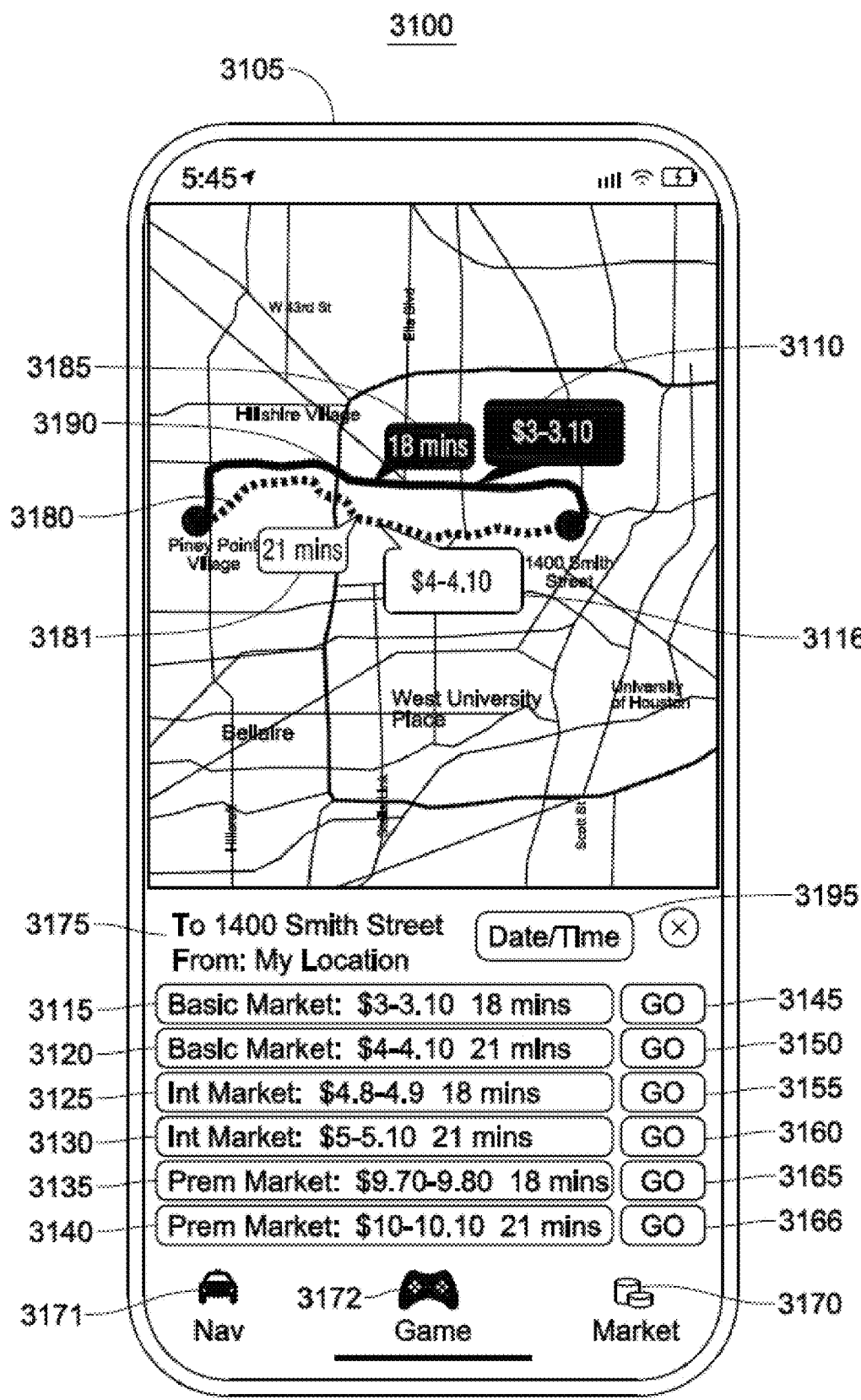
FIG. 31 illustrates an exemplary method and system configuration of the integration interface with GPS virtual power plant interval objects community linked routing with associated price-time priority queues such as TomTom or Apple Maps or other third party map routing software applications.

FIG. 31 illustrates an exemplary network configuration 3100 integrating the disclosed method and system as a layer on a traditional third party map software. In some embodiments, the multi layered network node topology of participating, transacting and/or trading transformed virtual power plant capacity configuration 3100 includes the following accounting elements, or a subset or superset thereof:

exemplary computing device 3105;

exemplary route input by user 3175;

exemplary route node structure 3190 to satisfy user virtual power plant route request 3175;

exemplary alternative virtual power plant route node structure 3180 to satisfy user route request 3175 with associated time 3180;

exemplary time estimate 3185 for route 3190;

exemplary live auction price value 3110 for virtual power plant route 3190;

exemplary alternative live auction price value 3115 for virtual power plant route 3180;

exemplary navigation mode button 3171;

exemplary game mode button 3172;

exemplary date and time modification button 3195 for disclosed virtual power plant route 3175;

exemplary transformed forward virtual power plant capacity unit auction value and modification feed 3115 and selection GO 3145 button to transact the given virtual power plant route with a basic virtual power plant capacity unit or security feature and characteristic for one virtual power plant route 3190 that satisfies the user virtual power plant route request 3175;

exemplary alternative transformed forward virtual power plant capacity unit auction value and modification feed 3120 and selection GO 3150 button to transact the given route with a basic virtual power plant capacity unit or security feature and characteristic for one alternative route 3180 that satisfies the user route request 3175;

exemplary transformed forward virtual power plant capacity unit auction value and modification feed 3125 and selection GO 3155 button to transact the given virtual power plant route with an intermediate virtual power plant capacity unit or security feature and characteristic for one virtual power plant route 3190 that satisfies the user route request 3175;

exemplary alternative transformed forward virtual power plant capacity unit auction value and modification feed 3130 and selection GO 3160 button to transact the given virtual power plant route with an intermediate virtual power plant capacity unit or security feature and characteristic for one alternative route 3180 that satisfies the user virtual power plant route request 3175;

exemplary transformed forward virtual power plant capacity unit auction value and modification feed 3135 and selection GO 3165 button to transact the given virtual power plant route with a premium virtual power plant capacity unit or security feature and characteristic for one route 3190 that satisfies the user route request 3175;

exemplary alternative transformed forward virtual power plant capacity unit auction value and modification feed 3140 and selection GO 3165 button to transact the given route with a premium virtual power plant capacity unit or security feature and characteristic for one alternative virtual power plant route 3180 that satisfies the user virtual power plant route request 3175;

exemplary market display feature 3170 as an overlay onto virtual power plant map routing for user requests 3175;

In some embodiments, virtual power plant map routing interfaces 3105 such as Apple Maps or TomTom or another third party, may integrate the disclosed method and system to display the transformed forward virtual power plant capacity unit or security market auction price along a various route given various virtual hub topologies 1800 over the user 110 defined route request 3175. The computing device 3105 may disclose over visual, audio or other communication methods the forward transformed virtual power plant capacity unit auction price 3110 on a given route 3190. In yet other embodiments, the disclosed virtual power plant capacity unit transformation may communicate the forward transformed virtual power plant capacity unit or security auction price 3115 of an alternative route 3180 such that a user may select either route 3190 or 3180 based on the disclosed method and system price 3110 or 3115 which was generated by instructions from a plurality of users between two virtual hubs on the user defined route 3175. The disclosed forward market virtual power plant capacity unit auction may be communicated on an on demand basis representing the current time and day or on a forward basis by changing the Date/Time 3195 user interface button feature to represent the then current market pricing for future time intervals on a plurality of given routes 3190 and 3180 along the user requested virtual power plant hub combination 3175. Virtual power plant hubs may represent the end points of a route defined by the user 3175 or virtual hubs may represent points along a given virtual power plant route but not including the endpoints or virtual power plant hubs may represent points not along the virtual power plant route the user defined 3175. Virtual hub combinations transform virtual power plant capacity units into a forward market which allow users of the method and system to transact in the physical market by either delivering transformed virtual power plant capacity units as a virtual power plant user capacity holder or by receiving them as a virtual power plant object. A virtual power plant capacity unit or security represents energy delivered over the virtual power plant network. Further the forward transformed virtual power plant capacity unit market auction 3170 overlay may be a layer on traditional GPS virtual power plant map routing software or as an alternative to time based routing or virtual power plant mileage based routing for transmission losses. The forward virtual power plant capacity unit market specification such as "Basic" 3115, 3120 or "Intermediate" 3125, 3130 or "Premium" 3135, 3140 may also have a plurality of other characteristics or levels which form the basis of a fungible transformed contract or substitutable contract between users which is exchangeable with the same terms and conditions if one user is unable to fulfil their contract obligations for the transformed virtual power plant capacity unit. In some embodiments, the navigation mode 3171 may move the user to turn by turn directions along the price based navigation virtual power plant route 3190. In some embodiments, the virtual power plant game mode 3172 may move the user to a game based overlay on the price based navigation route 3190. In some embodiments, the market mode 3170 may move the user to a market based overlay on the priced based navigation virtual power plant route 3190.

The disclosed method and system of a transformed virtual power plant capacity unit may be fully functional as a layer in virtual power plant map routing software 3100 or as a stand alone application 200, 300, etc.

In some embodiments, the disclosed method and system virtual power plant capacity unit auction price 3110 and 3115 has two prices or more in other embodiments. Two virtual power plant route prices 3110 are disclosed at $3 and $3.10. The former price of $3 is the price where a user is willing to buy or pay for a virtual power plant capacity unit along the given route 3190. The later price of $3.10 is the price at which a user is willing to sell a virtual power plant capacity unit along the given route 3190. The instructions of the auction may match the highest bidding price of $3 with the lowest selling price in the price queue when the prices match. In other words, in the exemplary embodiment, if a user wanted to sell a virtual power plant capacity unit at the current forward market auction queue 3110 on route 3190, the user would enter a price of $3 which is the current highest bidding price in the method and system queue 3110. By way of further example, another user may desire to buy a virtual power plant capacity unit on the forward transformed virtual power plant capacity unit auction method and system on route 3190, to match, the user would enter a price of $3.10 which is the lowest selling price of a seller on the forward market virtual power plant capacity unit auction method and system.

Figure 32:
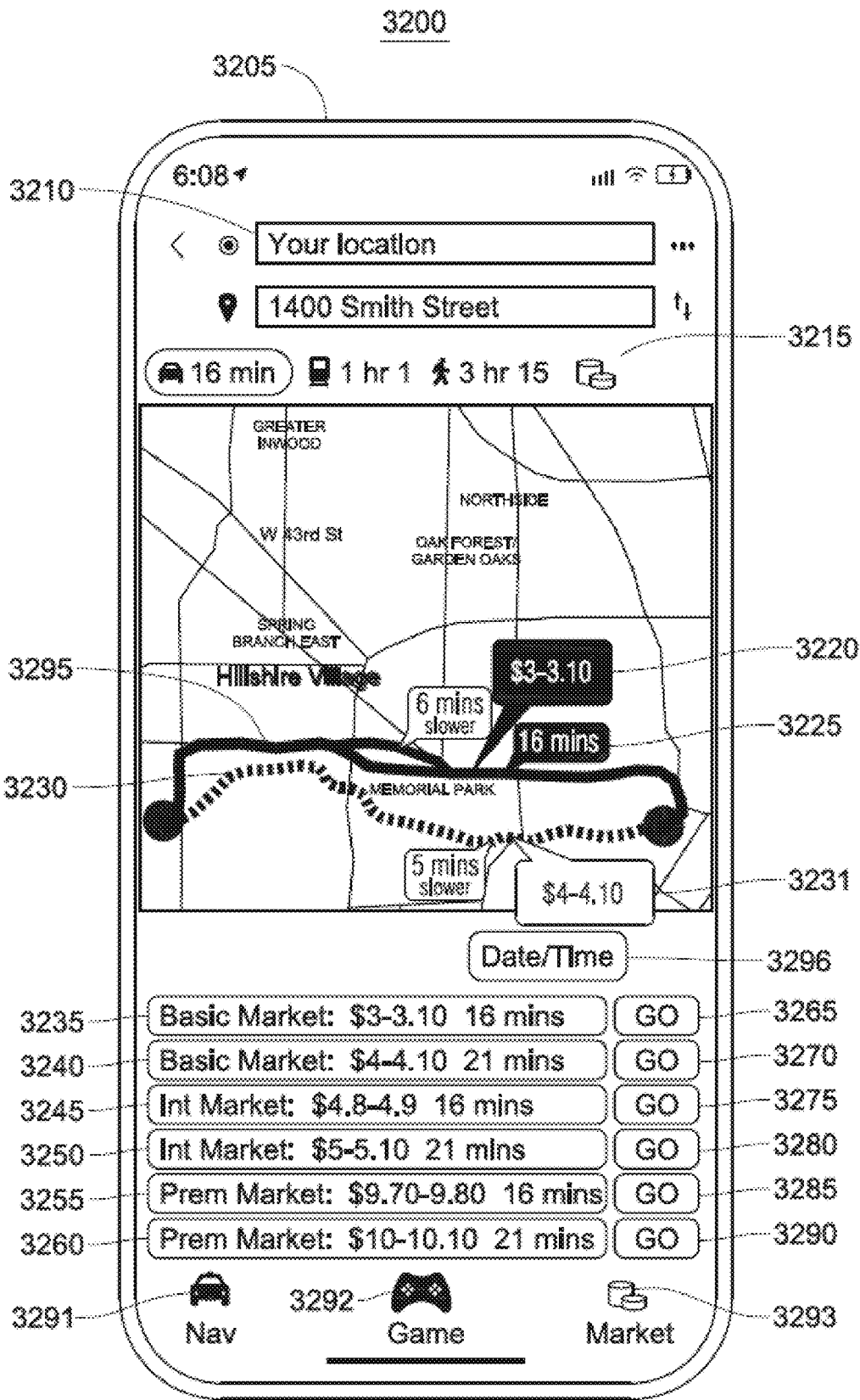
FIG. 32 illustrates an exemplary method and system configuration of the integration interface with GPS virtual power plant interval object community linked routing with associated price-time priority queues such as Google Maps or other third party map routing software applications.

FIG. 32 illustrates another exemplary network configuration 3200 integrating the disclosed method and system as a layer on another traditional third party map software. In some embodiments, the multi layered network node topology of participating, transacting and/or trading virtual power plant capacity configuration 3200 includes the following accounting elements, or a subset or superset thereof:

exemplary computing device 3205;

exemplary virtual power plant route input by user 3210;

exemplary virtual power plant route node structure 3295 to satisfy user route request 3210;

exemplary alternative virtual power plant route node structure 3230 to satisfy user route request 3210 with associated time;

exemplary virtual power plant time estimate 3225 for route 3295;

exemplary virtual power plant navigation mode button 3291;

exemplary virtual power plant game mode button 3292;

exemplary virtual power plant market mode button 3293;

exemplary virtual power plant live auction price value 3220 for route 3295;

exemplary alternative virtual power plant live auction price value 3230 for route 3230;

exemplary virtual power plant date and time modification button 3296 for disclosed route 3210;

exemplary transformed forward virtual power plant capacity unit or security auction value and modification feed 3235 and selection GO 3265 button to transact the given route with a basic virtual power plant capacity unit feature and characteristic for one route 3295 that satisfies the user route request 3210;

exemplary alternative transformed forward virtual power plant capacity unit or security auction value and modification feed 3240 and selection GO 3270 button to transact the given route with a basic virtual power plant capacity unit feature and characteristic for one alternative route 3230 that satisfies the user route request 3210;

exemplary transformed forward virtual power plant capacity unit or security auction value and modification feed 3245 and selection GO 3275 button to transact the given virtual power plant route with an intermediate virtual power plant capacity unit feature and characteristic for one route 3295 that satisfies the user virtual power plant route request 3210;

exemplary alternative transformed forward virtual power plant capacity unit or security auction value and modification feed 3250 and selection GO 3280 button to transact the given route with an intermediate virtual power plant capacity unit feature and characteristic for one alternative route 3230 that satisfies the user virtual power plant route request 3210;

exemplary transformed forward virtual power plant capacity unit or security auction value and modification feed 3255 and selection GO 3285 button to transact the given route with a premium virtual power plant capacity unit feature and characteristic for one route 3295 that satisfies the user route request 3210;

exemplary alternative transformed forward virtual power plant capacity unit or security auction value and modification feed 3260 and selection GO 3290 button to transact the given route with a premium transformed virtual power plant capacity unit feature and characteristic for one alternative virtual power plant route 3230 that satisfies the user virtual power plant route request 3210;

exemplary market display feature 3215 as an overlay onto virtual power plant map routing for user requests 3210;

In some embodiments, map routing interfaces 3205 such as Google Maps or Garmin or another third party navigation method, may integrate the disclosed method and system to display the transformed forward virtual power plant capacity unit or security market auction price along a various route given various virtual hub topologies 1800 over the user 110 defined virtual power plant route request 3210. The computing device 3205 may disclose over visual, audio or other communication methods the forward transformed virtual power plant capacity unit or security auction price 3220 on a given route 3295. In yet other embodiments, the disclosed virtual power plant capacity unit transformation may communicate the forward transformed virtual power plant capacity unit auction price 3230 of an alternative route 3230 such that a user may select either route 3295 or 3230 based on the disclosed method and system price 3230 or 3220 which was generated by instructions from a plurality of users between two virtual power plant hubs on the user defined route 3210 and instructions to generate a price queue for buyers and sellers of virtual power plant capacity units long given routes. In some embodiments, the user(s) 110 may alter the date 3296 such that the transformed virtual power plant capacity unit or security may be updated with user 110 submitted prices 3235 for forward looking time periods. The disclosed forward market transformed virtual power plant capacity unit or security auction may be communicated on an on demand basis representing the current time and day or on a forward basis by changing the Date/Time 3296 user interface button feature to represent the then current market pricing for future time intervals on a plurality of given routes 3295 and 3230 along the user requested virtual power plant hub combination 3210. Virtual power plant hubs may represent the end points of a virtual power plant route defined by the user 3210 or virtual power plant hubs may represent points along a given virtual power plant route but not including the endpoints or virtual power plant hubs may represent points not along the route the user defined 3210. Virtual power plant hub combinations transform virtual power plant capacity units or securities into a forward market which allow users of the method and system to transact in the physical market by either delivering transformed virtual power plant capacity units as a capacity holder or by receiving them as a virtual power plant capacity holder. A transformed virtual power plant capacity unit represents energy which may be filled by a virtual power plant object. Further the forward transformed virtual power plant capacity unit market auction 3215 overlay may be a layer on traditional GPS virtual power plant map routing software as an alternative to time based routing. The forward virtual power plant capacity unit market specification such as "Basic" 3235, 3240 or "Intermediate" 3245, 3250 or "Premium" 3255, 3260 may also have a plurality of other characteristics or levels which form the basis of a fungible contract or substitutable contract between users which is exchangeable with the same terms and conditions if one user is unable to fulfil their contract obligations for the transformed virtual power plant capacity unit. In some embodiments, the navigation mode 3291 may move the user to turn by turn directions along the price based navigation route 3295. In some embodiments, the virtual power plant game mode 3292 may move the user to a game based overlay on the price based navigation virtual power plant route 3295. In some embodiments, the market mode 3293 may move the user to a market based overlay on the priced based navigation virtual power plant route 3295.

The disclosed method and system of a transformed virtual power plant capacity unit may be fully functional as a layer in map routing software 3200 or as a stand alone application 200, 400, etc.

In some embodiments, the disclosed method and system transformed virtual power plant capacity unit or security auction price 3220 and 3230 has two prices or more in other embodiments. Two virtual power plant route prices 3220 are disclosed at $3 and $3.10. The former price of $3 is the price where a user is willing to buy or pay for a virtual power plant capacity unit along the given route 3295. The later price of $3.10 is the price at which a user is willing to sell a virtual power plant capacity unit along the given virtual power plant route 3295. The instructions of the auction may match the highest bidding price of $3 with the lowest selling price in the price queue when the prices match. In other words, in the exemplary embodiment, if a user wanted to sell a virtual power plant capacity unit at the current forward market auction queue 3220 on route 3295, the user would enter a price of $3 which is the current highest bidding price in the method and system queue 3220. By way of further example, another user may desire to buy a transformed virtual power plant capacity unit on the forward transformed virtual power plant capacity unit or security auction method and system on route 3295, to match, the user would enter a price of $3.10 which is the lowest selling price of a seller on the forward market transformed virtual power plant capacity unit auction method and system.

Figure 33:
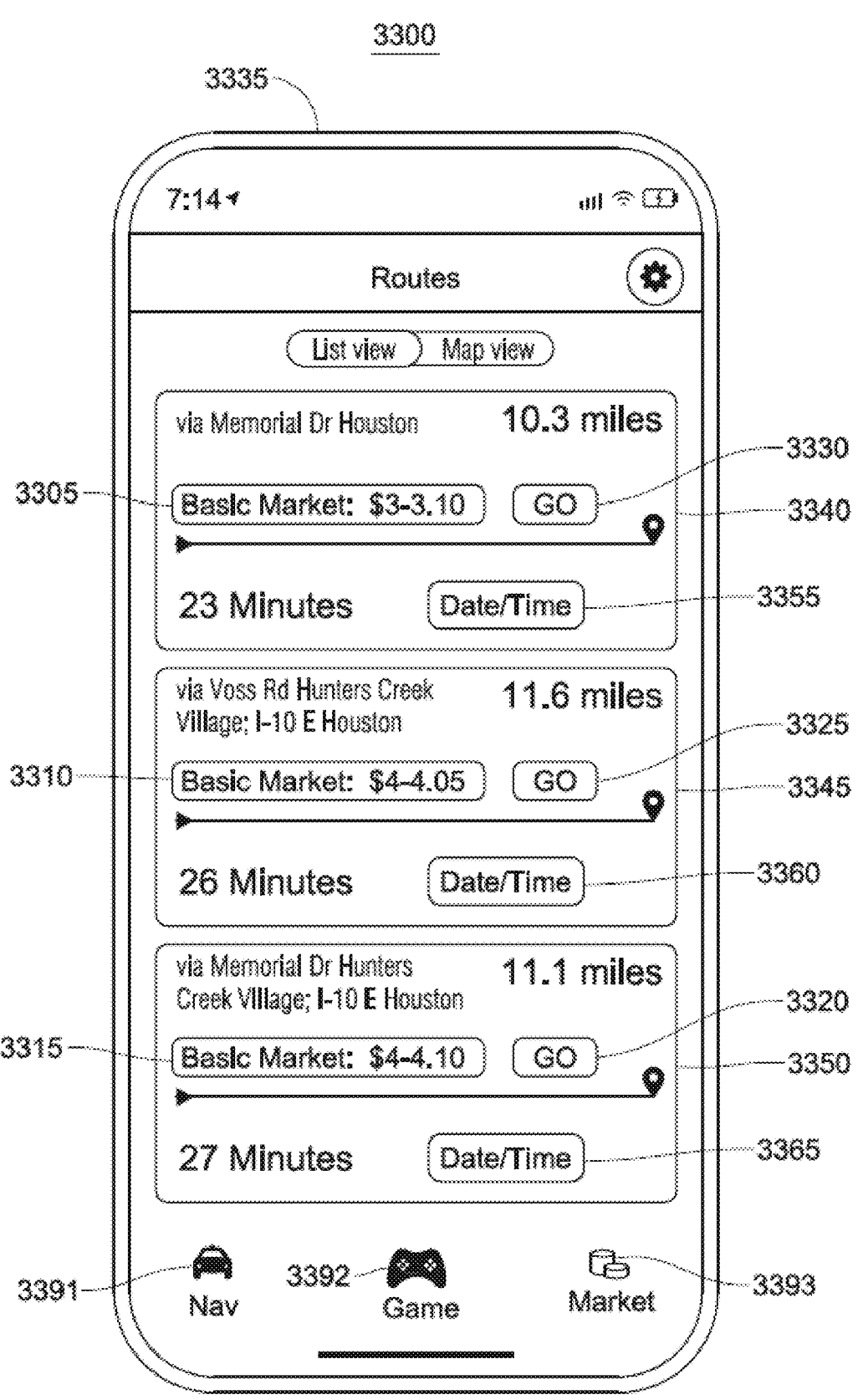
FIG. 33 illustrates an exemplary method and system configuration of the integration interface with GPS virtual power plant interval object community linked routing with associated price-time priority queues such as Waze Maps or other third party map routing software applications.

FIG. 33 illustrates another exemplary network configuration 3300 integrating the disclosed method and system as a layer on another traditional third party map software. In some embodiments, the multi layered network node topology of participating, transacting and/or trading virtual power plant capacity configuration 3300 includes the following accounting elements, or a subset or superset thereof:

exemplary computing device 3335;

exemplary virtual power plant route node structure 3340 to satisfy user virtual power plant route requests with associated time and price;

exemplary alternative virtual power plant route node structure 3345 to satisfy user route request with associated time and price;

exemplary alternative virtual power plant route node structure 3350 to satisfy user route request with associated time and price;

exemplary live auction price value 3305 for price based virtual power plant route 3340;

exemplary virtual power plant navigation mode button 3391;

exemplary virtual power plant game mode button 3392;

exemplary virtual power plant market mode button 3393;

exemplary go 3330 button to transact or modify the price based virtual power plant routing;

exemplary go 3325 button to transact or modify the price based virtual power plant routing;

exemplary go 3320 button to transact or modify the price based virtual power plant routing;

exemplary alternative live auction price value 3310 for virtual power plant route 3345;

exemplary alternative live auction price value 3315 for virtual power plant route 3350;

exemplary date and time modification button 3355 for disclosed virtual power plant route 3340;

exemplary date and time modification button 3360 for disclosed virtual power plant route 3345;

exemplary date and time modification button 3365 for disclosed route 3350;

In some embodiments, virtual power plant map routing interfaces 3335 such as Waze Maps or another third party, may integrate the disclosed method and system to display the transformed forward virtual power plant capacity unit market auction price along a various route given various virtual power plant hub topologies 1800 over the user 110 defined route requests. The computing device 3335 may disclose over visual, audio or other communication methods the forward transformed virtual power plant capacity unit or security auction price 3305 on a given route 3340. In yet other embodiments, the disclosed virtual power plant capacity unit transformation may communicate the forward transformed virtual power plant capacity unit auction price 3310 of an alternative route 3345 such that a user may select either route 3340 or 3345 or 3350 based on the disclosed method and system price 3305 or 3310 or 3315 which was generated by instructions from a plurality of users between two virtual power plant hubs on the user defined virtual power plant route and instructions to generate a price queue for buyers and sellers of virtual power plant capacity units along given virtual power plant routes. The disclosed forward market transformed virtual power plant capacity unit or security auction may be communicated on an on demand basis representing the current time and day or on a forward basis by changing the Date/Time 3340, 3360, 3365 user interface button feature to represent the then current market pricing for future time intervals on a plurality of given routes 3340 or 3345 or 3350 along the user requested virtual power plant hub combination. In some embodiments, the user(s) 110 may alter the date 3355 such that the transformed virtual power plant capacity unit or security may be updated with user 110 submitted prices 3305 for forward looking time periods. Virtual power plant hubs may represent the end points of a route defined by the user or virtual hubs may represent points along a given route but not including the endpoints or virtual power plant hubs may represent points not along the route the user defined. Virtual power plant hub combinations transform virtual power plant capacity units into a forward market which allow users of the method and system to transact in the physical market by either delivering virtual power plant capacity units as a capacity holder. A virtual power plant capacity unit represents energy delivered or consumed over the virtual power plant network. Further the forward virtual power plant capacity unit market auction 3305 overlay may be a layer on traditional GPS virtual power plant map routing software or as an alternative to time based virtual power plant routing. The forward virtual power plant capacity unit market specification such as "Basic" 3305 may also have a plurality of other transformed characteristics or levels which form the basis of a fungible contract or substitutable contract specifications between users which is exchangeable with the same terms and conditions if one user is unable to fulfil their contract obligations for the transformed virtual power plant capacity unit or security. In some embodiments, the navigation mode 3391 may move the user to turn by turn directions along the price based navigation route 3350. In some embodiments, the game mode 3392 may move the user to a virtual power plant game based overlay on the price based navigation virtual power plant route 3340. In some embodiments, the market mode 3393 may move the user to a market based overlay on the priced based navigation virtual power plant route 3350.

The disclosed method and system of a transformed virtual power plant capacity unit may be fully functional as a layer in virtual power plant map routing software 3300 or as a stand alone application 200, 400, etc.

In some embodiments, the disclosed method and system virtual power plant capacity unit auction price 3305 and 3310 and 3315 has two prices or more in other embodiments. Two virtual power plant route prices 3305 are disclosed at $3 and $3.10. The former price of $3 is the price where a user is willing to buy or pay for a virtual power plant capacity unit along the given route 3340. The later price of $3.10 is the price at which a user is willing to sell a virtual power plant capacity unit along the given route 3340. The instructions of the auction may match the highest bidding price of $3 with the lowest selling price in the price queue when the prices match. In other words, in the exemplary embodiment, if a user wanted to sell a virtual power plant capacity unit at the current forward market auction queue 3305 on route 3340, the user would enter a price of $3 which is the current highest bidding price in the method and system queue 3305. By way of further example, another user may desire to buy a virtual power plant capacity unit on the forward virtual power plant capacity unit auction method and system on virtual power plant route 3340, to match, the user would enter a price of $3.10 which is the lowest selling price of a seller on the forward market virtual power plant capacity unit auction method and system.

Figure 34:
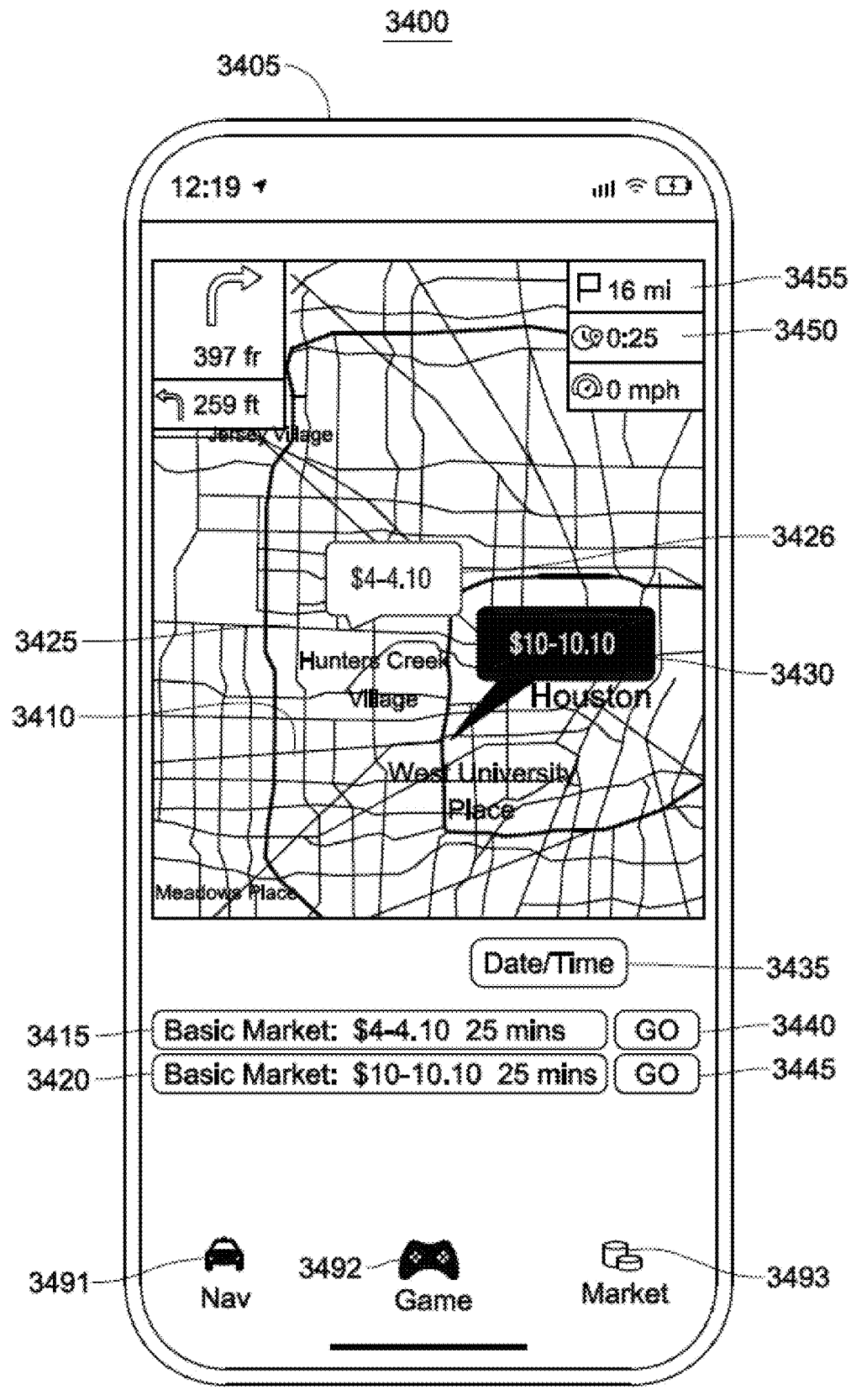
FIG. 34 illustrates an exemplary method and system configuration of the integration interface with GPS virtual power plant interval object community linked routing with associated price-time priority queues such as Open Street Maps or other third party map routing software applications.

FIG. 34 illustrates another exemplary network configuration 3400 integrating the disclosed method and system as a layer on another traditional third party map software. In some embodiments, the multi layered network virtual power plant node topology of participating, transacting and/or trading transformed virtual power plant capacity or freight capacity unit or security configuration 3400 includes the following accounting elements, or a subset or superset thereof:

exemplary computing device 3405;

exemplary virtual power plant route 3410;

exemplary live virtual power plant auction price value 3430 for route 3410;

exemplary alternative live virtual power plant auction price value 3425 for route 3425;

exemplary virtual power plant navigation mode button 3491;

exemplary virtual power plant game mode button 3492;

exemplary virtual power plant market mode button 3493;

exemplary virtual power plant date and time modification button 3435 for disclosed route 3410;

exemplary virtual power plant transmission mileage estimate 3455 for disclosed virtual power plant route 3410;

exemplary route estimate 3450 for disclosed route 3410;

exemplary transformed forward virtual power plant capacity unit auction value and modification feed 3415 and selection GO 3440 button to transact the given virtual power plant route with a basic virtual power plant capacity unit or security feature and characteristic for one route 3425 that satisfies the user virtual power plant route request;

exemplary transformed forward virtual power plant capacity unit or security auction value and modification feed 3420 and selection GO 3445 button to transact the given route with a premium virtual power plant capacity unit feature and characteristic for one route 3410 that satisfies the user virtual power plant route request;

In some embodiments, the navigation mode 3491 may move the user to turn by turn directions along the price based navigation virtual power plant route 3410. In some embodiments, the game mode 3492 may move the user to a game based overlay on the price based navigation virtual power plant route 3410. In some embodiments, the market mode 3493 may move the user to a market based overlay on the priced based navigation virtual power plant route 3410.

Figure 35:
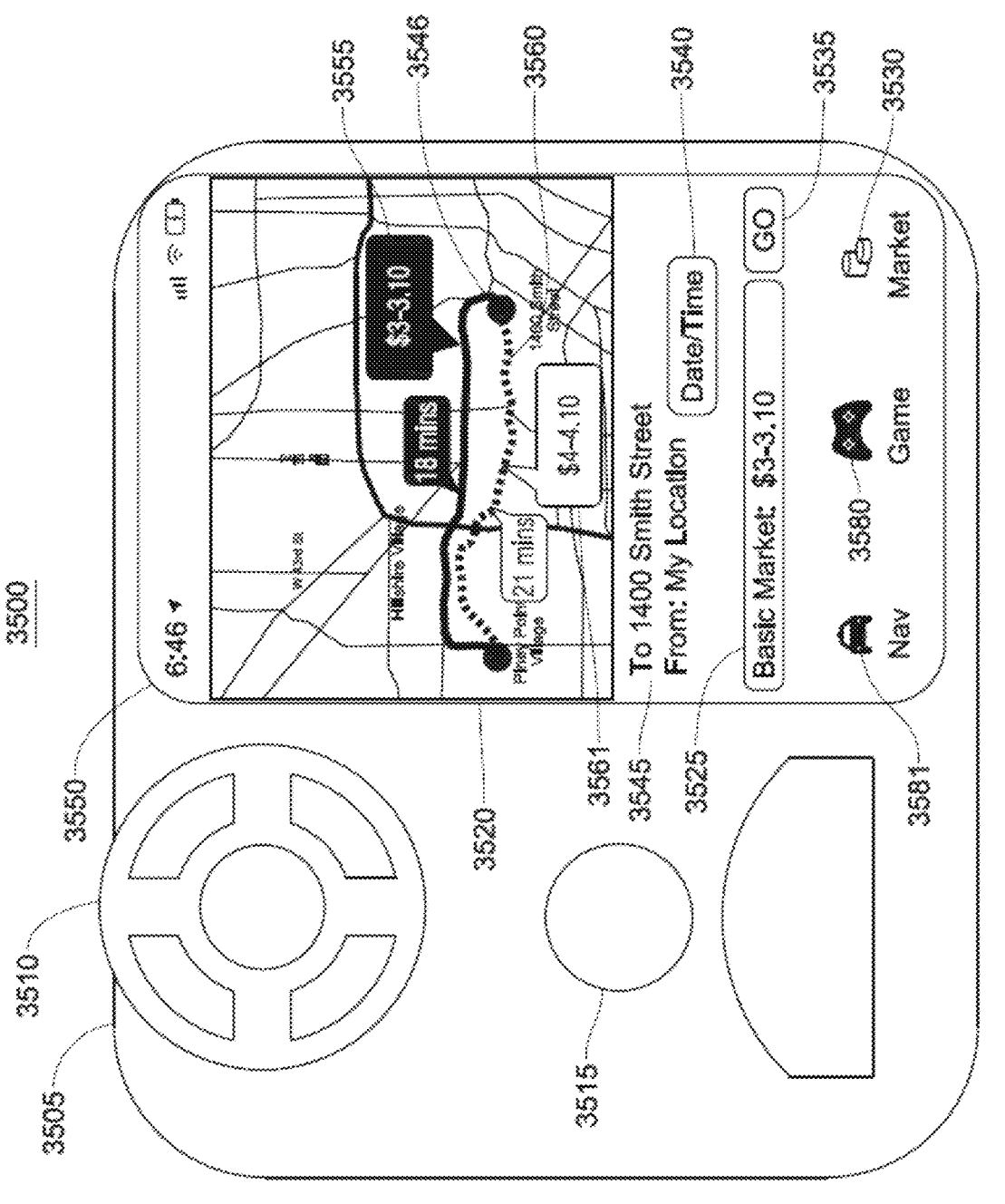
FIG. 35 illustrates an exemplary method and system configuration of the integration interface with GPS virtual power plant routing in a vehicle such as Tesla, VW, Audi, Daimler, GM, Ford, Honda, Fiat, Nissan, Hyundai, Renault, Suzuki, BMW, Mazda, Dongfeng, Great Wall, Geely, BAIC, Tata, Toyota or any other third party map time interval object community linked routing software with associated price-time priority queue applications inside a vehicle.

FIG. 35 illustrates another exemplary network configuration 3500 integrating the disclosed method and system as a layer on another traditional third party map software in the setting of a vehicle GPS navigation system. In some embodiments, the multi layered network node topology of participating, transacting and/or trading virtual power plant capacity or freight capacity configuration 3500 includes the following accounting elements, or a subset or superset thereof:

exemplary computing device 3550;

exemplary vehicle virtual power plant capacity unit carrier unit 3505;

exemplary vehicle virtual power plant capacity unit steering wheel 3510;

exemplary virtual power plant navigation mode button 3581;

exemplary virtual power plant game mode button 3580;

exemplary virtual power plant market mode button 3530;

exemplary user of virtual power plant capacity unit as seller or driver 3515;

exemplary user virtual power plant route request address information 3545;

exemplary virtual power plant date and time modification button 3540 for disclosed route 3545;

exemplary transformed forward virtual power plant capacity unit auction value and modification feed 3525 and selection GO 3535 button to transact the given route with a basic virtual power plant capacity unit feature and characteristic for one route 3545 that satisfies the user route request;

exemplary live virtual power plant auction price value 3555 for price based virtual power plant route 3555;

exemplary live virtual power plant auction price value 3560 for price based alternative virtual power plant route 3560;

exemplary market layer virtual power plant routing overlay 3530;

In some embodiments, the disclosed method and system transformed virtual power plant capacity unit or security auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market auction price based route 3555 from on demand or current time to a forward time or date. Market auction based pricing 3555 may vary by date and time due to a plurality of market factors. In some embodiments the user 3515 may edit the market based auction price for the virtual power plant capacity units by selecting the market feature button 3525. In some embodiments the user 3515 may select a give virtual power plant capacity unit auction price to transact by selecting the go button 3535. In some embodiments, the navigation virtual power plant mode 3581 may move the user to turn by turn directions along the price based navigation virtual power plant route 3555. In some embodiments, the virtual power plant game mode 3580 may move the user to a virtual power plant game based overlay on the price based navigation route 3555. In some embodiments, the market mode 3530 may move the user to a market based overlay on the priced based navigation virtual power plant route 3555.

In some embodiments, the disclosed method and system virtual power plant capacity unit auction price 3555 and 3560 has two prices or more in other embodiments. Two virtual power plant route prices 3555 are disclosed at $3 and $3.10. The former price of $3 is the price where a user is willing to buy or pay for a virtual power plant capacity unit along the given virtual power plant route 3545. The later price of $3.10 is the price at which a user is willing to sell a virtual power plant capacity unit along the given route 3545. The instructions of the auction may match the highest bidding price of $3 with the lowest selling price in the price queue when the prices match. In other words, in the exemplary embodiment, if a user 3515 wanted to sell a virtual power plant capacity unit at the current forward market auction queue 3555 on route 3545, the user 3515 would enter a price of $3 which is the current highest bidding price in the method and system queue 3555. By way of further example, another user may desire to buy a virtual power plant capacity unit on the forward transformed virtual power plant capacity unit or security auction method and system on route 3545, to match, the user would enter a price of $3.10 which is the lowest selling price of a seller on the forward market transformed virtual power plant capacity unit or security auction method and system. In some embodiments, alternative routes based on prices in alternative virtual power plant capacity unit auctions 3560 may have different prices based on supply and demand conditions. In some embodiments the market based routing layer 3530 serves as an alternative to time based routing or mileage based routing which are fundamentally different premises. In some embodiments, the overall software system 3505 and associated instructions may ask the user 3515 with visual or audio interface if the user 110 would like to monetize there virtual power plant routes upon starting any navigation sequence for transformed virtual power plant capacity units or securities.

Figure 36:
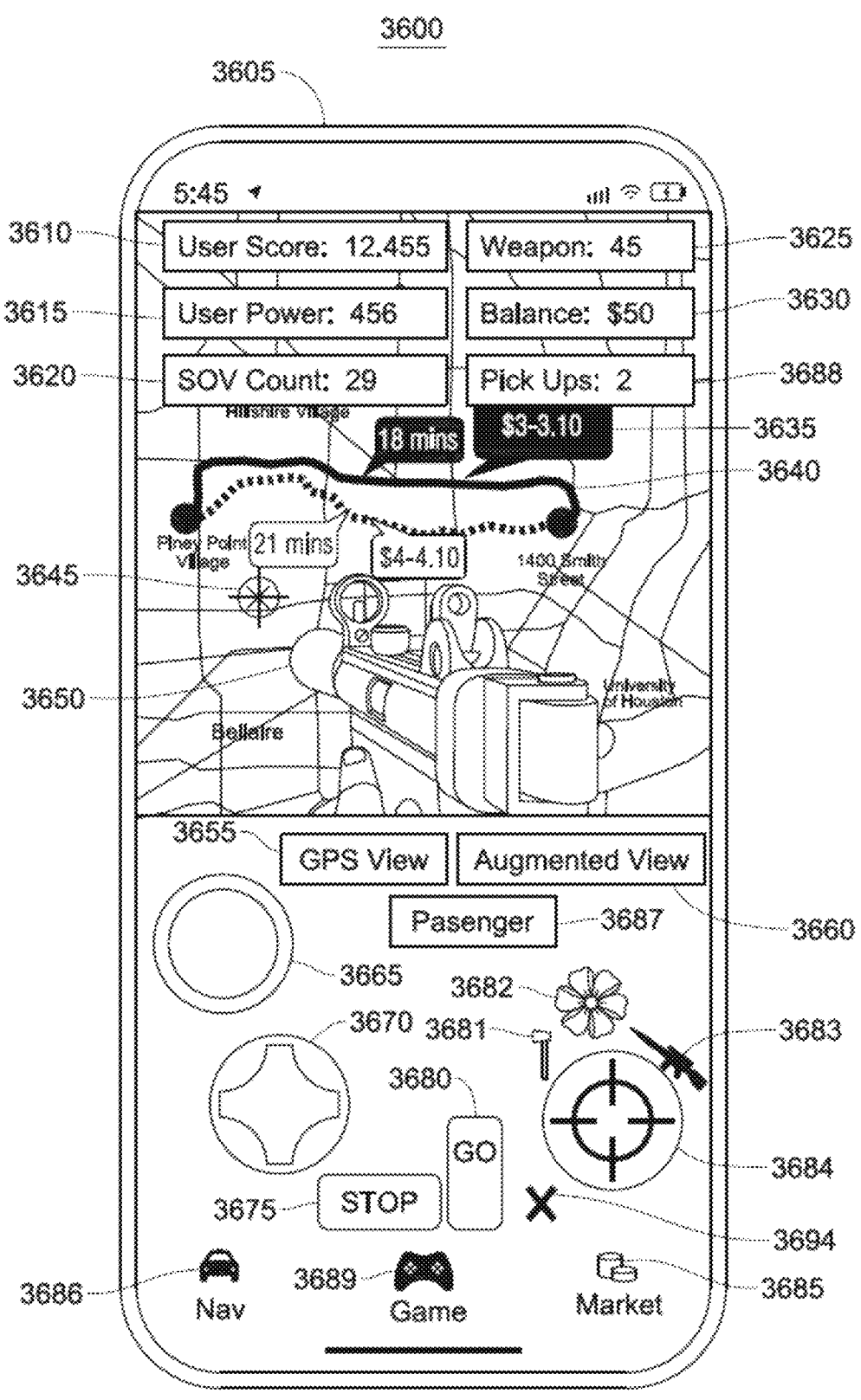
FIG. 36 illustrates an exemplary user interface and database configuration which allow the user to play a strategy based game overlay on the priced based navigation virtual power plant interval object community linked subject with associated price-time priority queues.

FIG. 36 illustrates another exemplary network configuration 3600 integrating the disclosed method and system as a virtual power plant game layer on another internal mapping system or traditional third party map system in the setting of a mobile computing device. In some embodiments, the multi layered network node topology of participating, transacting and/or trading transformed virtual power plant capacity units or securities for price based navigation virtual power plant configuration 3600 includes the following accounting elements, or a subset or superset thereof:

exemplary computing device 3605;

exemplary virtual power plant game overlay user score 3610;

exemplary virtual power plant game overlay user power 3615;

exemplary virtual power plant game overlay SOV (single occupancy vehicle) count 3620;

exemplary virtual power plant game overlay weapon strength 3625;

exemplary virtual power plant game overlay account balance 3630;

exemplary virtual power plant game overlay passenger pick ups 3688;

exemplary virtual power plant game overlay Single Occupancy Vehicle target 3645;

exemplary virtual power plant game overlay Single Occupancy Vehicle weapon 3650;

exemplary virtual power plant game overlay GPS standard map view 3655;

exemplary game overlay augmented or mixed reality view 3660;

exemplary game overlay passenger mode 3687;

exemplary virtual power plant game overlay fire button 3665;

exemplary virtual power plant game overlay multi-purpose direction button 3670;

exemplary virtual power plant game overlay go button 3680;

exemplary virtual power plant game overlay stop button 3675;

exemplary virtual power plant navigation overlay button 3686;

exemplary virtual power plant game overlay button 3689;

exemplary virtual power plant market overlay button 3685;

exemplary virtual power plant market overlay weapon selection button 3683, 3682, 3681, 3694;

exemplary virtual power plant market overlay aim finder toggle 3684.

In some embodiments, the game overlay 3689 awards score and points for destroying the single occupancy vehicle 3620, compute and distribute positive or negative virtual power plant capacity unit game auction strategy points 3610 or power 3615 or rewards 3630 based on any superset combination or subset combination of price 3635, route mileage 3640, number of single occupancy vehicles destroyed or passed 3620, number of passengers 3688, virtual power plant route time estimates 3640, virtual power plant capacity unit route 3640, virtual power plant capacity unit specifications 3415, virtual power plant capacity unit model type 4000 based on model type and age 4000, virtual power plant capacity unit make type 4000, virtual power plant capacity unit age 4000, matched virtual power plant capacity unit specification 800 and 620, matched virtual power plant capacity unit fuel type 4000, matched virtual power plant capacity unit emission specification 4000, cumulative user virtual power plant capacity unit specifications 4100, virtual power plant capacity unit rating 4100, virtual power plant capacity unit safety 4100, virtual power plant capacity unit time 4100, virtual power plant capacity unit delay, virtual power plant capacity unit driver rating 4100, virtual power plant capacity unit rider rating 4100, virtual power plant capacity unit timeliness relative to contract specification 4100.

In some embodiments, the game overlay 3689 may use a plurality of weapon or scoring configurations such as a rifle 3683, an axe 3681, a flower gift 3682, a X logo 3694 to take away points or gain points from other users on the system. In some embodiments the scoring may be independent of other players on the system, but dependent on the users actions in the game overlay 3689. In some embodiments a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation route to increase the score of the player 3610 and increase the balances 3630 by earning money on the system. In some embodiments user(s) may be identified by the X logo 3694 or by a person logo who is a bidder on the priced based navigation route 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation virtual power plant route 3640.

In some embodiments, the strategy of the priced based navigation virtual power plant game overlay is to pick up as many passengers or bidders as possible along the price based navigation virtual power plant route 3640, destroy as many single occupancy vehicles along the price based navigation virtual power plant route 3640 and to give flowers 3682 and rewards to virtual power plant capacity unit providers who have more than one person in the vehicle along the price based navigation route 3640. In some embodiments user(s) may work independently or collectively in tribes to maximize user score in strategy.

Figure 37:
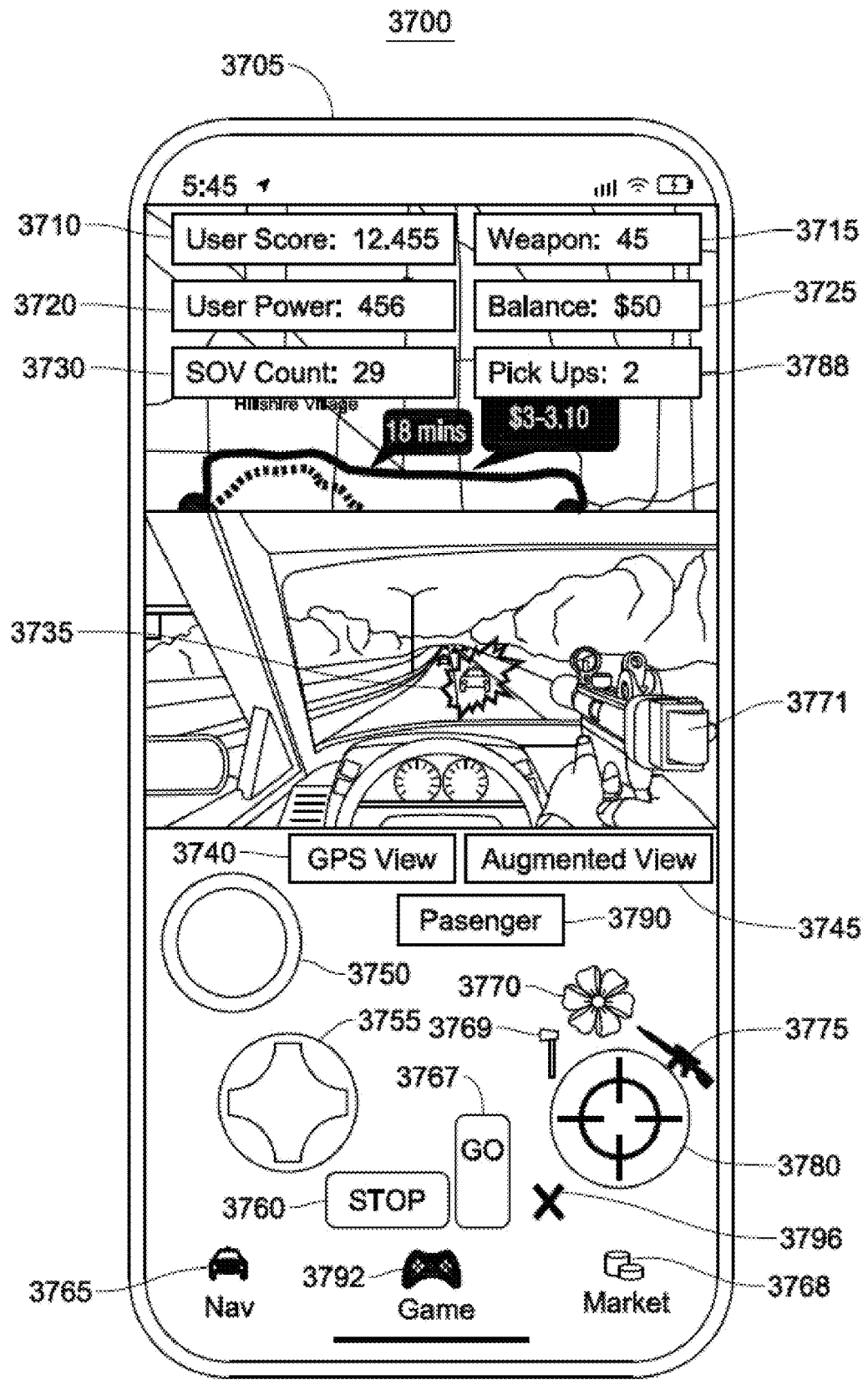
FIG. 37 illustrates an exemplary user interface and database configuration which allow the user to play a strategy based game overlay on the priced based navigation virtual power plant interval object community linked subject with associated price-time priority queues with augmented reality.

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading virtual power plant capacity for price based navigation virtual power plant configuration 3700 includes the following accounting elements, or a subset or superset thereof:
    exemplary computing device 3705;
    exemplary virtual power plant game overlay user score 3710;

exemplary virtual power plant game overlay user power 3720;
    exemplary virtual power plant game overlay SOV (single occupancy vehicle) count 3730;
    exemplary virtual power plant game overlay weapon strength 3715;
    exemplary virtual power plant game overlay account balance 3725;
    exemplary virtual power plant game overlay passenger pick ups 3788;
    exemplary virtual power plant game overlay Single Occupancy Vehicle target 3735;
    exemplary virtual power plant game overlay Single Occupancy Vehicle weapon 3771;
    exemplary virtual power plant game overlay GPS standard map view 3740;
    exemplary virtual power plant game overlay augmented or mixed reality view 3745;
    exemplary virtual power plant game overlay passenger mode 3790;
    exemplary virtual power plant game overlay fire button 3750;
    exemplary virtual power plant game overlay multi-purpose direction button 3755;
    exemplary virtual power plant game overlay go button 3767;
    exemplary virtual power plant game overlay stop button 3760;
    exemplary virtual power plant navigation overlay button 3765;
    exemplary virtual power plant game overlay button 3792;
    exemplary virtual power plant market overlay button 3768;
    exemplary virtual power plant market overlay weapon selection button 3775, 3770, 3769, 3796;
    exemplary virtual power plant market overlay aim finder toggle 3780.

In some embodiments, the game overlay view 3768 of the price based navigation virtual power plant system 3705 may alert the user to a single occupancy vehicle 3735 which would then be a target for the user to use a weapon 3771, 3775, 3769 to destroy the single occupancy vehicle to increase user score 3710. In some embodiments, the user may identify a vehicle as having more than one passenger in the vehicle and therefore award or gift flowers 3770 to the vehicle or virtual power plant capacity user in the price based navigation game strategy. In some embodiments, the user may use a weapon 3771 against a single occupancy vehicle 3735 at which point the vehicle would explode and the passenger would be left without a vehicle in the augmented reality view 3745 or GPS view 3740. In some embodiments, the user may award flowers 3770 to a vehicle with more than one passenger to increase their score 3710 and the score of the user that has more than one passenger in their virtual power plant vehicle.

Figure 38:
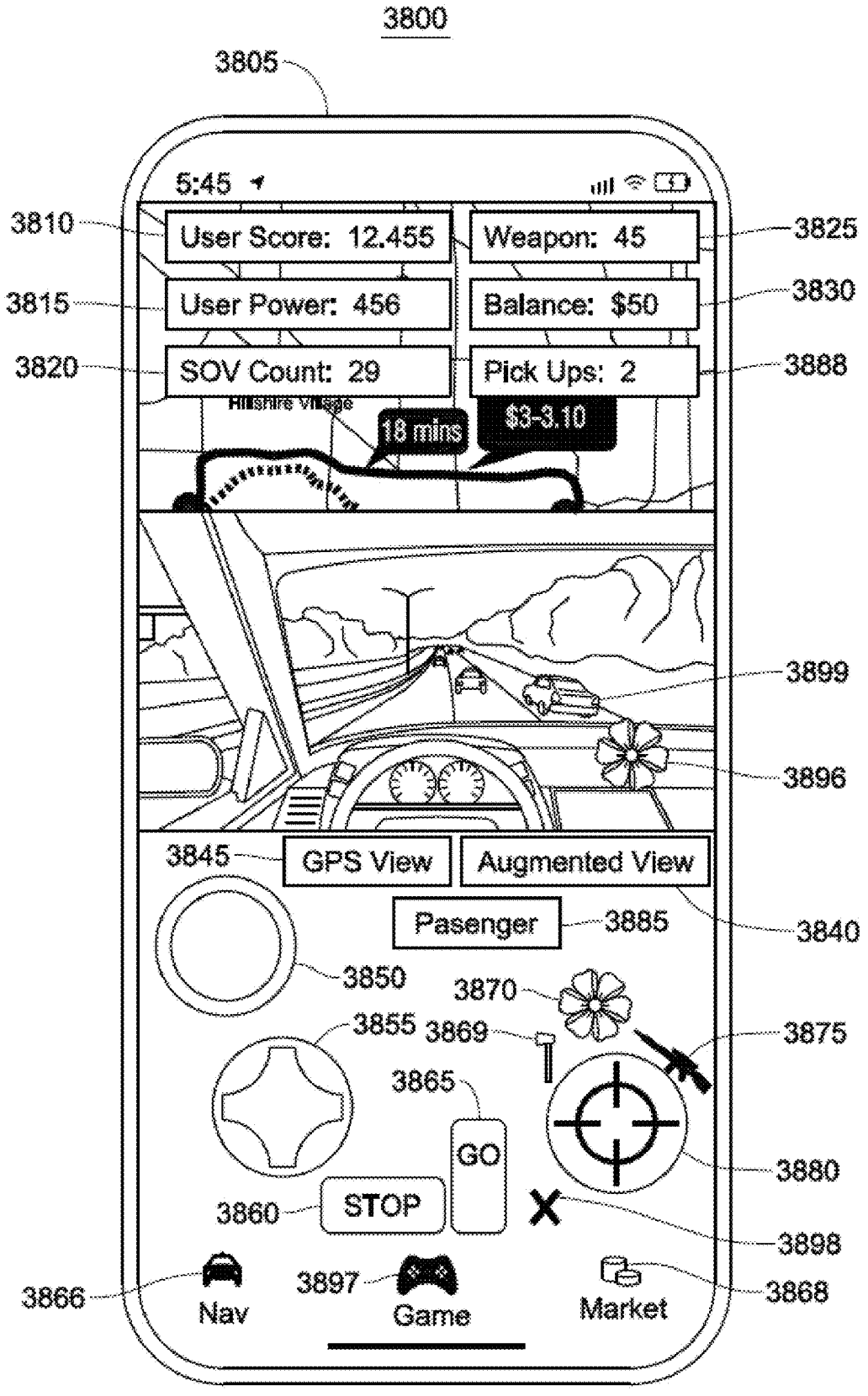
FIG. 38 illustrates an exemplary user interface and database configuration which allow the user to play a strategy based game overlay on the priced based navigation virtual power plant interval object community linked subject with associated price-time priority queues with augmented reality.

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading virtual power plant capacity for price based navigation virtual power plant configuration 3800 includes the following accounting elements, or a subset or superset thereof:
    exemplary computing device 3805;

exemplary virtual power plant game overlay user score 3810;

exemplary virtual power plant game overlay user power 3815;

exemplary virtual power plant game overlay SOV (single occupancy vehicle) count 3820;

exemplary virtual power plant game overlay weapon strength 3825;

exemplary virtual power plant game overlay account balance 3830;

exemplary virtual power plant game overlay passenger pick ups 3888;

exemplary virtual power plant game overlay flower gift 3896;

exemplary game overlay GPS standard map view 3845;

exemplary virtual power plant game overlay augmented or mixed reality view 3840;

exemplary virtual power plant game overlay passenger mode 3885;

exemplary virtual power plant game overlay fire button 3850;

exemplary virtual power plant game overlay multi-purpose direction button 3855;

exemplary virtual power plant game overlay go button 3865;

exemplary virtual power plant game overlay stop button 3860;

exemplary virtual power plant navigation overlay button 3866;

exemplary virtual power plant game overlay button 3897;

exemplary virtual power plant market overlay button 3868;

exemplary virtual power plant market overlay weapon selection button 3869, 3870, 3875, 3898;

exemplary virtual power plant market overlay aim finder toggle 3880.

In some embodiments, the game overlay view 3897 of the price based navigation virtual power plant system 3805 may alert the user to a vehicle with more than one passenger 3899 which would then be a way for the user to gift a flower to the other user 3899.

Figure 39:
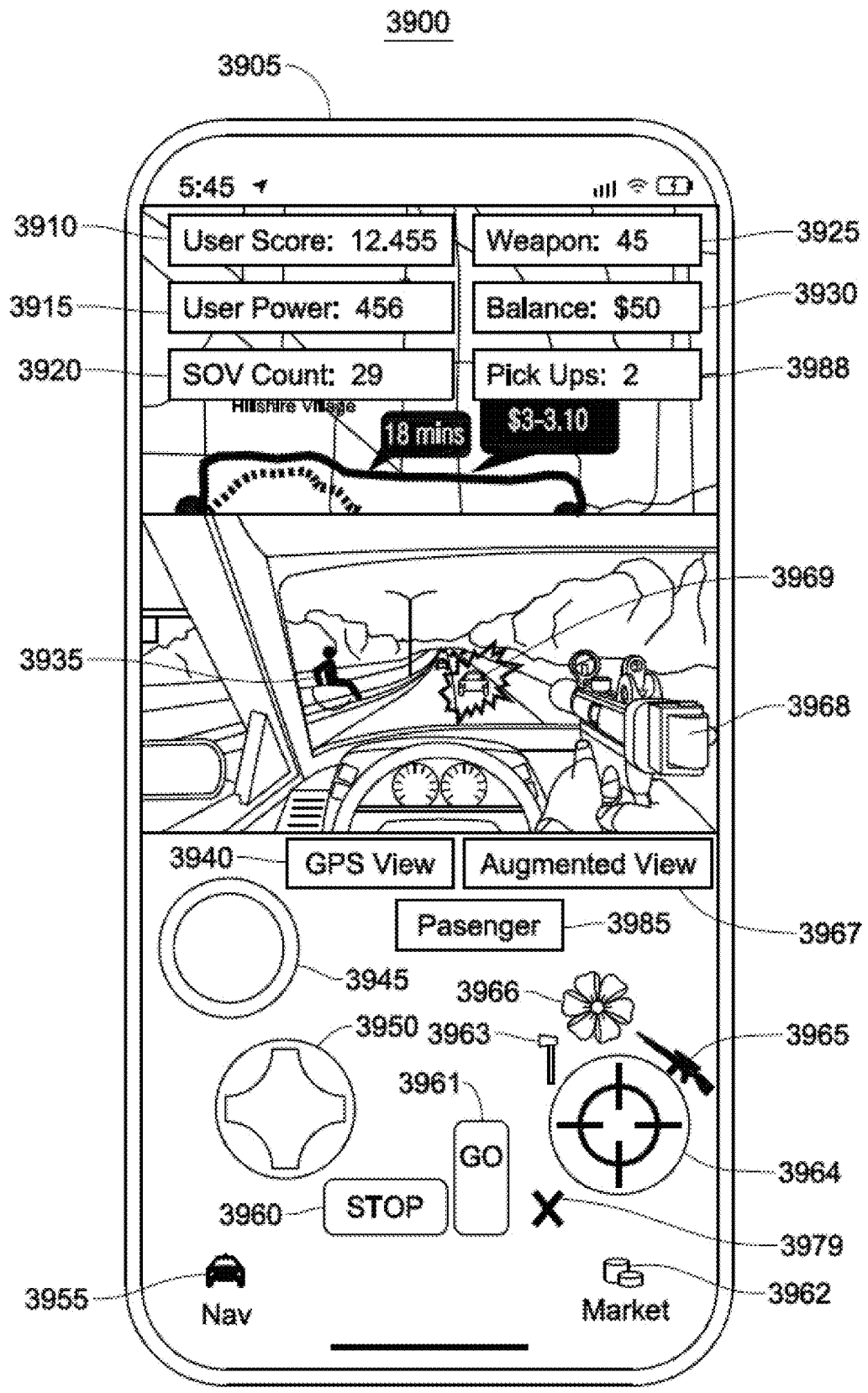
FIG. 39 illustrates an exemplary user interface and database configuration which allow the user to play a strategy based game overlay on the priced based navigation virtual power plant interval object community linked subject with associated price-time priority queues with augmented reality.

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading virtual power plant capacity for price based navigation virtual power plant configuration 3900 includes the following accounting elements, or a subset or superset thereof:

exemplary computing device 3905;

exemplary virtual power plant game overlay user score 3910;

exemplary virtual power plant game overlay user power 3915;

exemplary virtual power plant game overlay SOV (single occupancy vehicle) count 3920;

exemplary virtual power plant game overlay weapon strength 3925;

exemplary virtual power plant game overlay account balance 3930;

exemplary virtual power plant game overlay passenger pick ups 3988;

exemplary virtual power plant game overlay weapon 3968;

exemplary game overlay GPS standard map view 3940;

exemplary virtual power plant game overlay augmented or mixed reality view 3967;

exemplary virtual power plant game overlay passenger mode 3985;

exemplary virtual power plant game overlay fire button 3945;

exemplary virtual power plant game overlay multi-purpose direction button 3950;

exemplary virtual power plant game overlay go button 3961;

exemplary virtual power plant game overlay stop button 3960;

exemplary virtual power plant navigation overlay button 3955;

exemplary virtual power plant market overlay button 3962;

exemplary virtual power plant market overlay weapon selection button 3963, 3966, 3965, 3979;

exemplary virtual power plant market overlay aim finder toggle 3964;

exemplary virtual power plant user in augmented reality view who has had their single occupancy vehicle destroyed 3935.

In some embodiments, the game overlay view 3905 of the price based navigation virtual power plant system 3905 may show a user who has had their single occupancy vehicle destroyed 3935 which increases the score of the user 3910. In some embodiments, the user may target additional single occupancy vehicles 3969 to destroy along the priced based navigation route.

Figure 40:
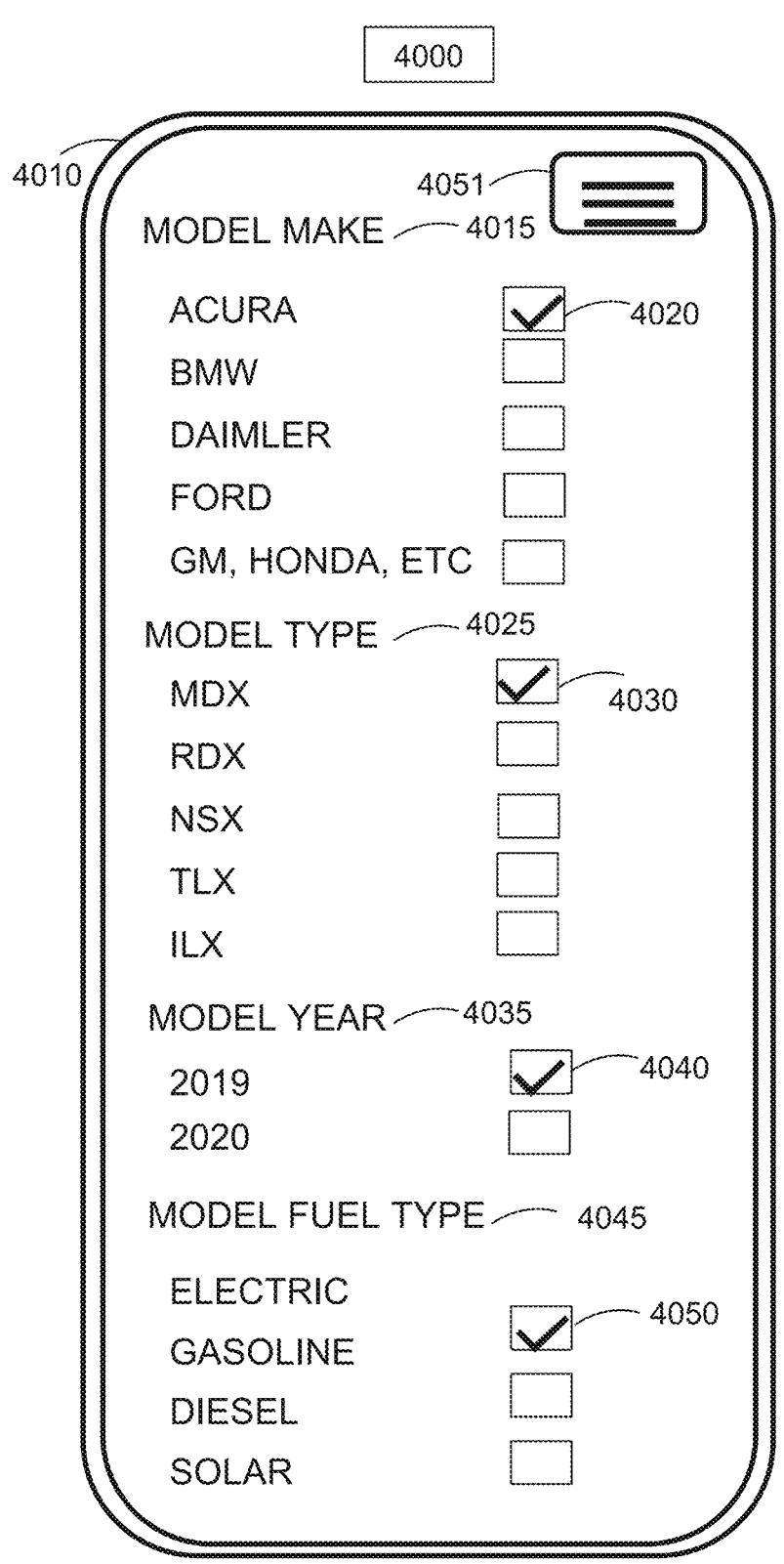
FIG. 40 illustrates an exemplary user interface and database configuration which allow the user to select model, make, type, year, fuel type in configuration for virtual power plant interval object community linked price based navigation with associated price-time priority queues.

FIG. 40 illustrates another exemplary network configuration 4000 module of the disclosed method and system which records the vehicle specifications for a given user on the system 4010 in the setting of a mobile computing device. In some embodiments, the multi layered network node topology of participating, transacting and/or trading transformed virtual power plant capacity or securities for price based navigation virtual power plant configuration 4000 includes the following elements, or a subset or superset thereof:

exemplary computing device 4010;

exemplary virtual power plant capacity unit model make 4015;

exemplary virtual power plant capacity unit model type 4025;

exemplary virtual power plant capacity unit model year 4035;

exemplary virtual power plant system menu toggle box 4051;

exemplary virtual power plant capacity unit model fuel type 4045;

exemplary virtual power plant capacity unit model make selection box toggle 4020;

exemplary virtual power plant capacity unit model type selection box toggle 4030;

exemplary virtual power plant capacity unit model year selection box toggle 4040;

exemplary virtual power plant capacity unit model fuel type selection box toggle 4050;

In some embodiments, the disclosed method and system may allow the user to select the model make such as by example an Acura 4020 as a model make 4015. In some embodiments the user may select an unlimited variety of vehicle virtual power plant types in the method and system not limiting the system to those vehicle make 4015 or model 4025 types in FIG. 40. In some embodiments, the user may configure the system for the virtual power plant capacity unit specification model year 4035 or the model fuel type 4045 or a plurality of other vehicle specifications for the purpose of recording specification for the priced based navigation virtual power plant system 4010. In some embodiments, the data transformation of the transformed virtual power plant capacity unit or security links the attributes or supersets or subsets of the model make 4015, model type 4025, model year 4035, model fuel type 4045, or a plurality of other vehicle features to create specification pools as a feature in the data transformations for the transformed virtual power plant capacity units or securities. In some embodiments, the combinations of similar vehicle model make 4015, model type 4025, model year 4035, model fuel type 4045 and plurality of other vehicle attributes are fungible or substitutable in the method of the transformed virtual power plant capacity unit or security. To avoid confusion, and to provide further example, but not limit by example, bus or subway or train or air or private automobile or other transformed virtual power plant capacity units or securities may be substitutable under broad specifications of the transformed virtual power plant capacity or security pool provided that the broad transformed specifications are met for delivery within the transformed virtual power plant capacity unit or security pool.

Figure 41:
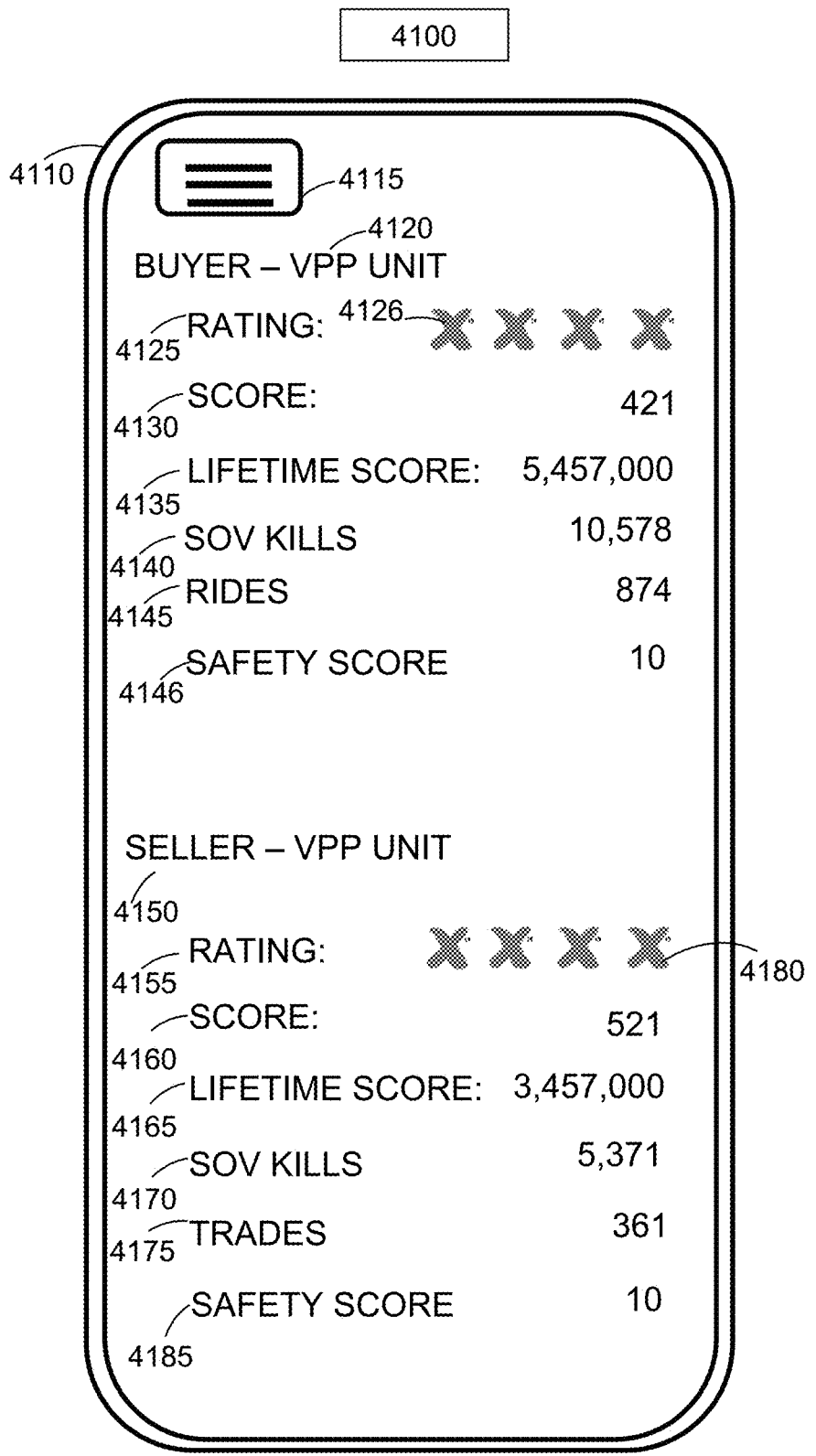
FIG. 41 illustrates an exemplary user interface and database configuration which displays a plurality of metrics for the performance of the user in the game overlay and general system and method of virtual power plant interval object community linked priced based navigation with associated price-time priority queues.

FIG. 41 illustrates another exemplary network configuration 4100 module of the disclosed method and system which records the buyer or seller of virtual power plant capacity unit specification ratings for a given user on the system 4110 in the setting of a mobile computing device. In some embodiments, the multi layered virtual power plant network node topology of participating, transacting and/or trading virtual power plant capacity for price based navigation virtual power plant configuration 4100 includes the following elements, or a subset or superset thereof:

exemplary menu toggle box 4115;

exemplary buyer virtual power plant capacity unit rating category summary 4120;

exemplary buyer virtual power plant capacity unit rating summary 4125;

exemplary buyer virtual power plant capacity unit rating X logo amount 4126;

exemplary buyer virtual power plant capacity unit rating score for navigation route 4130;

exemplary buyer virtual power plant capacity unit rating lifetime score 4135;

exemplary buyer virtual power plant capacity unit SOV kills 4140;

exemplary buyer virtual power plant capacity unit trade count 4145;

exemplary buyer virtual power plant capacity unit trade safety score 4146;

exemplary buyer virtual power plant capacity unit rating category summary 4150;

exemplary seller virtual power plant capacity unit rating summary 4155;

exemplary seller virtual power plant capacity unit rating X logo amount 4180;

exemplary seller virtual power plant capacity unit rating score for navigation route 4160;

exemplary seller virtual power plant capacity unit rating lifetime score 4165;

exemplary seller virtual power plant capacity unit SOV kills 5,371;

exemplary seller virtual power plant capacity unit trade count 4175;

exemplary seller virtual power plant capacity unit trade safety score 4185;

In some embodiments the price based navigation virtual power plant system game overlay layer uses a plurality of the aforementioned combinations to account for user actions in the game overlay of the disclosed method and system.

Figure 42:
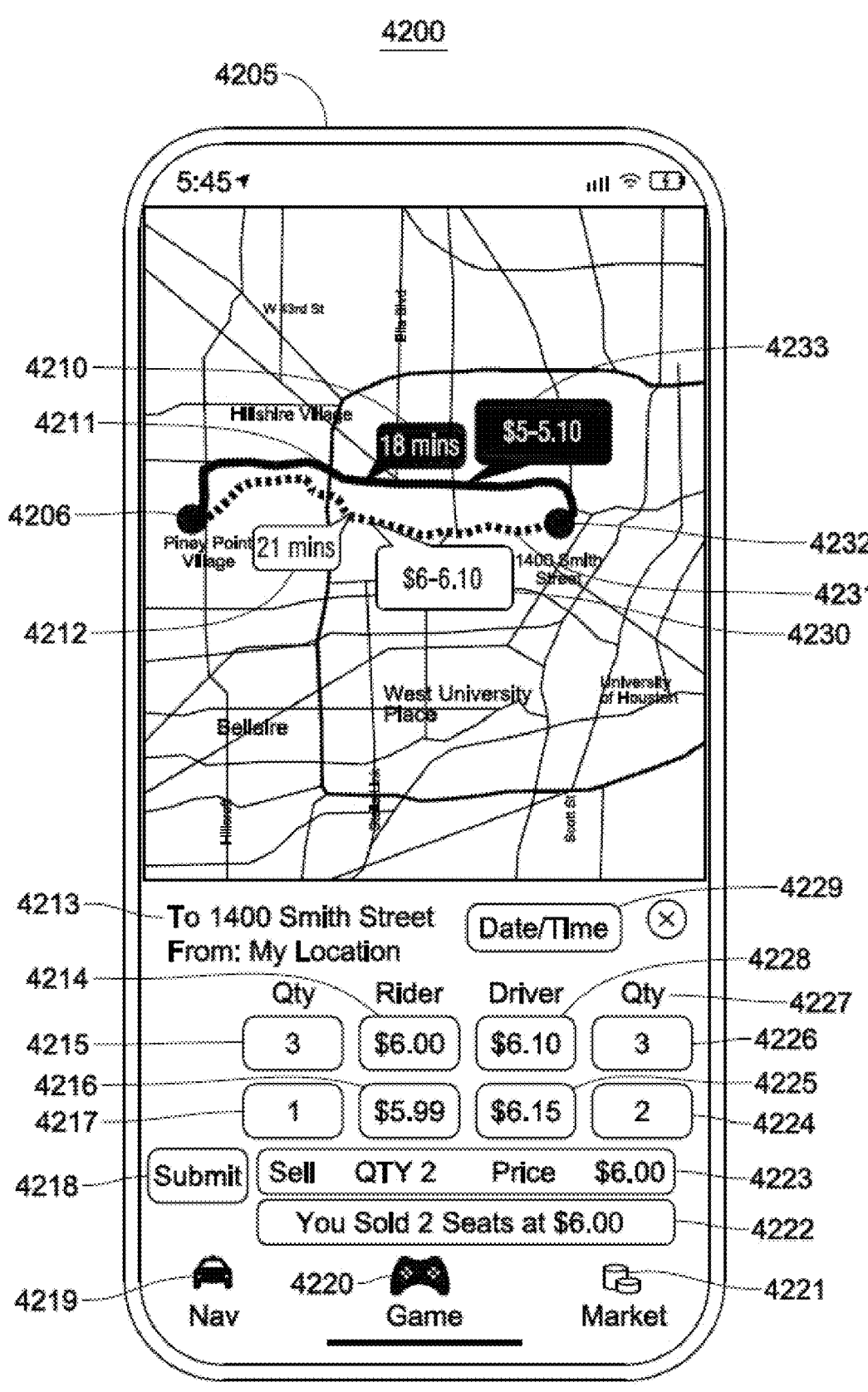
FIG. 42 illustrates an exemplary user interface and database configuration which displays a plurality of virtual power plant interval object community linked subjects between two user requested hubs indexed based on the pricing of virtual power plant interval object community linked virtual power plant interval object units or time interval object community linked virtual power plant interval object unit securities with associated price-time priority queues and the associated open market transaction interface for those transformed virtual power plant interval object community linked virtual power plant interval object unit securities.

FIG. 42 illustrates another exemplary network configuration 4200 module of the disclosed method and system which records the rider or driver transformed virtual power plant capacity unit or security specification and market framework for the transformation for a specified plurality of routes. In some embodiments, the multi layered network node topology of participating, transacting and/or trading transformed virtual power plant capacity units or securities for price based navigation configuration 4200 includes the following elements, or a subset or superset thereof:

exemplary computing device to display the method or system 4205;

exemplary estimated time of a primary indexed price based navigation virtual power plant route of a transformed virtual power plant capacity unit or security 4120;

exemplary market price of a buyer and seller of primary price based navigation virtual power plant route of a transformed virtual power plant capacity unit or security 4233;

exemplary price based navigation virtual power plant route of a primary transformed virtual power plant capacity unit or security 4211;

exemplary estimated time of a secondary indexed price based navigation virtual power plant route of a transformed virtual power plant capacity unit or security 4231;

exemplary estimated time of a secondary indexed price based navigation virtual power plant route of a transformed virtual power plant capacity unit or security 4212;

exemplary market price of a buyer and seller of secondary price based navigation virtual power plant route of a transformed virtual power plant capacity unit or security 4230;

exemplary starting point virtual hub of an indexed price based navigation virtual power plant route of a transformed virtual power plant capacity unit or security 4206;

exemplary ending point virtual hub of an indexed price based navigation route of a transformed virtual power plant capacity unit or security 4232;

exemplary ending point and starting point address of virtual hub(s) of an indexed price based navigation virtual power plant route of a transformed virtual power plant capacity unit or security 4213;

exemplary date and time specification of an indexed price based navigation virtual power plant route of a transformed virtual power plant capacity unit or security 4213;

exemplary number or quantity of transformed virtual power plant capacity units or securities that are bidding or buying for purchase by riders of a secondary indexed price based navigation route of a transformed virtual power plant capacity unit or security which is first in the buyer queue indexed by highest price 4215;

exemplary price of transformed virtual power plant capacity units or securities that are bidding or buying for purchase by buyers of a secondary indexed price based navigation route of a transformed virtual power plant capacity unit or security which is first in the buyer queue indexed by highest price 4214;

exemplary price of transformed virtual power plant capacity units or securities that are bidding or buying for purchase by buyers of a secondary indexed price based navigation route of a transformed virtual power plant capacity unit or security which is second in the buyer queue indexed by second highest price 4216;

exemplary number or quantity of transformed virtual power plant capacity units or securities that are bidding or buying for purchase by buyers of a secondary indexed price based navigation route of a transformed virtual power plant capacity unit or security which is second in the buyer queue indexed by second highest price 4217;

exemplary number or quantity of transformed virtual power plant capacity units or securities that are offering or selling by sellers of a secondary indexed price based navigation route of a transformed virtual power plant capacity unit or security which is first in the seller queue indexed by lowest price 4226;

exemplary price of transformed virtual power plant capacity units or securities that are offering or selling by sellers of a secondary indexed price based navigation route of a transformed virtual power plant capacity unit or security which is first in the seller queue indexed by lowest price 4228;

exemplary number or quantity of transformed virtual power plant capacity units or securities that are offering or selling by sellers of a secondary indexed price based navigation route of a transformed virtual power plant capacity unit or security which is second in the seller queue indexed by second lowest price 4224;

exemplary price of transformed virtual power plant capacity units or securities that are offering or selling by drivers of a secondary indexed price based navigation route of a transformed virtual power plant capacity unit or security which is second in the seller queue indexed by second lowest price 4225;

exemplary order entry submit button to the method and system for a user order 4218;

exemplary order on the method and system by a driver to sell a specified quantity of transformed virtual power plant capacity units or securities 4223;

exemplary order confirmation on the method and system by a seller sold two units of transformed virtual power plant capacity units or securities 4222;

exemplary market view of priced based navigation virtual power plant layer to display indexed prices of a plurality routes which may be one, two, three, or an infinite number of virtual power plant routes between two virtual power plant hubs 4222;

exemplary game view layer of a transformed virtual power plant capacity unit or security 4220;

exemplary navigation view layer of a transformed virtual power plant capacity unit or security 4219;

In some embodiments, the disclosed method and system may allow the user to select the model make such as by example an Acura 4020 as a model make 4015 or an industrial, commercial or residential facility virtual power plant which is placed in a certain transformed virtual power plant capacity specification pool that may be aggregated with similar transformed virtual power plant capacity unit specification participants or units that then display a user 110 selected navigation route 4211 or plurality of virtual power plant routes 4231 and 4211 or an infinite number of virtual power plant routes between the virtual power plant hub start point 4206 and virtual power plant hub endpoint 4232. In some embodiments the prices 4230 on a virtual power plant route 4231 may display the buy price of the highest bidder or buyer on a given virtual power plant route 4231 which is listed in more detail in the buyer queue display for highest indexed price bid 4214 for a route 4231. In some embodiments, the highest bid price 4214 for a buyer on a given virtual power plant route 4231 has an associated quantity 4215 of transformed virtual power plant capacity units or securities. Similarly in some embodiments, the lowest offer or sale price 4228 for a driver on a given virtual power plant route 4231 has an associated quantity 4226 of transformed virtual power plant capacity units or securities. In some embodiments, the buyer quantity 4215 listed as three units, may be one rider, two buyers, or three buyers who desire to purchase a given transformed virtual power plant capacity unit(s) or securities so long as the indexed price is queued to the top based on a highest price index and time stamp for a given specification of a transformed virtual power plant capacity unit or security. In some embodiments, transformed virtual power plant capacity units or securities may represent a similar pool of transformed virtual power plant capacity units or securities based on a superset or subset or the plurality of attributes such as industrial, residential, commercial virtual power plant facility, vehicle mode make 4015, vehicle mode model type 4025, vehicle model year 4035, cheapest virtual power plant transmission route 1011, single virtual power plant transmission mode 1012, multi virtual power plant modal 1013, fastest virtual power plant transmission route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, business 824, train 825, fastest optimized 826, cheapest route 827, packages 828, cargo 829, virtual 830, order types 710, 720, term specification 600, timing specification 500, virtual hub end point 230 and start point 220, eScooter, eBike or a plurality of other specifications. In some embodiments, the match of buyer price 4214 and driver price 4228 for a transformed virtual power plant capacity unit(s) or securities occurs the lowest price in the seller queue 4228 equals the highest price in the buyer queue 4214. In some embodiments, if no such match of prices occur between seller and buyer queues for a given specification of a transformed virtual power plant capacity unit or security, then prices remain in the queue until a match or a new order entry re-indexes the order of all the deals because the price is higher than the current highest bid in the buyer queue 4214 or the queue entries for the transformed virtual power plant capacity unit or security may become re-indexed to place an order with the appropriate price index ranking in a queue that places the highest buyer price 4214 in the top and descends by price 4216, then time of order entry all other things equal. In some embodiments, the seller price queue 4228, 4225 similarly ranks from lowest seller price 4228 at the top of the queue to highest seller price 4228 at the bottom on the queue, then indexing by time subordinate to price for a given pool specification of transformed virtual power plant capacity units or securities. In some embodiments, a plurality of routes 4231 and 4211 may be displayed as price based navigation options indexed by market pricing. In some embodiments, the user may select one, two or many, many more routes as to how many they desire to be displayed as options between their virtual power plant hubs to perform calculations that may maximize the number of virtual power plant capacity units or securities they sell on a given route specification or the prices which they obtain or any combination of specifications or objectives the user may have in the price based navigation virtual power plant method and display of transformed virtual power plant capacity unit or security.

Figure 43:
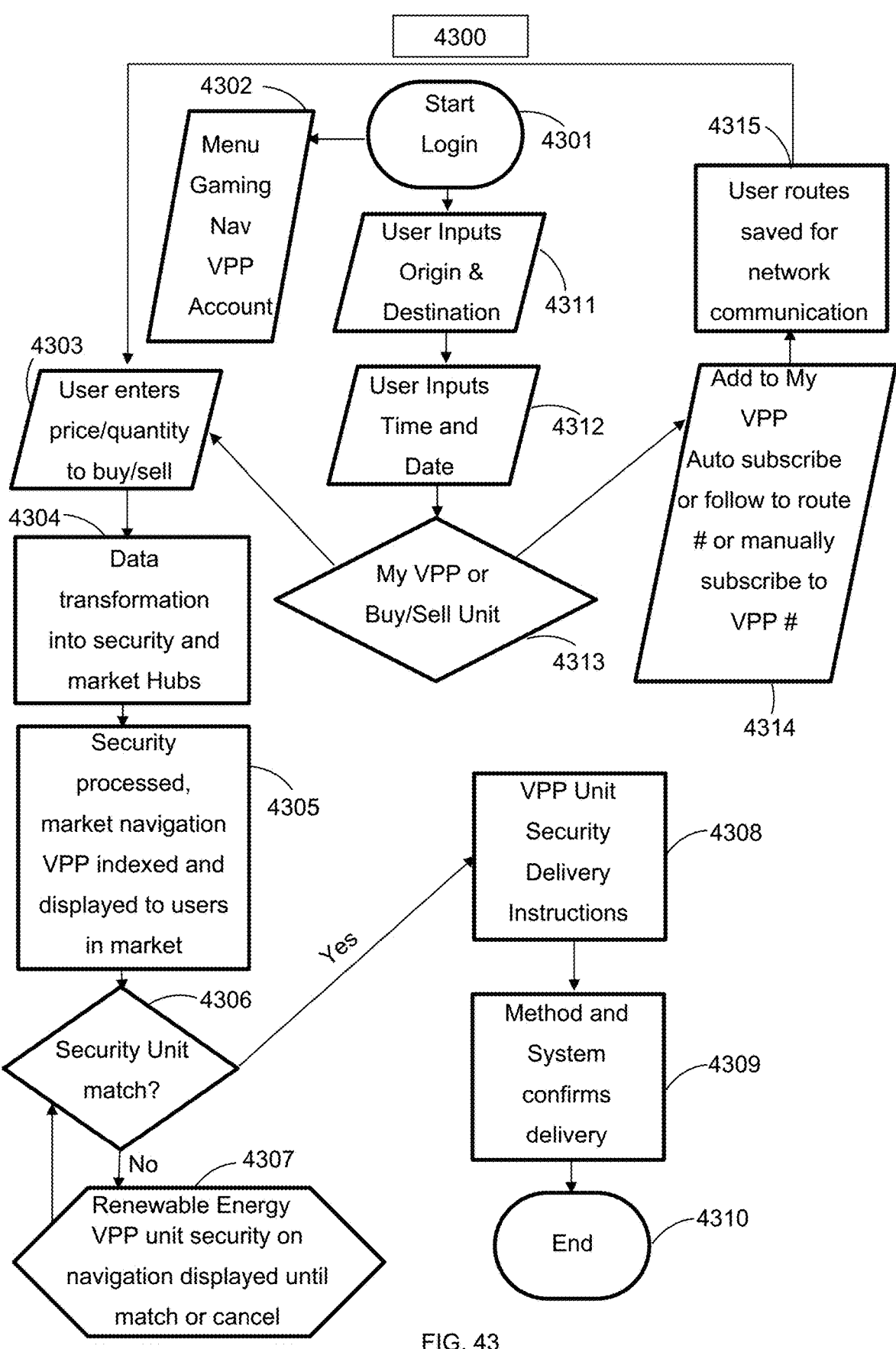
FIG. 43 illustrates an exemplary flow chart of steps in the virtual power plant interval object community linked virtual power plant interval object unit security data transformation and presentation of the virtual power plant interval object unit security with integration to navigation systems with associated price-time priority queues which is another data transformation.

FIG. 43 illustrates an exemplary flow chart 4300 of user 110 experience during a transformed virtual power plant capacity unit or security life cycle. In some embodiments the user 110 may login 4301 to the system which requires the user to go to a plurality of menu options 4302 or user input for origin and destination of virtual power plant capacity hubs 4311 alongside user inputs of time and date 4312 for a given specification that may contain a subset or superset of attributes such as virtual power plant mode make 4015, virtual power plant mode model type 4025, virtual power plant model year 4035, cheapest virtual power plant route 1011, single virtual power plant mode 1012, multi virtual power plant modal 1013, fastest virtual power plant route 1014, most virtual power plant scenic 1015, highest virtual power plant rating 1016, most virtual power plant available 1017, highest virtual power plant volume 1018, most virtual power plant frequent 1019, service level 1020, security and safety 1021, group restricted 1022, modes 810, virtual power plant 811, air 812, autonomous vehicle 813, bike 814, boat 815, bus 816, drone 817, limo 818, motorcycle 819, moped 820, shuttle 821, spaceship 822, subway 823, business 824, train 825, fastest optimized 826, cheapest route 827, home, residential, industrial 828, cargo 829, virtual 830, eScooter, eBike, eSkates, eBoards, order types 710, 720, term specification 600, timing specification 500, virtual power plant hub end point 230 and virtual power plant start point 220, or a plurality of other specifications. In some embodiments, the user may save a route to the "My VPP" 4313 in "Add My VPP" 4314 whereby the user virtual power plant route is saved in the system for one touch retrieval in the future. In some embodiments, the user may enter a price or quantity to buy or sell a transformed virtual power plant capacity unit or security of a given specification or specification combination 4303 which has many steps involved with the transformation of the virtual power plant capacity unit or security. In some embodiments, additional data transformations occur to process 4305, market navigation virtual power plant route options and indexing 4305, virtual power plant hub or virtual power plant hub combination data transformations 4305, virtual power plant capacity unit transformations 4305 and many other subsets or supersets of transformed virtual power plant capacity unit combinations and combination specifications 4305. In some embodiments, if a transformed virtual power plant capacity unit or security matches 4306 in price and specification, then the transformed virtual power plant capacity unit or security moves into delivery 4308 and the deliver process has many steps of electric signal handoff 4308, 4309 and security checks 4308, 4309, 911 system checks 4308, 4309, GPS server and user 110 position checks 4308, 4309 as well as virtual power plant capacity unit rating checks 4308, 4309 and many other possible checks for all the data elements of the transformed virtual power plant capacity unit or security for verification of delivery 4308, 4309. In some embodiments, if prices of the buyer and seller queue do not match 4307, then the steps of processing 4304, 4305, 4306 repeat until a match is made 4306 to 4308 or an order is cancelled before it expires for the transformed virtual power plant capacity unit or security.

Figure 44:
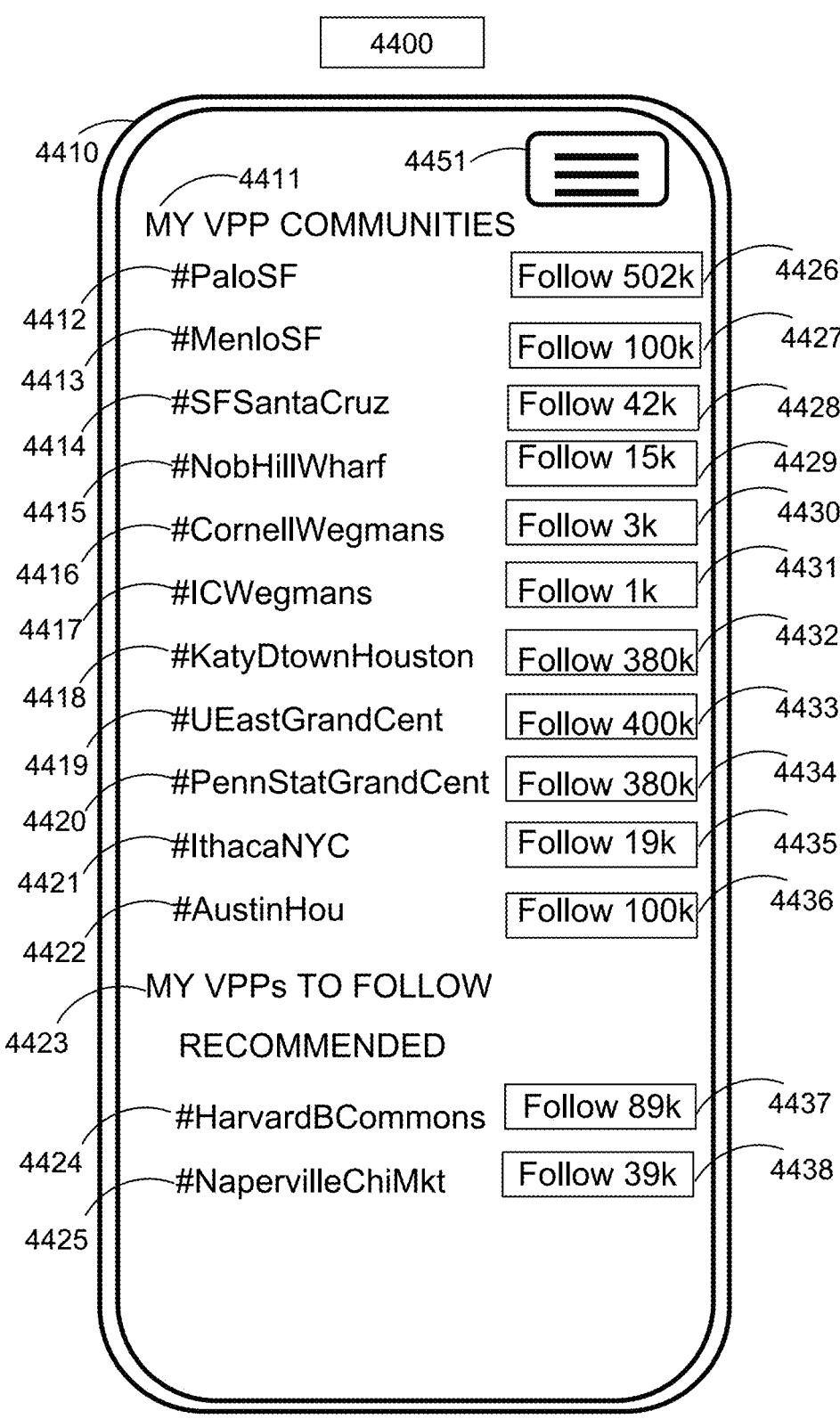
FIG. 44 illustrates an exemplary user interface of virtual power plant interval object community linked subject sequences with associated price-time priority queues as community object(s) to which users may subscribe.

FIG. 44 illustrates an exemplary user interface 4410 for the My VPP Communities functions 4411. In some embodiments, the user interface 4410 may have a menu option 4451 to move to other areas of the method and system. In some embodiments, the virtual power plant capacity hub sequence as an object may be meta data tag #PaloSF 4412 to represent Palo Alto, California to San Francisco, California. In some embodiments, #PaloSF 4412 may have an option for the user 110 to Follow or Join or subscribe, or add 4426 the virtual power plant capacity hub sequence #PaloSF 4412. In some embodiments, the number of followers or network members who are joined to that community object transformed data structure 4412 are 502 k 4426. In some embodiments, the virtual power plant capacity hub sequence as an object may be meta data tag #MenloSF 4413 to represent Menlo Park, California to San Francisco, California. In some embodiments, #MenloSF 4413 may have an option for the user 110 to Follow or Join or subscribe, or add 4427 the virtual power plant capacity hub sequence #MenloSF 4413. In some embodiments, the number of followers or network members who are joined to that community object transformed data structure 4413 are 100 k 4427. In some embodiments, the virtual power plant capacity hub sequence as an object may be meta data tag #SFSantaCruz 4414 to represent San Francisco, California to Santa Cruz, California. In some embodiments, #SFSantaCruz 4414 may have an option for the user 110 to Follow or Join or subscribe, or add 4428 the virtual power plant capacity hub sequence #SFSantaCruz 4414. In some embodiments, the number of followers or network members who are joined to that community object transformed data structure 4414 are 42 k 4428. In some embodiments, the virtual power plant capacity hub sequence as an object may be meta data tag #NobHillWharf 4415 to represent Nob Hill San Francisco, California to Fishermans Wharf, San Francisco, California. In some embodiments, #NobHillWharf 4415 may have an option for the user 110 to Follow or Join or subscribe, or add 4429 the virtual power plant capacity hub sequence #NobHillWharf 4415. In some embodiments, the number of followers or network members who are joined to that community object transformed data structure 4415 are 15 k 4429. In some embodiments, the virtual power plant capacity hub sequence as an object may be meta data tag #CornellWegmans 4416 to represent Cornell University, Ithaca, NY to Wegmans, Ithaca, NY. In some embodiments, #CornellWegmans 4416 may have an option for the user 110 to Follow or Join or subscribe, or add 4430 the virtual power plant capacity hub sequence #CornellWegmans 4416. In some embodiments, the number of followers or network members who are joined to that community object transformed data structure 4416 are 3 k 4430. In some embodiments, the virtual power plant capacity hub sequence as an object may be meta data tag #ICWegmans 4417 to represent Ithaca College, Ithaca, NY to Wegmans, Ithaca, NY. In some embodiments, #ICWegmans 4417 may have an option for the user 110 to Follow or Join or subscribe, or add 4431 the virtual power plant capacity hub sequence #ICWegmans 4417. In some embodiments, the number of followers or network members who are joined to that community object transformed data structure 4417 are 1 k 4431. In some embodiments, the virtual power plant capacity hub sequence as an object may be meta data tag #KatyDtownHouston 4418 to represent Katy, Texas to Houston, Texas. In some embodiments, #KatyDtownHouston 4418 may have an option for the user 110 to Follow or Join or subscribe, or add 4432 the virtual power plant capacity hub sequence #KatyDtownHouston 4418. In some embodiments, the number of followers or network members who are joined to that community object transformed data structure 4418 are 380 k 4432. In some embodiments, the virtual power plant capacity hub sequence as an object may be meta data tag #UEastGrandCent 4419 to represent Upper East Side, NYC to Grand Central Station, NYC. In some embodiments, #UEastGrandCent 4419 may have an option for the user 110 to Follow or Join or subscribe, or add 4433 the virtual power plant capacity hub sequence #UEastGrandCent 4419. In some embodiments, the number of followers or network members who are joined to that community object transformed data structure 4419 are 400 k 4433. In some embodiments, the virtual power plant capacity hub sequence as an object may be meta data tag #PennStatGrandCent 4420 to represent Penn Station, NYC to Grand Central Station, NYC. In some embodiments, #PennStatGrandCent 4420 may have an option for the user 110 to Follow or Join or subscribe, or add 4434 the virtual power plant capacity hub sequence #PennStatGrandCent 4420. In some embodiments, the number of followers or network members who are joined to that community object transformed data structure 4420 are 280 k 4434. In some embodiments, the virtual power plant capacity hub sequence as an object may be meta data tag #IthacaNYC 4421 to represent Ithaca, NY to Grand Central Station, NYC. In some embodiments, #IthacaNYC 4421 may have an option for the user 110 to Follow or Join or subscribe, or add 4435 the virtual power plant capacity hub sequence #IthacaNYC 4421. In some embodiments, the number of followers or network members who are joined to that community object transformed data structure 4421 are 19 k 4435. In some embodiments, the virtual power plant capacity hub sequence as an object may be meta data tag #AustinHou 4422 to represent Austin, TX to Houston, TX. In some embodiments, #AustinHou 4422 may have an option for the user 110 to Follow or Join or subscribe, or add 4436 the virtual power plant capacity hub sequence #AustinHou 4422. In some embodiments, the number of followers or network members who are joined to that community object transformed data structure 4422 are 100 k 4436. In some embodiments, the virtual power plant capacity hub sequences may be recommended 4423 to follow as an object may be meta data tag #HarvardBCommons 4424 to represent Harvard, Cambridge, Mass to Boston Commons. In some embodiments, #HarvardBCommons 4424 may have an option for the user 110 to Follow or Join or subscribe, or add 4437 the virtual power plant capacity hub sequence #HarvardBCommons 4424. In some embodiments, the number of followers or network members who are joined to that community object transformed data structure 4424 are 89 k 4437. In some embodiments, the virtual power plant capacity hub sequences may be recommended 4423 to follow as an object may be meta data tag #NapervilleChiMkt 4425 to represent Naperville, Chicago to Marketplace, Chicago, Ill. In some embodiments, #NapervilleChiMkt 4425 may have an option for the user 110 to Follow or Join or subscribe, or add 4438 the virtual power plant capacity hub sequence #NapervilleChiMkt 4425. In some embodiments, the number of followers or network members who are joined to that community object transformed data structure 4425 are 39 k 4438.

Figure 45:
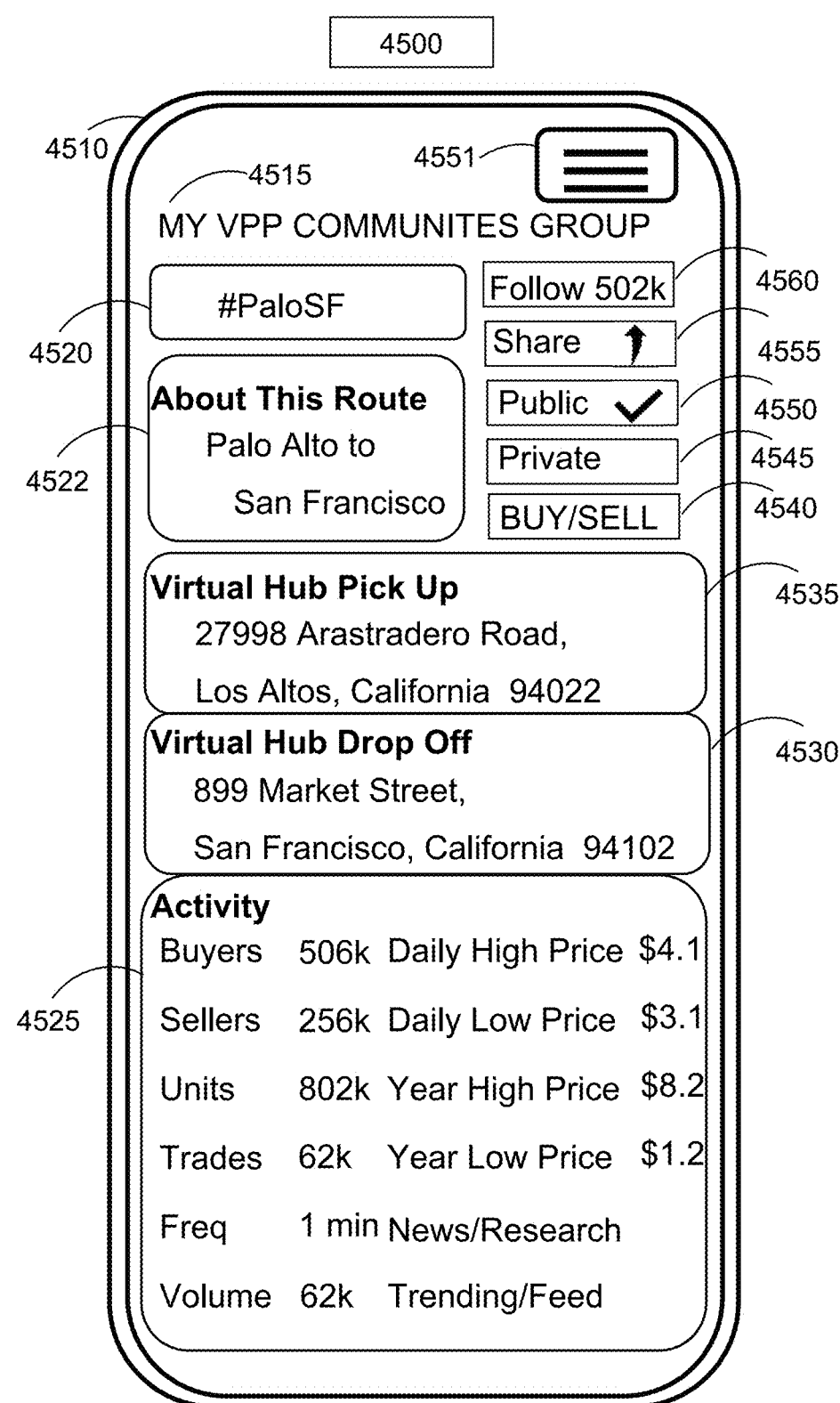
FIG. 45 illustrates an exemplary user interface of an exemplary virtual power plant interval object community linked subject sequence as a community object with associated price-time priority queues and the associated attributes.

FIG. 45 illustrates an exemplary user interface 4500 for the My VPP Communities Group 4515 for a specific transformed data structure of a transformed community virtual power plant hub sequence 4520. In some embodiments, the meta data virtual power plant hub sequence #PaloSF 4520 may list the long form route details in the about the route section 4522. In some embodiments, the specific hub sequence #PaloSF 4520 may list the amount of followers and an option to follow 4560. In some embodiments, the specific virtual power plant hub sequence #PaloSF 4520 may list the ability to share the community group with another social network or text or email or other network protocol. In some embodiments, the specific virtual power plant hub sequence #PaloSF 4520 may list group as public 4550 or private 4545. In some embodiments, the specific hub sequence #PaloSF 4520 may list gateway to buy or sell 4540 transformed virtual power plant capacity units using the LOB 300 for a commute community 241. In some embodiments, the specific virtual power plant hub sequence #PaloSF 4520 may list specific pick up hub address location 4535 or drop off point address 4530. In some embodiments, the specific hub sequence #PaloSF 4520 may list the activity statistics and data with respect to the number of buyers 4525, number of sellers 4525, number of units 4525, number of trades 4525, frequency of virtual power plant capacity units 4525, volume of virtual power plant capacity units 4525, daily high price for virtual power plant capacity units 4525, daily low price for virtual power plant capacity units on the community object of #PaloSF 4520, yearly high price 4525, yearly low price 4525, news, research, trending, feeds for the #PaloSF 4520 virtual power plant hub sequence.

Figure 46:
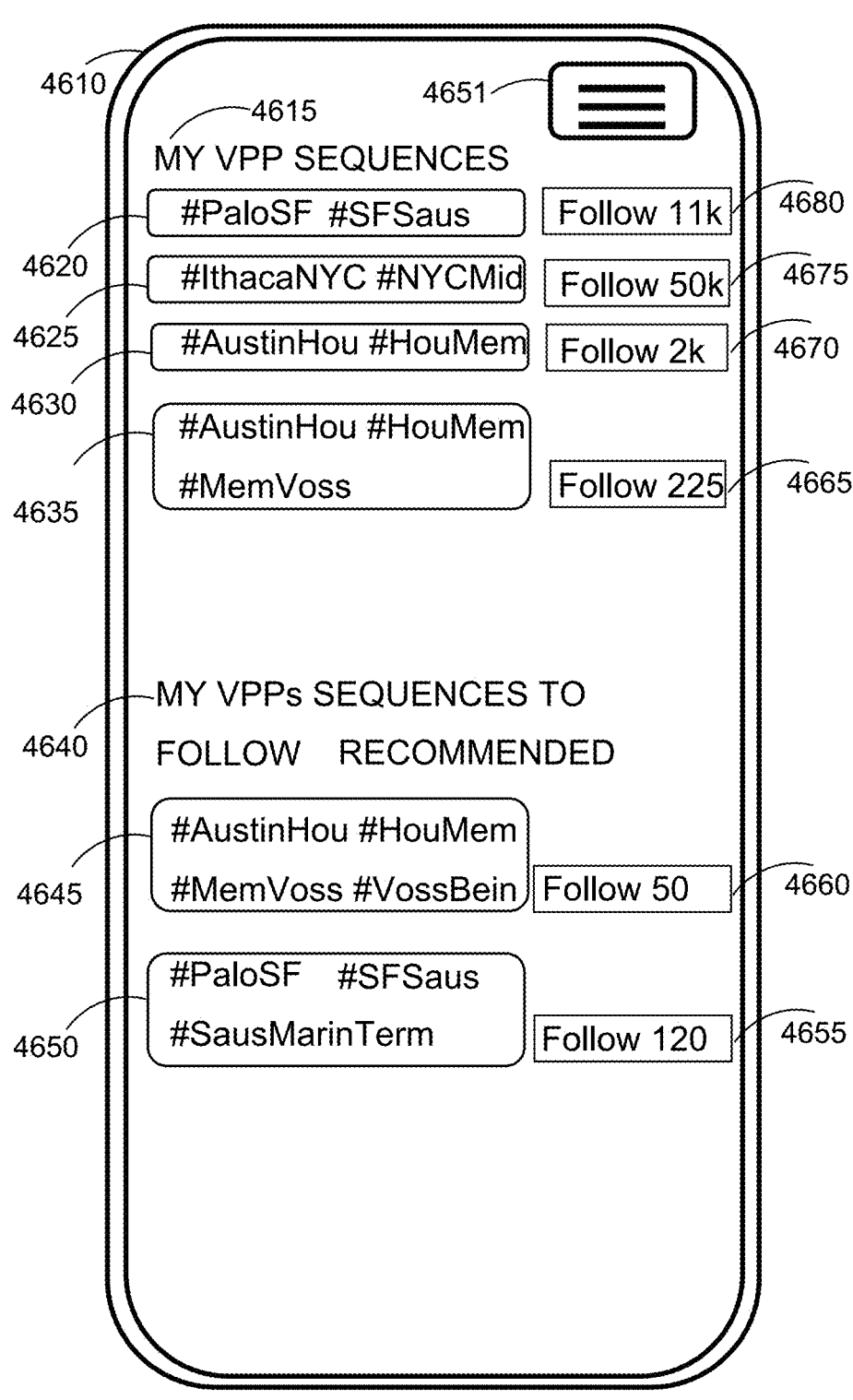
FIG. 46 illustrates an exemplary multi-virtual hub sequence virtual power plant interval object community linked object combination with associated price-time priority queues.

FIG. 46 illustrates an exemplary user interface 4600 with respect to My VPP Sequences 4615 which may transform sequences with more than two virtual power plant hubs into sequences as two or three or more series of route sequences 4620. In some embodiments, #PaloSF #SFSaus 4620 may represent an origin virtual hub sequence of Palo Alto, California to San Francisco, California followed by a secondary sequence of San Francisco, California to Sausalito, California 4620. Multi leg virtual power plant hub sequences allow for the power of the data transformation to link the villages, cities or states from a network virtual power plant capacity topology structure from multiple providers of virtual power plant capacity units to provide higher levels of frequency and market opportunity to link public and private systems among many other benefits. In some embodiments, #PaloSF #SFSaus 4620 may allow input from users to join, follow, subscribe or become a member of multi leg sequences which help solve potential last mile issues within virtual power plant capacity systems 4680. In some embodiments, #IthacaNYC #NYCMid 4625, may allow for a virtual power plant capacity unit seller or buyer to connect two disparate virtual power plant capacity networks to provide last mile virtual power plant capacity to a destination at the lowest market cost because each leg or series of virtual hub sequences has an independent market associated with the leg or virtual power plant hub sequence #IthacaNYC #NYCMid 4625. In some embodiments, #IthacaNYC #NYCMid 4625 may allow input from users to join, follow, subscribe or become a member of multi leg sequences which help solve potential last mile issues within virtual power plant capacity systems 4675. In some embodiments, three two leg sequences may be attached through data transformations such that #AustinHou then takes a virtual power plant capacity unit to #HouMem which then takes a virtual power plant capacity unit to #MemVoss. The #AustinHou #HouMem #MemVoss 4635 three leg virtual power plant hub sequence combination may further solve issues for virtual power plant buyers and sellers where inefficiencies are an issue 4665 or private virtual power plants simply are going a different direction, but the sequence community object transformation helps buyers and sellers understand options and piece multiple virtual power plant capacity systems onto a single community based virtual power plant object to aggregate communication and transaction benefits of the system. In some embodiments, prior history navigation searches and locations may be used to build recommended additional sequences 4640 which may be recommended for users to subscribe, join, follow or become a member. In some embodiments, the virtual power plant hub route sequence may link 4 or more virtual power plant hub sequence pairs or even combinations of already linked community object pairs 4645. In some embodiments, #AustinHou #HouMem #MemVoss #VossBein 4645 may be linked to provide a sequence to a buyer or seller from Austin to the Memorial Area of Houston in a specific address. Traversing a series of linked virtual power plants may allow for the cost of non-linked virtual power plant to be dramatically lower due to using a series of connected local units which may be 10 times the cost. The transformed virtual power plant hub sequence methodology allows for virtual power plant capacity systems to be integrated in ways that were not formerly possible because the systems were disparate or simply did not allow for linked virtual power plants or linked community objects that could optimize topological network structures over existing inefficient structures. In some embodiments, virtual hub sequences which have been linked 4645 may also allow users to subscribe 4660. In some embodiments, #PaloSF #SFSaus #SausMarinTerm 4650 may be linked to provide a sequence to a buyer or seller from Palo Alto, California to Marin Terminal in Sausalito, California in a specific address. In some embodiments, virtual hub sequences which have been linked 4650 may also allow users to subscribe 4655.

Figure 47:
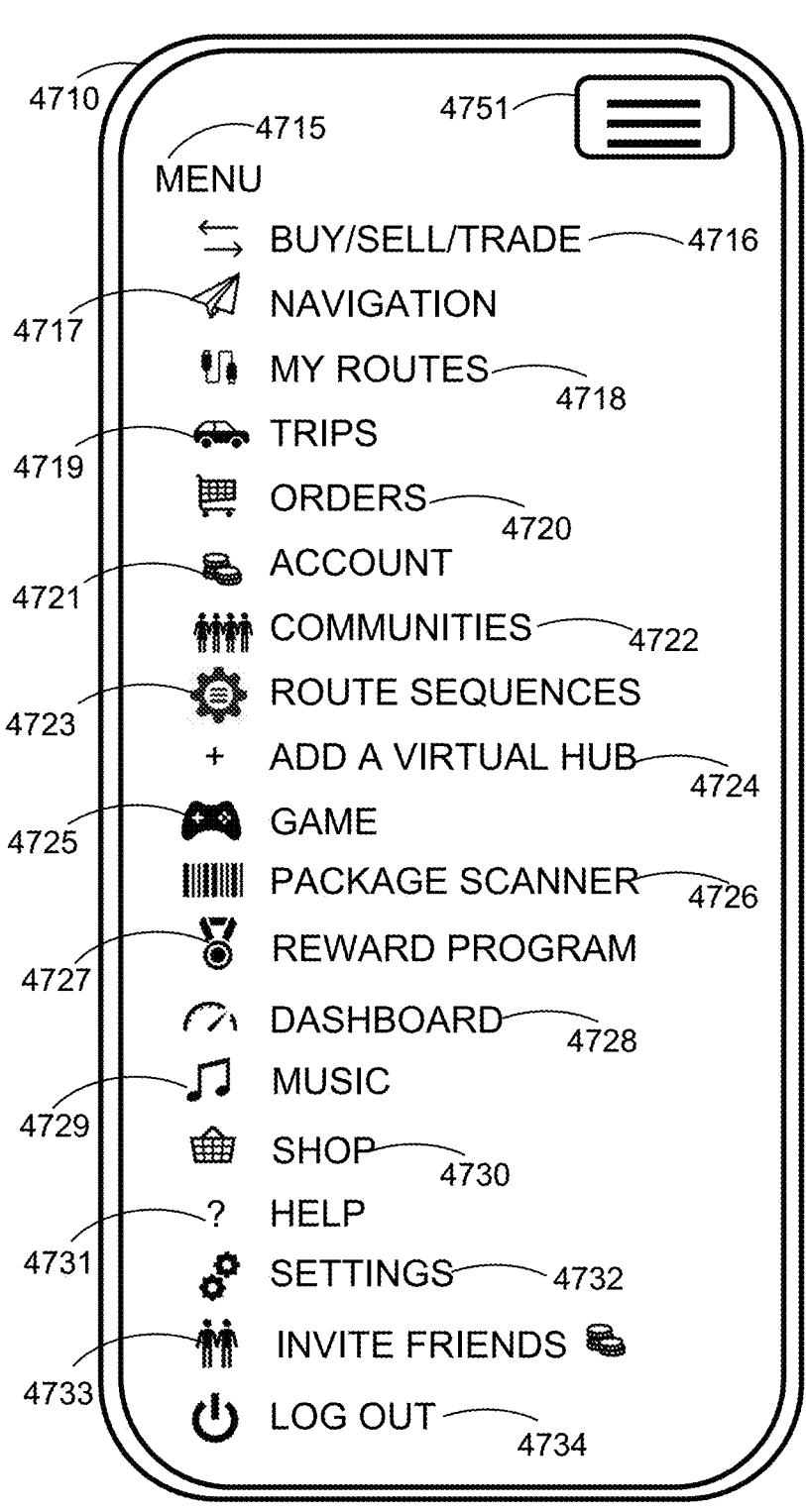
FIG. 47 illustrates an exemplary menu user interface for the method and system of virtual power plant interval object community linked subject time interval object sequence unit market with associated price-time priority queues system and method.

FIG. 47 illustrates an exemplary user menu interface 4700. In some embodiments, menu options may list as buy/sell/trade 4716 to go to the virtual power plant community linked transmission unit gateway trading platform for virtual power plant hub combinations and virtual power plant hub sequences. In some embodiments, the user interface may allow a user to go to the virtual power plant transmission navigation 4717 module for price based virtual power plant transmission navigation or route selection based on cost or earnings from a route as described in U.S. patent application Ser. No. 16/242,967, "Price Based Navigation," filed Jan. 8, 2019; the entirety of which is incorporated by reference herein. Furthermore, as described in U.S. Patent Application Publication, Ser. No. 15/877,393, "Electronic Forward market exchange for transmission seats and capacity in transportation spaces and vehicles," filed Jan. 23, 2018, the entirety of which is incorporated by reference herein. In some embodiments, a user 110 may select my routes 4718 to toggle to routes that are important to their user profile or needs in the network member database. In some embodiments, virtual power plant 4719 may be selected to toggle to the virtual power plant delivery view. In some embodiments, orders 4720 may be selected to toggle to cancel or adjust orders in the system that are unfilled. In some embodiments, users may toggle to the account 4721 page or time and data community linked communities object page 4400 or the virtual power plant route sequences page 4723. In some embodiments, users 110 may add additional hubs 4724 or may toggle to the virtual power plant gaming interface 3700. In some embodiments, virtual power plant community linked time and data transmission units may need to be scanned on the time and data scanning module 4726. In some embodiments, users may select the virtual power plant reward program module 4727 or the dashboard module 4728. In some embodiments, the user may select the virtual power plant music 4729 or virtual power plant shopping module 4730. In some embodiments, the user may select virtual power plant help 4731 or settings 4732 to update account information or privacy settings. In some embodiments, users 110 may invite friends 4733 for rewards or bonuses or cash or credits 4733. In some embodiments, users may also logout 4734.

Figure 48:
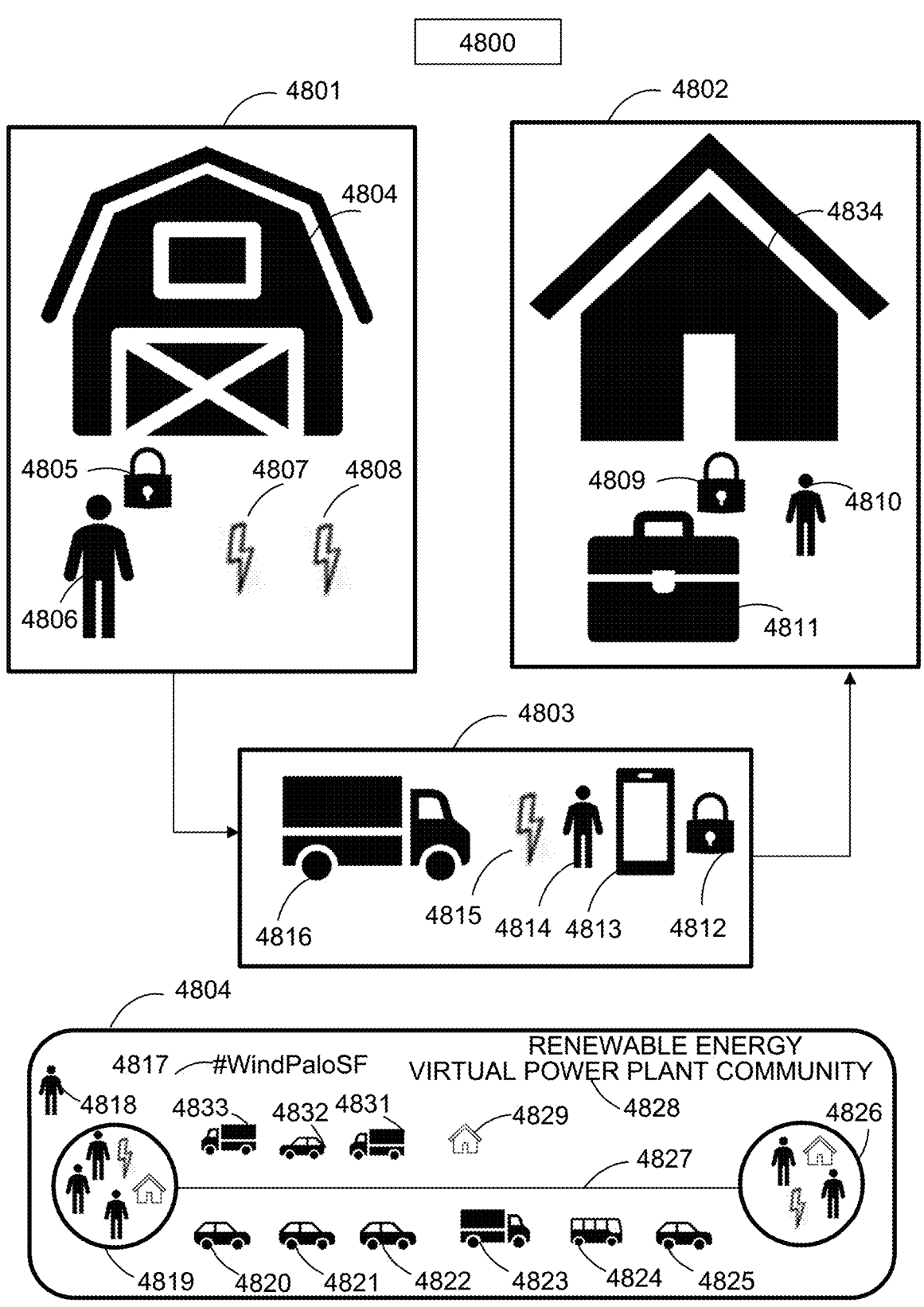
FIG. 48 illustrates an exemplary virtual power plant configuration with a social network virtual power plant object for the method and system of virtual power plant interval object community linked time interval object price-time priority queues with delivery security sequence.

FIG. 48 illustrates an exemplary formation of a virtual power plant sequence 4801, 4802 where residential, industrial and commercial virtual power plant objects my producer or consume power in a plurality of community object settings which may include smart meters, meters, connected appliances, connected distributed generation, net metering and power inverters. In one embodiment, the renewable energy virtual power plant community 4828 may consist of a wind farm in Palo Alto, California 4817 with a plurality of users 4818, 4819, 4826, 4806, 4810, 4814. In some embodiments, the virtual power plant object 4801 may consist of a commercial or industrial unit 4804 which may be unlocked by the device 4813 to provide power from solar or wind or natural gas or a plurality of other power producing methods 4807, 4808. In one embodiment, a user 4810 may control a residential virtual power plant unit 4802 comprised of a residential unit 4834 with solar on the roof as well as a plurality of devices 4809, 4811 which may be optimized by the optimization step in the method 5100-7100. In some embodiments, the optimization method step 5100-7100 may also include a plurality of stationary industrial, commercial or residential units 4829 or mobile units 4833, 1832, 1831, 4820, 4821, 4822, 4823, 4824, 4825 between a plurality of virtual plant power hubs 4819, 4827, 4826. In some embodiments, the optimization step 5100-7100 may produce a plurality of efficient power weights for a portfolio of power consuming and producing virtual power plants units 4801, 4802. In some embodiments, the weights assigned to power objects 4816, 4815, 4813, 4812 which may include smart meters, meters, connected appliances, connected distributed generation, net metering and power inverters may be then received and delivered against other virtual power plant objects 4801, 4802, 4803, 4804.

FIG. 49 illustrates an exemplary user interface for an energy product uplink interface for optimization fuels which produce power 4901. In some embodiments, the user interface for uplink or upload 4902 many include fields for product, quantity, specification, price, date and time 4903. In some embodiments, the link field 4904 may include electricity, solar, kWH, MWH quantity, solar power specification quality, price and a date and time. In some embodiments, the link field 4905 may include electricity, wind, kWH, MWH quantity, wind power specification quality, price and a date and time. In some embodiments, the link field 4906 may include electricity, biomass, kWH, MWH quantity, biomass power specification quality, price and a date and time. In some embodiments, the link field 4907 may include electricity, geothermal, kWH, MWH quantity, geothermal power specification quality, price and a date and time. In some embodiments, the link field 4908 may include electricity, hydro, kWH, MWH quantity, hydro power specification quality, price and a date and time. In some embodiments, the link field 4909 may include electricity, tidal, kWH, MWH quantity, tidal power specification quality, price and a date and time. In some embodiments, the link field 4911 may include electricity, hydrogen, kWH, MWH quantity, hydrogen power specification quality, price and a date and time. In some embodiments, the link field 4912 may include electricity, moon, kWH, MWH quantity, moon power specification quality, price and a date and time. In some embodiments, the link field 4914 may include electricity, plant, kWH, MWH quantity, plant power specification quality, price and a date and time. In some embodiments, the link field 4913 may include electricity, chlorophyll, kWH, MWH quantity, chlorophyll power specification quality, price and a date and time. In some embodiments, the link field 4921 may include electricity, natural gas, oil, coal, nuclear, kWH, MWH quantity, natural gas, oil, coal, nuclear power specification quality, price and a date and time. In some embodiments, the virtual power plant may consist of a plurality of nodes which represent power producing nodes 4916, power transmission nodes 4917, power transmission 4918 and end use or production location such as 4919 and 4920.

Figure 50:
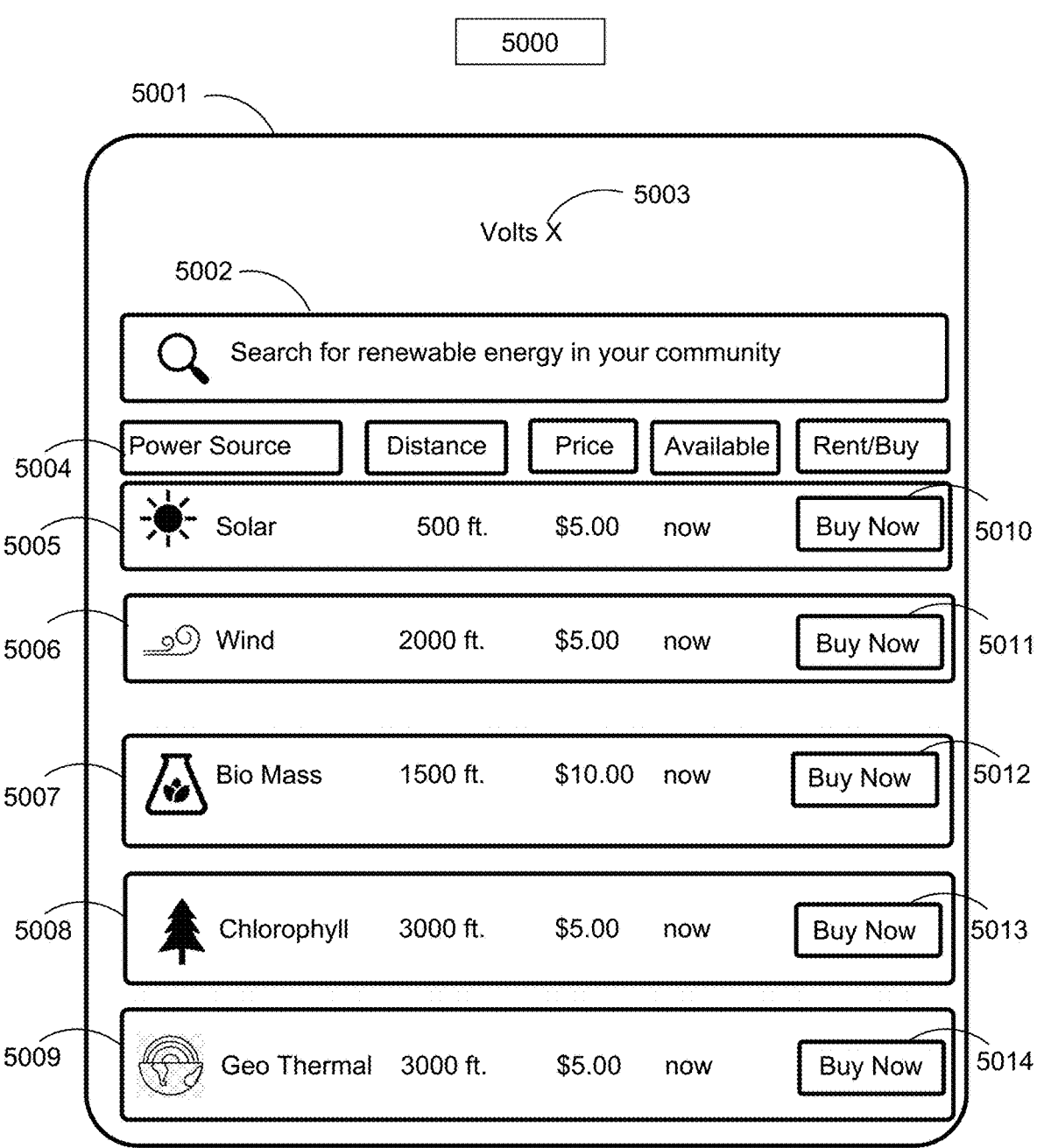
FIG. 50 illustrates an exemplary virtual power plant interval object unit search interface with the virtual power plant interval object community linked subject time interval object subject sequence unit market with associated price-time priority queues.

FIG. 50 illustrates an exemplary view of the virtual power plant search function 5002 to price virtual power plant alternatives for a plurality of users. In some embodiments, the user interface or multi-function device 5001 may have a logo such as VoltsX 5003. In some embodiments, the user interface may be comprised of a search engine input field 5002 for a plurality of power producing or consuming methods. In some embodiments, the title or header fields may include power source, distance, price, availability, buy fields 5004. In some embodiments, the production sale or purchase consume options may include solar 5005 with a distance of 500 feet at a price of $5.00 which is available now and the user may select buy now option 5010. In some embodiments, the production sale or purchase consume options may include wind 5006 with a distance of 2000 feet at a price of $5.00 which is available now and the user may select buy now option 5011. In some embodiments, the production sale or purchase consume options may include biomass 5007 with a distance of 1500 feet at a price of $10.00 which is available now and the user may select buy now option 5012. In some embodiments, the production sale or purchase consume options may include chlorophyll 5008 with a distance of 3000 feet at a price of $5.00 which is available now and the user may select buy now option 5013. In some embodiments, the production sale or purchase consume options may include geo thermal 5009 with a distance of 3000 feet at a price of $5.00 which is available now and the user may select buy now option 5014.

Figure 51:
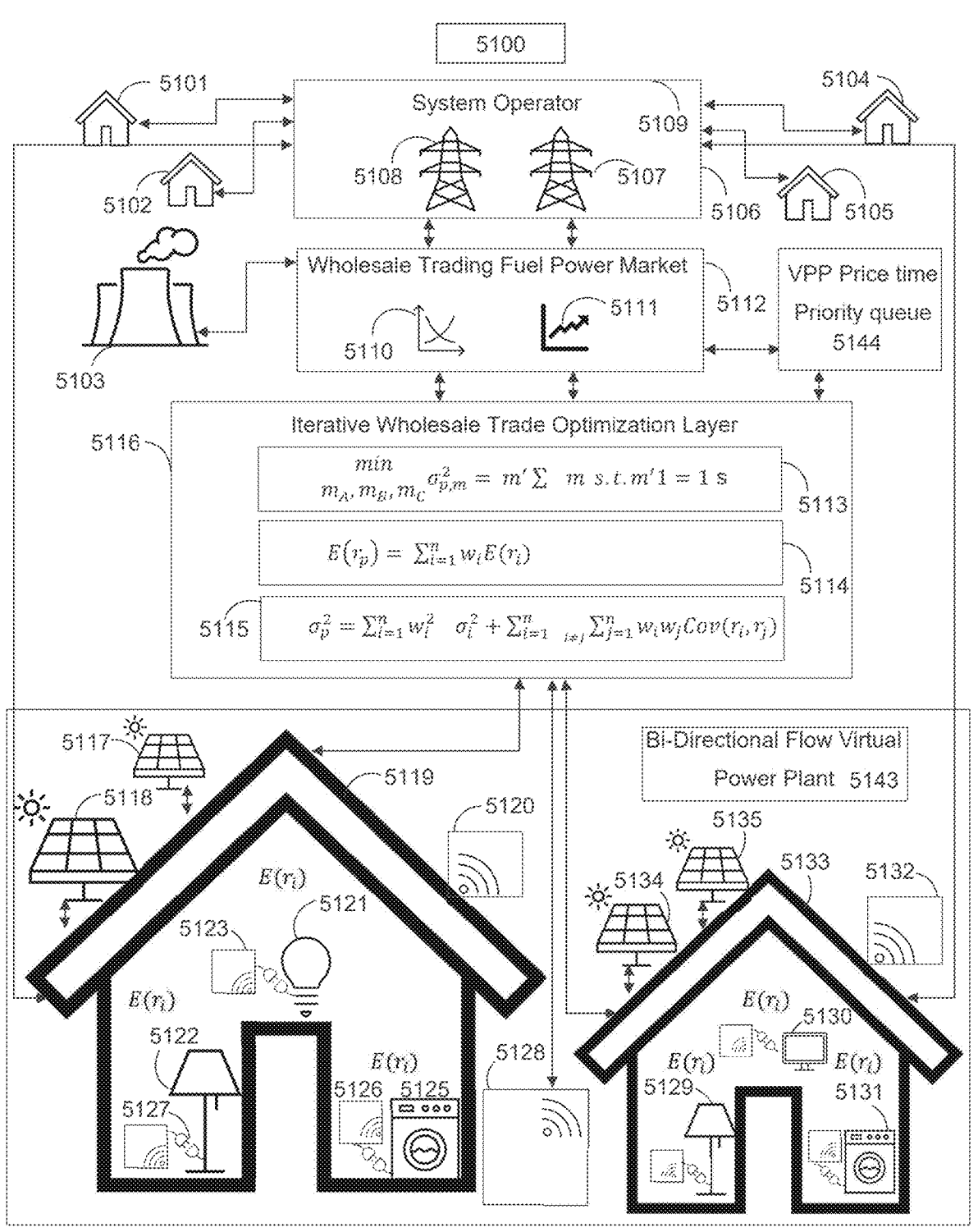
FIG. 51 illustrates an exemplary virtual power plant iterative optimization sequence of minimizing the variance of the objective utility function subject to a set expected value portfolio return corroborated with the price time priority queue and a plurality of virtual power plant objects.

FIG. 51 illustrates an exemplary step and flow chart for the plurality of steps of the optimization of a virtual power plant. In some embodiments, the steps may include, receive a power load quantity of generation or consumption over a plurality of power producing 5117 and consuming units 5119; calculate the expected value return 5121 and return variance and return correlation of a matrix 5115 of multi-dimensional power producing 5117 and consuming 5127 units and unit alternatives using current, historical and forward values; minimize the variance of an objective function which weights power producing and consuming units and unit alternatives for a given objective function of expected value return 5113; process the optimal energy unit portfolio positive and negative weights for the expected portfolio value with the energy unit price time priority queue to request user market execution approval 5116; process user execution approval for positive and negative weights of the optimized objective function 5116 with instructions to the power producing and consuming unit and unit alternative devices to produce or curtail output; process objects through the price-time priority queue 5144 to the wholesale market 5112 in corroboration with scheduling for the independent system operator 5106. In some embodiments, virtual power plant may consist of a single residential, commercial or industrial unit 5119 which may include smart meters, meters, connected appliances, connected distributed generation, net metering and power inverters or a plurality of units 5101, 5104, 5105, 5102 which have formed a social network virtual power plant object for the virtual power plant price time priority queue for trading 5144 with the wholesale market 5112. In some embodiments, the virtual power plant may compete with a physical power plant 5103 which may produce power from natural gas, coal, nuclear, oil, thermal, hydro, solar, biomass or a plurality of other methods. In some embodiments, the iterative wholesale trade optimization layer 5116 is the organizational method that takes the virtual power plant objects 5121, 5130, 5131, 5135 and organizes the producing and consuming objects to efficient outcomes for trading with the virtual power plant price time priority queue layer 5144. In some embodiments, a virtual power plant may consist of multiple energy producing solar units 5118, 5117 as well as multiple energy consuming devices such as a lamp 5122, wall light 5121, washing machine 5125 as well as wifi connected outlet apparatus 5123, 5127, 5126 which may collect and transmit data for electricity consumption and production levels as well as regulate the weight outcomes from the optimization instructions 5116 which lead to superior outcomes than rule based systems. In some embodiments, the volatility, covariance and variance virtual power plant portfolio equation step 5115 leads to less wear and tear on electric production and consumption motors as well as smoothing grid performance with lower variability over power lines 5108, 5107. In some embodiments the expected value 5114 of each power producing device such as the solar units 5117, 5118 and consumption devices 5123, 5121 have expected values that compare not only usage with the wholesale electric grid 5112 for trading and optimization outcomes, but also risk adjusted return. The overall minimization of the variance covariance matrix 5113 subject to a target expected return threshold 5114 is the essence of the overall step transformation which also includes the feeding of optimized portfolio devices which produce and consume power into the price time priority queue, but also the social network structure of the virtual power plant which may include smart meters, meters, connected appliances, connected distributed generation, net metering and power inverters. In some embodiments, the residential, commercial and industrial virtual power plant units 5119 have one or more parent control devices 5120, 5128 to provide redundancy of power use and alternative use features of the system. In some embodiments, the control box 5128 may also contain an inverter and battery storage which may include smart meters, meters, connected appliances, connected distributed generation, net metering and power inverters. In some embodiments, the residential, commercial and industrial facility 5133 may be coupled or grouped with another facility 5119 to combine one social network virtual power plant object. In some embodiment, the devices and portfolio optimization may occur over single portfolios 5133 or 5119 or 5119 and 5133 together or many other combinations thereof. In some embodiments, a computer 5130 may have an expected return value 5130 a lamp 5129 may have an expected value and a washer machine may have an expected value 5131. In some embodiments, the solar units 5135 and 5134 may have bi-directional flow capability with the inverter 5132 or battery 5132. In some embodiments, the multi-dimension virtual power plant may optimize not only against one unit 5133, 5119, 5102, 5105, but also across the portfolio of units so that a user may decide to not go to work if the incentive is high enough compared to transportation dimension costs or room heating, air conditioning or power costs from virtual meetings rather than in person meetings which may have higher associated costs across the virtual power plant portfolio.

FIGS. 52A and 52B illustrates an exemplary representative multi dimension coordinate virtual power plant object portfolio with heterogeneous expectations. Traditionally the buyer and seller have very different information or in another words, the buyer and seller have asymmetric information. In an exemplary scenario, the seller or producer or virtual power plant data or units knows the attributes whereas the buyer or user may make a purchase without knowing the attributes of the virtual power plant which is a large deficiency in current virtual power plant software and hardware. Surely the buyer or user can do research on all the virtual power plant portfolios, but generally the buyer does not have the same resources as the producer or seller or virtual power plant provider to understand the effects of the virtual power plant attributes on the virtual power plant rendering which may leave many deficiencies in the virtual power plant. Incrementally, the seller may collect incremental information from the buyer without the buyers full consent or knowledge. The implementation of the method considers that it is very costly for buyers and sellers of virtual power plant data or virtual power plant units or multi dimensional coordinate object data to have homogeneous information or even to reduce heterogeneous information so that people make less sub-optimal data choices as consumers or that providers offer the wrong types of data to their primary demographics and customers. The implementation of the method has provided a solution for these problems and has greatly reduced or nearly eliminated the problem of heterogeneous information on data relative to limited portions of multi dimension coordinate object data. The implementation of the method allows both the user and the data provider to speak the same language of data multi dimension virtual power plant coordinate objects for the multi dimension virtual power plant coordinate object utility function preferences. The implementation of the method allows both the user and data provider to speak the same language of data for the respective sound, sensory, image, latitude, longitude, altitude, time, weather, scale, micro scale, nano scale, chemistry, color, aperture, lens speed, type, fuel heat rates, power load or generation dimensions, cross product and additional nth dimension preferences. In some embodiments, additional power dimension analysis for travel and even meetings have historically have been costly which add to the problem of heterogeneous information between provider and consumer. The method and system may reduce the overall travel pollution or even wasted power or fuel resources of the user by providing mathematically rigorous data for the respective sound, sensory, image, latitude, longitude, altitude, time, weather, scale, micro scale, nano scale, chemistry, color, aperture, lens speed, type, fuel heat rate, power load and power generation factors, cross product and additional nth dimension preferences for the multi dimension virtual power plant coordinate object utility function preferences. To quantify embodiments of the method and system 5200, FIG. 52A illustrates a general virtual power plant utility function. The system and method assigns a utility function or "Virtual Power Plant Score" or VPP 6410 to their multi dimension virtual power plant coordinate object preferences which ranks through a series of neural network feedback on respective sound, sensory, image, latitude, longitude, altitude, time, weather, scale, micro scale, nano scale, chemistry, color, aperture, lens speed, type, power factor, fuel heat rates, travel, alternative room, legal blockchain attributes, cross product and additional nth dimension preferences for the multi dimension virtual power plant coordinate object utility function preferences. The equation 5210 has the following variables, VPP(virtual power plant object score) which is the utility function, E(B multi dimension virtual power plant coordinate object) which is the current expected virtual power plant utility value of a portfolio of multi dimension virtual power plant coordinate objects minus 0.005 which is a scaling convention that allows the system and method to express the current multi dimension virtual power plant coordinate object expected utility of a portfolio of multi dimension virtual power plant coordinate objects and the standard deviation of those multi dimension virtual power plant coordinate objects to be a percentage rather than a decimal. The term A in 5210, is an index of the users preference which is derived from using neural networks that have been trained on the users preferences. The term A in 5210 is continually updated in a recursive fashion to reflect the user's preferences in travel, waking, sleeping, work, family, play, usage, activity level, reading, showering, bathing, cleaning, cooking or other characteristics. The sigma term squared in 5210 is the variance is of the multi dimension virtual power plant coordinate objects of a portfolio of multi dimension virtual power plant coordinate objects. The utility function or multi dimension object score 5210 represents the notion that the user virtual power plant utility is enhanced or goes up when respective virtual power plant sound, sensory, image, latitude, longitude, altitude, time, weather, scale, micro scale, nano scale, chemistry, color, aperture, lens speed, type, fuel heat rate, power factor, cross product and additional nth dimension expected value is within target and diminished or reduced by high variance multi dimension virtual power plant coordinate objects or multi dimension virtual power plant coordinate objects which brings the user out of target ranges. The extent by which the user is negatively affected by multi dimension virtual power plant coordinate object variance or respective sound, sensory, image, latitude, longitude, altitude, time, weather, scale, micro scale, nano scale, chemistry, color, aperture, lens speed, type, fuel heat rate, power factor, cross product and additional nth dimension variance outside of target ranges depends on the term A in 5210 which is the user's preference index. More sensitive user's may have a higher term A index value as their respective sound, sensory, image, latitude, longitude, altitude, time, weather, scale, micro scale, nano scale, chemistry, color, aperture, lens speed, type, fuel heat rate, power factor, cross product and additional nth dimension is disadvantaged more by respective sound, sensory, image, latitude, longitude, altitude, time, weather, scale, micro scale, nano scale, chemistry, color, aperture, lens speed, type, fuel heat rate, power factor, cross product and additional nth dimension variance and out of range respective sound, sensory, image, latitude, longitude, altitude, time, weather, scale, micro scale, nano scale, chemistry, color, aperture, lens speed, type, fuel heat rate, power factor cross product and additional nth dimension. User's may pick multi dimension virtual power plant coordinate objects or portfolios of multi dimension virtual power plant coordinate objects based on the highest M(multi dimension object score) in the equation 6410. In some embodiments, multi dimension virtual power plant coordinate objects or multi dimension virtual power plant coordinate object combinations may be node ranked based on the distance of the multi dimension virtual power plant coordinate object combination portfolio value and the user utility function 5210 or a plurality of other factors. If a multi dimension virtual power plant coordinate object or portfolio of multi dimension coordinate objects has no variance to multi dimension virtual power plant coordinate object of the user then a selection will have a utility or multi dimension virtual power plant object score of the expected multi dimension object score without variance as the sigma term in equation 5210 is equal to zero. Equation 5210 provides a benchmark for the system and method to evaluate multi dimension virtual power plant coordinate objects against user utility. In the implementation of the method according to equation 5210, the term A determines preferences of the user which then may cause as certain multi dimension virtual power plant coordinate object to be accepted or rejected based upon the effect to respective sound, sensory, image, latitude, longitude, altitude, time, weather, scale, micro scale, nano scale, chemistry, color, aperture, lens speed, type, fuel heat rate, power factor, cross product and additional nth dimension as a portfolio with respect to user utility.

The implementation of the system and method is further represented in equations 5220 to take a simple two state case of multi dimension virtual power plant coordinate objects for an exemplary user. If a user has an respective sound, sensory, image, latitude, longitude, altitude, time, weather, scale, micro scale, nano scale, chemistry, color, aperture, lens speed, type, fuel heat rate, power factor, cross product and additional nth dimension multi dimension virtual power plant coordinate object (each multi dimension virtual power plant coordinate object may be represented as short form "multi dimension virtual power plant coordinate object") represented as a vector of attributes and assume two possible results after including a multi dimension virtual power plant coordinate object or a portfolio of multi dimension virtual power plant coordinate objects with a vector of respective sound, sensory, image, latitude, longitude, altitude, time, weather, scale, micro scale, nano scale, chemistry, color, aperture, lens speed, type, fuel heat rate, power factor, cross product and additional nth dimension. The probability of state one is p for state of multi dimension virtual power plant coordinate object 1 and a probability of (1–p) for the state two of multi dimension virtual power plant coordinate object 2. Accordingly, the expected value of multi dimension virtual power plant coordinate object portfolio as illustrated in the set of equations 5230 is E(B multi dimension virtual power plant coordinate object) equals probability p multiplied by respective sound, sensory, image, latitude, longitude, altitude, time, weather, scale, micro scale, nano scale, chemistry, color, aperture, lens speed, type, fuel heat rate, power factor, cross product and additional nth dimension state 1 plus probability (1–p) multiplied by respective sound, sensory, image, latitude, longitude, altitude, time, weather, scale, micro scale, nano scale, chemistry, color, aperture, lens speed, type, fuel heat rate, power factor, legal blockchain attribute, cross product and additional nth dimension state 2. The variance or sigma squared of the respective sound, sensory, image, latitude, longitude, altitude, time, weather, scale, micro scale, nano scale, chemistry, color, aperture, lens speed, type, fuel heat rate, power factor, cross product and additional nth dimension is represented in 5240.

Figures 53A, 53B:
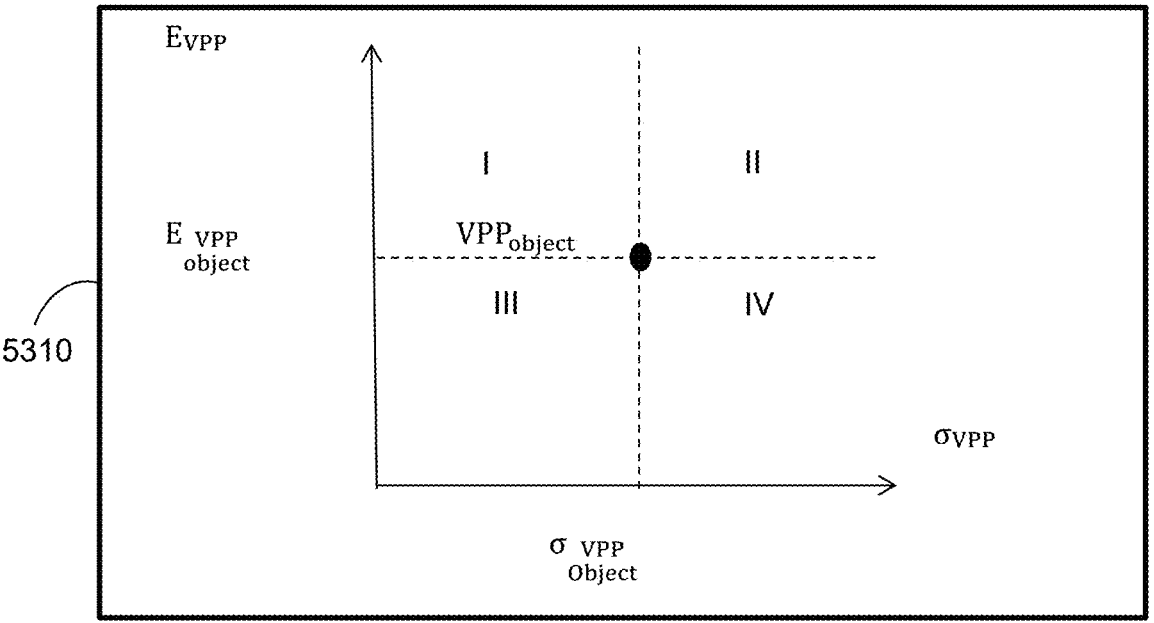
FIGS. 53A and 53B illustrate the embodiment of the method and system in FIG. 53A illustrate an exemplary implementation of methods utilizing a plurality of linear and non-linear equations to maximize multi dimension user portfolio object utility function of the virtual power plant in accordance with some embodiments while 53B represents the inequality condition.

The embodiment of the method and system in FIG. 53A represents the tradeoff between the standard deviation of respective sound, sensory, image, latitude, longitude, altitude, time, weather, scale, micro scale, nano scale, chemistry, color, aperture, lens speed, type, fuel heat rate, power factor, legal blockchain attribute, cross product and additional nth dimension of a multi dimension virtual power plant coordinate object portfolio and the expected return of the respective sound, sensory, image, latitude, longitude, altitude, time, weather, scale, micro scale, nano scale, chemistry, color, aperture, lens speed, type, fuel heat rate, power factor, cross product and additional nth dimension of a portfolio 5310. Multi dimension virtual power plant coordinate object M 5310 is preferred by users with a high term A index value 5310 to any alternative multi dimension virtual power plant coordinate object in quadrant IV 5310 because the expected value of the multi dimension virtual power plant coordinate object is expected to be equal to or greater than any multi dimension virtual power plant coordinate object in quadrant IV and a standard deviation of the multi dimension virtual power plant coordinate object is smaller than any multi dimension virtual power plant coordinate object in that quadrant. Conversely, any multi dimension virtual power plant coordinate object portfolio M in quadrant I is preferable to multi dimension virtual power plant coordinate object portfolio M 5310 because its expected value of the multi dimension virtual power plant coordinate object is higher than or equal to multi dimension virtual power plant coordinate object M 5310 and the standard deviation of the multi dimension virtual power plant coordinate object M is equal to or smaller than multi dimension virtual power plant coordinate object M 5310. FIG. 53B represents the inequality condition. Accordingly, if the expected value of the multi dimension virtual power plant coordinate object of a certain multi dimension virtual power plant coordinate object 1 is greater than or equal to the expected value of the multi dimension virtual power plant coordinate object of a certain multi dimension virtual power plant coordinate object 2 5320 and the standard deviation of the multi dimension coordinate object of a certain multi dimension coordinate object 1 is less than or equal to the standard deviation of the multi dimension virtual power plant coordinate object of a certain multi dimension virtual power plant coordinate object 2 5320, at least one inequality is strict which rules out inequality 6520.

Figures 54A, 54B:
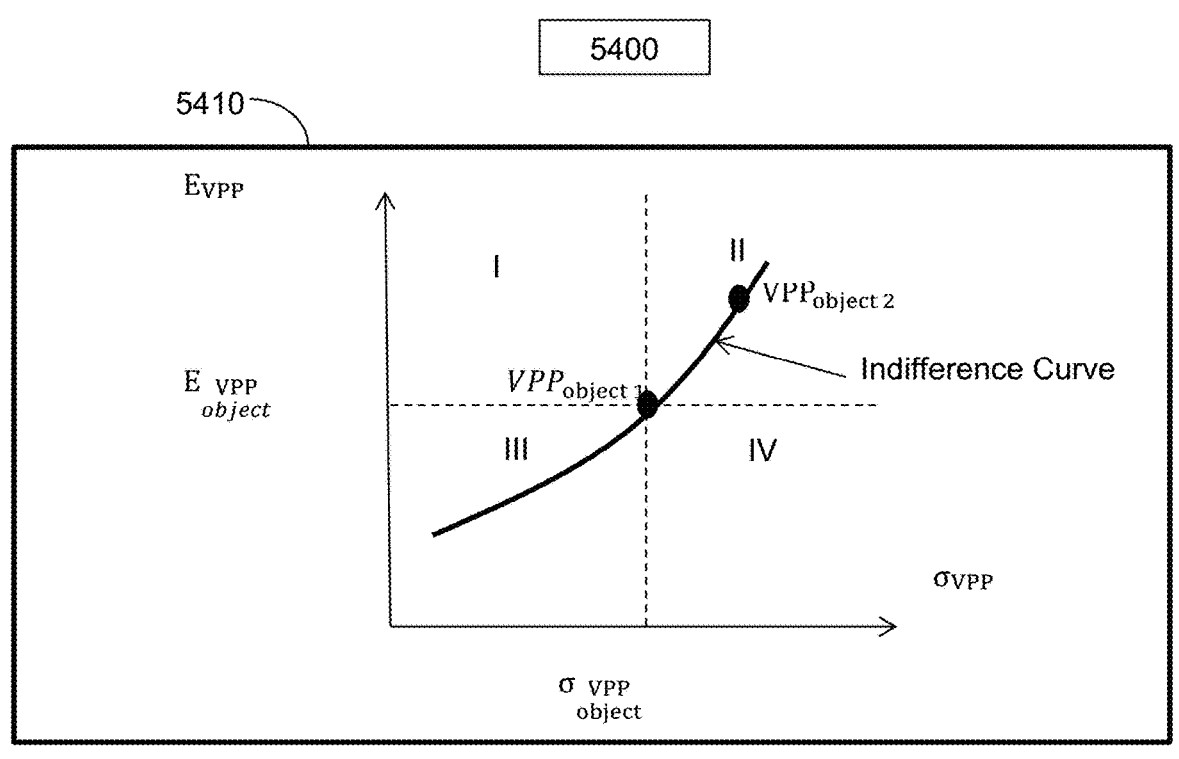
FIG. 54A in the form of a graph and 54B in the form of a table illustrates the points along a users indifference curve where object virtual power plant portfolios have equal utility to the user.

The embodiment of the method and system in FIG. 54A supposes a user identifies all the multi dimension virtual power plant coordinate objects that are equally attractive from a utility and multi dimension virtual power plant coordinate object perspective to multi dimension virtual power plant coordinate object M1 5410, starting at point multi dimension coordinate object M1 5410, an increase in standard deviation of the multi dimension virtual power plant coordinate object lowers utility and must be compensated for by an increase in the expected value of the multi dimension virtual power plant coordinate object. Thus multi dimension virtual power plant coordinate object M2 is equally desirable to the user as multi dimension virtual power plant coordinate object M1 along the indifference curve 5410. Users are equally attracted to multi dimension virtual power plant coordinate objects with higher expected value of multi dimension virtual power plant coordinate objects and higher standard deviation of multi dimension virtual power plant coordinate objects as compared to meals with lower expected value of multi dimension virtual power plant coordinate objects and lower standard deviation of multi dimension virtual power plant coordinate objects along the indifference curve 5410. Equally desirable multi dimension virtual power plant coordinate objects lie on the indifference multi dimension coordinate objects curve that connects all multi dimension virtual power plant coordinate objects with the same utility value 5410.

The embodiment of the method and system in FIG. 54B examines multi dimension virtual power plant coordinate object along a users indifference curve with utility values of several possible multi dimension virtual power plant coordinate objects for a user with a term A index value of 4, 5420. The table of combinations of multi dimension virtual power plant coordinate objects 5420 illustrates as one embodiment an expected value of multi dimension virtual power plant coordinate objects of a multi dimension coordinate object index of 10 and a standard deviation of the multi dimension virtual power plant coordinate objects of the multi dimension coordinate objects of 20% 6620.

Accordingly the user score or utility function is therefore 10 minus 0.005 multiplied by 4 multiplied by 400 equals 2 as a utility score. FIG. 54B also illustrates 3 additional examples of various expected values of multi dimension virtual power plant coordinate objects and standard deviation of multi dimension coordinate objects 5420.

FIG. 52A, FIG. 52B, FIG. 53A, FIG. 53B, FIG. 54A, FIG. 54B discuss the multi dimension virtual power plant coordinate object utility for a particular user. Such multi dimension virtual power plant coordinate objects are composed of various types of multi dimension virtual power plant coordinate objects. Users may consume a single multi dimension virtual power plant coordinate object or multiple multi dimension virtual power plant coordinate objects which combine multi dimension virtual power plant coordinate objects. In some embodiments, adding a certain multi dimension virtual power plant coordinate object increased the utility of a user's multi dimension virtual power plant coordinate object utility, while in some embodiments adding an multi dimension virtual power plant coordinate objects decreases the utility.

The embodiment of the method and system in FIG. 55A examines one exemplary probability distribution of a particular multi dimension virtual power plant coordinate object affecting the multi dimension virtual power plant coordinate object portfolio of a user 5510. State 1 probability of the multi dimension coordinate object is 0.5 in table 5510 and the expected value of the multi dimension virtual power plant coordinate object is to increase the multi dimension virtual power plant coordinate object portfolio by 25% towards the target multi dimension virtual power plant coordinate object portfolio range 5510, State 2 probability of the multi dimension virtual power plant coordinate object is 0.3 in table 5510 and the expected value of the multi dimension virtual power plant coordinate object is to increase the multi dimension virtual power plant coordinate object portfolio by 10% towards the target multi dimension virtual power plant coordinate object portfolio range 5510, State 3 probability of the multi dimension virtual power plant coordinate object is 0.2 in table 5510 and the expected value of the multi dimension virtual power plant coordinate object is to decrease the multi dimension virtual power plant coordinate object portfolio by 25% towards the target multi dimension virtual power plant coordinate object portfolio range 5510. Accordingly the effect on the user's multi dimension virtual power plant coordinate object portfolio is the mean or expected return on multi dimension virtual power plant coordinate objects of the multi dimension virtual power plant coordinate object is a probability weighted average of expected return on multi dimension virtual power plant coordinate objects in all scenarios 5520. Calling Pr(s) the probability scenario s and r(s) the multi dimension virtual power plant coordinate object return in scenario s, we may write the expected return E(r) of the ingredient on multi dimension virtual power plant coordinate object, as is done in 5520. In FIG. 55B applying the formula of expected return of multi dimension virtual power plant coordinate object on multi dimension virtual power plant coordinate object portfolio 5520 with the three possible scenarios in 5510 the expected return of multi dimension virtual power plant coordinate object on multi dimension virtual power plant coordinate object portfolio of the user is 10.5% toward the target range in example 5520. The embodiment of the method and system in FIG. 55C illustrates the variance and standard deviation of multi dimension virtual power plant coordinate objects is 357.25 for variance and 18.99% for standard deviation 5530.

Exemplary embodiments of scenario probabilities vary amongst users and composites so the method and system is not limited to a single set of weights, but rather the system learns new weights using neural network probability weightings with iterative feedback from sampling to ascertain recursive effects of multi dimension virtual power plant coordinate object onto multi dimension coordinate object portfolios.

In an exemplary embodiment in FIG. 56A, the virtual power plant object of a vector of multi dimension virtual power plant coordinate objects is the weighted average of the multi dimension virtual power plant coordinate object of each individual multi dimension virtual power plant coordinate object, so the expected value of the multi dimension virtual power plant coordinate object of the multi dimension virtual power plant coordinate object portfolio is the weighted average of the multi dimension virtual power plant coordinate object of each individual multi dimension virtual power plant coordinate object 5610. In the exemplary two multi dimension virtual power plant coordinate object combination of multi dimension virtual power plant coordinate object 1 and 2 in 5610, the expected value of the combined multi dimension coordinate objects is 7.75% toward the target multi dimension virtual power plant coordinate objects range. The weight of an multi dimension virtual power plant coordinate object may be represented 5610 of how each multi dimension virtual power plant coordinate object effects the multi dimension virtual power plant coordinate object portfolio.

In an exemplary embodiment in FIG. 56B, the standard deviation of the multi dimension virtual power plant coordinate object of the combined multi dimension virtual power plant coordinate objects is represented in 5620.

Because the variance reduction in the combination since the multi dimension virtual power plant coordinate objects were not perfectly correlated, the exemplary implementation of the method and system illustrates that a User may be better off in their multi dimension virtual power plant coordinate object portfolio by adding multi dimension virtual power plant coordinate objects which have a negative correlation yet positive expected value gain to multi dimension virtual power plant coordinate objects because the variance of the multi dimension virtual power plant coordinate objects has been reduced. To quantify the diversification of various multi dimension coordinate virtual power plant objects we discuss the terms of covariance and correlation. The covariance measures how much the multi dimension virtual power plant coordinate object portfolio of two multi dimension virtual power plant coordinate objects or move in tandem. A positive covariance means the multi dimension virtual power plant coordinate objects move together with respect to the effects on multi dimension virtual power plant coordinate object portfolios. A negative covariance means the multi dimension virtual power plant coordinate objects move inversely with their effect on multi dimension virtual power plant coordinate object portfolios. To measure covariance we look at surprises of deviations to multi dimension virtual power plant coordinate object portfolios in each scenario. In the following implementation of the method and system as stated in 5630 the product will be positive if the multi dimension virtual power plant coordinate object portfolio of the two multi dimension virtual power plant coordinate objects move together across scenarios, that is, if both multi dimension virtual power plant coordinate objects exceed their expectations on effect on multi dimension virtual power plant coordinate object portfolios or both multi dimension virtual power plant coordinate objects fall short together. If the multi dimension coordinate objects effect on the multi dimension virtual power plant coordinate object portfolio move in such a way that when a multi dimension virtual power plant coordinate object has a positive effect on multi dimension virtual power plant coordinate objects portfolio and multi dimension coordinate object 2 has a negative effect on multi dimension virtual power plant coordinate objects portfolio then the product of the equation in 5630 would be negative. Equation 5640 in FIG. 56D is thus a good measure of how the two multi dimension coordinate objects move together to effect multi dimension virtual power plant coordinate object portfolios across all scenarios which is defined as the covariance.

In an exemplary embodiment in FIG. 57A, an easier statistic to interpret than covariance is the correlation coefficient which scales the covariance to a value between negative 1 (perfect negative correlation) and positive 1 (perfect positive correlation). The correlation coefficient between two virtual power plant objects equals their covariance divided by the product of the standard deviations. In FIG. 57A, using the Greek letter rho, we find in equation 5710 the formula for correlation in an exemplary embodiment. The correlation equation 5710 can be written to solve for covariance or correlation. Studying equation 5710, one may observe that multi dimension virtual power plant coordinate objects which have a perfect correlation term of 1, have their expected value of multi dimension virtual power plant coordinate object as just the weighted average of the any two multi dimension virtual power plant coordinate objects. If the correlation term in 5710 has a negative value, then the combination of multi dimension virtual power plant coordinate objects lowers the standard deviation of the combined multi dimension virtual power plant coordinate objects. The mathematics of equations 5710 and 5720 show that multi dimension virtual power plant coordinate objects can have offsetting effects which can help overall target multi dimension virtual power plant coordinate object readings and multi dimension virtual power plant coordinate object portfolios. Combinations of multi dimension coordinate objects where the multi dimension virtual power plant coordinate objects are not perfectly correlated always offer a better combination to reduce multi dimension virtual power plant coordinate object portfolio volatility while moving more efficiently toward target ranges.

In an exemplary embodiment in FIG. 57B, the impact of the covariance of individual multi dimension virtual power plant coordinate objects on multi dimension virtual power plant coordinate object portfolios is apparent in the following formula 5720 for multi dimension virtual power plant coordinate object portfolio variance.

The most fundamental decision of a user is how much of each multi dimension virtual power plant coordinate object should you add or subtract? And how will it affect multi dimension virtual power plant coordinate object virtual power plant portfolio utility. Therefore one implementation of the method and system covers the multi dimension virtual power plant coordinate object tradeoff between combinations of multi dimension virtual power plant coordinate objects or various portfolios of multi dimension virtual power plant coordinate objects.

In an exemplary embodiment in FIG. 57C, recalling the user score or utility equation of a user 5210, the user attempts to maximize his or her utility level or multi dimension virtual power plant object score by choosing the best allocation of a portfolio of multi dimension virtual power plant coordinate objects or menu selection written as equation 5730.

Constructing the optimal portfolio of multi dimension coordinate objects is a complicated statistical task. The principle that the method and system follow is the same used to construct a simple two multi dimension virtual power plant coordinate object or combination in an exemplary scenario or for millions of multi dimension virtual power plant coordinate objects. To understand the formula for the variance of a portfolio of multi dimension virtual power plant coordinate objects more clearly, we must recall that the covariance of an multi dimension virtual power plant coordinate object with itself is the variance of that virtual power plant object such as written in FIG. 58A. Wobj1 and Wobj2 5810 are short for the weight associated with multi dimension virtual power plant coordinate object or multi dimension virtual power plant coordinate object portfolio 1 and multi dimension virtual power plant coordinate object or multi dimension virtual power plant coordinate object portfolio 2. The matrix 5810 is simply the bordered covariance matrix of the two multi dimension virtual power plant coordinate objects or multi dimension virtual power plant coordinate object portfolios.

In the embodiment of the method and system in FIG. 58B, the descriptive statistics for two multi dimension virtual power plant coordinate objects are listed as the expected value and standard deviation as well as covariance and correlation between the exemplary multi dimension virtual power plant coordinate objects 5820. The parameters for the joint probability distribution of returns is shown in FIG. 58B.

The embodiments of the method and system in FIG. 59A and FIG. 59B illustrate an exemplary scenario of experiment with different proportions to observe the effect on the expected multi dimension virtual power plant coordinate object portfolios and variance of multi dimension virtual power plant coordinate object portfolios. Suppose the proportion of the multi dimension virtual power plant coordinate object portfolio weight of multi dimension virtual power plant coordinate object 1 is changed. The effect on the multi dimension virtual power plant coordinate object portfolio is plotted in FIG. 59A. When the proportion of the multi dimension virtual power plant coordinate object that is multi dimension virtual power plant coordinate object 1 varies from a weight of zero to one, the effect on multi dimension virtual power plant coordinate object portfolio change as toward the target goes from 13% (expected multi dimension virtual power plant coordinate object 1) to 8% (expected multi dimension c virtual power plant coordinate object 1 value). Of course, varying proportions of a multi dimension coordinate object portfolio also has an effect on the standard deviation of multi dimension virtual power plant coordinate object utility. FIG. 59B presents various standard deviation for various weights of multi dimension virtual power plant coordinate object 1 and multi dimension virtual power plant coordinate object 2, 7120.

Figure 60A:
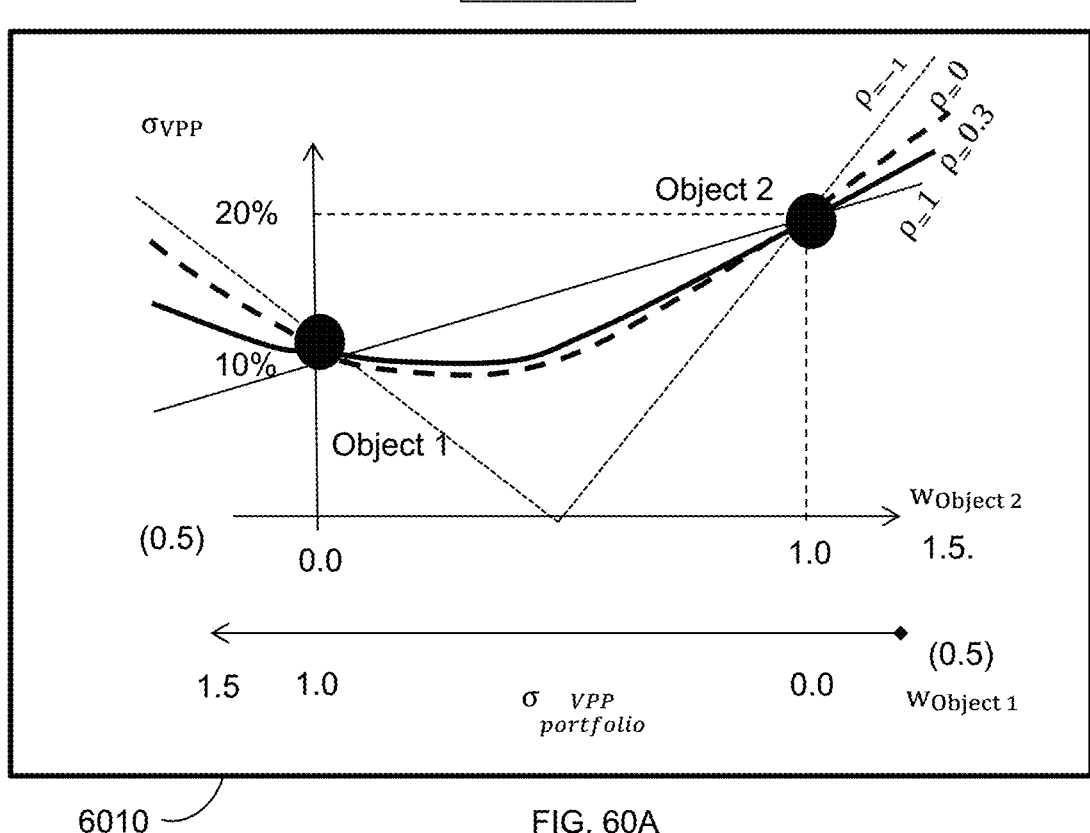
FIGS. 60A and 60B illustrate an exemplary case of the multi dimension virtual power plant coordinate object combinations of standard deviation when correlation rho is at 0.30.

In the exemplary case of the multi dimension virtual power plant coordinate object combination multi dimension virtual power plant coordinate object portfolio standard deviation when correlation rho is at 0.30 in FIG. 60A. The thick curved black line labeled rho=0.3 in FIG. 7210. Note that the combined multi dimension virtual power plant coordinate object portfolio of multi dimension virtual power plant coordinate object 1 and multi dimension virtual power plant coordinate object 2 is a minimum variance combination that has a standard deviation smaller than that of either multi dimension virtual power plant coordinate object 1 or multi dimension virtual power plant coordinate object 2 as individual multi dimension coordinate objects. FIG. 60A highlights the effect of multi dimension virtual power plant coordinate object combinations lowering overall standard deviation. The other three lines in FIG. 60A show how multi dimension virtual power plant coordinate object portfolio standard deviation varies for other values of the correlation coefficient, holding the variances of the multi dimension virtual power plant coordinate objects constant. The dotted curve where rho=0 in FIG. 60A depicts the standard deviation of multi dimension virtual power plant coordinate object portfolios with uncorrelated multi dimension virtual power plant coordinate objects. With the lower correlation between the two multi dimension virtual power plant coordinate objects, combination is more effective and multi dimension virtual power plant coordinate object portfolio standard deviation is lower. We can see that the minimum standard deviation of the multi dimension virtual power plant coordinate object combination in table 5920 shows a value of 10.29% when rho=0. Finally the upside down triangular broken dotted line represents the potential case where rho=−1 and the multi dimension virtual power plant coordinate objects are perfectly negatively correlated 6010. In the rho=−1 case 6010, the solution for the minimum variance combination is a multi dimension virtual power plant coordinate object 1 weight of 0.625 and a multi dimension virtual power plant coordinate object 2 weight of 0.375 in FIG. 60A. The method and system can combine FIG. 59A and FIG. 59A to demonstrate the relationship between the multi dimension virtual power plant coordinate object combination's level of standard deviation to multi dimension virtual power plant coordinate object portfolio and the expected improvement or decline in expected multi dimension virtual power plant coordinate object portfolio value given the multi dimension virtual power plant coordinate object combination parameters 6020.

Figure 60B:
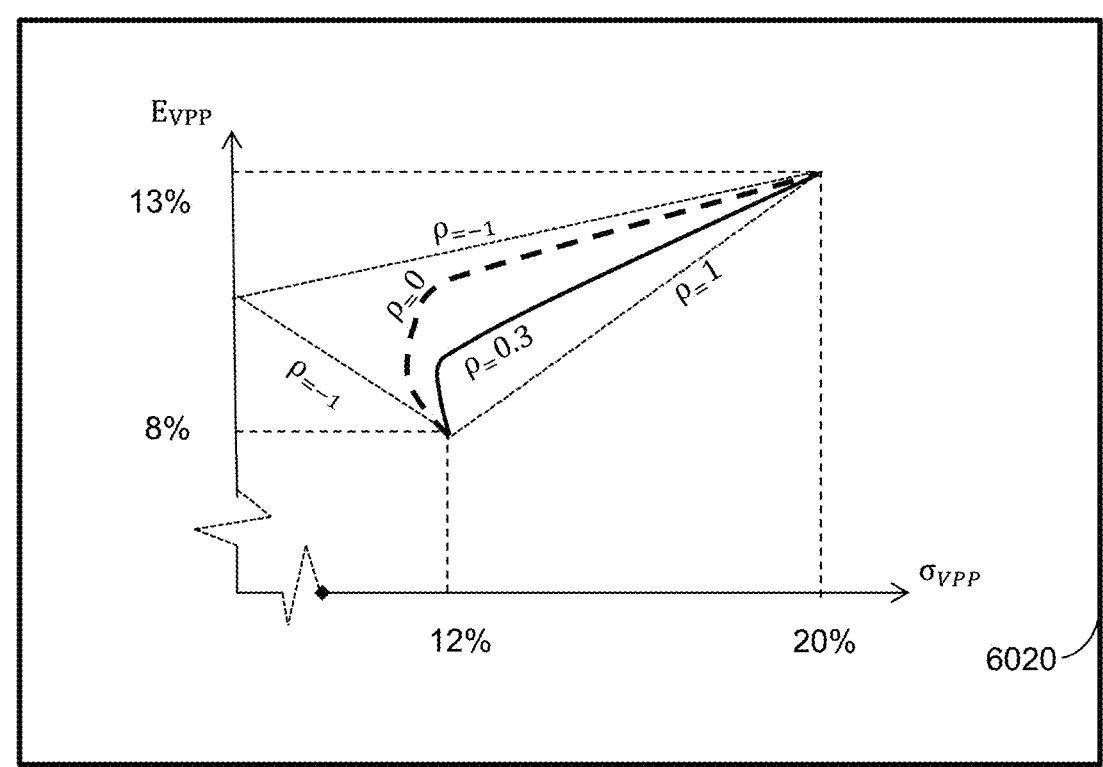

The embodiment illustrated in FIG. 60B shows for any pair of multi dimension coordinate objects or multi dimension virtual power plant coordinate object portfolios which may be illustrated for an exemplary case, but not limited to the exemplary case w(multi dimension virtual power plant coordinate object 2) and w(multi dimension virtual power plant coordinate object 1), the resulting pairs of combinations from 7210 and 7120 and 7110 are plotted in 7220. The solid curved line in 7220 labeled with rho=0.3 shows the combination opportunity set while correlation equals 0.3. The name opportunity set is used because it shows the combination of expected value of a multi dimension coordinate object portfolio and standard deviation of a multi dimension virtual power plant coordinate object portfolio of all combinations that can be constructed from the two available multi dimension virtual power plant coordinate objects. The broken dotted lines show the combination opportunity set for the other values of the correlation coefficient. The line farthest to the right, which is the straight line connecting the combinations where the term rho equals one, shows there are no benefits to a multi dimension virtual power plant coordinate object portfolio from combinations between ingredients where the correlation between the two multi dimension virtual power plant coordinate objects is perfectly positive or where the term rho equals one. The opportunity set is not "pushed" to the northwest. The curved dotted line to the left of the curved solid line where the term rho equals zero shows that there are greater benefits to a multi dimension virtual power plant coordinate object portfolio when the correlation coefficient between the two multi dimension coordinate objects is zero than when the correlation coefficient is positive 6020. Finally the broken line where the term rho equals negative one shows the effect of perfectly negative correlation between multi dimension virtual power plant coordinate objects. The combination opportunity set is linear, but offers the perfect offset between multi dimension coordinate objects to move toward target multi dimension virtual power plant coordinate object portfolio 6020. In summary, although the expected multi dimension coordinate object portfolio value of any combination of multi dimension virtual power plant coordinate objects is simply the weighted average of the virtual power plant objects expected multi dimension virtual power plant coordinate object portfolio value, this is not true for the combination of virtual power plant objects standard deviation. Potential benefits from combinations of virtual power plant objects arise when correlation is less than perfectly positive. The lower the correlation coefficient, the greater the potential benefit of combinations. In the extreme case of perfect negative correlation between multi dimension virtual power plant coordinate objects, the method and system show a perfect offset to a multi dimension coordinate object portfolio and we can construct a zero-variance combination of multi dimension virtual power plant coordinate objects 6020.

Suppose the exemplary case where the user wishes to select the optimal combination from the opportunity set. The best combination will depend upon the user's preferences and aversion to the standard deviation of multi dimension virtual power plant coordinate objects. Combinations of multi dimension coordinate virtual power plant objects to the northeast in FIG. 60B provide higher movements towards expected target multi dimension virtual power plant coordinate object portfolio value, but impose greater levels of volatility of multi dimension virtual power plant coordinate objects on multi dimension virtual power plant coordinate object portfolios. The best trade-off among these choices is a matter of personal preference. User's with greater desire to avoid volatility in their multi dimension virtual power plant coordinate object portfolio will prefer combinations of ingredients in the southwest, with lower expected movement toward target multi dimension virtual power plant coordinate object expected value, but lower standard deviation of multi dimension virtual power plant coordinate object portfolios 6020.

In the embodiment illustrated in FIG. 60B, most user's recognize the really critical decision is how to divvy up their selection amongst multi dimension virtual power plant coordinate objects or multi dimension coordinate object combinations. In the embodiment of the method and system in FIG. 61A, the exemplary diagram is a graphical solution. FIG. 61A shows the opportunity set generated from the joint probability distribution of the combination of multi dimension virtual power plant coordinate object 1 and multi dimension coordinate object 2 using the data from FIG. 59B. Two possible allocation lines are drawn and labeled "VPP allocation line". The first VPP allocation line (A) is drawn through the minimum variance multi dimension virtual power plant coordinate object combination point A which is divided as 82% multi dimension virtual power plant coordinate object 1 and 18% multi dimension virtual power plant coordinate object 2. The multi dimension virtual power plant coordinate object combination has an expected multi dimension virtual power plant coordinate object portfolio value movement of 8.9% and its standard deviation is 11.45% for the multi dimension coordinate object portfolio 6110. The reward to variability ratio or slope of the VPP allocation line combining a zero variance multi dimension virtual power plant coordinate object (which may be certain types of images, sounds, chemistry, latitude, longitude, altitude, time, temperature, fuel heat rate, power factor, or a plurality of other dimension vectors) with multi dimension virtual power plant coordinate object 1 and multi dimension virtual power plant coordinate object 2 with the aforementioned weights of 82% multi dimension virtual power plant coordinate object 1 and 18% multi dimension virtual power plant coordinate object 2, forms an equation listed in FIG. 61B. Accordingly the exemplary slope 6120 of VPP Allocation Line (A) is 0.34. Considering the embodiment in FIG. 61A of VPP allocation line (B), the multi dimension virtual power plant coordinate object combination was 70% multi dimension virtual power plant coordinate object 1 and 30% multi dimension virtual power plant coordinate object 2, the expected value movement towards target multi dimension virtual power plant coordinate object is 9.5%. Thus the reward to variability ration or slope of VPP allocation line(B) is 9.5 minus 5 divided by 11.7 which equals 0.38 or a steeper slope as illustrated in FIG. 61A. If the VPP allocation line (B) has a better reward to variability ratio than the VPP allocation line (A), then for any level of standard deviation that a virtual power plant is willing to bear, the expected target multi dimension virtual power plant coordinate object movement value is higher with the combination of point B. FIG. 61B illustrates the aforementioned exemplary case, showing that VPP allocation line (B) intersection with the opportunity set at point B is above the VPP allocation line (A) intersection with the opportunity set point A. In this case, point B allocation combination dominates point A allocation combination. In fact, the difference between the reward to variability ratio is the difference between the two VPP allocation line (A) and (B) slopes 6120. The difference between the two VPP allocation line slopes is 0.38–0.34=0.04. This means that the user gets four extra basis points of expected multi dimension virtual power plant coordinate object value movement toward the target with VPP allocation line (B) for each percentage point increase in standard deviation of multi dimension virtual power plant coordinate object portfolio 6110. If the user is willing to bear a standard deviation of multi dimension coordinate object portfolio of 4%, the user can achieve a 5.36% (5+4×0.34) expected multi dimension virtual power plant coordinate object portfolio value movement to the target range along VPP allocation line (A) and with VPP allocation line (B) the VPP can achieve an expected movement of multi dimension coordinate object portfolio to the target of 6.52% (5+4×0.38) 6110. Why stop at point B? The user can continue to ratchet up the VPP allocation line until it ultimately reaches the point of tangency with the Opportunity set 6110. This aforementioned exemplary scenario in FIG. 61A must yield the VPP allocation line with the highest feasible reward to variability ratio.

The embodiment illustrated in exemplary scenario FIG. 62A shows the highest sloping VPP allocation line (C) at point P intersecting with the opportunity set. Point P is the tangency combination of multi dimension virtual power plant coordinate objects where the expected multi dimension virtual power plant coordinate object portfolio target movement is the highest relative to the opportunity set and standard deviation of multi dimension virtual power plant coordinate objects or multi dimension virtual power plant coordinate object combinations 6210. The optimal combination or allocation of multi dimension virtual power plant coordinate objects is labeled point P. At Point P, the expected value multi dimension virtual power plant coordinate object portfolio movement to the target is 11% while the standard deviation of point P is 14.2%. In practice, we obtain the solution to the method and system with a computer program with instructions to perform the calculations for the user 6210. The method process to obtain the solution to the problem of the optimal mix of multi dimension virtual power plant coordinate objects or multi dimension virtual power plant coordinate object combinations of weight multi dimension virtual power plant coordinate object 1 and weight multi dimension virtual power plant coordinate object 2 or any other combination of multi dimension virtual power plant coordinate objects is the objective of the method and system. In some embodiments, node rankings from the multi dimension virtual power plant coordinate objects database may be determined by the relative ranking of the ratio of expected multi dimension virtual power plant coordinate object targets to the opportunity set and standard deviation of the multi dimension virtual power plant coordinate objects and multi dimension coordinate object combinations 6210.

There are many approaches toward optimization which are covered under method and system to optimize multi dimension coordinate object portfolios through multi dimension coordinate objects which may be utilized for computational efficiency, but the method and system may use as one approach of many approaches where the method finds the weights for various multi dimension coordinate objects that result in the highest slope of the VPP allocation line (C) 6210. In other words, the method and system may find the weights that result in the variable multi dimension virtual power plant coordinate object combination with the highest reward to variability ratio. Therefore the objective function of the method and system may maximize the slope of the VPP allocation line for any possible combination of multi dimension virtual power plant coordinate objects 6210. Thus the objective function of the method and system may show the slope as the ratio of the expected multi dimension coordinate object portfolio of the combination of multi dimension virtual power plant coordinate objects less the multi dimension virtual power plant coordinate object of a zero standard deviation multi dimension virtual power plant coordinate object divided by the standard deviation of the combination of multi dimension coordinate virtual power plant objects illustrated in FIG. 62B. For the combination of multi dimension virtual power plant coordinate objects with just two multi dimension virtual power plant coordinate objects, the expected multi dimension virtual power plant coordinate object value movement toward the target and standard deviation of multi dimension virtual power plant coordinate object of the combination of multi dimension virtual power plant coordinate objects is illustrated in FIG. 62B. When the method and system maximize the objective function which is the slope of the user allocation line subject to the constraint that the combination weights sum to one or one hundred percent 6220. In other words the weight of the multi dimension coordinate object 1 plus the weight of the multi dimension coordinate object 2 must sum to one. Accordingly, the method and system may solve a mathematical problem formulated as FIG. 63A which is the standard problem in calculus. Maximize the slope of the VPP allocation line subject to the condition that the sum of the weight of all the virtual power plant objects will sum to one.

In the embodiment case illustrated in FIG. 63B, the exemplary case may include two multi dimension virtual power plant coordinate objects or multi dimension virtual power plant coordinate object portfolio combinations, but the system and method are able to process any amount of multi dimension virtual power plant coordinate object or multi dimension virtual power plant coordinate object combinations with an extension of the calculus equations 6310. In the exemplary case of only two multi dimension virtual power plant coordinate objects, FIG. 63B illustrates the solution for the weights of the optimal multi dimension coordinate object combination of multi dimension coordinate objects. Data from 5910, 5920, 6110, 6210, 6220, 6310 have been substituted in to give the weights of multi dimension virtual power plant coordinate object 1 and multi dimension virtual power plant coordinate object 2 in FIG. 63B an exemplary case. The expected multi dimension virtual power plant coordinate object value has moved 11% toward the target multi dimension coordinate object value which incorporates the optimal weights for multi dimension coordinate object 1 and multi dimension virtual power plant coordinate object 2 in this exemplary case 6210 and the standard deviation is 14.2% in FIG. 62A. The VPP allocation line using the optimal combination in 6310 and 6320 has a slope of $0.42=(11–5)/14.2$ which is the reward to variability ratio of multi dimension virtual power plant coordinate objects. Notice how the slope of the VPP allocation line exceeds the slope of VPP allocation line (B) and VPP allocation line (A) in FIG. 61A as it must if it is to be the slope of the best feasible VPP allocation line. A user with a coefficient term A in FIG. 62A equal to 4 would then make a combination as follows in FIG. 63C. Thus the user would select 74.39% of her/his multi dimension virtual power plant coordinate object allocation in the combination of multi dimension virtual power plant coordinate object 1 and multi dimension virtual power plant coordinate object 2 and 25.61% in a base stable high quality multi dimension virtual power plant coordinate object image or an multi dimension virtual power plant coordinate object which has zero standard deviation to multi dimension coordinate object 6330. Of the 74.39% of the multi dimension coordinate object selection, 40% of the 74.39% or $(0.4×0.7439=0.2976)$ would go to multi dimension virtual power plant coordinate object 1 and 60% of 74.39% or $(0.60×0.7439=0.4463)$ would go toward multi dimension virtual power plant coordinate object 2. The graphical solution of the equations in FIG. 63A, FIG. 63B and FIG. 63C is illustrated in FIG. 64A.

Once the specific two multi dimension coordinate object case has been explained for the method and system, generalizing the embodiment to the case of many multi dimension virtual power plant coordinate objects is straightforward. The summarization of steps are outlined in FIG. 64B.

Figure 65A:
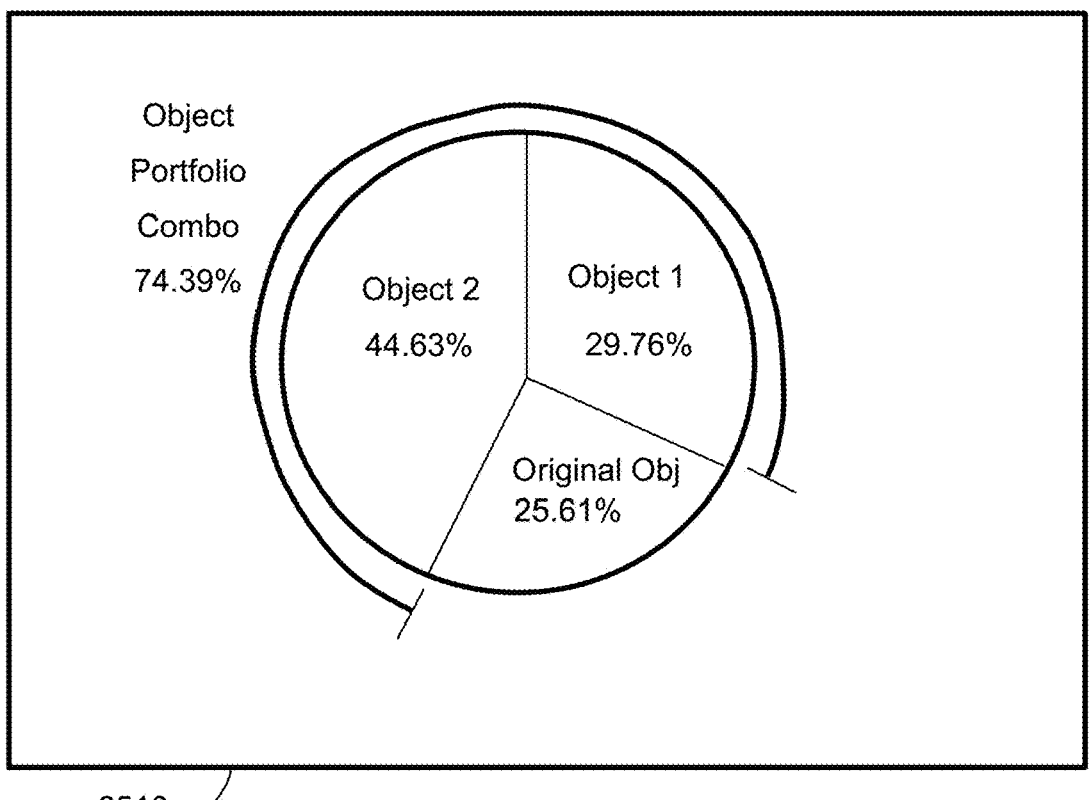
FIGS. 65A and 65B illustrate the graphical solution of FIGS. 65A and 65B as well as the summarization of a two or more multi dimension virtual power plant coordinate object embodiment to a general embodiment.

The embodiment of FIG. 65A illustrates a combination of multi dimension virtual power plant coordinate objects for the optimal combination in the form of a pie chart. Before moving on it is important to understand that the two multi dimension virtual power plant coordinate objects described could be multi dimension virtual power plant coordinate objects or combinations of multi dimension virtual power plant coordinate objects. Accordingly the method and system may consider the multi dimension virtual power plant coordinate object characteristics of single multi dimension virtual power plant coordinate object or combinations of multi dimension virtual power plant coordinate objects which can then form an multi dimension virtual power plant coordinate object portfolio which would act as an virtual power plant object which characteristics such as expected multi dimension coordinate object value, variance and covariance and correlation. Accordingly there can be diversification within multi dimension virtual power plant coordinate objects as some multi dimension virtual power plant coordinate objects are combinations of multi dimension virtual power plant coordinate objects.

Now we can generalize the two multi dimension coordinate object embodiment of the method and system to the case of many multi dimension virtual power plant coordinate objects alongside an multi dimension virtual power plant coordinate object with near zero multi dimension virtual power plant coordinate object variance or standard deviation. As in the case of the two multi dimension virtual power plant coordinate object embodiment, the problem is solved by the method and system in three parts. First, we identify the expected multi dimension virtual power plant coordinate object contribution of the multi dimension virtual power plant coordinate object and standard deviation of that multi dimension virtual power plant coordinate object contribution to the multi dimension virtual power plant coordinate object portfolio. Second, the method and system identifies the optimal combination of multi dimension virtual power plant coordinate objects by finding the combination weights that result in the steepest VPP allocation line. Last, the method and system may choose an appropriate complete combination by mixing the combination of a zero multi dimension virtual power plant coordinate object standard deviation multi dimension coordinate object with the combination of multi dimension virtual power plant coordinate objects that carry various standard deviation and correlations. The multi dimension coordinate object opportunities available to the user must be determined in the method and system. These multi dimension virtual power plant coordinate object opportunities are summarized by the minimum variance multi dimension virtual power plant coordinate object portfolio frontier of multi dimension virtual power plant coordinate objects. This frontier is a graph of the lowest possible combination variances that can be attained for a given combination of expected multi dimension virtual power plant coordinate object value. Given the set of data for expected multi dimension virtual power plant coordinate object value contribution, variances and covariance's of multi dimension virtual power plant coordinate object and expected covariance's of multi dimension virtual power plant coordinate objects of combinations, we can calculate the minimum multi dimension virtual power plant coordinate object variance combination for any targeted multi dimension coordinate object contribution. Performing such as calculation for many such expected multi dimension virtual power plant coordinate object combinations results in a paring between expected multi dimension virtual power plant coordinate object value contributions and minimum variance multi dimension virtual power plant coordinate object contribution that offer the expected multi dimension virtual power plant coordinate object value contributions. The plot of these expected multi dimension virtual power plant coordinate object contribution and standard deviation pairs are presented in FIG. 65B. Notice that all multi dimension virtual power plant coordinate objects lie to the right of the frontier. This tells us that combinations that consist only of a single multi dimension virtual power plant coordinate object are inefficient relative to combinations. Adding many virtual power plant objects leads to combinations with higher expected multi dimension virtual power plant coordinate object contribution and lower standard deviations 6520. All the combinations in FIG. 65B that lie on the minimum variance frontier from the global minimum variance multi dimension virtual power plant coordinate object portfolio and upward, provide the best expected multi dimension virtual power plant coordinate object value contribution and standard deviation of multi dimension virtual power plant coordinate object combinations and thus are candidates for the optimal combination 6520. The part of the frontier that lies above the global minimum variance combination is called the efficient frontier 6520. For any combination on the lower portion of the minimum variance frontier, there is a combination with the same standard deviation of virtual power plant objects but higher expected virtual power plant object contribution positioned directly above it. Hence the bottom part of the minimum variance frontier is inefficient.

The second part of the optimization plan involves a zero standard deviation multi dimension coordinate object. As before, the method and system search for the VPP allocation line with the highest reward to variability ratio (that is the steepest slope) as shown in FIG. 64A. The VPP allocation line that is supported by the optimal combination point P 6410, is, as before, the combination that is tangent to the efficient frontier. This VPP allocation line dominates all alternative feasible lines. Therefore, combination P in FIG. 64A is the optimal multi dimension coordinate object combination.

Finally, the last part of the embodiment of the method and system, the user chooses the appropriate mix between the optimal multi dimension virtual power plant coordinate object combination and a zero multi dimension virtual power plant coordinate object portfolio variance multi dimension virtual power plant coordinate object which may include a zero variance multi dimension virtual power plant coordinate object. In FIG. 64A, the point where VPP allocation line (C) has a zero standard deviation value is where the expected multi dimension coordinate object target movement is 5% or point F 6410.

Now let us consider in the method and system each part of the combination construction problem in more detail. In the first part of the user problem, the analysis of the expected multi dimension virtual power plant coordinate object value of the multi dimension virtual power plant coordinate object, the user needs as inputs, a set of estimates of expected multi dimension virtual power plant coordinate object value target movement for each multi dimension virtual power plant coordinate object and a set of estimates for the covariance matrix which the method and system provide for the user through the system application.

Suppose that the time period of the analysis for the combination of multi dimension coordinate objects between virtual power plant time scalar tests was one year. Therefore all calculations and estimates pertain to a one year virtual power plant under the method and system. The database system contains the variable n multi dimension virtual power plant coordinate objects where n could be any amount of multi dimension virtual power plant coordinate objects. As of now, time zero, we observed the expected multi dimension virtual power plant coordinate object value of the multi dimension virtual power plant coordinate objects such that each multi dimension virtual power plant coordinate object is given the variable label i and an index number of n at time zero. Then the system and method determine how the multi dimension coordinate object effects the users multi dimension virtual power plant coordinate object utility at the end of one year or time equal to one year. The covariance's of the multi dimension coordinate objects effects on multi dimension virtual power plant coordinate object portfolios are usually estimated from historical data for both the user and from users in the database with similar characteristics. Through the method and system, the user is now armed with the n estimates of the expected effect on multi dimension virtual power plant coordinate objects of each ingredient and then the nxn estimates in the covariance matrix in which the n diagonal elements are estimates of the variances of each multi dimension virtual power plant coordinate object and then the n squared minus n equals n multiplied by the quantity of n minus 1 off diagonal elements are the estimates of the covariances between each pair of multi dimension virtual power plant coordinate object portfolios. We know that each covariance appears twice in the aforementioned table, so actually we have n(n−1)/2 different covariance estimates. If the user considers 50 multi dimension virtual power plant coordinate objects or multi dimension coordinate object combinations, the method and system needs to provide 50 estimates of multi dimension virtual power plant coordinate object results for each respective multi dimension coordinate object or multi dimension coordinate object combination and (50×49)/2=1,225 estimates of covariance's which is a daunting task without the assistance of the method and system computer application program. Once these estimates are compiled by the method and system, the expected multi dimension virtual power plant coordinate object value and variance of any combination of multi dimension virtual power plant coordinate objects with weights for any of the respective multi dimension coordinate objects can be calculated by the general formulas in FIG. 66A and FIG. 67.

Figure 65B:
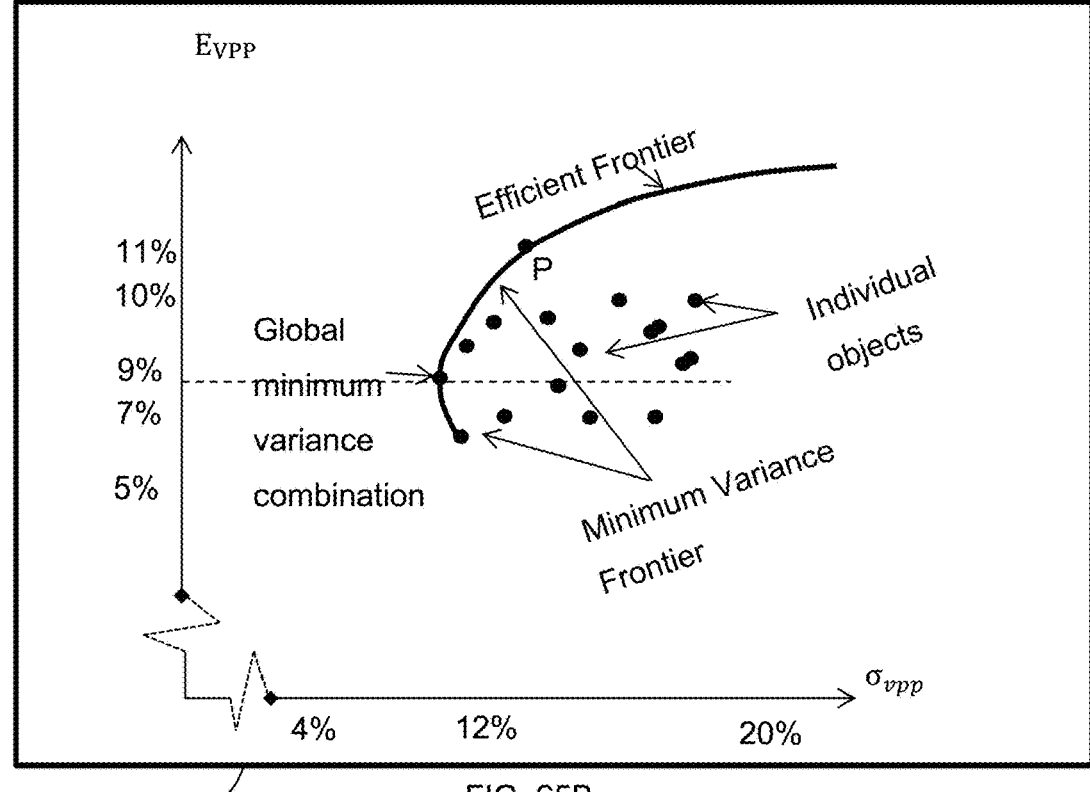
Figures 66A, 66B:
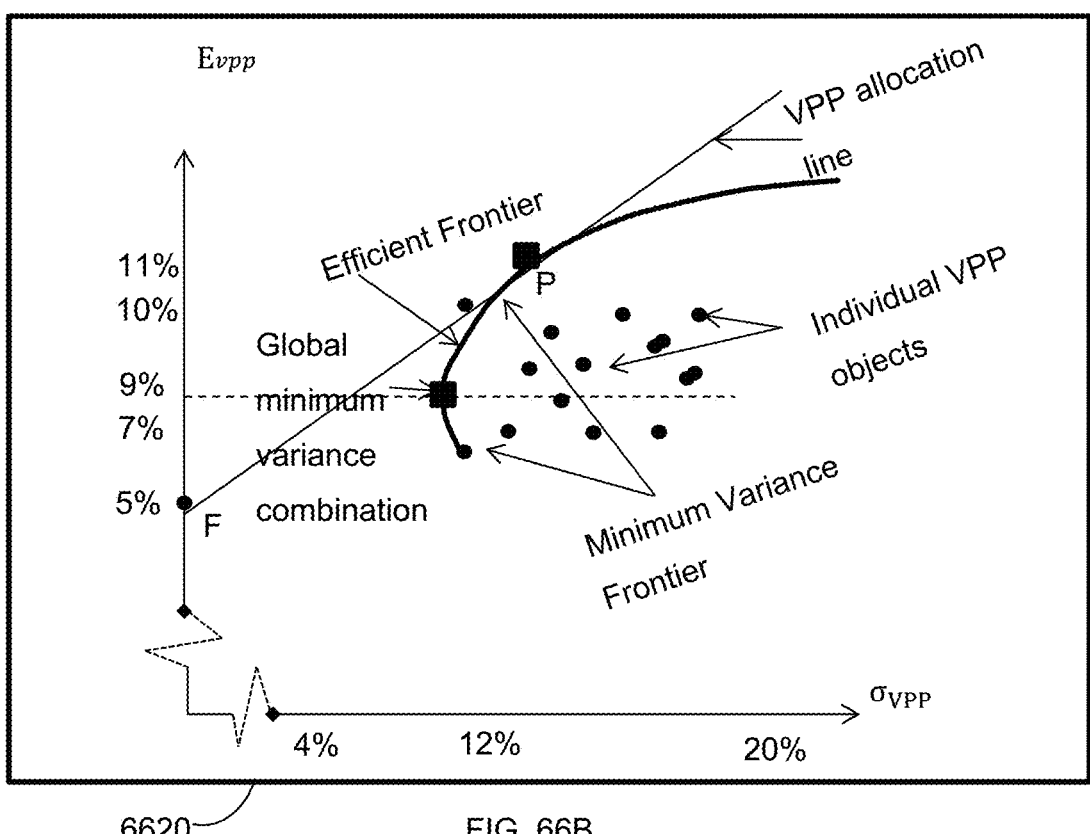
FIGS. 66A and 66B illustrate the graphical solution of the user multi dimension virtual power plant coordinate object allocation method as well as the minimum variance frontier of multi dimension virtual power plant coordinate objects which is the graph of the lowest possible multi dimension virtual power plant coordinate object variance combination for a given target user multi dimension virtual power plant object score.

The general embodiment of an exemplary case of the method and system in FIG. 66A states the expected multi dimension virtual power plant coordinate object value toward the target multi dimension virtual power plant coordinate object value of each multi dimension coordinate object and the variance of the multi dimension coordinate object of each multi dimension coordinate object such that the weights of each multi dimension virtual power plant coordinate object can be calculated 6610. The principle behind the method and system is that a user or users can quantify the set of multi dimension virtual power plant coordinate object combinations that give the highest multi dimension virtual power plant coordinate object expected value result to maximize user utility. Alternatively, the efficient frontier in FIG. 65B is the set of multi dimension virtual power plant coordinate object combinations that minimize the variance of multi dimension virtual power plant coordinate object portfolio for any target multi dimension virtual power plant coordinate object portfolio expected value. In some embodiments, node rankings from the multi dimension virtual power plant coordinate object database 6900 may be determined by the relative ranking of the ratio of expected value multi dimension virtual power plant coordinate object targets to the opportunity set and standard deviation of the multi dimension virtual power plant coordinate objects and multi dimension virtual power plant coordinate object combinations which are represented by the plurality of multi dimension virtual power plant coordinate object combinations that are points with expected multi dimension virtual power plant coordinate object values and multi dimension virtual power plant coordinate object variances in the opportunity set from the machine learning optimization instruction CPU or GPU 6916. The result is the most efficient method empirically and quantitatively to render the multi dimension virtual power plant coordinate object space.

The points marked by rectangles in the exemplary embodiment in FIG. 66B are the result of variance—minimization calculations in the method and system. First, we draw the constraint, that is, a horizontal line at the level of required expected multi dimension virtual power plant coordinate object value target. We then look for the combination of multi dimension virtual power plant coordinate objects (point P) with the lowest standard deviation that plots on the user allocation line 6620. We then discard the bottom of the minimum variance frontier below the global minimum variance combination as it is inefficient 6620 and points above the global minimum variance combination have higher multi dimension virtual power plant coordinate object expected value contribution to the target, but a similar standard deviation. Restating the solution that the method and system has completed thus far. The estimate generated by the user utilizing the method and system transformed multi dimension coordinate objects and multi dimension virtual power plant coordinate object combinations into a set of expected multi dimension virtual power plant coordinate object statistics toward the users multi dimension virtual power plant coordinate object portfolio utility and a covariance matrix of how the multi dimension virtual power plant coordinate objects are correlated. This group of estimates shall be called the input list. This input list is then fed into the optimization system and method. Before we proceed to the second step of choosing the optimal combination of multi dimension virtual power plant coordinate objects for multi dimension coordinate object portfolios, some users may have additional constraints. For example, many users have temperature constraints which preclude certain multi dimension coordinate object types. The list of potential constraints is large and the method and system allows for the addition of constraints in the optimization method and system. Users of the system and method may tailor the efficient set of virtual power plant objects to conform to any desire of the user. Of course, each constraint carries a price tag in the sense that an efficient frontier constructed subject to extra constraints may offer a reward to variability ratio inferior to that of a less constrained set. The user is made aware of this cost through the system and method application and should carefully consider constraints that are not mandated by law or specific physical limitations.

Proceeding to step two in the method and system, this step introduces a zero variance multi dimension virtual power plant coordinate object that has positive multi dimension virtual power plant coordinate object attributes. As before, we ratchet up the VPP allocation line by selecting different combinations of multi dimension coordinate objects until combination P is reached 6620 which is the tangency point of a line from point F to the efficient frontier 6620. Multi dimension virtual power plant coordinate objects combination P maximizes the reward to variability ratio, the slope of the VPP allocation line from point F to combinations on the efficient frontier set 6620.

The method and system embodiment of the general exemplary case may be written in one form as in FIG. 67. Vectors are used to capture variable d inputs or as many inputs as are required to weight in FIG. 67. The method as system may use other techniques to express combination multi dimension virtual power plant coordinate object expected target multi dimension coordinate object values and variances, but it is convenient to handle large combinations of multi dimension virtual power plant coordinate objects in matrix form in FIG. 67.

Figure 68:
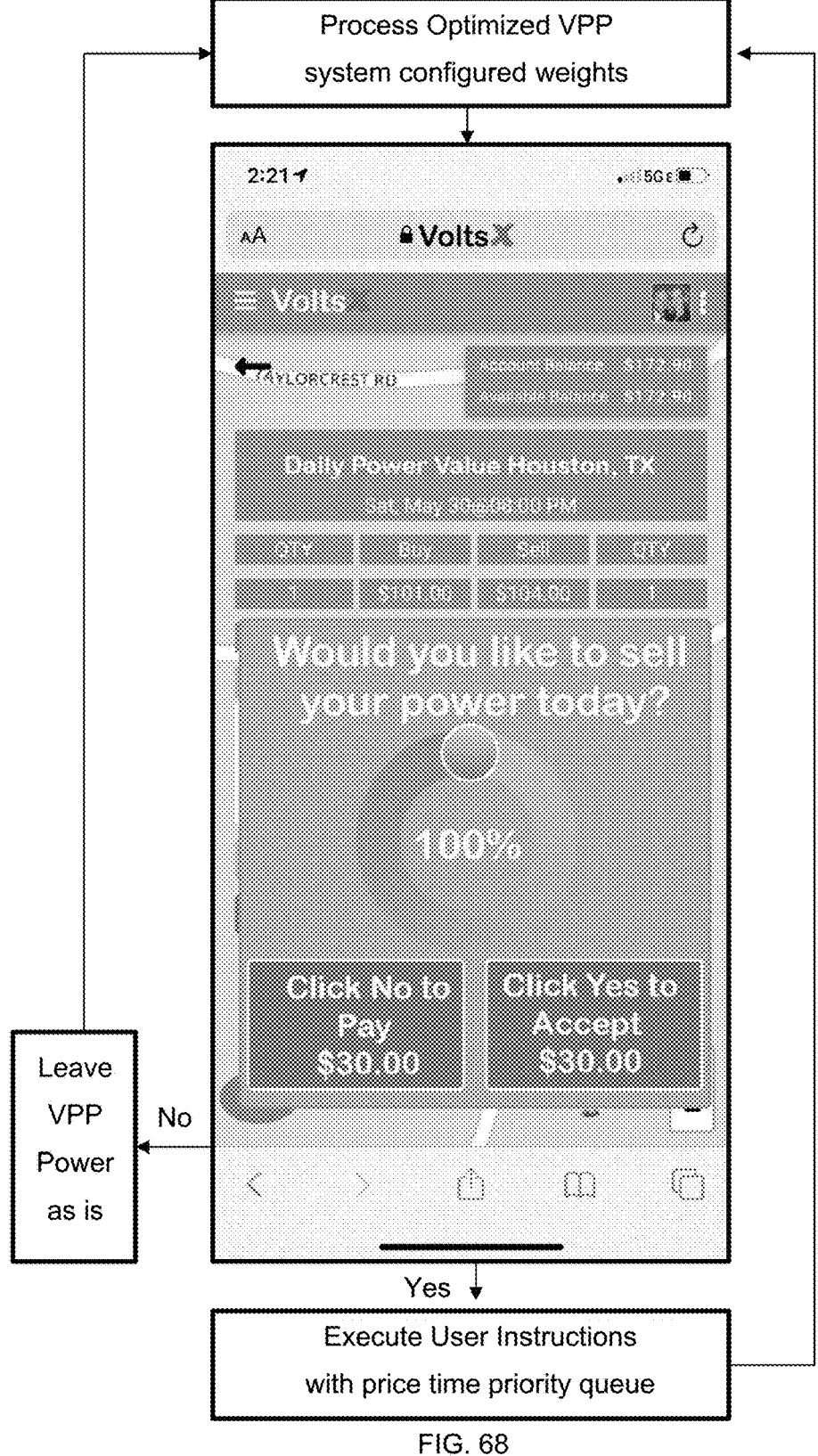
FIG. 68 illustrates a multi dimension virtual power plant coordinate object portfolio, expected value of the virtual power plant portfolio object, standard deviation of the virtual power plant object portfolio and covariance of the virtual power plant object portfolio as an optimized virtual power plant portfolio presented to the user in a price time priority queue to accept or reject the optimization.

FIG. 68 illustrates an exemplary connected graphical user interface 6802 embodiment with the overall optimization steps to form an efficient virtual power plant. In some embodiments, the iterative optimization 6801 for a specification and date and time period processes the electrical or fuel production and consumption expected values and variances and covariances and correlations to optimize the weights 6801 for a given objective function minimizing the variance of the virtual power plant portfolio 6310. In some embodiments, the weights display 6802 a presentation of the opportunity set 6520 to the user with a price time priority queue exchange 5144 value from the whole sale market 5112 or general market to allow the user to select the opportunity to monetize their optimal virtual power plant portfolio 6804, 5116 or to reject the optimal virtual power plant portfolio 6803. The user may accept 6804 or reject 6803 the optimal multi dimension virtual power plant coordinate object portfolio in the iterative cycle.

Figure 69:
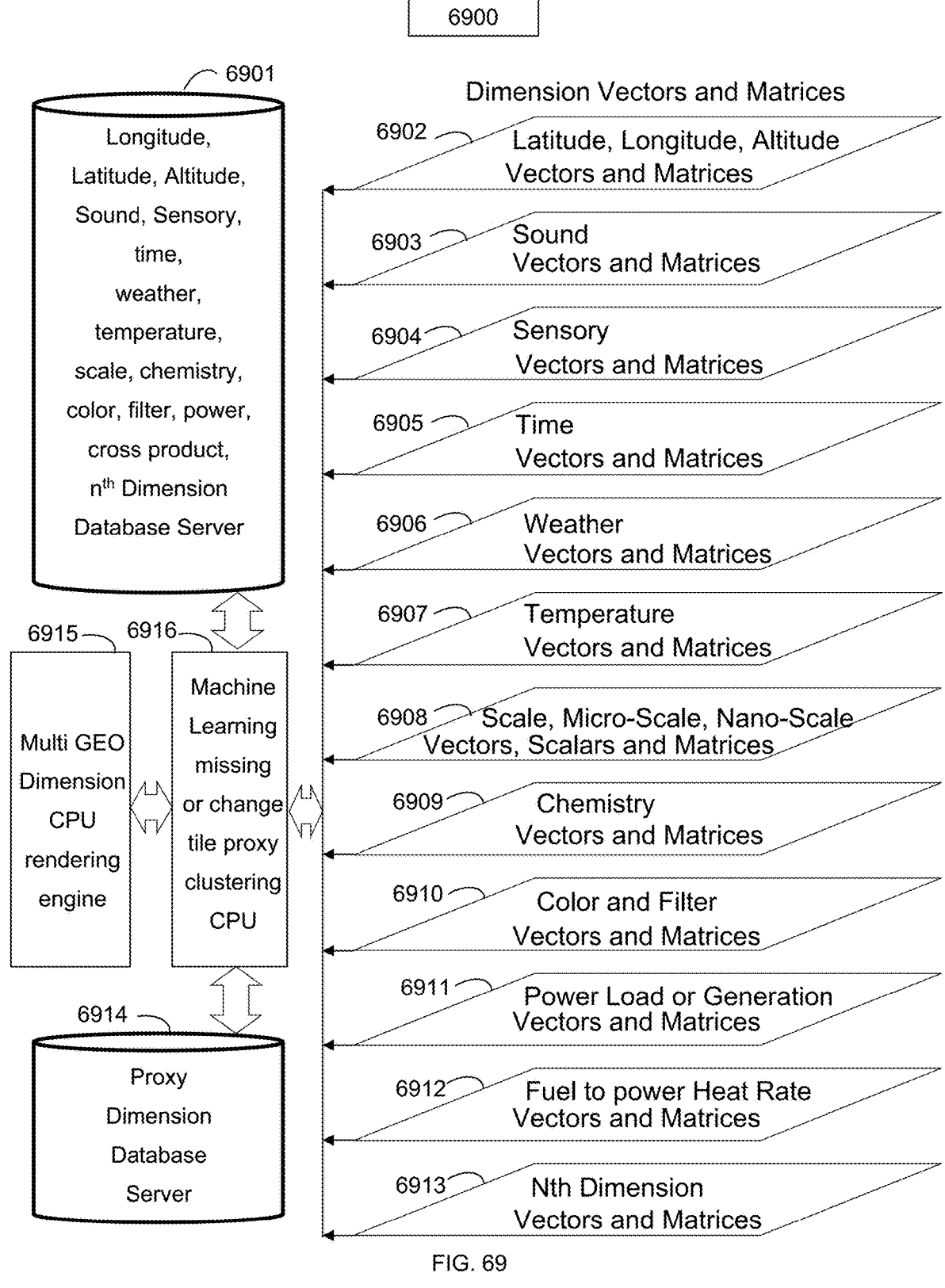
FIG. 69 illustrates an exemplary multi-dimension power factor virtual power plant tile database with such object transformations as latitude, longitude, altitude, sound, sensory, time, weather, temperature, scale, micro-scale, nano-scale, chemistry, color, aperture, speed, type, power load, power generation, fuel to power heat rate cross product combinations and nth dimensions with associated proxy database servers and CPU rendering engine.

FIG. 69 illustrates an exemplary multi dimension virtual power plant coordinate object database with weight allocation of multi dimensional virtual power plant coordinate objects based on maximizing the expected value of the user objective function adjusting for variance and holding the multi dimension coordinate object portfolio variance at a minimum. The deep learning processor 6916 may call proxy data 6914 from a sound vector 6903 for the noise of dog paws walking in a room to sense the need to air condition the room with similar probability weights from actual dimension data 6901 that may link to the movement of the accelerometer in the CPU device 210. In some embodiments, the multi-dimension virtual power plant coordinate object tile database may store dimension and vector coordinate data for latitude, longitude, altitude vectors and matrices 6902, sound vectors and matrices 6903, sensory vectors and matrices 6904, time or history vectors and matrices 6905, weather vectors and matrices 6906, temperature vectors and matrices 6907, scale, micro-scale, nano-scale vectors, scalars, and matrices 6908, chemistry vectors and matrices 6909, color and filter vectors and matrices 6910, power load or generation vectors and matrices 6911, fuel to power heat rate combination vectors and matrices 6912 and nth dimension vectors and matrices 6913 which may include smart meters, meters, connected appliances, connected distributed generation, net metering and power inverters. While most machine learning processes three dimensions or four dimensions such as color channel or color depth, height, width, and sample identification measured and stored as coordinates, the multi-dimension virtual power plant map-tile database also stores many additional dimensions such as longitude, latitude, altitude, sound, sensory feel, sensory smell, sensory touch, sensory electromagnetic waves, time dimension, time history dimension, time style dimension, time growth dimension, weather dimension, temperatures dimension, fuel heat rate dimensions, power load and generation factor dimensions, scale of picture dimension, microscopic scale dimension, nano-scale dimension, chemistry state dimension, chemistry feeling dimension, color depth dimension, filter color dimension, lens focus aperture dimension, lens speed dimension, type dimension, cross product blend dimension of multiple dimensions blended together to make a new dimension, or a yet to be defined nth dimension, in some embodiments, tensor storage vectors and matrices may exceed traditional three, four and five dimension tensors. In some embodiments, the classification engine and machine learning missing or change multi dimension coordinate object proxy clustering CPU or GPU 6916 and well as multi dimension coordinate object CPU or GPU rendering engine 6915 may optimize across dimensions to process, by example but not limiting by example, a dog which then may be segmented into an multi dimension image coordinate object 6915 and multi dimension sound coordinate object 6916 and multi dimension touch coordinate object 6914 which then may be optimized to obtain the highest multi dimension virtual power plant coordinate object utility function subject to a target multi-dimension coordinate object variance, or equivalently to minimize the multi dimension coordinate virtual power plant object variance subject to a target expected virtual power plant utility function. In some embodiments, under these assumptions, a user may assume their multi dimension virtual power plant coordinate object portfolio is the highest utility for a target variance of objects. In some embodiments, these optimization formulas are explained in detail from drawings 5200 to 6800, however, they may be represented as two equivalent portfolios of multi dimension coordinate objects:

$$^{max_x}\mu_p = X'\mu \text{ s.t. or } \qquad ^{min_x}\sigma_{p,x} = X'\sum X \text{ s.t.}$$

$$\sigma_p^2 = X'\sum x = \sigma_{p,0}^2 \text{ and } X'1 = 1 \quad \mu_p = X'\mu = \mu_{p,0} \text{ and } X'1 = 1$$

In some embodiments, the equations in lines 00774 and 00775 above, let $\sigma_{p,0}^2$ denote a target level of variance for the equations on the left side of the page with the constrained maximization problem of maximizing the user multi dimension virtual power plant coordinate object virtual power plant portfolio utility for a target level of object variance. Or in other exemplary embodiments, the users problem may denote the objective to minimize risk or variance subject to a target level of multi dimension virtual power plant coordinate object portfolio utility such that we let $\mu_{p,0}$ to denote a target expected level of multi dimension virtual power plant coordinate object portfolio utility. In some embodiments, the component multi dimension virtual power plant coordinate objects may be broken down into further transformed subsets of virtual power plant objects which may then be optimized to render the virtual power plant object of an optimized VPP portfolio. In some embodiments, the user may further configure the rendered object with multi dimension virtual power plant coordinate objects for time to make the object higher or lower in temperature which would then re-iterate or re-optimize over the objects with additional multi dimension coordinate object parameters such as micro scalar coordinates 6908, time or age scalar coordinate objects 6905 and nano scalar coordinate objects 6908 which then may be optimized to minimize portfolio object variance for a given target utility for the user over a plurality of weighted objects such as micro scalars 6908 or time scalar coordinate objects 6905 or nano scalar coordinate objects 6908 to render the multi dimension virtual power plant coordinate portfolio object. In some embodiments, the user may adjust the time scalar coordinate 6905 of the object which would then boost the weight of the time scalar multi dimension 6905 coordinate object to hold the equation of optimizing user multi dimension virtual power plant coordinate object portfolio utility. In the aforementioned embodiment, the adjusted weights of the multi dimension virtual power plant coordinate object portfolio resulted in the transformation of additional savings for consumers and earnings for producers of power across multiple virtual power plant object dimensions.

FIG. 70 illustrates an exemplary series of optimal virtual power plant portfolios as weighted by the step equations from 5200 to 6700. In some embodiments, the user graphical user interface 7004 may present an accept virtual power plant portfolio 6804 or reject the virtual power plant portfolio 6803. In some embodiments, by example, but not limiting by example, the optimal multi dimension virtual power plant coordinate object portfolio may be configured to lower virtual power plant portfolio variance to increase the motor life of appliances, vehicles and machines as a scenario 7001. In some embodiments, by example, but not limiting by example, the optimal multi dimension virtual power plant coordinate object portfolio may be configured to increase expected value of the virtual power plan by comparing solar heat rates to natural gas heat rates which is the power price divided by the fuel price to understand the efficiency factor 7002. In some embodiments, by example, but not limiting by example, the optimal multi dimension virtual power plant coordinate object portfolio may be configured to shut down an office and sell back power to the grid while coordinating a virtual commute or virtual work environment 7003. In some embodiments, by example, but not limiting by example, the optimal multi dimension virtual power plant coordinate object portfolio may be configured to turn on a distributed fuel generator and sell the power to the grid 7005. In some embodiments, by example, but not limiting by example, the optimal multi dimension virtual power plant coordinate object portfolio may be configured to schedule a half day at a particular office, sell the remaining power to the grid and allow people a work at home option 7006. In some embodiments, by example, but not limiting by example, the optimal multi dimension virtual power plant coordinate object portfolio may be configured to lower virtual power plant portfolio variance similar to expected value options to reduce electric production or consumption motor life 7007. In some embodiments, by example, but not limiting by example, the optimal multi dimension virtual power plant coordinate object portfolio may be configured to reduce health exposure risk, obtain a virtual medical visit, sell power to the grid for less office space 7008. In some embodiments, by example, but not limiting by example, the optimal multi dimension virtual power plant coordinate object portfolio may be configured to monetize more efficient asset to power or virtual power plant portfolio in an appliance exchange program if the net present value of the savings from the new appliance is better than the cost 7009. In some embodiments, by example, but not limiting by example, the optimal multi dimension virtual power plant coordinate object portfolio may be configured to offer to buy solar and wind while curtailing gas, oil, coal, nuke to geolocation virtual power plant under the social network virtual power plant structure 7010. In some embodiments, by example, but not limiting by example, the optimal multi dimension virtual power plant coordinate object portfolio may be configured to offer price time priority queues to save geolocation savings from transit by cutting physical travel with less energy intensive virtual travel over the social network 7001.

Figure 71:
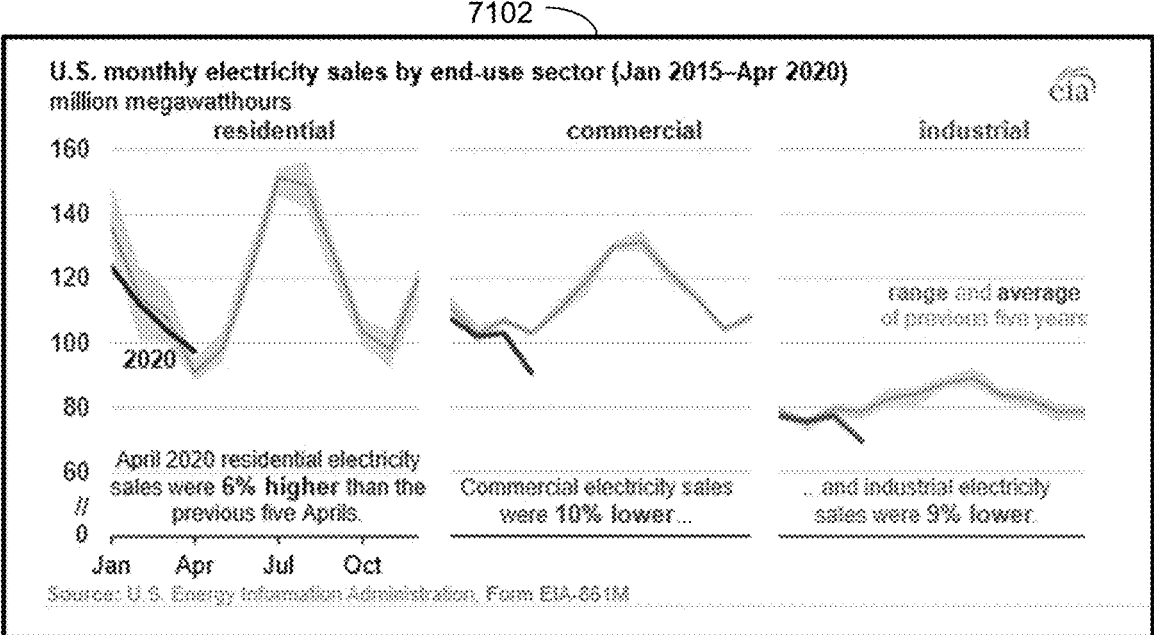
FIG. 71 illustrates an exemplary portfolio savings from an optimized virtual power plant portfolio object.

FIG. 71 illustrates an exemplary multi dimension optimization minimizing VPP portfolio expected return variance subject to VPP portfolio expected return targets shows clear gains in reduced power usage 7101. In some embodiments, the optimization 5200-6900 may yield portfolio results over a virtual power plant portfolio object of net savings over residential, commercial and industrial units 7102 that save large power usage and/or more efficient production of power. Multi dimension optimization is required to consider equation variables outside of single mode optimization or optimization only over the power dimension without regard for variance, correlation, covariance or reduction of motor use while achieving an expected value return objective function 7103.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

determining power portfolio data for one or more first users having a plurality of power devices, wherein the power portfolio data comprises a plurality of power data objects corresponding to the plurality of power devices;

determining a plurality of optimized weight values for the plurality of power data objects based on the power portfolio data;

determining a plurality of optimized power objects based on the plurality of optimized weight values, wherein the plurality of optimized power objects is a subset of the plurality of power data objects;

receiving market depth data for one or more virtual power plant capacity units of a virtual power plant capacity exchange, wherein:

the one or more virtual power plant capacity units correspond to available power capacity configured for physical transfer for one or more second users of the virtual power plant capacity exchange; and the market depth data comprises data indicating one or more bid prices and one or more offer prices from the one or more second users for the one or more virtual power plant capacity units; and transmitting transaction input data from the one or more first users based on the plurality of optimized power objects and the market depth data, wherein the transaction input data comprises data indicating an acceptance or a rejection by the one or more first users of the one or more bid prices or the one or more offer prices.

2. The method of claim 1, further comprising:

receiving satellite navigation data corresponding to the one or more first users; and determining the one or more first users based on the satellite navigation data.

3. The method of claim 1, wherein the power portfolio data further comprises data corresponding to historical power consumption by the plurality of power devices, historical power generation by the plurality of power devices, current power consumption by the plurality of power devices, current power generation by the plurality of power devices, future power consumption by the plurality of power devices, future power generation by the plurality of power devices, or combinations thereof.

4. The method of claim 1, wherein the plurality of power devices comprises one or more power generation devices and one or more power consumption devices.

5. The method of claim 4, wherein:

the one or more power generation devices comprise one or more solar power generating devices, one or more battery devices, one or more wind power generating devices, one or more biomass power generating devices, one or more geothermal power generating devices, one or more hydroelectric power generating devices, one or more tidal power generating devices, one or more hydrogen power generating devices, one or more lunar power generating devices, one or more plant power generating devices, one or more chlorophyll power generating devices, or combinations thereof; and the one or more power consumption devices comprise one or more computing devices, one or more electronic devices, one or more lighting devices, one or more lamps, one or more appliances, one or more smart meters, one or more vehicles, or combinations thereof.

6. The method of claim 1, wherein the plurality of power data objects comprises a plurality of data objects corresponding to power consumption and power generation by the plurality of power devices.

7. The method of claim 1, wherein determining the plurality of optimized weight values comprises:

determining a plurality of expected values for the plurality of power data objects, wherein a respective expected value corresponds to an expected power utility of one or more respective power data objects for the one or more first users;

determining a plurality of standard deviation values for the plurality of power data objects based on the plurality of expected values;

determining a plurality of ratios for the plurality of power data objects based on the plurality of expected values and the plurality of standard deviation values; and determining the plurality of optimized weight values based on the plurality of ratios.

8. The method of claim 7, wherein determining the plurality of expected values comprises:

determining a plurality of utility values for the plurality of power data objects based on one or more utility functions, wherein the one or more utility functions correspond to one or more user preferences of the one or more first users, and wherein a respective utility value corresponds to a utility of the one or more respective power data objects for the one or more first users;

determining a plurality of probability weight values for the plurality of utility values based on historical data for the one or more first users; and determining the plurality of expected values based on the plurality of probability weight values and the plurality of utility values.

9. The method of claim 1, wherein determining the plurality of optimized power objects comprises:

determining a plurality of allocations for the plurality of power data objects; and identifying the plurality of optimized power objects based on the plurality of optimized weight values and the plurality of allocations.

10. The method of claim 1, wherein the data indicating the acceptance or the rejection comprises data indicating an acceptance by the one or more first users of a respective bid price by a respective second user for a respective virtual power plant capacity unit, wherein the respective virtual power plant capacity unit corresponds to the subset of the plurality of power data objects.

11. The method of claim 10, further comprising:

receiving a forward commodity contract between the one or more first users and the respective second user, wherein the forward commodity contract corresponds to the respective bid price; and arranging for a physical delivery corresponding to the respective virtual power plant capacity unit, wherein the physical delivery comprises power transfer using one or more power transmission lines, power transfer using one or more vehicles, or combinations thereof.

12. The method of claim 1, wherein the data indicating the acceptance or the rejection comprises data indicating an acceptance by the one or more first users of a respective offer price by a respective second user for a respective virtual power plant capacity unit, wherein the respective virtual power plant capacity unit corresponds to a respective available power capacity associated with the respective second user.

13. The method of claim 12, further comprising:

receiving a forward commodity contract between the one or more first users and the respective second user, wherein the forward commodity contract corresponds to the respective offer price; and arranging for a physical delivery corresponding to the respective virtual power plant capacity unit, wherein the physical delivery comprises power transfer using one or more power transmission lines, power transfer using one or more vehicles, or combinations thereof.

14. The method of claim 1, wherein transmitting the transaction input data comprises:

determining one or more power costs associated with the one or more first users, wherein the one or more power costs comprise one or more power consumptions costs associated with the plurality of power devices, one or more power generation costs associated with the plurality of power devices, one or more transportation costs, one or more emissions costs, one or more pollution costs, one or more health costs, one or more virtual work environment costs, one or more virtual transportation costs, or combinations thereof;

determining one or more net savings values associated with the one or more first users based on the one or more power costs, the plurality of optimized power objects, and the market depth data, wherein the one or more net savings values correspond to one or more financial savings associated with the one or more first users, one or more pollution savings associated with the one or more first users, or combinations thereof; and transmitting the transaction input data from the one or more first users based on the one or more net savings values.

15. The method of claim 8, wherein:

the one or more user preferences comprise one or more preferences relating to motor life associated with the plurality of power devices, one or more power costs associated with the one or more first users, or combinations thereof; and the one or more power costs comprise one or more power consumptions costs associated with the plurality of power devices, one or more power generation costs associated with the plurality of power devices, one or more transportation costs, one or more emissions costs, one or more pollution costs, one or more health costs, one or more virtual work environment costs, one or more virtual transportation costs, or combinations thereof.

16. A computing system, comprising:

one or more processors; and at least one memory comprising program instructions executable by the one or more processors to:

determine power portfolio data for one or more first users having a plurality of power devices, wherein the power portfolio data comprises a plurality of power data objects corresponding to the plurality of power devices;

determine a plurality of optimized weight values for the plurality of power data objects based on the power portfolio data;

determine a plurality of optimized power objects based on the plurality of optimized weight values, wherein the plurality of optimized power objects is a subset of the plurality of power data objects;

receive market depth data for one or more virtual power plant capacity units of a virtual power plant capacity exchange, wherein:

the one or more virtual power plant capacity units correspond to available power capacity configured for physical transfer for one or more second users of the virtual power plant capacity exchange; and the market depth data comprises data indicating one or more bid prices and one or more offer prices from the one or more second users for the one or more virtual power plant capacity units; and transmit transaction input data from the one or more first users based on the plurality of optimized power objects and the market depth data, wherein the transaction input data comprises data indicating an acceptance or a rejection by the one or more first users of the one or more bid prices or the one or more offer prices.

17. The computing system of claim 16, wherein the power portfolio data further comprises data corresponding to historical power consumption by the plurality of power devices, historical power generation by the plurality of power devices, current power consumption by the plurality of power devices, current power generation by the plurality of power devices, future power consumption by the plurality of power devices, future power generation by the plurality of power devices, or combinations thereof.

18. The computing system of claim 16, wherein the plurality of power devices comprises one or more power generation devices and one or more power consumption devices.

19. A non-transitory computer-readable medium having stored thereon a plurality of computer-executable instructions which, when executed by a computer, causes the computer to:

determine power portfolio data for one or more first users having a plurality of power devices, wherein the power portfolio data comprises a plurality of power data objects corresponding to the plurality of power devices;

determine a plurality of optimized weight values for the plurality of power data objects based on the power portfolio data;

determine a plurality of optimized power objects based on the plurality of optimized weight values, wherein the plurality of optimized power objects is a subset of the plurality of power data objects;

receive market depth data for one or more virtual power plant capacity units of a virtual power plant capacity exchange, wherein:

the one or more virtual power plant capacity units correspond to available power capacity configured for physical transfer for one or more second users of the virtual power plant capacity exchange; and the market depth data comprises data indicating one or more bid prices and one or more offer prices from the one or more second users for the one or more virtual power plant capacity units; and transmit transaction input data from the one or more first users based on the plurality of optimized power objects and the market depth data, wherein the transaction input data comprises data indicating an acceptance or a rejection by the one or more first users of the one or more bid prices or the one or more offer prices.

20. The non-transitory computer-readable medium of claim 19, wherein:

the one or more power generation devices comprise one or more solar power generating devices, one or more battery devices, one or more wind power generating devices, one or more biomass power generating devices, one or more geothermal power generating devices, one or more hydroelectric power generating devices, one or more tidal power generating devices, one or more hydrogen power generating devices, one or more lunar power generating devices, one or more plant power generating devices, one or more chlorophyll power generating devices, or combinations thereof; and the one or more power consumption devices comprise one or more computing devices, one or more electronic devices, one or more lighting devices, one or more lamps, one or more appliances, one or more smart meters, one or more vehicles, or combinations thereof.

\* \* \* \* \*